US012078952B2

(12) United States Patent
Kashiide et al.

(10) Patent No.: US 12,078,952 B2
(45) Date of Patent: Sep. 3, 2024

(54) TONER CARTRIDGE, TONER SUPPLYING MECHANISM AND SHUTTER

(71) Applicant: CANON KABUSHIKI KAISHA, Tokyo (JP)

(72) Inventors: Yosuke Kashiide, Tokyo (JP); Takashi Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/124,675

(22) Filed: Mar. 22, 2023

(65) Prior Publication Data

US 2023/0221677 A1 Jul. 13, 2023

Related U.S. Application Data

(60) Division of application No. 17/506,803, filed on Oct. 21, 2021, now Pat. No. 11,703,793, which is a (Continued)

(30) Foreign Application Priority Data

Aug. 1, 2014 (JP) ................................ 2014-158119
Aug. 1, 2014 (JP) ................................ 2014-158120
Feb. 20, 2015 (JP) ................................ 2015-032063

(51) Int. Cl.

*G03G 15/08* (2006.01)
*G03G 21/16* (2006.01)
*G03G 21/18* (2006.01)

(52) U.S. Cl.

CPC ......... *G03G 21/1647* (2013.01); *G03G 15/08* (2013.01); *G03G 15/0877* (2013.01); (Continued)

(58) Field of Classification Search

CPC ............... G03G 21/1647; G03G 15/08; G03G 15/0877; G03G 15/0886; G03G 21/1676; G03G 21/1832; G03G 2215/067
(Continued)

(56) References Cited

U.S. PATENT DOCUMENTS 5,548,384 A 8/1996 Weed
5,579,101 A 11/1996 Omata et al.
(Continued)

FOREIGN PATENT DOCUMENTS

CL 201000577 A 3/2011
CL 2010000577 11/2011
(Continued)

OTHER PUBLICATIONS

Jan. 9, 2024 Office Action in Japanese Patent Application No. 2022-186243 (with English translation).
(Continued)

*Primary Examiner* — Walter L Lindsay, Jr.
*Assistant Examiner* — Frederick Wenderoth
(74) *Attorney, Agent, or Firm* — Venable LLP

(57) ABSTRACT

According to a first aspect of the present invention, there is provided a toner cartridge detachably mountable to a receiving device, the toner cartridge comprising a container including a accommodating portion for accommodating the toner and a discharge opening for discharging the toner from the accommodating portion into the receiving device; and an open/close member including a closing portion for closing the discharge opening and an engaging portion movable relative to the closing portion, the open/close member being rotatable relative to the container between (a) an opening position for causing the closing portion to open the discharge opening and (b) a closing position for causing the closing portion to close the discharge opening, wherein the engaging
(Continued)

portion is movable relative to the closing portion between (c) a engaging position for engagement with the receiving device to receive a force for moving the open/close member from the opening position to the closing position when the toner cartridge is dismounted from the receiving device and (d) a retracted position retracted from the engaging position, and wherein the engaging portion is movable from the retracted position to the engaging position with rotation of the open/close member from the closing position to the opening position.

9 Claims, 63 Drawing Sheets

Related U.S. Application Data division of application No. 17/231,105, filed on Apr. 15, 2021, now Pat. No. 11,650,536, which is a division of application No. 16/884,426, filed on May 27, 2020, now Pat. No. 11,022,934, which is a division of application No. 16/427,877, filed on May 31, 2019, now Pat. No. 11,714,374, which is a division of application No. 15/417,931, filed on Jan. 27, 2017, now Pat. No. 10,761,472, which is a continuation of application No. PCT/JP2015/072438, filed on Jul. 31, 2015.

(52) U.S. Cl.
CPC ..... *G03G 15/0886* (2013.01); *G03G 21/1676* (2013.01); *G03G 21/1832* (2013.01); *G03G 2215/067* (2013.01); *G03G 2215/0692* (2013.01)

(58) Field of Classification Search
USPC .......................................................... 399/262
See application file for complete search history.

(56) References Cited

U.S. PATENT DOCUMENTS

| | | | |
|---|---|---|---|
| 5,608,501 | A | 3/1997 | Makino |
| 5,991,571 | A | 11/1999 | Yamada et al. |
| 6,185,401 | B1 | 2/2001 | Kanamori et al. |
| 6,292,644 | B1 | 9/2001 | Goto et al. |
| 6,400,916 | B1 | 6/2002 | Go et al. |
| 6,453,135 | B1 | 9/2002 | Sameshima et al. |
| 6,456,809 | B1 | 9/2002 | Seikiguchi |
| 8,583,001 | B2 | 11/2013 | Kubo et al. |
| 9,052,640 | B2 | 6/2015 | Kashiide et al. |
| 9,213,306 | B2 | 12/2015 | Morioka et al. |
| 9,256,161 | B2 | 2/2016 | Hayashi et al. |
| 9,377,714 | B2 | 6/2016 | Nakazawa et al. |
| 9,429,906 | B2 | 8/2016 | Yoshimura et al. |
| 9,465,318 | B2 | 10/2016 | Takeuchi et al. |
| 9,523,942 | B2 | 12/2016 | Takeuchi et al. |
| 9,541,863 | B2 | 1/2017 | Kashiide et al. |
| 2004/0161266 | A1 | 8/2004 | Ban et al. |
| 2004/0265012 | A1 | 12/2004 | Hasebe |
| 2005/0135841 | A1 | 6/2005 | Murakami et al. |
| 2006/0193652 | A1 | 8/2006 | Sato |
| 2008/0013988 | A1 | 1/2008 | Murakami et al. |
| 2008/0080903 | A1 | 4/2008 | Noguchi |
| 2008/0181661 | A1 | 7/2008 | Mase et al. |
| 2008/0213004 | A1 | 9/2008 | Sasae et al. |
| 2008/0260422 | A1 | 10/2008 | Sasae et al. |
| 2009/0129813 | A1 | 5/2009 | Nagashima et al. |
| 2009/0297226 | A1 | 12/2009 | Nagashima et al. |
| 2010/0260516 | A1 | 10/2010 | Sato |
| 2011/0217068 | A1 | 9/2011 | Kamimura et al. |
| 2012/0099901 | A1 | 4/2012 | Sakai |
| 2012/0114386 | A1 | 5/2012 | Takashima |
| 2012/0114390 | A1 | 5/2012 | Ozawa et al. |
| 2012/0219330 | A1 | 8/2012 | Kikuchi et al. |
| 2012/0251165 | A1 | 10/2012 | Mushika et al. |
| 2012/0257912 | A1 | 10/2012 | Hasebe |
| 2012/0308270 | A1 | 12/2012 | Hayakawa et al. |
| 2013/0084106 | A1 | 4/2013 | Tsuda et al. |
| 2013/0121731 | A1 | 5/2013 | Takashima |
| 2013/0170867 | A1 | 7/2013 | Acosta et al. |
| 2013/0170868 | A1 | 7/2013 | Acosta et al. |
| 2013/0216272 | A1 | 8/2013 | Koshimori et al. |
| 2013/0243491 | A1 | 9/2013 | Nodera et al. |
| 2013/0259533 | A1 | 10/2013 | Hayashi et al. |
| 2014/0072327 | A1 | 3/2014 | Hayashi et al. |
| 2014/0153974 | A1 | 6/2014 | Jimba et al. |
| 2016/0033903 | A1 | 2/2016 | Eto |
| 2017/0010580 | A1 | 1/2017 | Yoshimura et al. |
| 2017/0060033 | A1 | 3/2017 | Takeuchi et al. |
| 2017/0139372 | A1* | 5/2017 | Kashiide ................ G03G 15/08 |

FOREIGN PATENT DOCUMENTS

| | | | |
|---|---|---|---|
| CL | 201401370 | A | 10/2014 |
| CL | 201401369 | A | 11/2014 |
| CL | 2017-000228 | A | 7/2017 |
| CN | 1619431 | A | 5/2005 |
| CN | 1828442 | A | 9/2006 |
| CN | 2849776 | Y | 12/2006 |
| CN | 101154075 | A | 4/2008 |
| CN | 102467016 | A | 5/2012 |
| CN | 102467019 | A | 5/2012 |
| CN | 102736365 | A | 10/2012 |
| CN | 103034094 | A | 4/2013 |
| CN | 103365165 | A | 10/2013 |
| CN | 103733141 | A | 4/2014 |
| CN | 103309206 | A | 9/2014 |
| EP | 1 780 606 | A2 | 5/2007 |
| EP | 2 624 068 | A1 | 8/2013 |
| JP | H07-199623 | A | 8/1995 |
| JP | H07-225514 | A | 8/1995 |
| JP | H07-306859 | A | 11/1995 |
| JP | H08-320634 | A | 12/1996 |
| JP | H10-55103 | A | 2/1998 |
| JP | 3450757 | A | 9/2003 |
| JP | 2005-173568 | A | 6/2005 |
| JP | 2005-211831 | A | 8/2005 |
| JP | 2005-221831 | A | 8/2005 |
| JP | 2005-326869 | A | 11/2005 |
| JP | 2006-139069 | A | 6/2006 |
| JP | 2006-139070 | A | 6/2006 |
| JP | 2006-189675 | A | 7/2006 |
| JP | 2006-243763 | A | 9/2006 |
| JP | 2006-343359 | A | 12/2006 |
| JP | 1 780 606 | A | 5/2007 |
| JP | 2007-178972 | A | 7/2007 |
| JP | 2017-178972 | A | 7/2007 |
| JP | 2008-015106 | A | 1/2008 |
| JP | 2008-134526 | A | 6/2008 |
| JP | 2008-185827 | A | 8/2008 |
| JP | 2009-122213 | A | 6/2009 |
| JP | 4328773 | B2 | 9/2009 |
| JP | 4579655 | B2 | 11/2010 |
| JP | 2011-076062 | A | 4/2011 |
| JP | 2011-186067 | A | 9/2011 |
| JP | 2011-257488 | A | 12/2011 |
| JP | 2012-037555 | A | 2/2012 |
| JP | 2013-015826 | A | 1/2013 |
| JP | 2013-105113 | A | 5/2013 |
| JP | 2013-0096173 | A | 8/2013 |
| JP | 2013-205441 | A | 10/2013 |
| JP | 2013-213910 | A | 10/2013 |
| JP | 2013-218276 | A | 10/2013 |
| JP | 5500199 | A | 5/2014 |
| JP | 2014-182265 | A | 9/2014 |
| JP | 7187651 | B2 | 12/2022 |
| KR | 10-2012-0042609 | A | 5/2012 |

(56) References Cited

FOREIGN PATENT DOCUMENTS

| | | |
|---|---|---|
| KR | 20130096173 A | 8/2013 |
| RU | 2 398 257 C2 | 8/2010 |

OTHER PUBLICATIONS

May 4, 2023 Notice of Allowance in Philippines Patent Application No. 1/2019/502641.
Jan. 31, 2024 Extended Search Report in European Patent Application No. 23 200 453.1.
Jan. 26, 2024 Notice of Allowance in Korean Patent Application No. 10-2022-7024157.
International Search Report and Written Opinion for International Patent Application No. PCT/JP2015/072438.
English translation of Japanese Patent Laid-Open No. 2008-134526.
English translation of Japanese Patent Laid-Open No. 2009-122213.
Office Action in Australian Patent Application No. 201597380, dated Feb. 9, 2018.
Notice of Allowance in Korean Patent Application No. 10-2017-7002635, mailed Mar. 19, 2018.
Extended Search Report in European Patent Application No. 15 82 6664.3, issued Mar. 28, 2018.
Office Action in Russian Patent Application No. 2017106174, dated Mar. 26, 2018 (with English translation).
Office Action in Taiwanese Patent Application No. 106115850, dated Jun. 5, 2018.
Office Action in Columbia Patent Application No. NC2017/0001950, dated Jun. 18, 2018 (with English translation).
Decision on Grant in Russian Patent Application No. 2017106174, mailed Jul. 27, 2018 (with English translation).
Office Action in Chilean Patent Application No. 201700228, mailed Jan. 16, 2019 (with English translation).
Office Action in Columbia Patent Application No. NC2017/0001950, dated Dec. 11, 2018 (with English translation).
Nov. 5, 2018 Office Action in Canadian Patent Application No. 2,956,560.
Nov. 21, 2018 Intention to Grant in European Patent Application No. 15 826 664.3.
Nov. 9, 2018 Office Action in Korean Patent Application No. 10-2018-7017298.
Office Action in Taiwanese Patent Application No. 104124916, dated Oct. 7, 2016.
Decision to Grant in Russian Patent Application No. 2018136223, mailed May 21, 2019 (with English translation).
May 27, 2019 Office Action in Chinese Patent Application No. 201580052038.6 (with English Translation).
Sep. 6, 2019 Office Action in Philippines Patent Application No. 1/2017/500183.
Office Action in European Patent Application No. 19164338.6, dated Aug. 19, 2019.
Office Action in Indian Patent Application No. 201747006969, dated Dec. 17, 2019.
Decision to Grant in Russian Patent Application No. 2019123845, mailed Dec. 17, 2019 (with English translation).
Examination Report in Australian Patent Application No. 2019200130, issued Jan. 30, 2020.
Examination Report in Australian Patent Application No. 2019200837, issued Feb. 5, 2020.
Mar. 13, 2020 Office Action in Chinese Patent Application No. 201580052038.6 (with English translation).
May 8, 2020 Notice of Allowance in Taiwanese Patent Application No. 108100624.
Notice of Allowance in Korean Patent Application Pub. No. 10-2018-7017298, dated Aug. 9, 2019.
Office Action in Chilean Patent Application No. 201700228, dated Aug. 13, 2019.
May 26, 2020 Office Action in Brazilian Patent Application No. BR122018 015123-4 (with partial English translation).
May 26, 2020 Office Action in Brazilian Patent Application No. BR112017001779-2 (with partial English translation).
May 26, 2020 Office Action in Brazilian Patent Application No. BR122018015122-6 (with partial English translation).
May 27, 2020 Office Action in Korean Patent Application No. 10-2019-7033171.
Jun. 7, 2020 Office Action in U.A.E. Patent Application No. UAE/P/6000082/2017.
Jun. 30, 2020 Office Action in Malaysian Patent Application No. PI 2017700329.
Sep. 1, 2020 Decision to Grant in Russian Patent Application No. 2020113698 (with English translation).
Sep. 25, 2020 Office Action in Chilean Patent Application No. 201901917.
Oct. 22, 2020 Notice of Allowance in Philippines Patent Application No. 1/2017/500183.
Search Report dated Oct. 29, 2020 in counterpart Philippines Application No. 1/2019/502641.
English translation of Japanese Patent Application Pub. No. 2013-205441 A.
English translation of Japanese Patent Application Pub. No. 2014-182265 A.
Mar. 18, 2021 Office Action in Russian Patent Application No. 2020136609 (with English translation).
Mar. 25, 2021 Notice of Allowance in Korean Patent Application No. 10-2019-7033171.
Mar. 19, 2021 Office Action in Chilean Patent Application No. 201901917.
Jul. 14, 2021 Office Action in Indian Patent Application No. 202048023986.
Jul. 20, 2021 Office Action in Japanese Patent Application No. 2020-131847.
Sep. 7, 2021 Office Action in Korean Patent Application No. 10-2021-7019288.
Jul. 23, 2021 Office Action in Philippines Patent Application No. 1/2020/500545.
Jul. 23, 2021 Office Action in Philippines Patent Application No. 1/2020/500546.
Jul. 23, 2021 Office Action in Philippines Patent Application No. 1/2020/500547.
Jul. 21, 2022 Office Action in Mexican Patent Application No. MX/a/2021/000122 (with English translation).
May 4, 2023 Examination Report in Philippines Patent Application No. 1/2020/500545.
May 4, 2023 Examination Report in Philippines Patent Application No. 1/2020/500547.
Sep. 27, 2023 Office Action in Chinese Patent Application No. 202011560083.1.
Sep. 20, 2023 Office Action in Chinese Patent Application No. 202011558942.3.
Sep. 28, 2023 Office Action in Chinese Patent Application No. 202011559730.7.
Sep. 29, 2023 Office Action in Chinese Patent Application No. 202011559827.8.
Sep. 21, 2023 Office Action in Chinese Patent Application No. 202011559203.6.
Mar. 4, 2022 Office Action in Mexican Patent Application No. MX/a/2021/000034 (with English translation).
Apr. 14, 2022 Notice of Allowance in Korean Patent Application No. 10-2021-7019288.
Apr. 12, 2022 Office Action in Chilean Patent Application No. 202100597.
May 19, 2022 Extended Search Report in European Patent Application No. 22 152 641.1.
Aug. 23, 2022 Office Action in Brazilian Patent Application No. 112017001779-2 (with English translation).
Aug. 8, 2022 Office Action in Philippines Patent Application No. 1/2020/500545.
Aug. 8, 2022 Office Action in Philippines Patent Application No. 1/2020/500547.
Sep. 16, 2022 Office Action in Philippines Patent Application No. 1/2019/502641.

(56) References Cited

OTHER PUBLICATIONS

Nov. 25, 2022 Notice of Acceptance in Australian Patent Application No. 2021200529.
Jan. 18, 2023 Office Action in Korean Patent Application No. 10-2022-7024157 (with English translation).
Oct. 17, 2023 Office Action in Japanese Patent Application No. 2022-186243 (with English translation).
Aug. 21, 2023 Office Action in Korean Patent Application No. 10-2022-7024157.
Mar. 20, 2023 Search and Examination Report in United Arab Emirates Patent Application No. P6000082/2017.

* cited by examiner (a)

(b)

(c)

(d)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

(a)

(b)

(a)

(b)

(a)

(b)

(a)

(b)

(a)

(b)

(c)

(a)

(b)

(a)

(b)

(a)

(b)

(a)

(b)

(a)

(b)

TONER CARTRIDGE, TONER SUPPLYING MECHANISM AND SHUTTER

FIELD OF THE INVENTION

The present invention relates to a toner cartridge, a toner supplying mechanism and a shutter for an electrophotographic image formation.

BACKGROUND ART

In the field of an electrophotographic type image forming apparatus, it is known that elements such as a photosensitive drum and/or a developing roller as a rotatable member contributable to image formation are unified into a cartridge, which is detachably mountable to the main assembly of the image forming apparatus (main assembly).

As one of such a cartridge detachably mountable to the image forming apparatus, there is known a toner cartridge which is exchangeable and which does not include the photosensitive drum or the developing roller, the toner cartridge containing toner (developer) which is to be consumed with the image formation.

With such a structure, the toner (developer) is discharged through the discharge opening from the toner cartridges into a developing device including the developing roller and so on. In addition, in order to prevent the toner from leaking out through the discharge opening, an open/close member such as a shutter for opening and closing the discharge opening is provided.

Japanese Laid-open Patent Application Hei 7-199623, for example discloses a structure in which when a cylindrical toner cartridge (developer supply container) is mounted to the main assembly of the image forming apparatus, the toner cartridge is rotated by which the shutter is opened.

SUMMARY OF THE INVENTION

Problem to be Solved

It is an object of the present invention to provide a further development of the above-described conventional structure.

Means for Solving the Problem

According to a first aspect of the present invention, there is provided a toner cartridge detachably mountable to a receiving device, said toner cartridge comprising a container including a accommodating portion for accommodating the toner and a discharge opening for discharging the toner from said accommodating portion into the receiving device; and an open/close member including a closing portion for closing said discharge opening and an engaging portion movable relative to said closing portion, said open/close member being rotatable relative to said container between (a) an opening position for causing said closing portion to open said discharge opening and (b) a closing position for causing said closing portion to close said discharge opening, wherein said engaging portion is movable relative to said closing portion between (c) a engaging position for engagement with the receiving device to receive a force for moving said open/close member from the opening position to the closing position when said toner cartridge is dismounted from the receiving device and (d) a retracted position retracted from the engaging position, and wherein said engaging portion is movable from the retracted position to the engaging position with rotation of said open/close member from the closing position to the opening position.

According to a second aspect of the present invention, there is provided a toner cartridge detachably mountable to a receiving device, said toner cartridge comprising a container including a accommodating portion for accommodating the toner and a discharge opening for discharging the toner from said accommodating portion into the receiving device; and an open/close member including a closing portion for closing said discharge opening and an engaging portion movable relative to said closing portion, said open/close member being rotatable relative to said container between (a) an opening position for causing said closing portion to open said discharge opening and (b) a closing position for causing said closing portion to close said discharge opening, wherein said engaging portion is movable relative to said closing portion between (c) a engaging position for engagement with the receiving device to receive a force for moving said open/close member from the opening position to the closing position when said toner cartridge is dismounted from the receiving device and (d) a retracted position retracted from the engaging position, and wherein said engaging portion is movable from the engaging position to the retracted position with rotation of said open/close member from the opening position to the closing position.

According to a third aspect of the present invention, there is provided a toner cartridge detachably mountable to a receiving device by a mounting operation including a rotating operation, said toner cartridge comprising a container including a accommodating portion for accommodating the toner and a discharge opening for discharging the toner from said accommodating portion into the receiving device; and an open/close member including a closing portion for closing said discharge opening and a engaging portion movable relative to said closing portion, said open/close member being movable relative to said container between (a) a opening position for causing said closing portion to open said discharge opening and (b) a closing position for causing said closing portion to close said discharge opening, wherein said engaging portion is movable relative to said closing portion between (c) a engaging position for engagement with the receiving device to receive a force for moving said open/close member from the opening position to the closing position when said toner cartridge is dismounted from the receiving device and (d) a retracted position retracted from the engaging position, and wherein said engaging portion is movable from the retracted position to the engaging position with the rotating operation.

According to a fourth aspect of the present invention, there is provided a toner cartridge dismountable from a receiving device by a dismounting operation including a rotating operation, said toner cartridge comprising a container including a accommodating portion for accommodating the toner and a discharge opening for discharging the toner from said accommodating portion into the receiving device; and an open/close member including a closing portion for closing said discharge opening and a engaging portion movable relative to said closing portion, said open/close member being movable relative to said container between (a) a opening position for causing said closing portion to open said discharge opening and (b) a closing position for causing said closing portion to close said discharge opening, wherein said engaging portion is movable relative to said closing portion between (c) a engaging position for engagement with the receiving device to receive a force for moving said open/close member from the opening position to the closing position when said toner cartridge is dismounted from the receiving device and (d) a retracted position retracted from the engaging position, and wherein said engaging portion is movable from the engaging position to the retracted position with the rotating operation.

According to a fifth aspect of the present invention, there is provided a toner cartridge detachably mountable to a receiving device, said toner cartridge comprising a container including a accommodating portion for accommodating the toner and a discharge opening for discharging the toner from said accommodating portion into the receiving device; and an open/close member including a closing portion for closing said discharge opening and an engaging portion movable relative to said closing portion, said open/close member being movable relative to said container between (a) an opening position for causing said closing portion to open said discharge opening and (b) a closing position for causing said closing portion to close said discharge opening, wherein said engaging portion is movable relative to said closing portion between (c) a engaging position for engagement with the receiving device to receive a force for moving said open/close member from the opening position to the closing position when said toner cartridge is dismounted from the receiving device and (d) a retracted position retracted from the engaging position, and a retracted position moving portion for moving said engaging portion from the engaging position to the retracted position with movement of said open/close member from the opening position to the closing position.

According to a sixth aspect of the present invention, there is provided a toner cartridge for electrophotographic image formation, said toner cartridge comprising a container including a accommodating portion for accommodating the toner and a discharge opening for discharging the toner; and an open/close member including a closing portion for closing said discharge opening and an engaging portion movable relative to said closing portion, said open/close member being rotatable relative to said container between an opening position for causing said closing portion to open said discharge opening and a closing position for causing said closing portion to close said discharge opening, wherein said engaging portion is movable relative to said closing portion at least in a direction of a rotational axis of said open/close member, with rotation of said open/close member between the closing position and the opening position.

According to a seventh aspect of the present invention, there is provided a toner cartridge for electrophotographic image formation, said toner cartridge comprising a container including a accommodating portion for accommodating the toner and a discharge opening for discharging the toner; and an open/close member including a closing portion for closing said discharge opening and an engaging portion movable relative to said closing portion, said open/close member being rotatable relative to said container between an opening position for causing said closing portion to open said discharge opening and a closing position for causing said closing portion to close said discharge opening, when said engaging portion is exposed at least toward an outside with respect to a direction of a rotational radius of said open/close member, and wherein said engaging portion is movable relative to said closing portion at least in the direction of the rotational radius of said open/close member, with rotation of said open/close member between the closing position and the opening position.

According to an eighth aspect of the present invention, there is provided a toner cartridge for electrophotographic image formation, said toner cartridge comprising a container including a accommodating portion for accommodating the toner and a discharge opening for discharging the toner; and an open/close member including a closing portion for closing said discharge opening and an engaging portion movable relative to said closing portion, said open/close member being rotatable relative to said container between an opening position for causing said closing portion to open said discharge opening and a closing position for causing said closing portion to close said discharge opening, wherein said engaging portion including a first projection projecting toward an outside with respect to a direction of a rotational radius of said open/close member, and a second projection provided on said first projection and projecting toward a downstream side with respect to a direction in which said open/close member rotates relative to said container from the from the closing position to the opening position, and wherein said engaging portion is movable relative to said closing portion with rotation of said open/close member between the closing position and the opening position.

According to a ninth aspect of the present invention, there is provided a toner cartridge for electrophotographic image formation, said toner cartridge comprising a container including a accommodating portion for accommodating the toner and a discharge opening for discharging the toner; an open/close member movable relative to said container between an opening position for causing said closing portion to open said discharge opening and a closing position for causing said closing portion to close said discharge opening; a moving portion, provided on said container, for moving said engaging portion with movement of said open/close member from the opening position to the closing position.

According to a tenth aspect of the present invention, there is provided a shutter for use with a toner cartridge, said shutter comprising a main body portion having a substantially accurate configuration; a first arm portion provided at a longitudinal end portion of said main body portion and extending toward a widthwise end portion of said main body portion; and a first projection provided at a free end side of said first arm portion and projecting in a radially outward direction with respect to the arcuate configuration, wherein first projection is movable at least in a longitudinal direction of said main body portion.

Effects of the Invention

The above-described conventional structure can be further developed.

Figure 16:
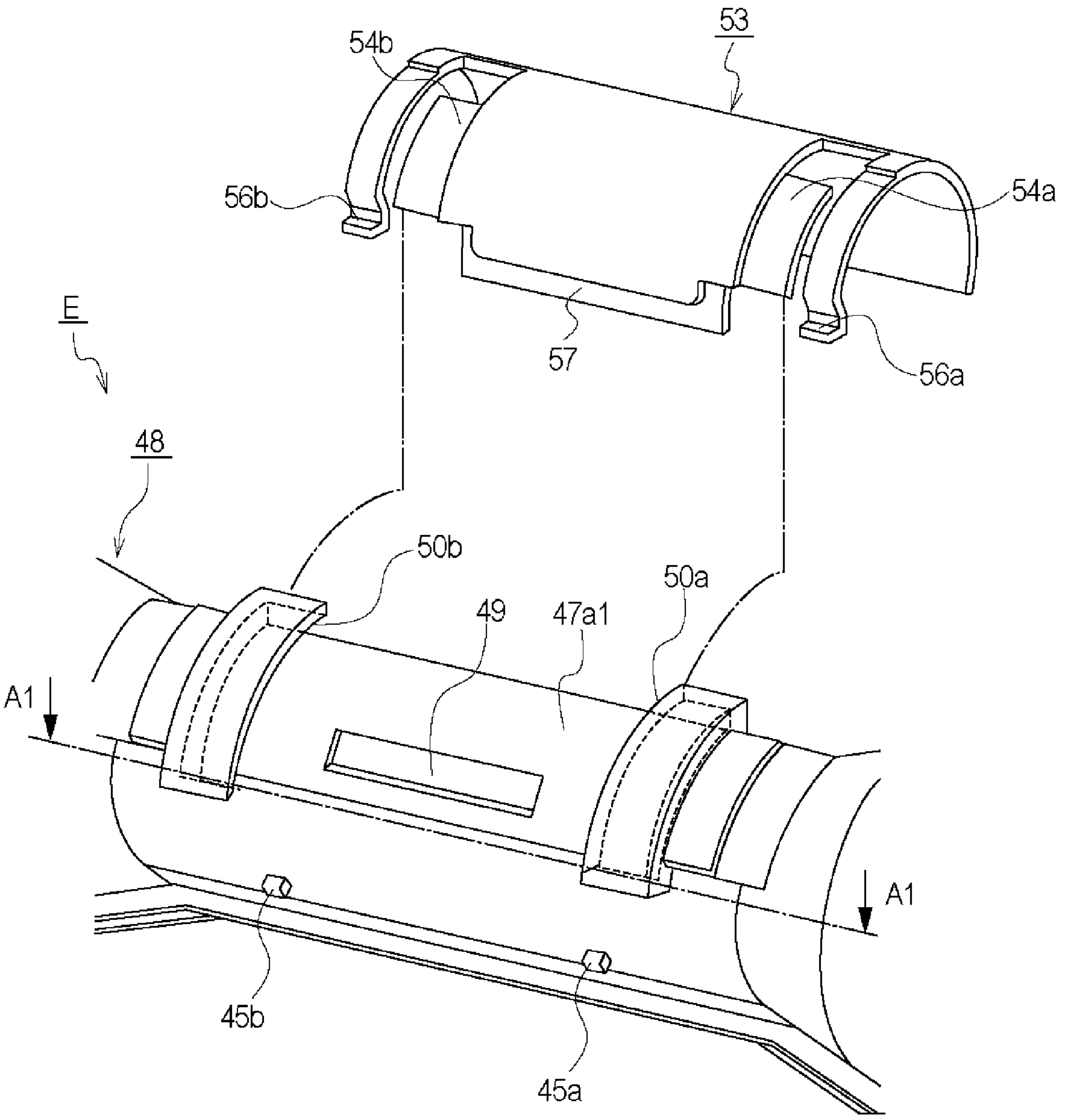
FIG. 16 is an exploded perspective view of the neighborhood of the opening of the toner cartridge.
Figure 18:
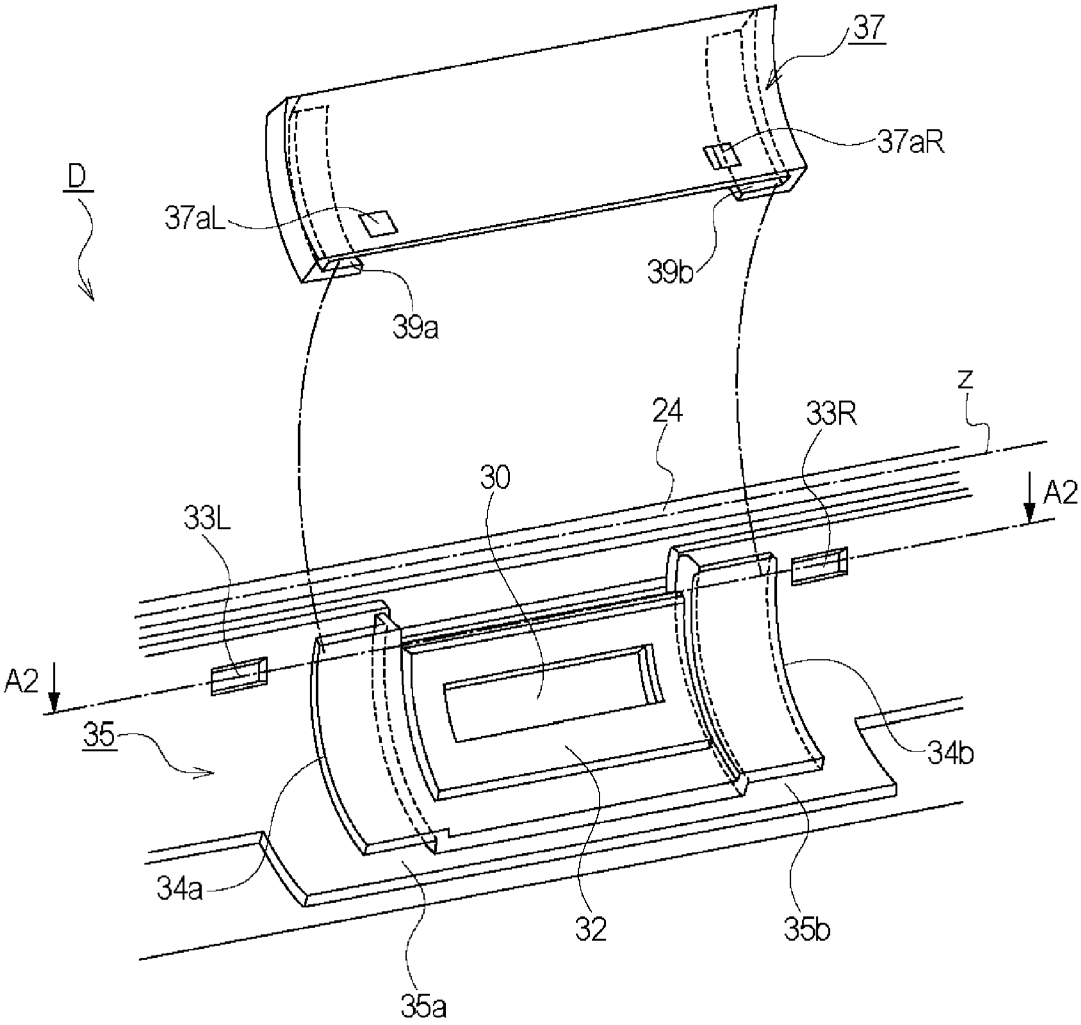
FIG. 18 is an exploded perspective view of the neighborhood of the opening of the developing unit.
Figure 20:
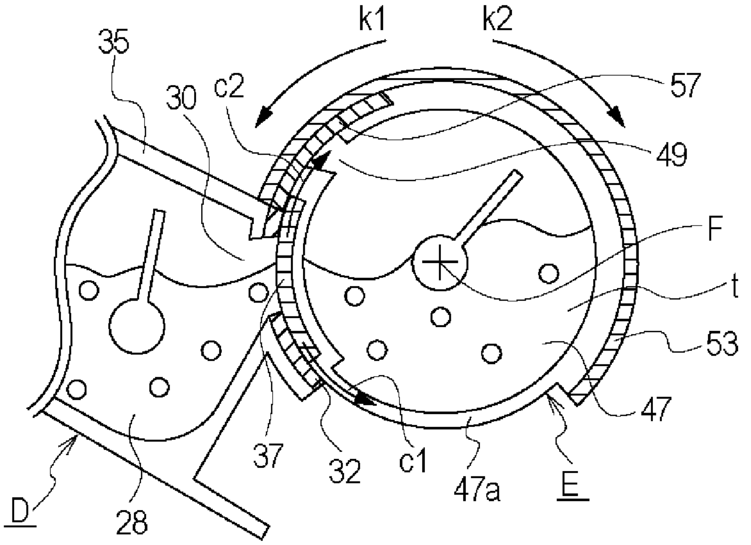
FIG. 20 is a schematic sectional side view of the toner cartridge and the developing unit.
Figure 20:
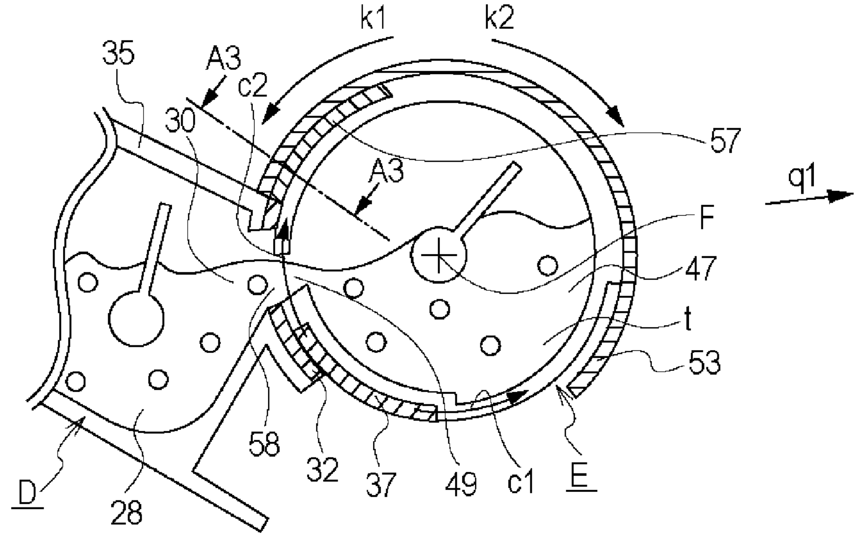
Figure 24:
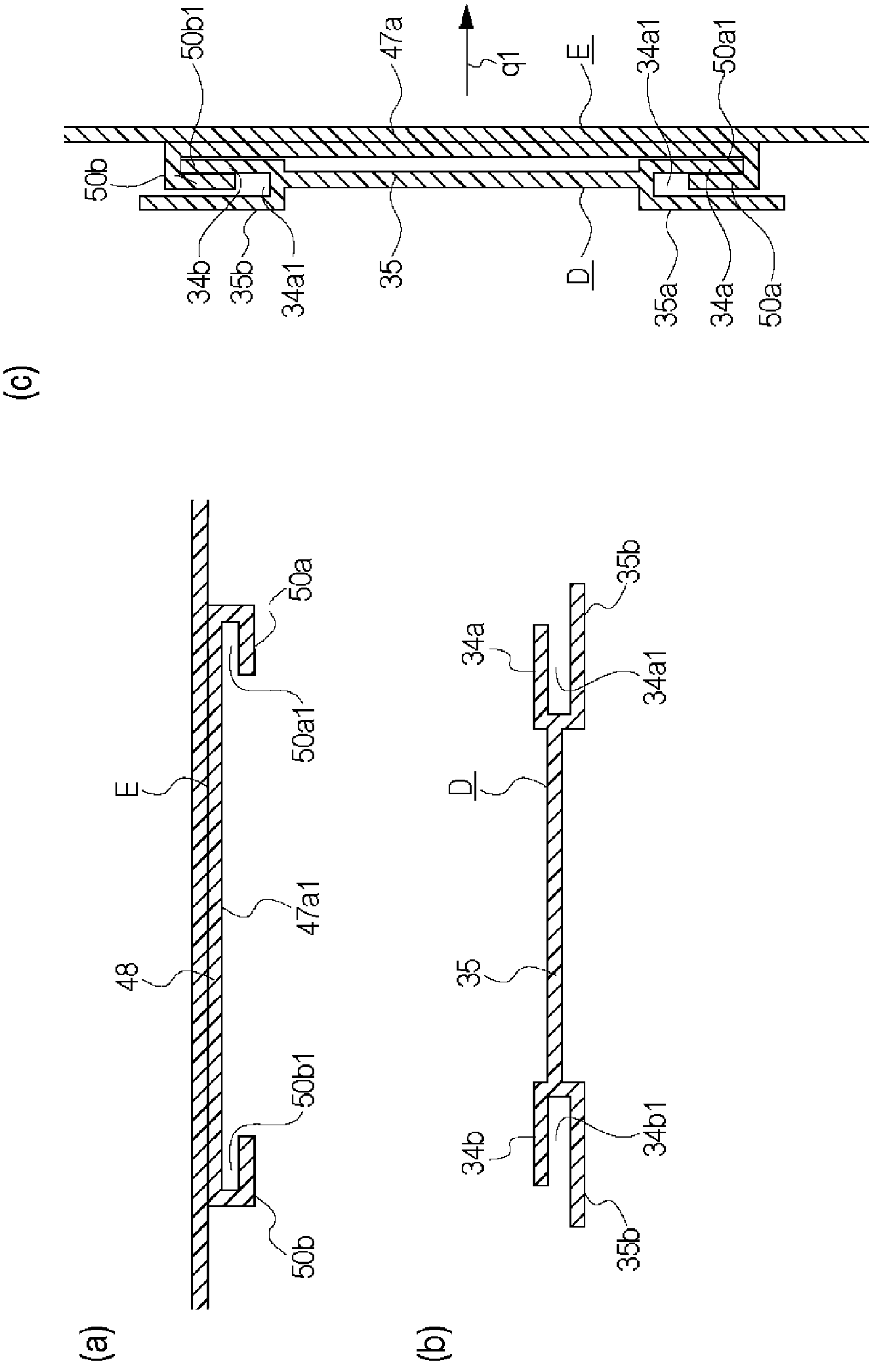

Part (a) of FIG. 24 is a sectional view taken along a line A1 of FIG. 16, part (b) is a sectional view taken along a line A2 of FIG. 18, and part (c) is a sectional view taken along a line A3 of part (b) of FIG. 20.

Figure 25:
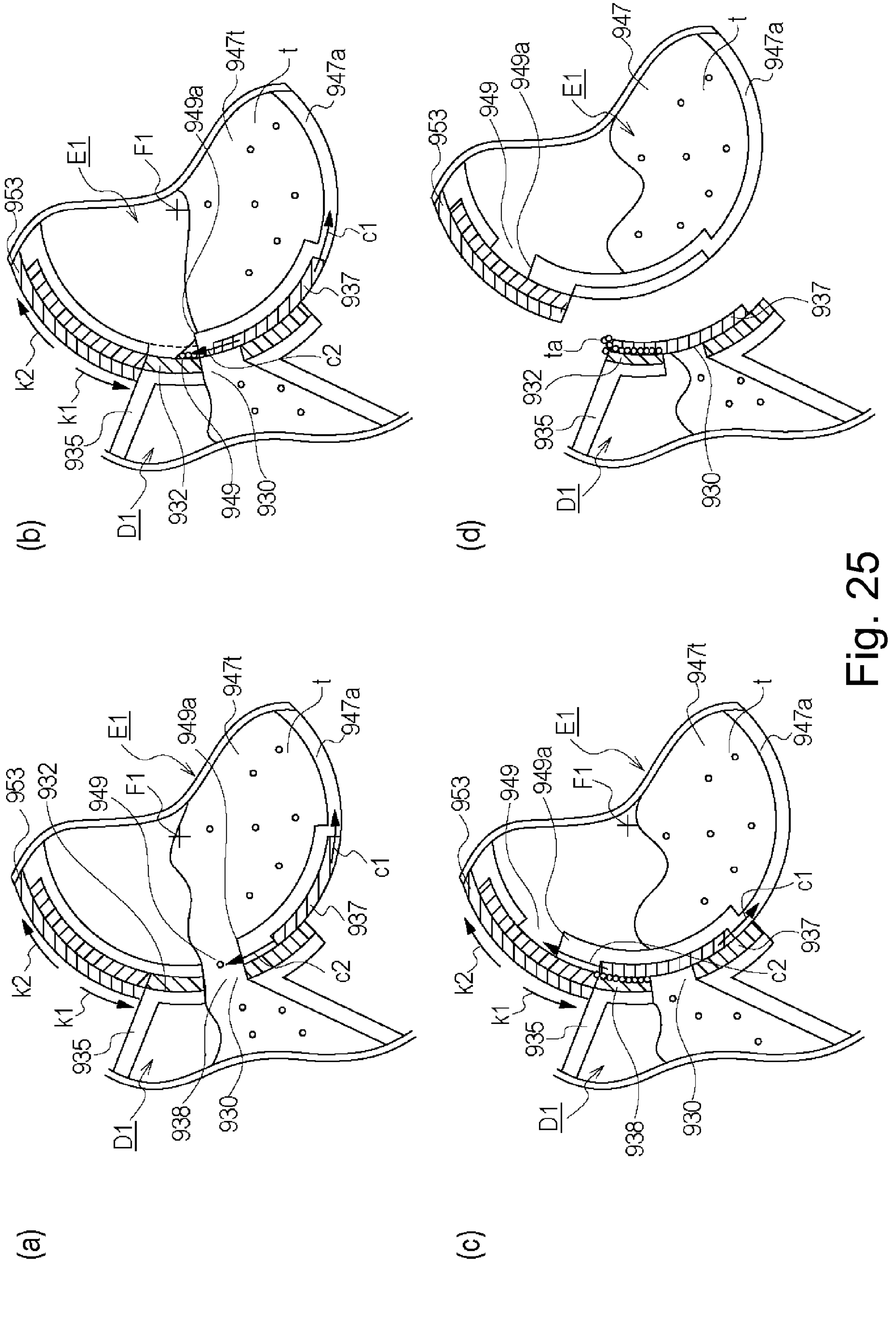

FIG. 25 is a sectional side view of the developing unit and the toner cartridge.

Figure 26:
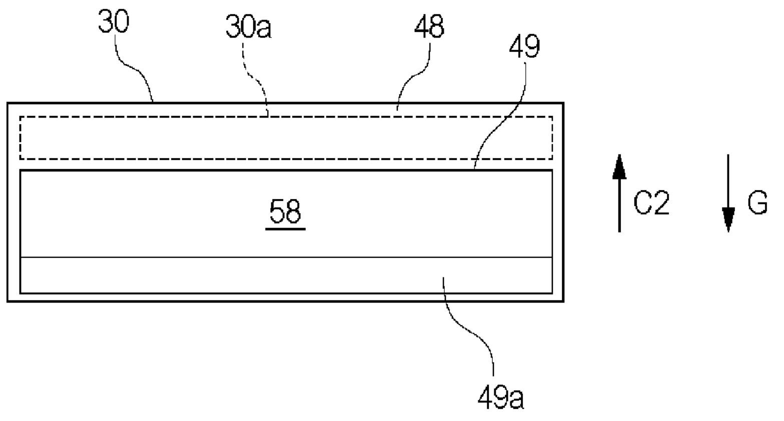

FIG. 26 is a schematic view of a communicating portion as seen from a first toner accommodating portion.

Figure 27:
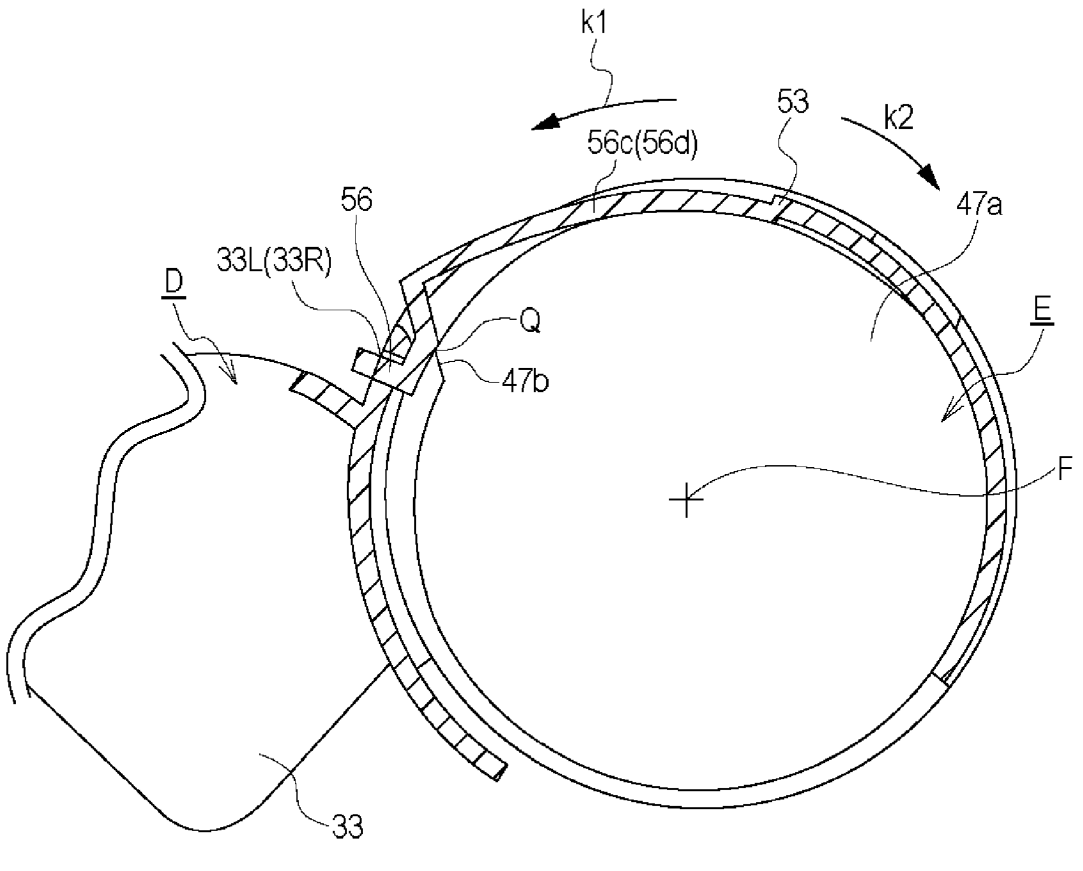

FIG. 27 is a schematic sectional view of the developing unit and the toner cartridge.

Figure 28:
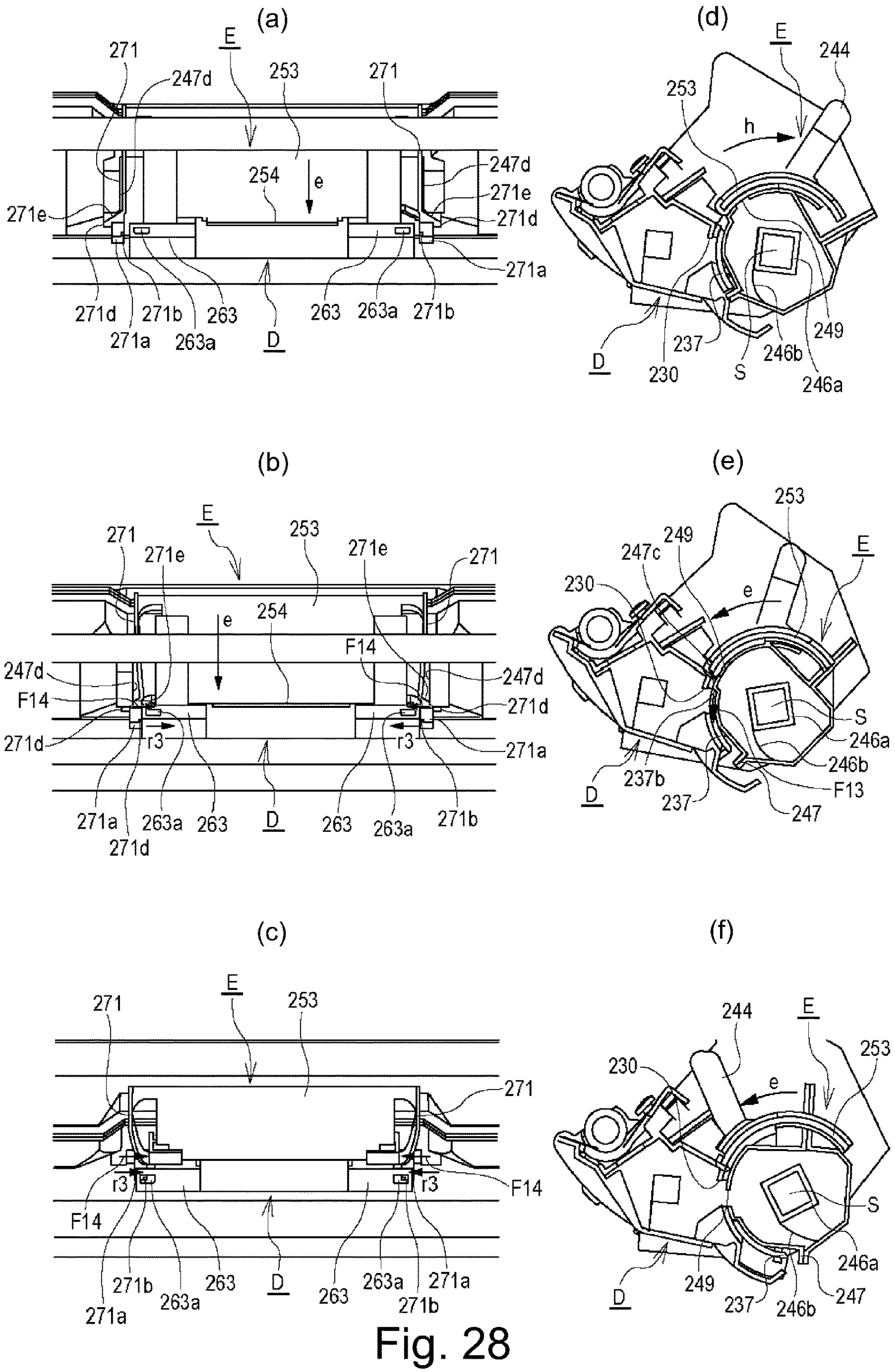

FIG. 28 illustrates an opening operation of a first shutter of the developing unit and a second shutter of the toner cartridge.

Figure 29:
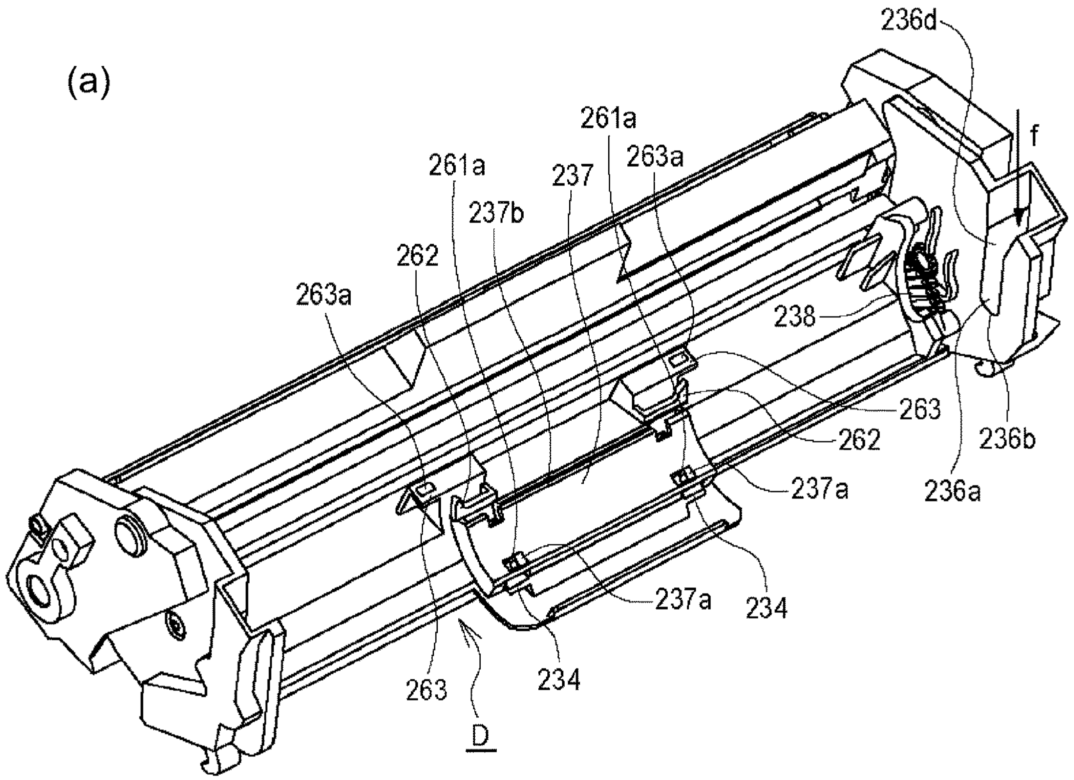
Figure 29:
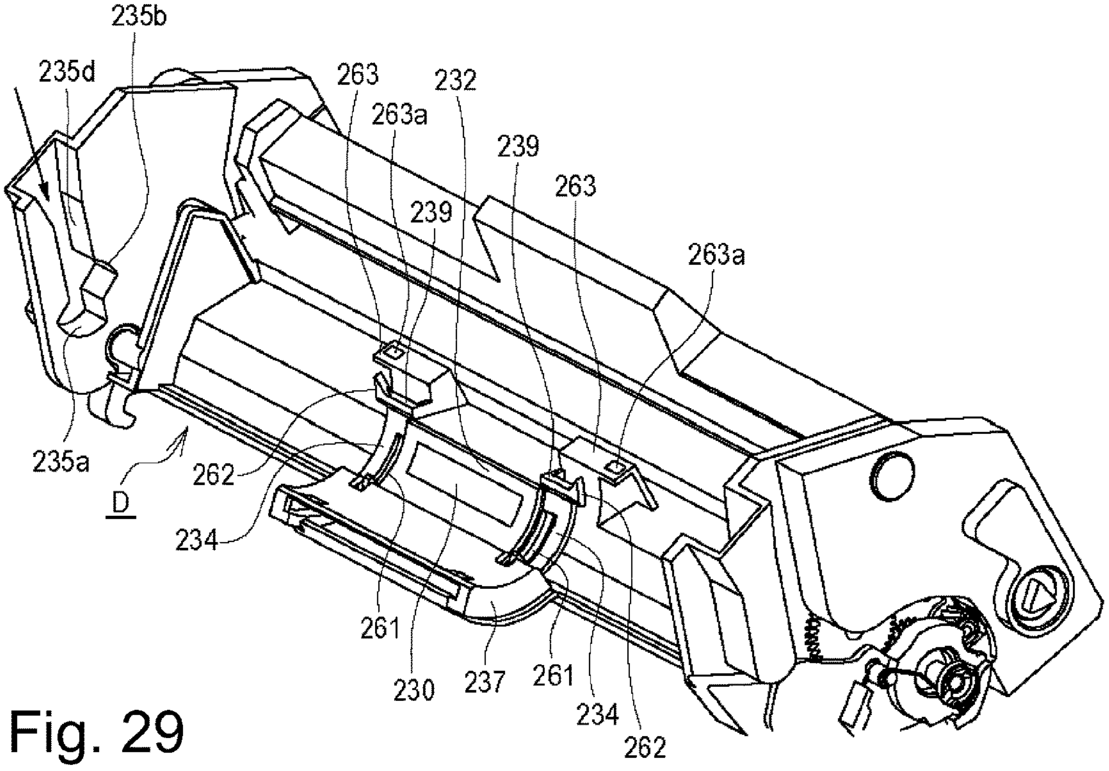

FIG. 29 illustrates detail structures of the neighborhood of a toner cartridge receiving portion of the developing unit.

Figure 30:
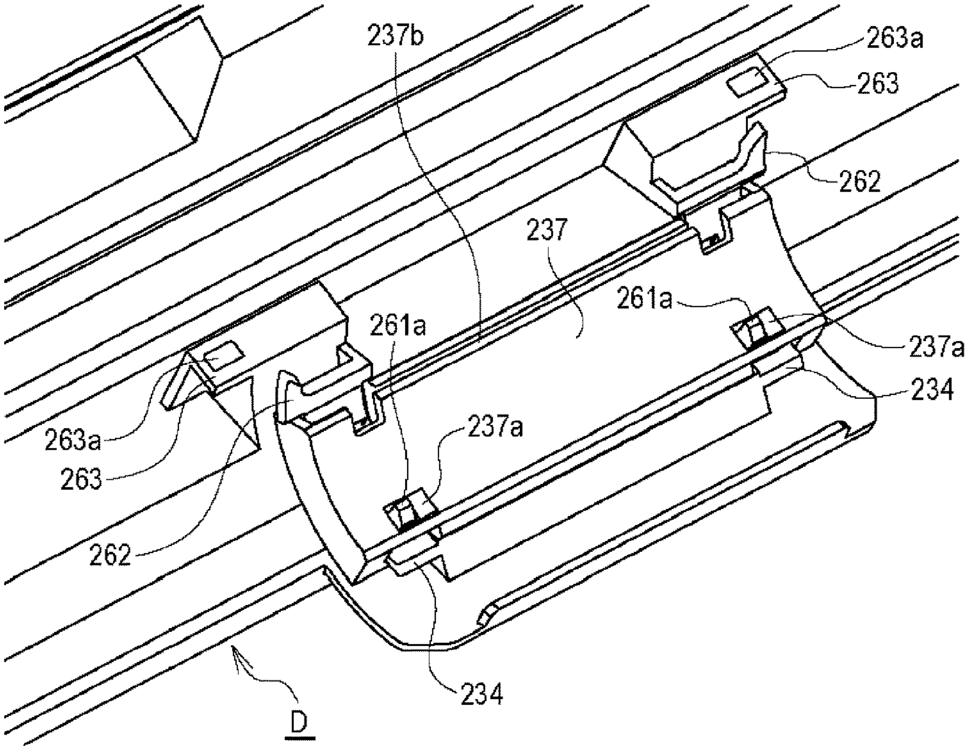
Figure 30:
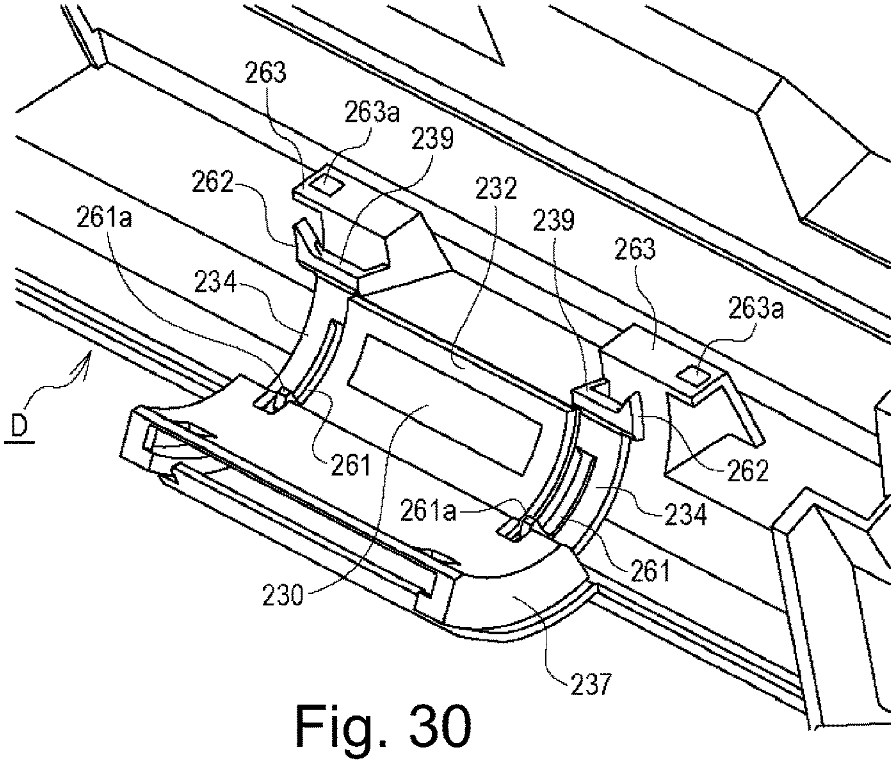

FIG. 30 illustrates detail structures of the neighborhood of a toner cartridge receiving portion of the developing unit.

Figure 31:
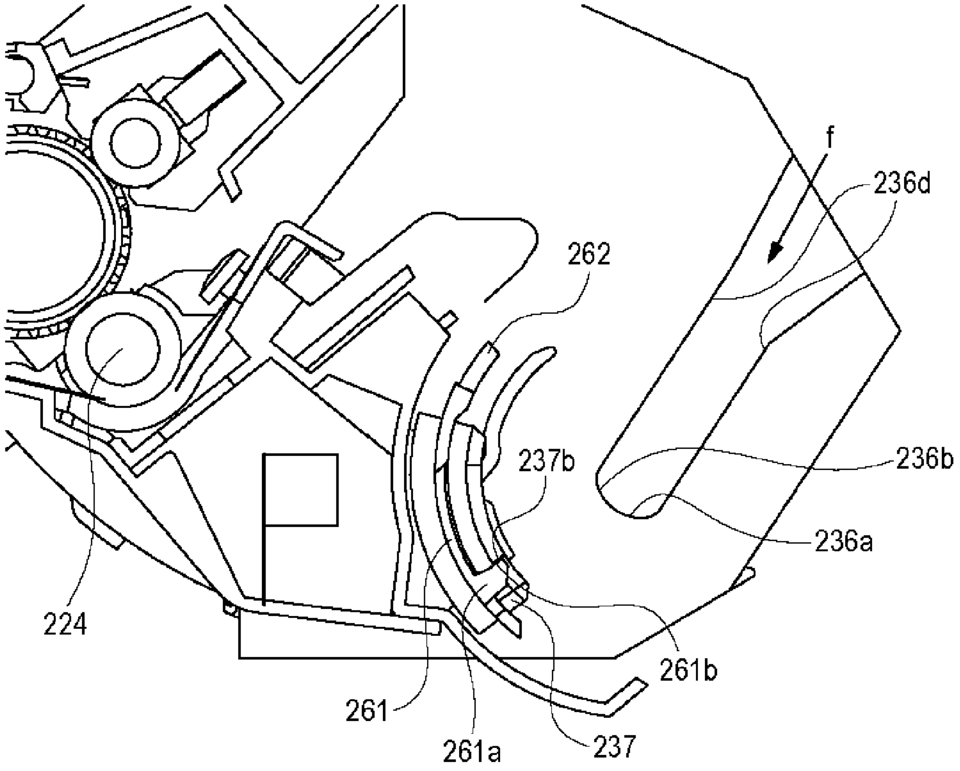
Figure 31:
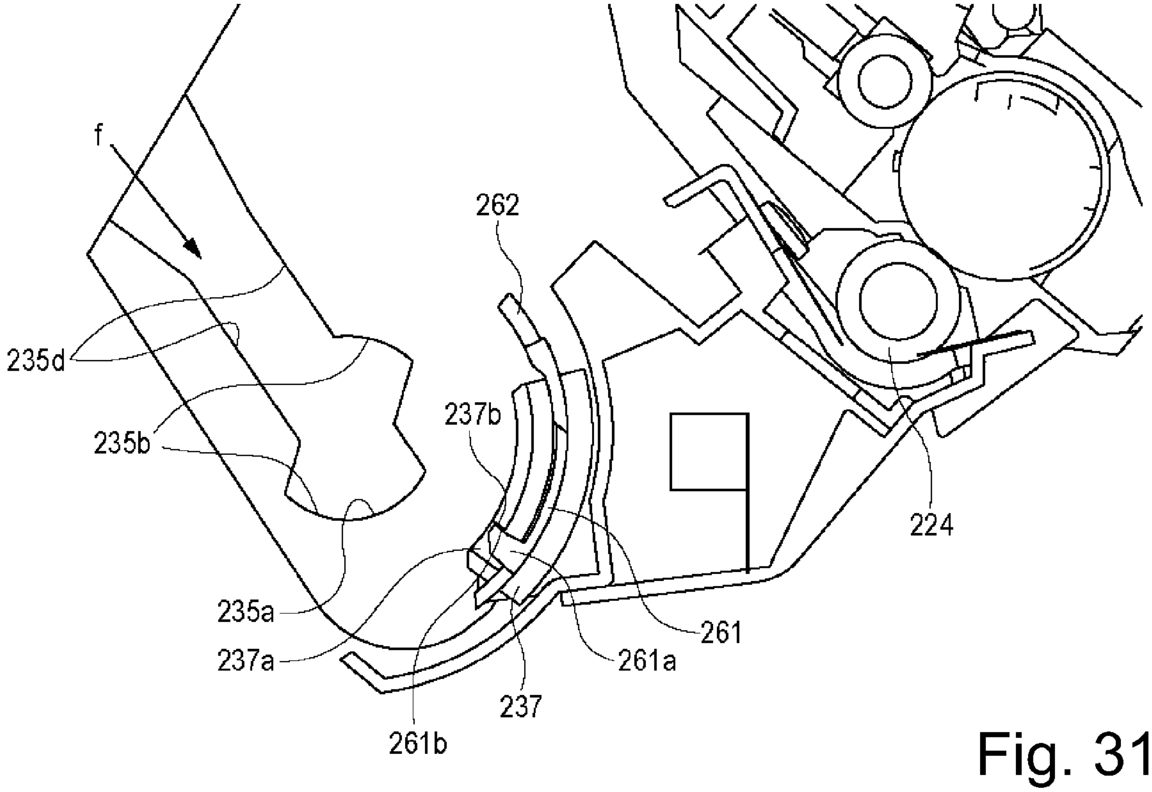

FIG. 31 illustrates detail structures of the neighborhood of a toner cartridge receiving portion of the developing unit.

Figure 32:
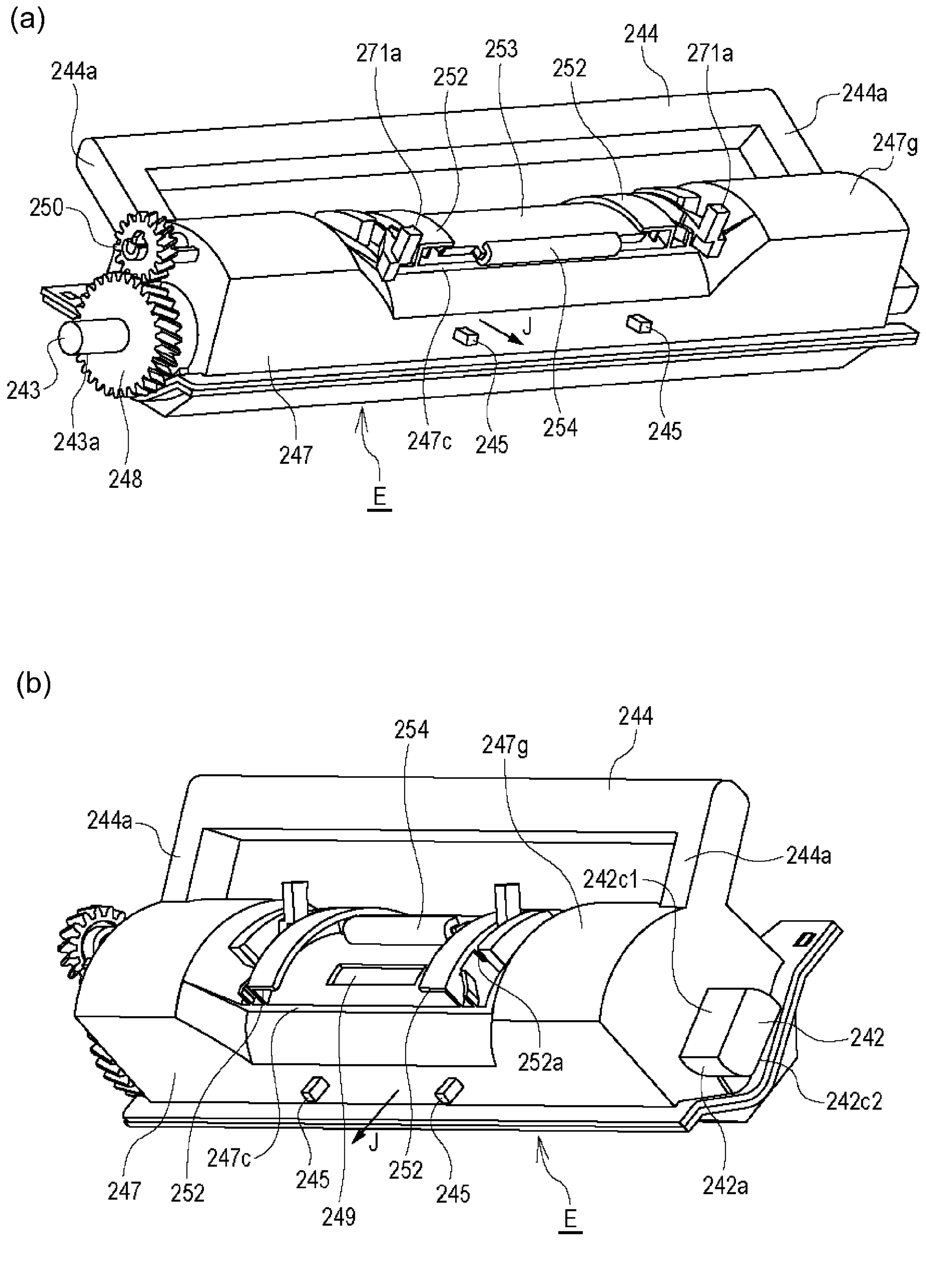

FIG. 32 illustrates detailed structures of the toner cartridge.

Figure 33:
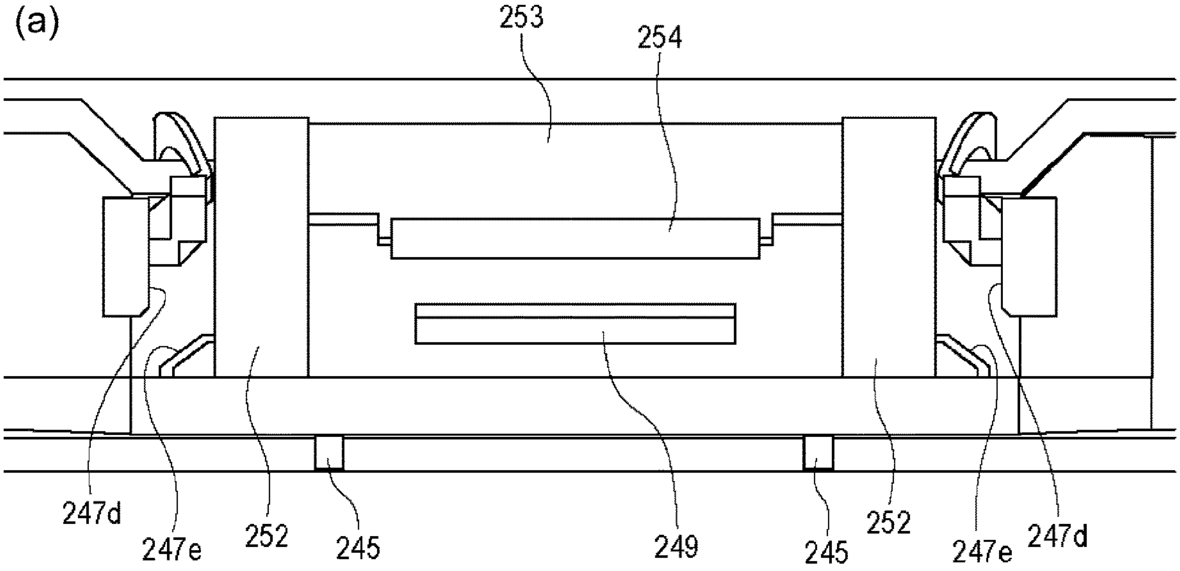
Figure 33:
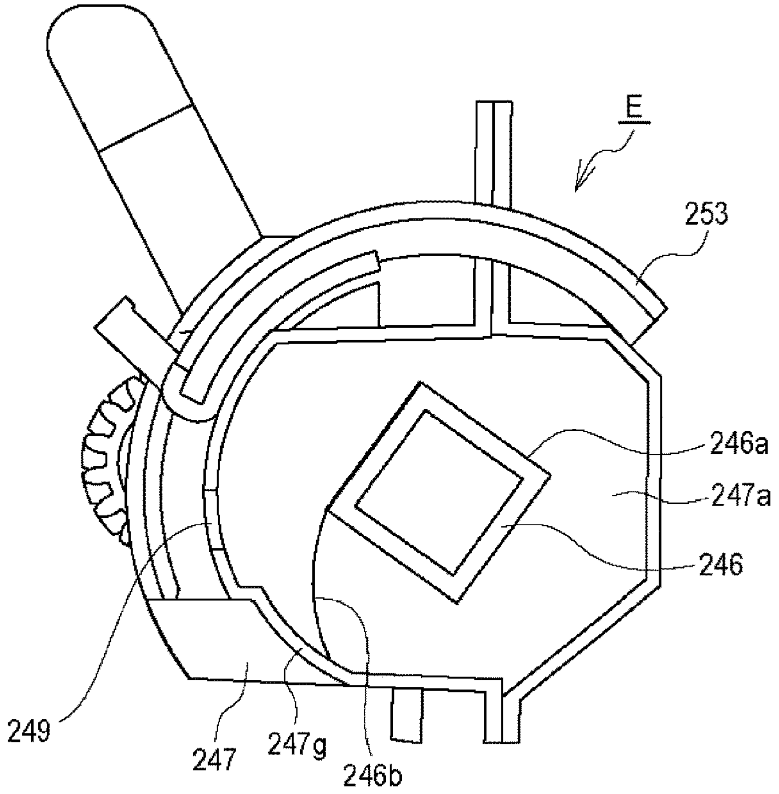

FIG. 33 illustrates detailed structures of the toner cartridge.

Figure 34:
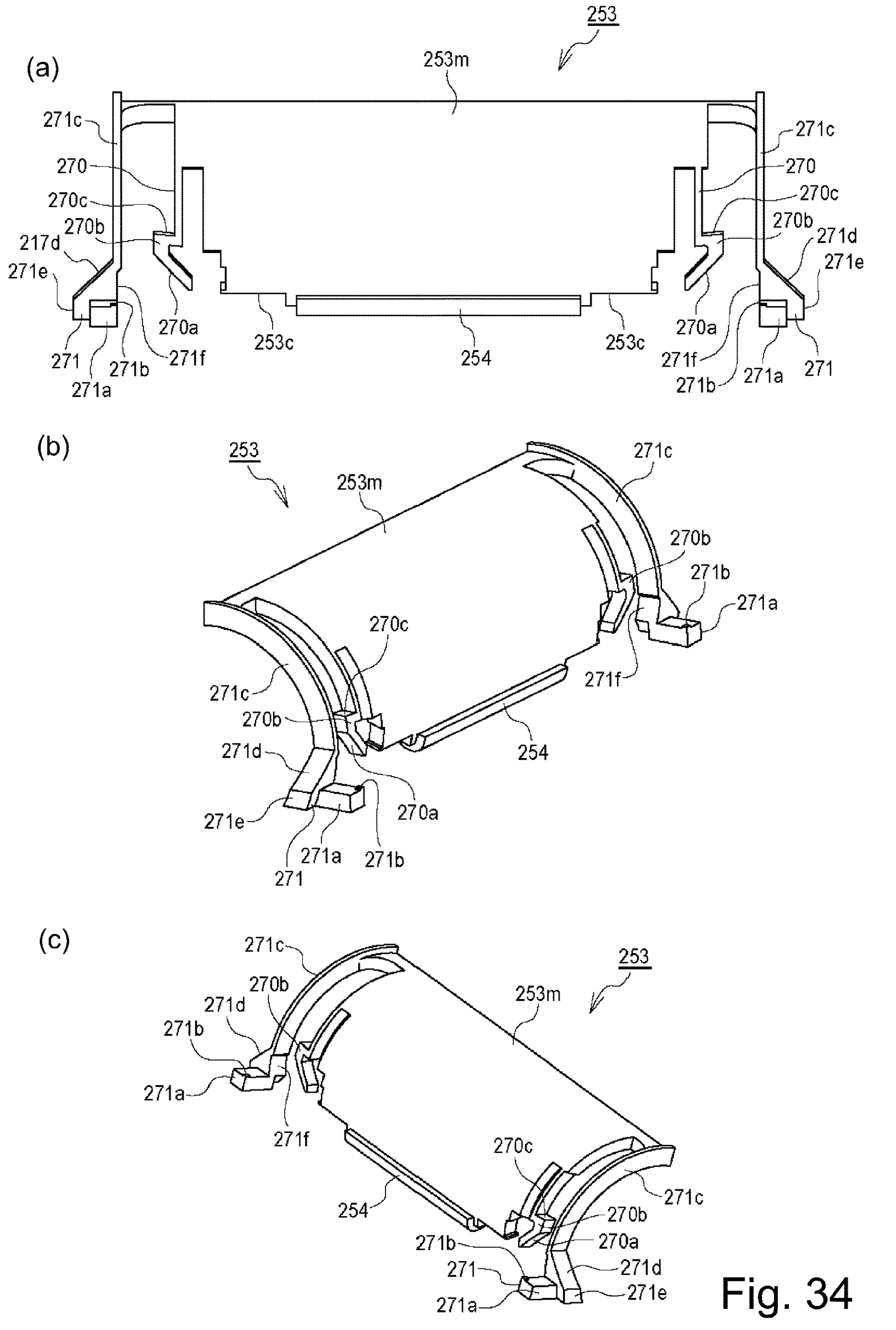

FIG. 34 illustrates detailed structures of the toner cartridge.

Figure 35:
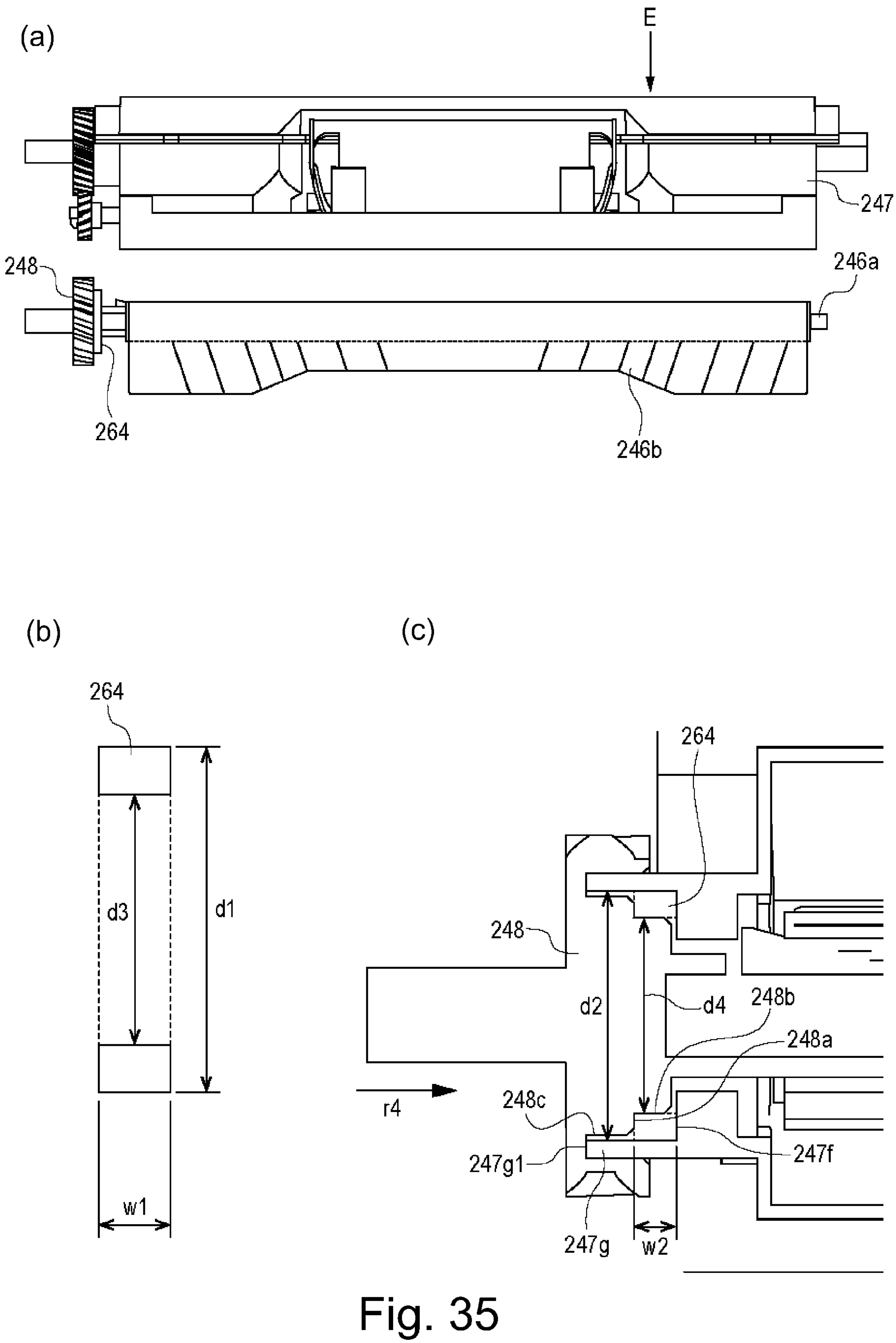

FIG. 35 illustrates detailed structures of the toner cartridge.

Figure 36:
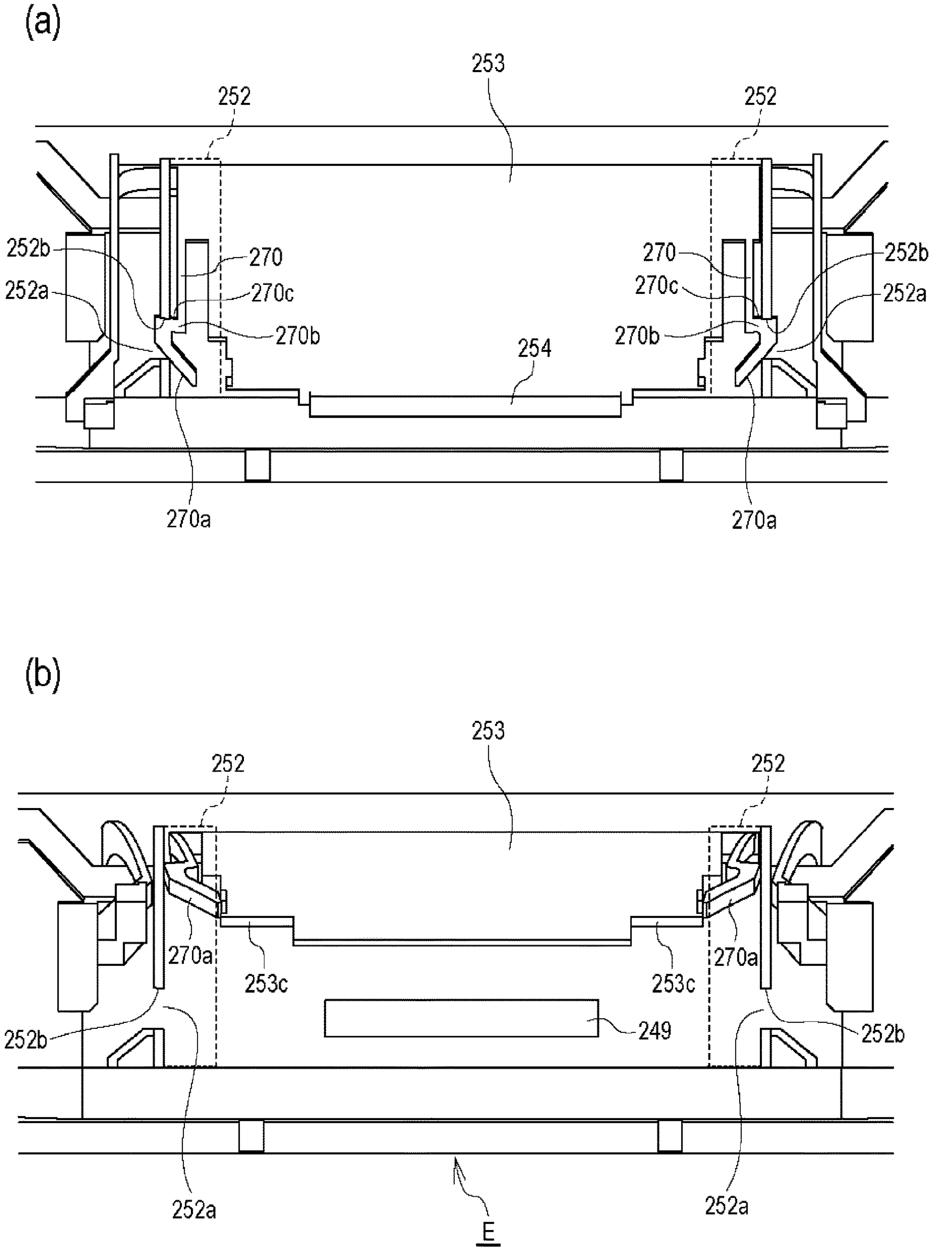

FIG. 36 illustrates detailed structures of the toner cartridge.

Figure 37:
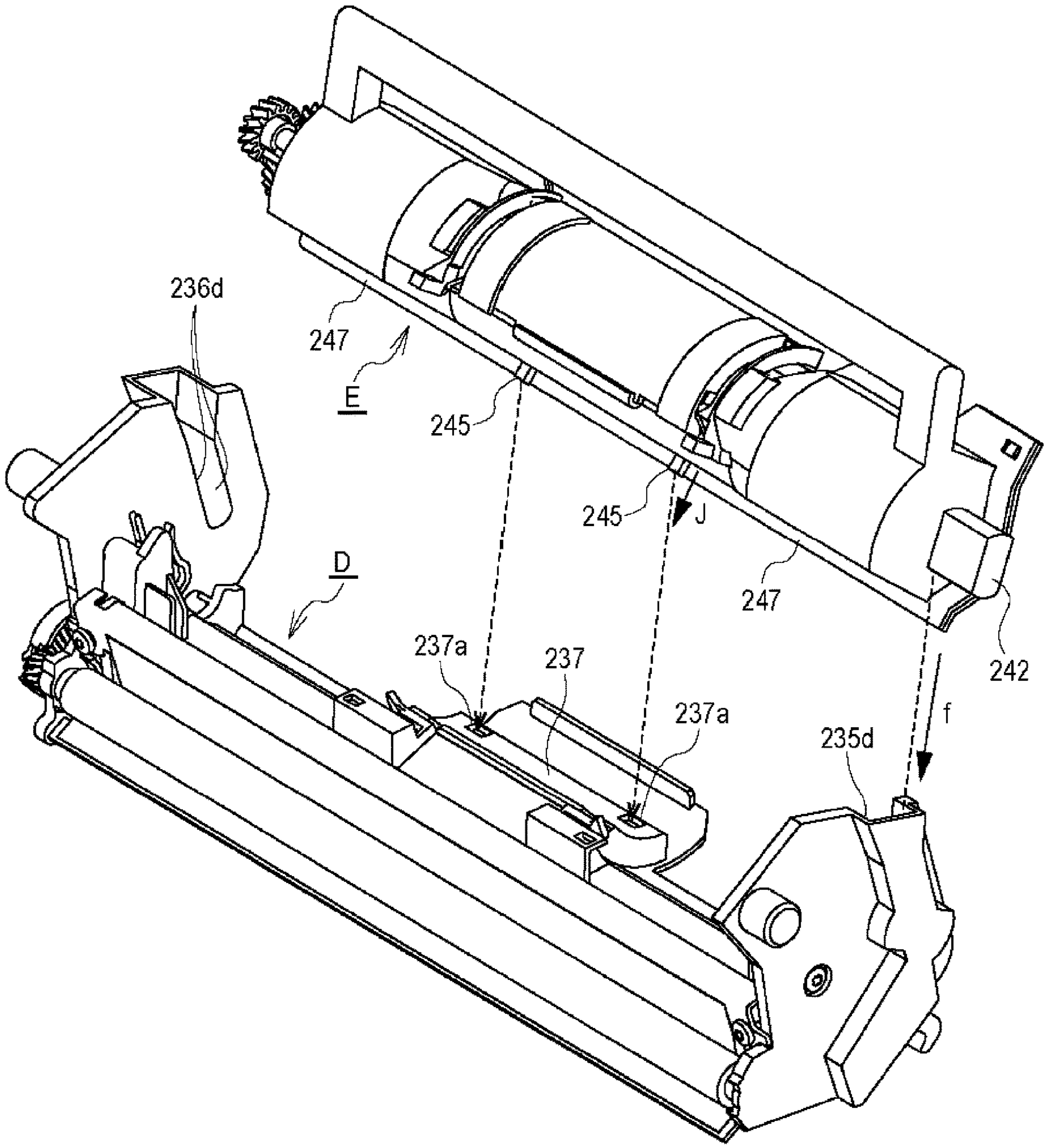

FIG. 37 illustrates opening operations of the first shutter and the second shutter.

Figure 38:
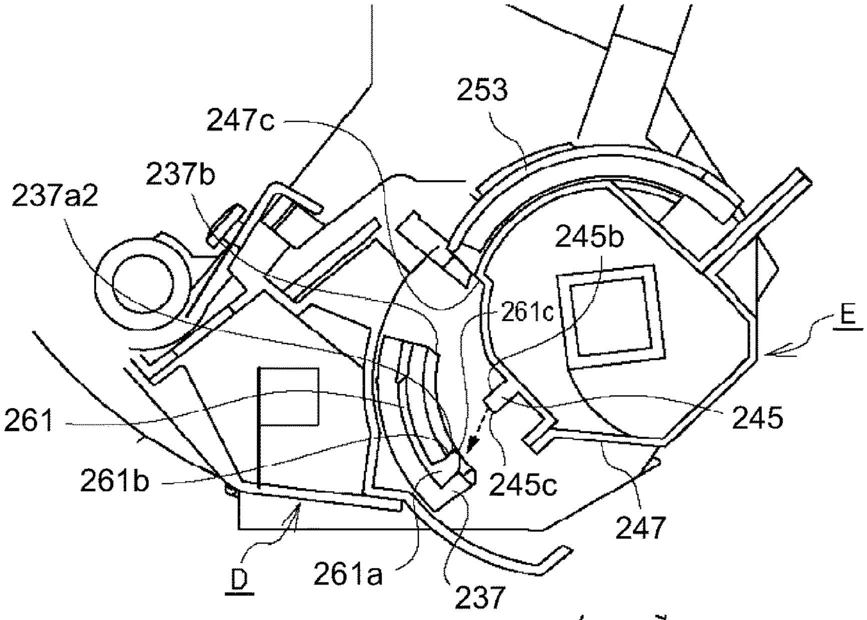
Figure 38:
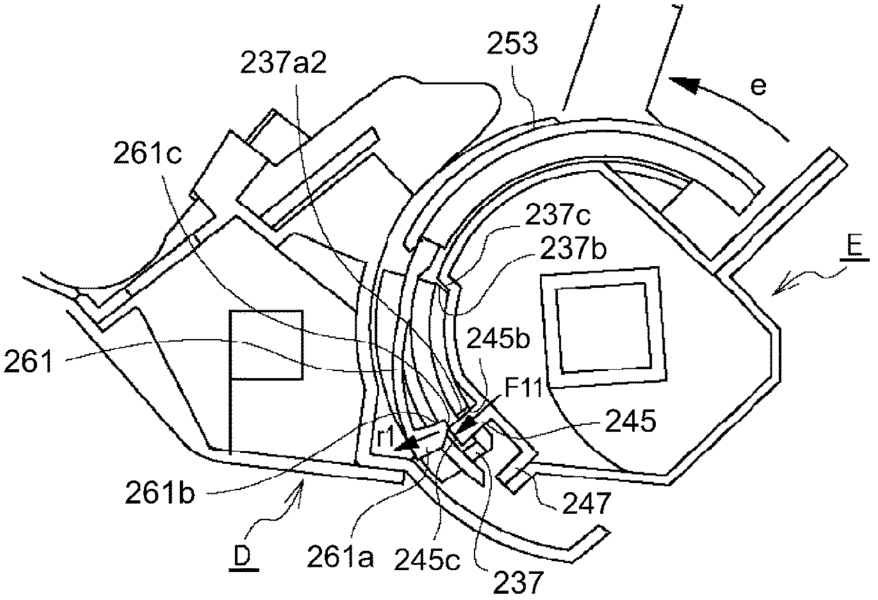
Figure 38:
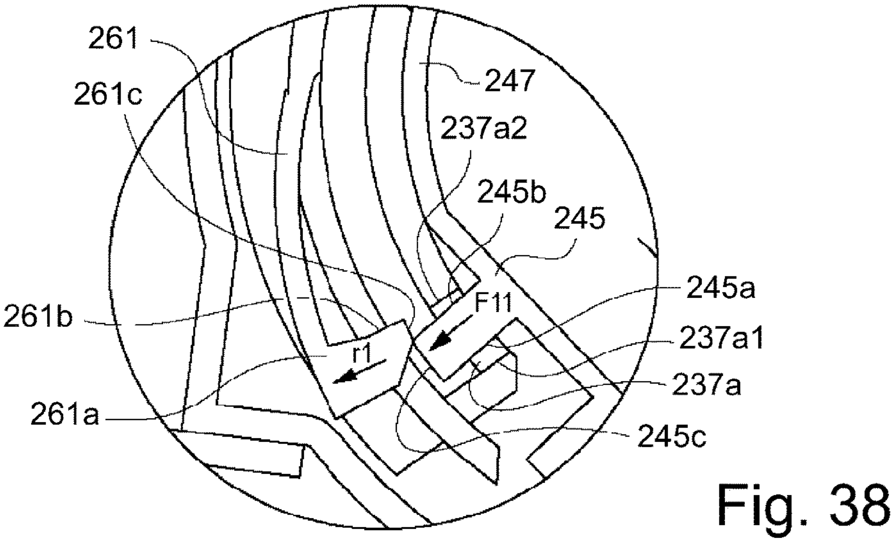

FIG. 38 illustrates opening operations of the first shutter and the second shutter.

Figure 39:
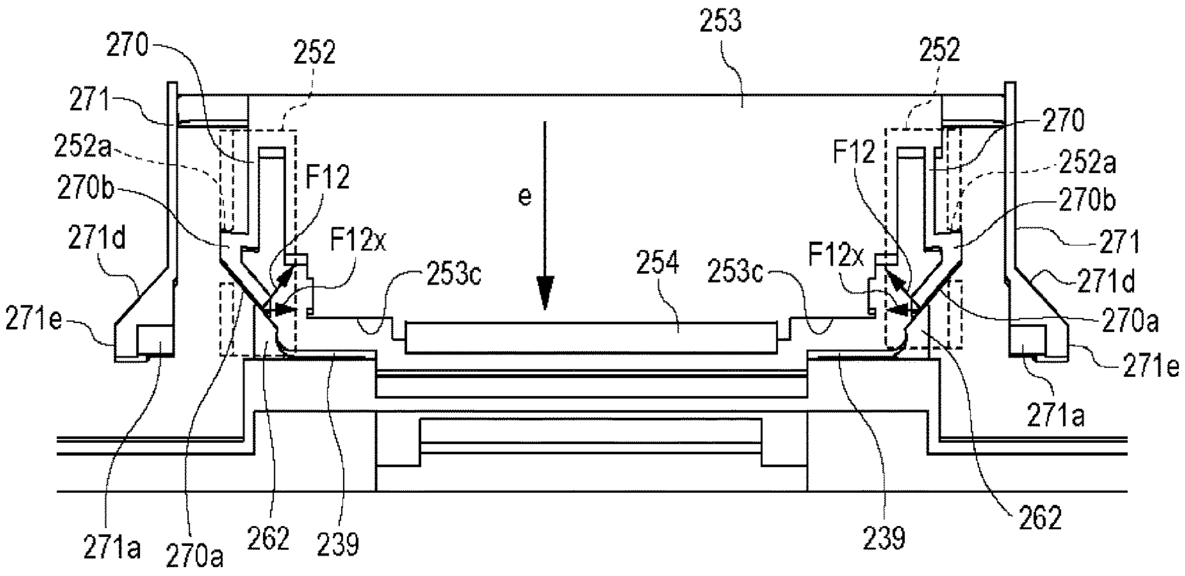
Figure 39:
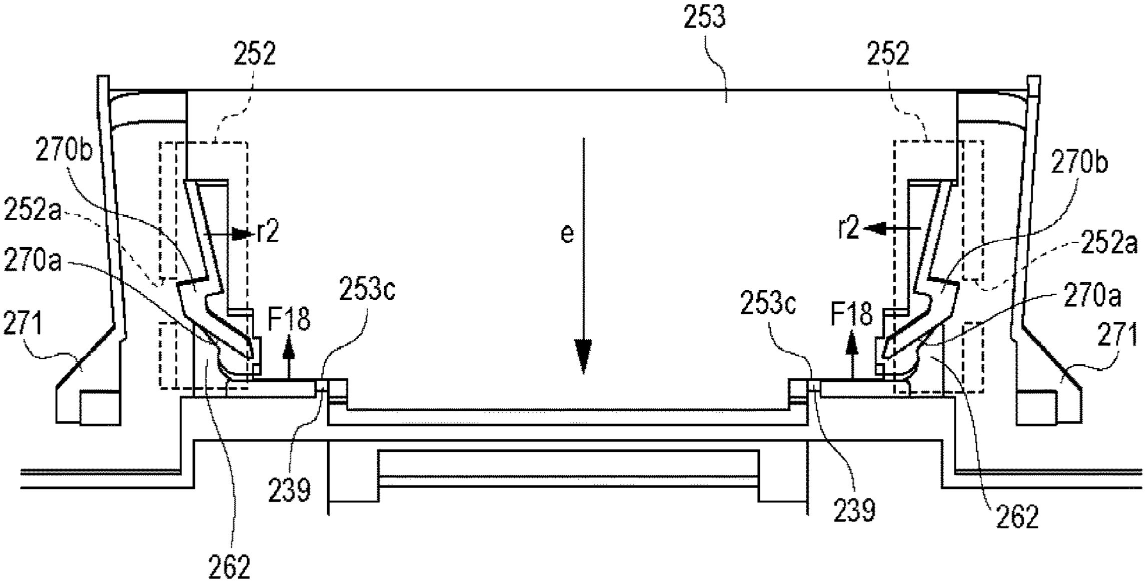

FIG. 39 illustrates opening operations of the first shutter and the second shutter.

Figure 40:
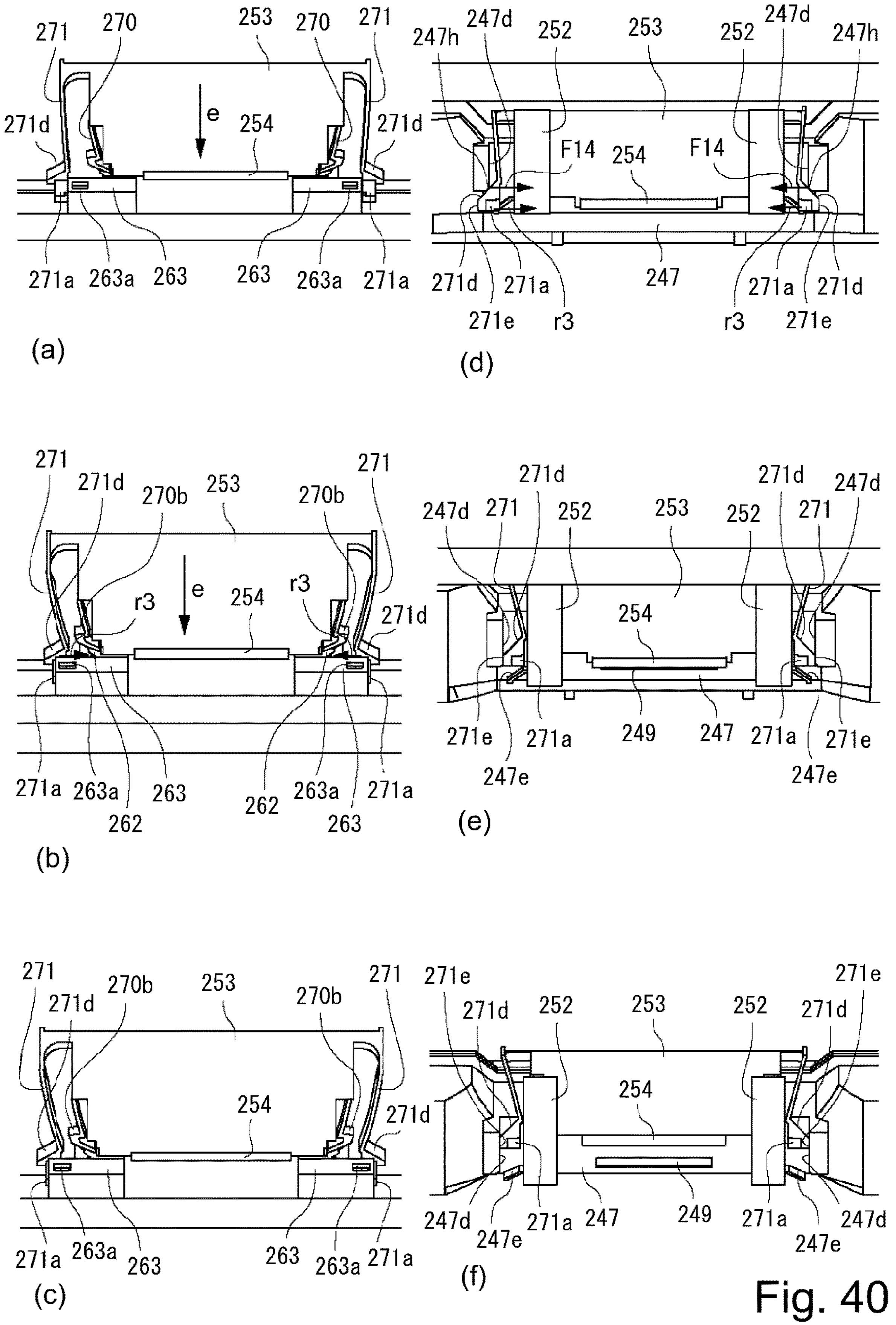

FIG. 40 illustrates opening operations of the first shutter and the second shutter.

Figure 41:
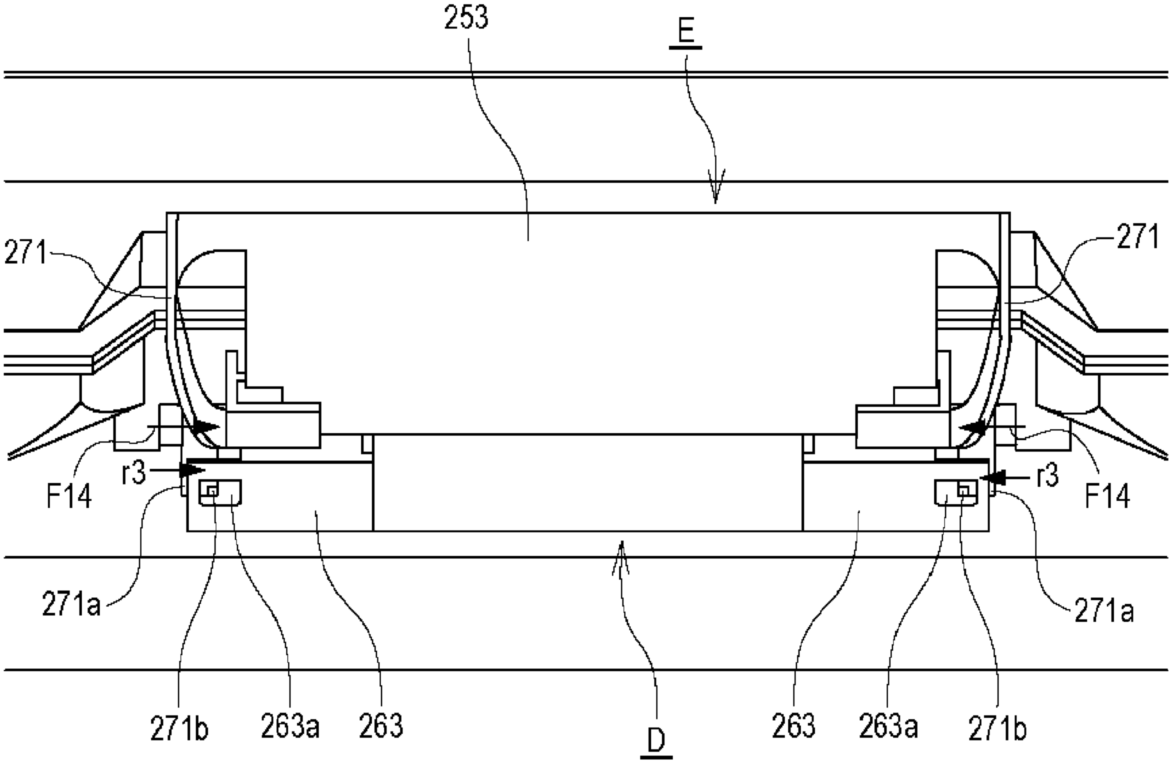

FIG. 41 illustrates opening operations of the first shutter and the second shutter.

Figure 42:
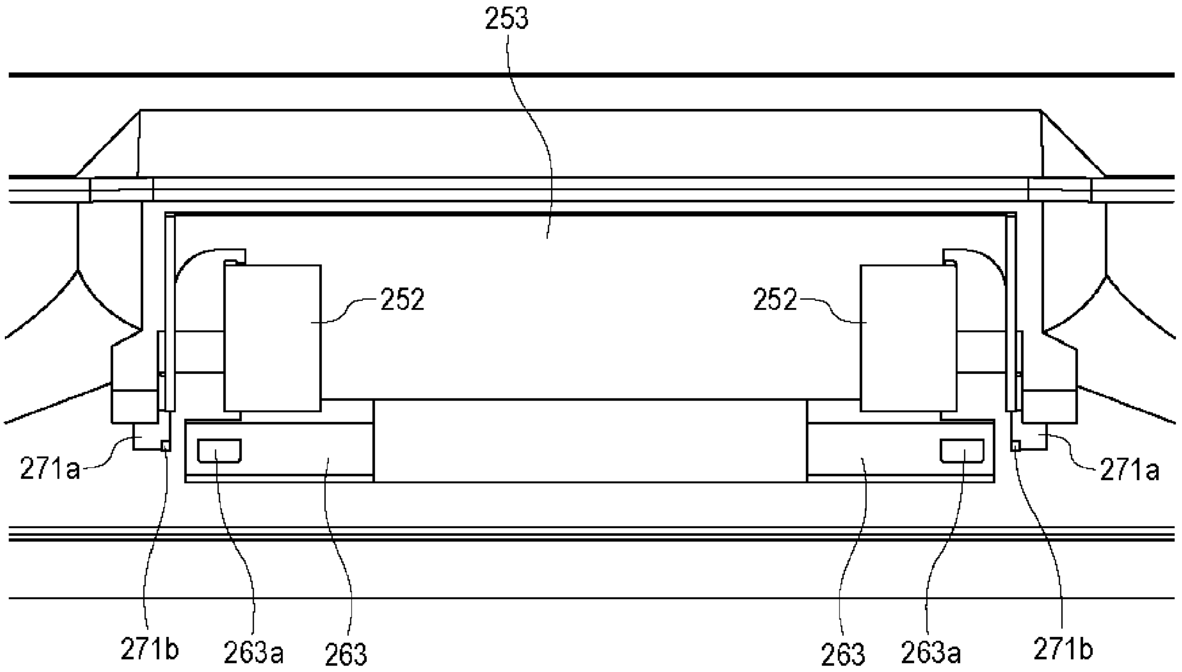
Figure 42:
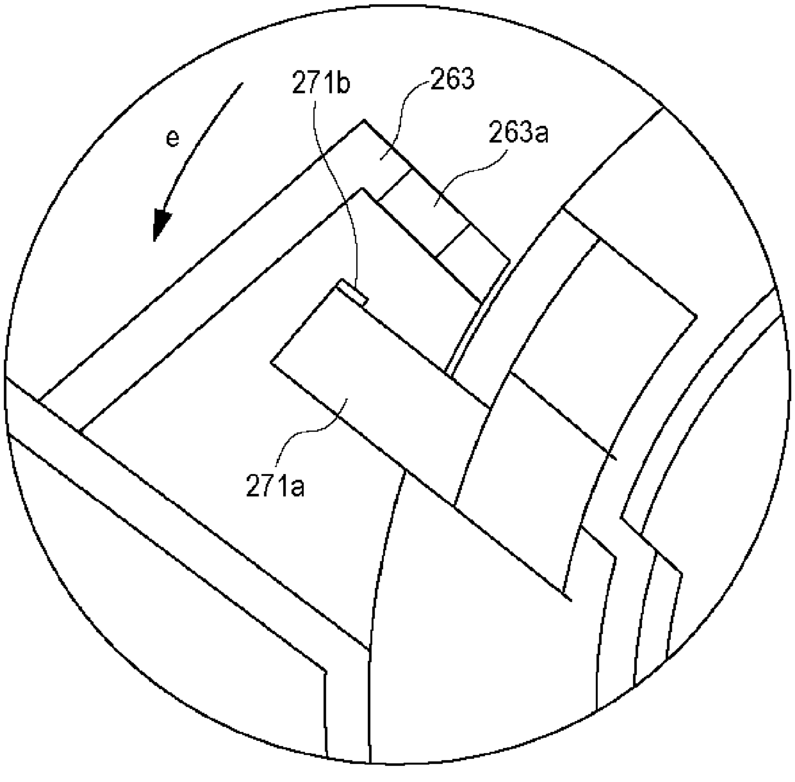

FIG. 42 illustrates opening operations of the first shutter and the second shutter.

Figure 43:
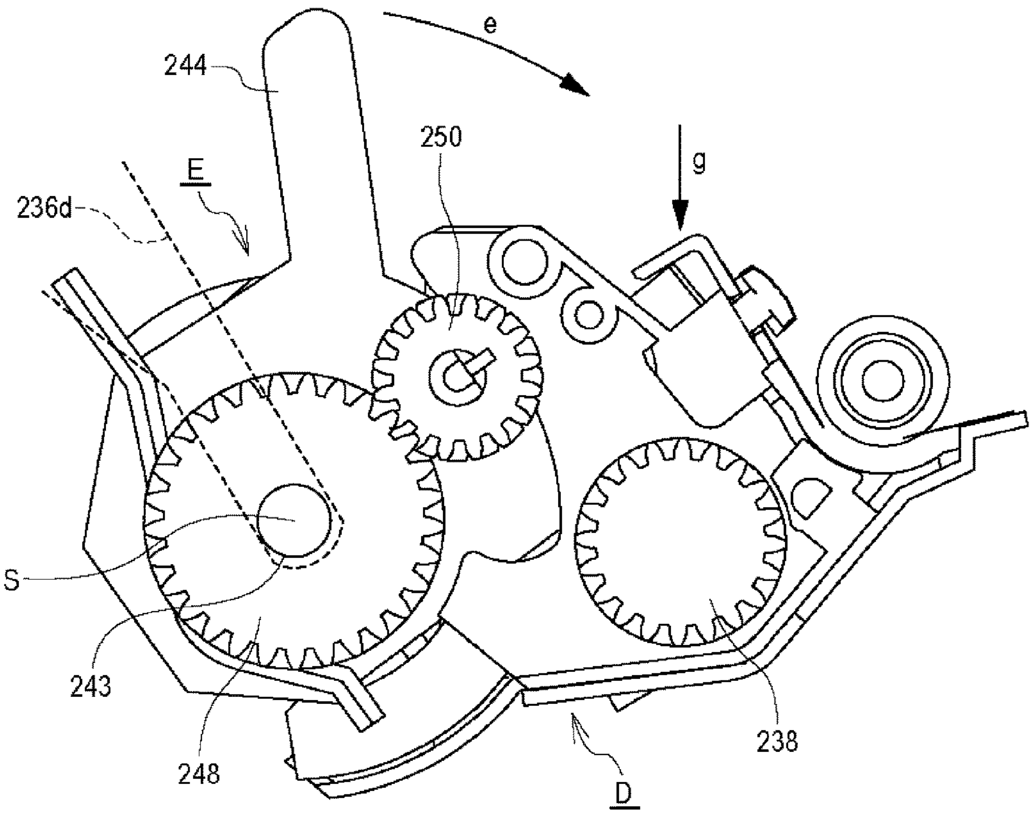
Figure 43:
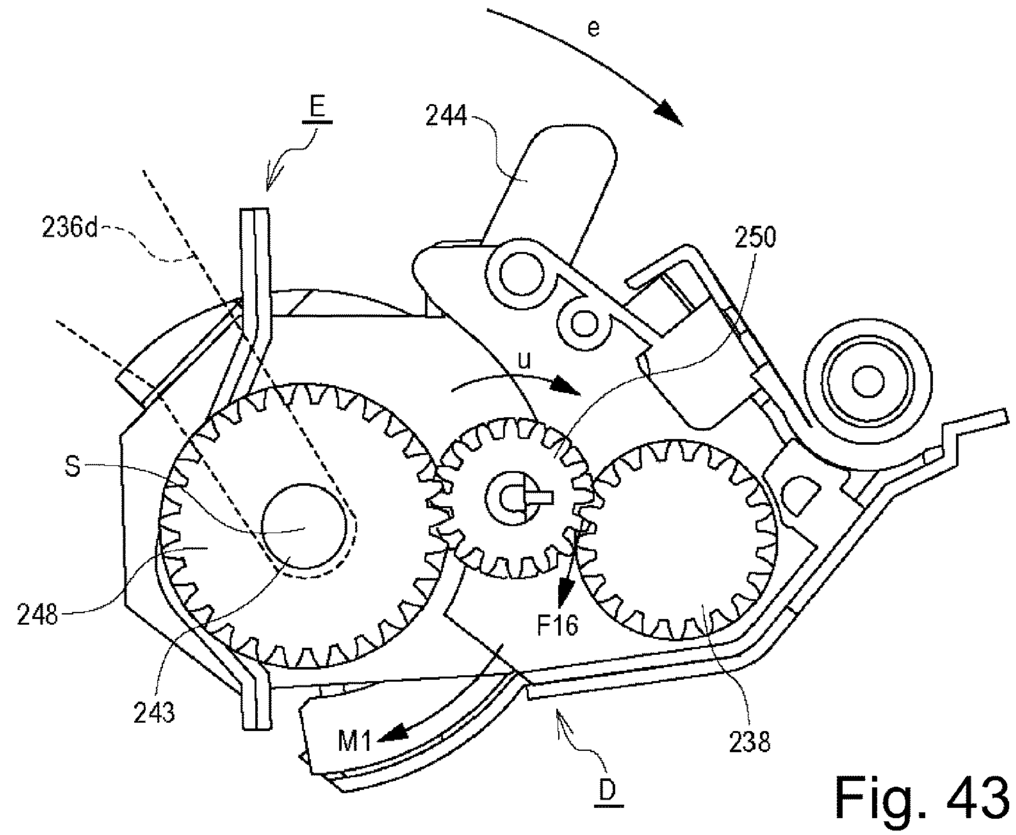

FIG. 43 illustrates opening operations of the first shutter and the second shutter.

Figure 44:
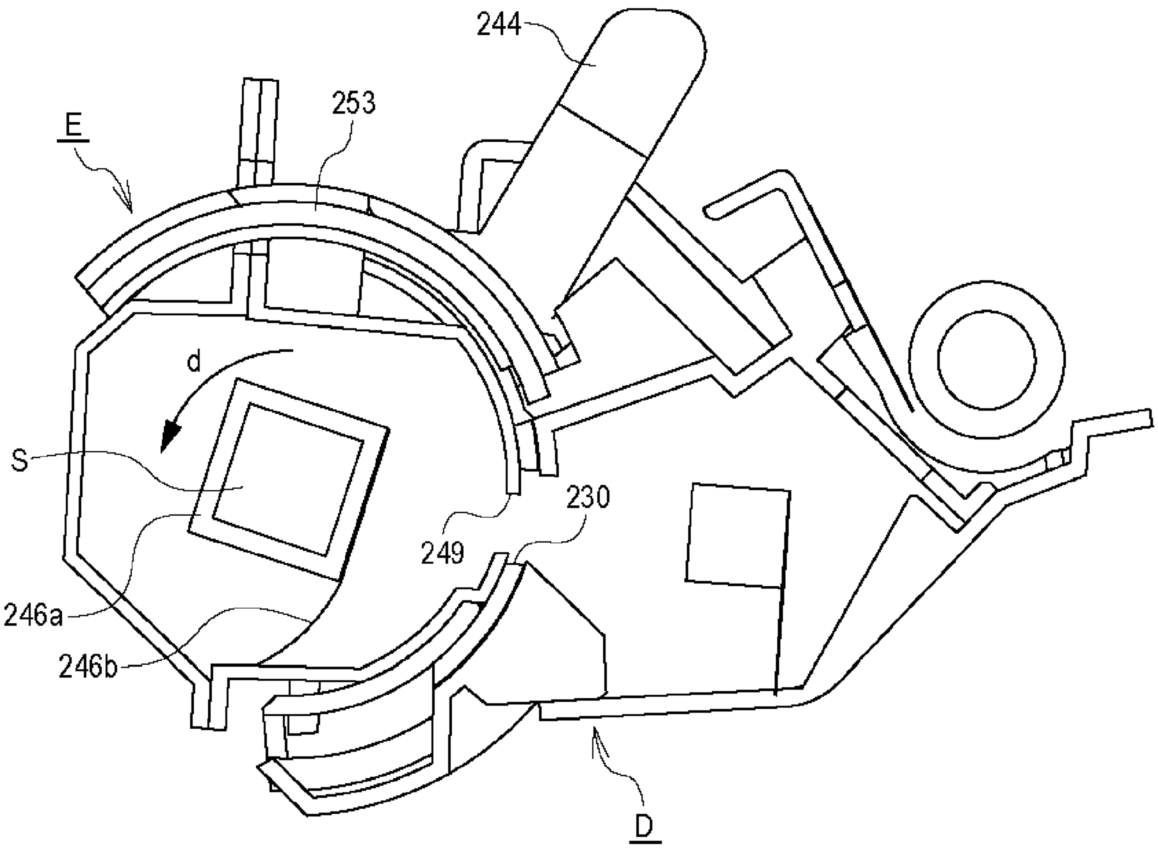

FIG. 44 is a sectional view of the neighborhood of a second opening and a third opening as seen from a driving side.

Figure 45:
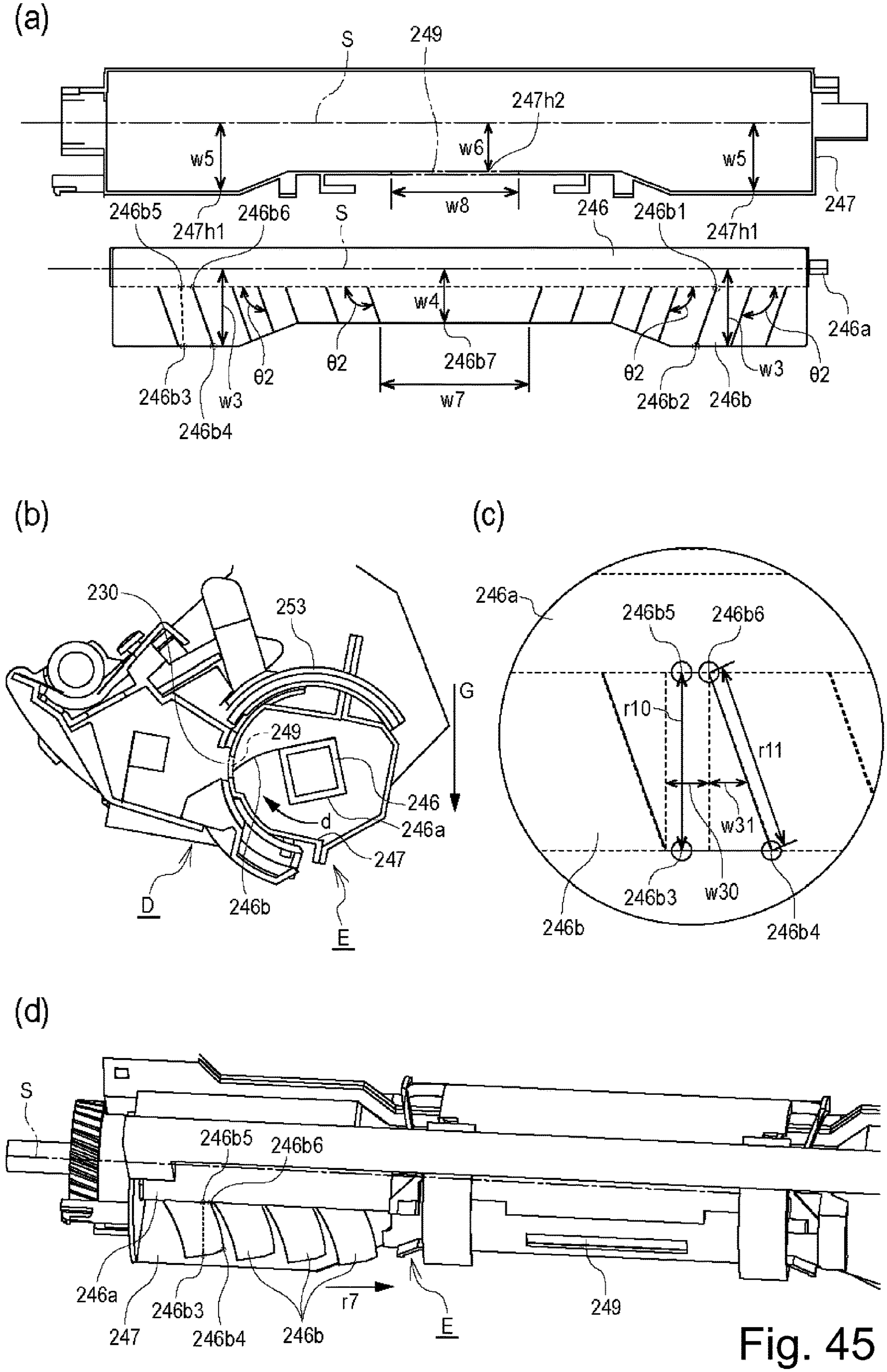

FIG. 45 illustrates a toner feeding structure from the toner cartridge to the developing unit.

Figure 46:
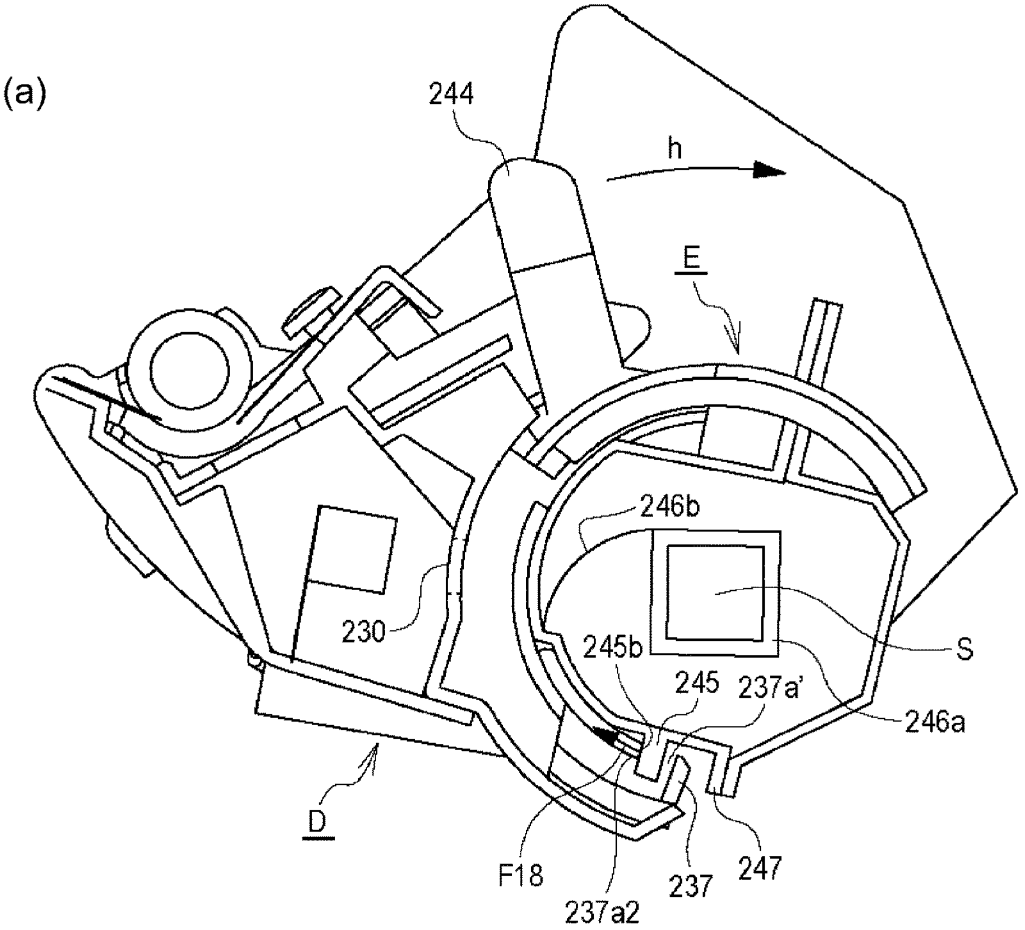
Figure 46:
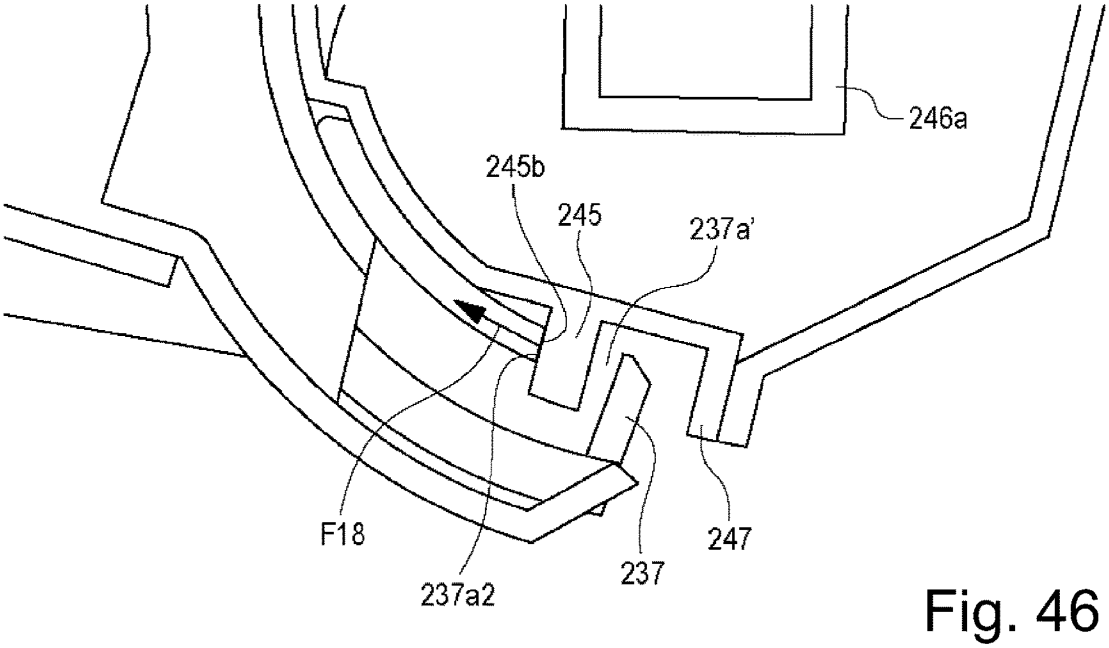

FIG. 46 illustrates closing operations of the first shutter and the second shutter.

Figure 47:
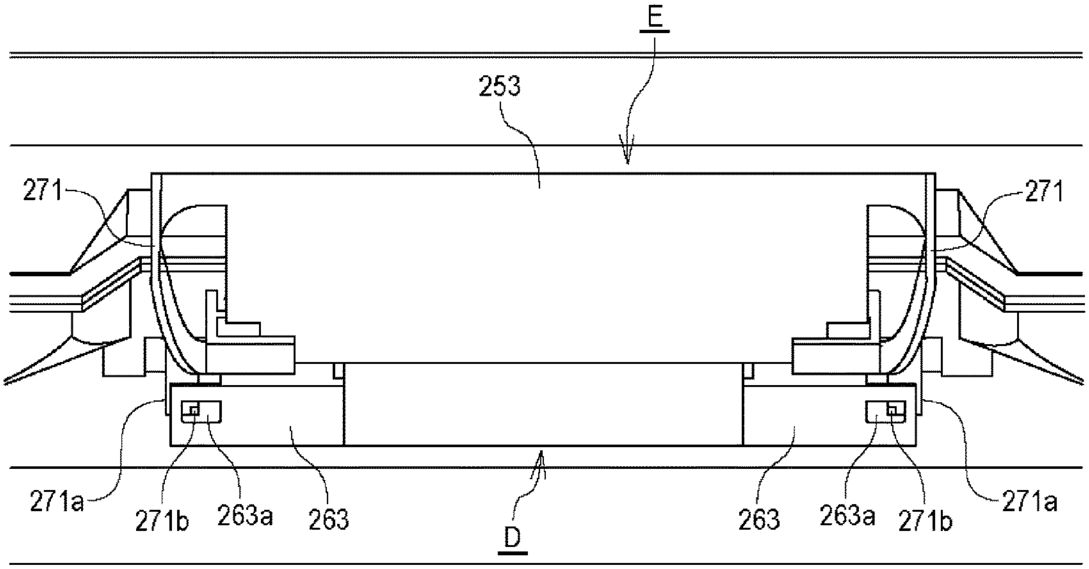
Figure 47:
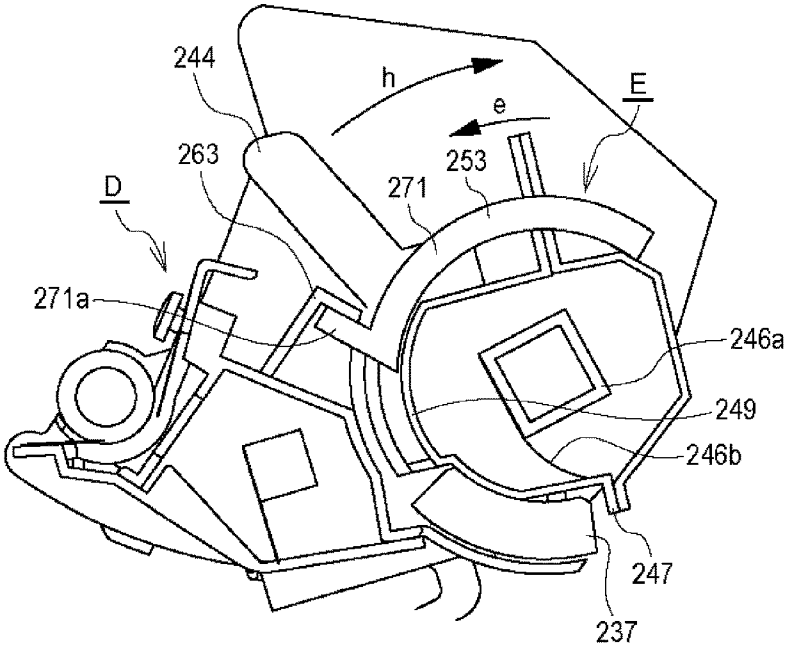
Figure 47:
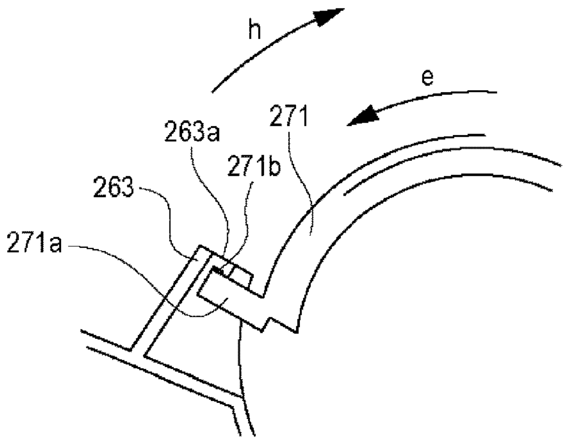

FIG. 47 illustrates closing operations of the first shutter and the second shutter.

Figure 48:
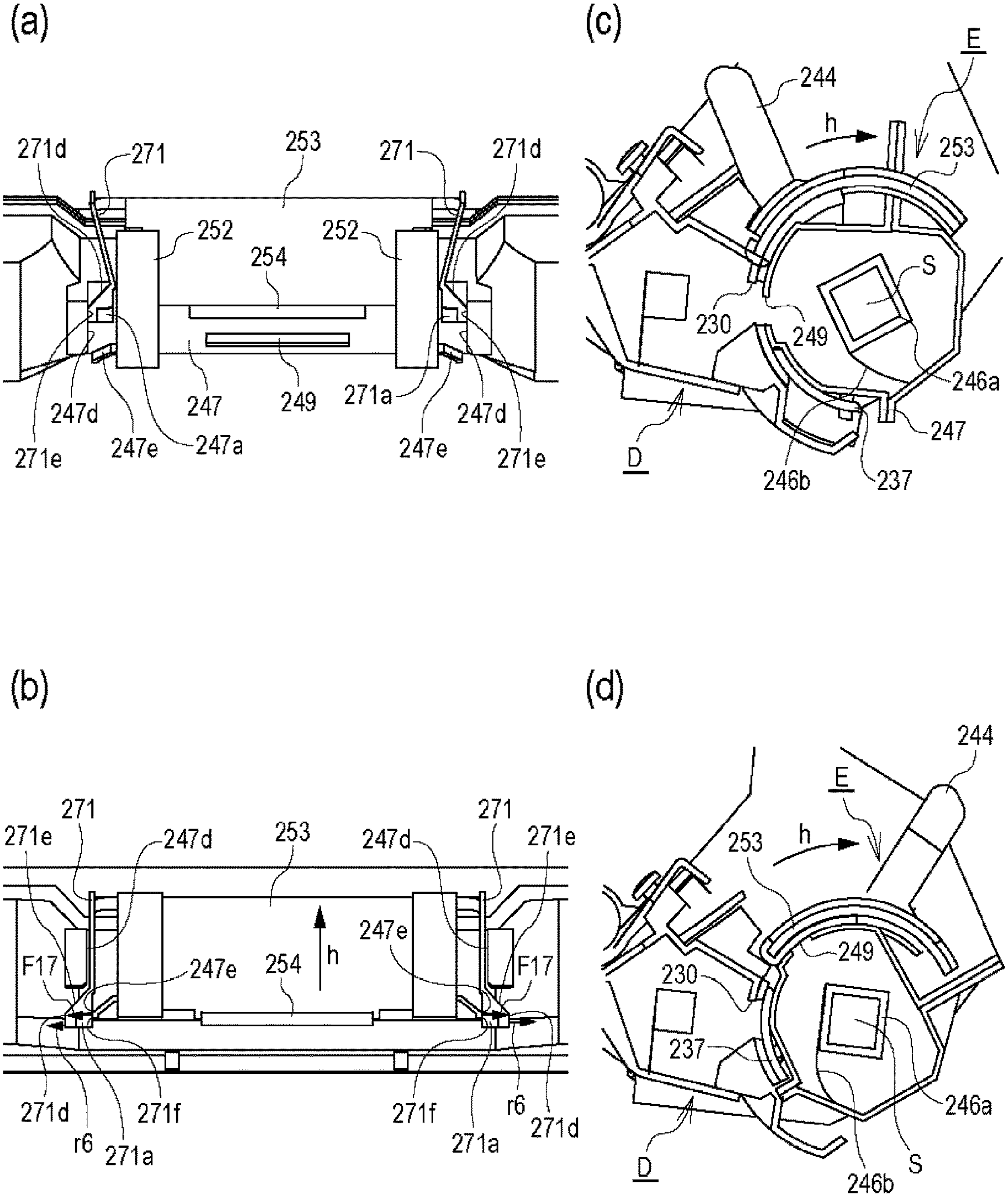

FIG. 48 illustrates closing operations of the first shutter and the second shutter.

Figure 49:
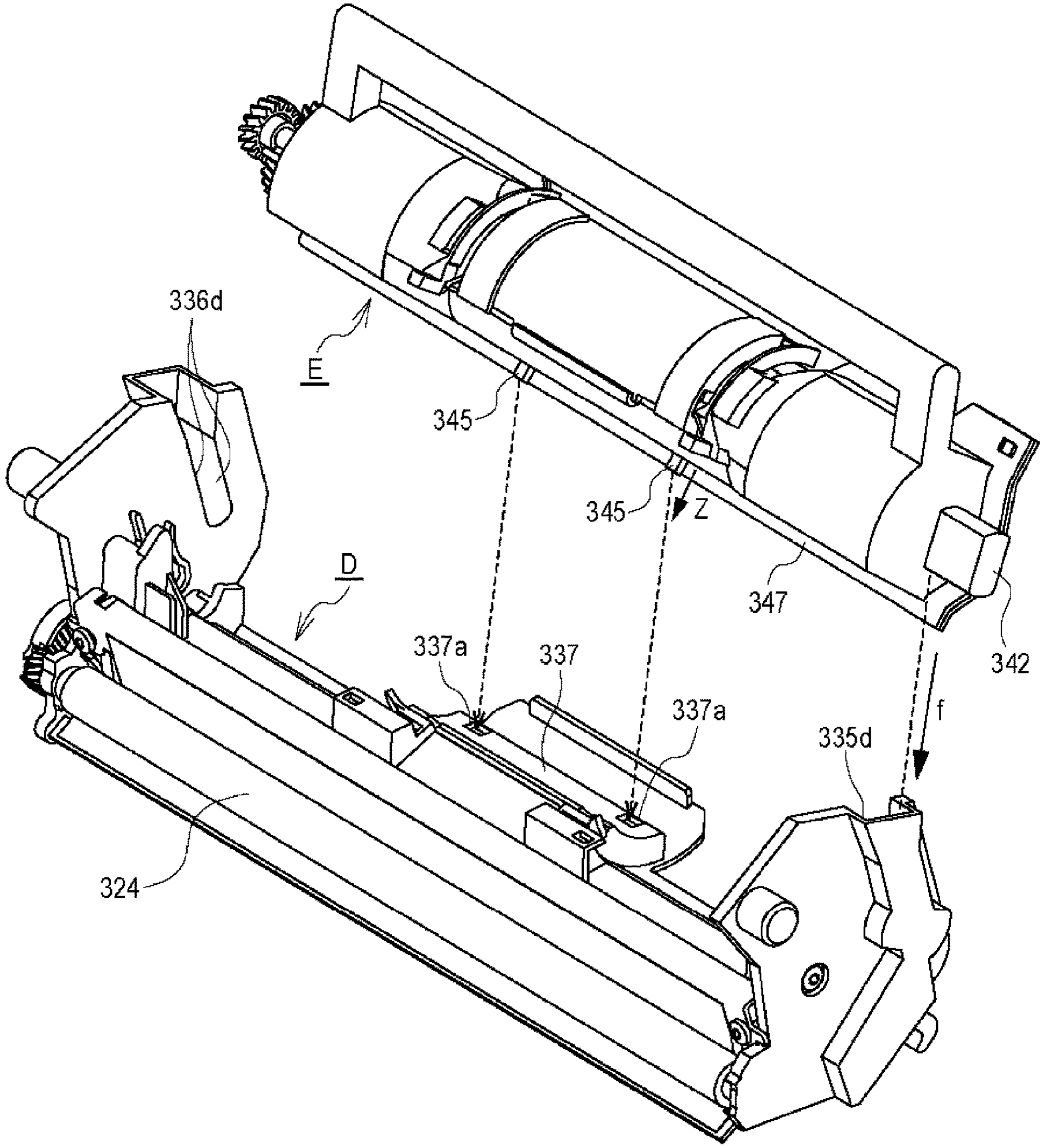

FIG. 49 is a perspective view illustrating a state before the toner cartridge is mounted to the developing unit.

Figure 50:
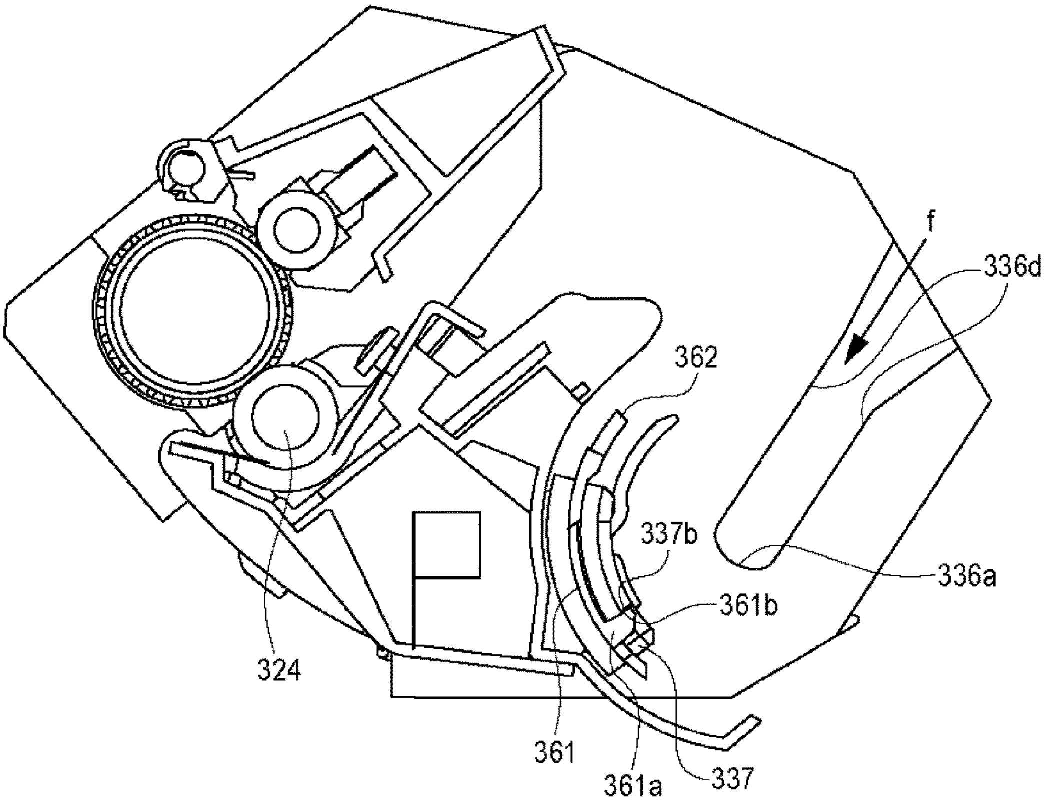
Figure 50:
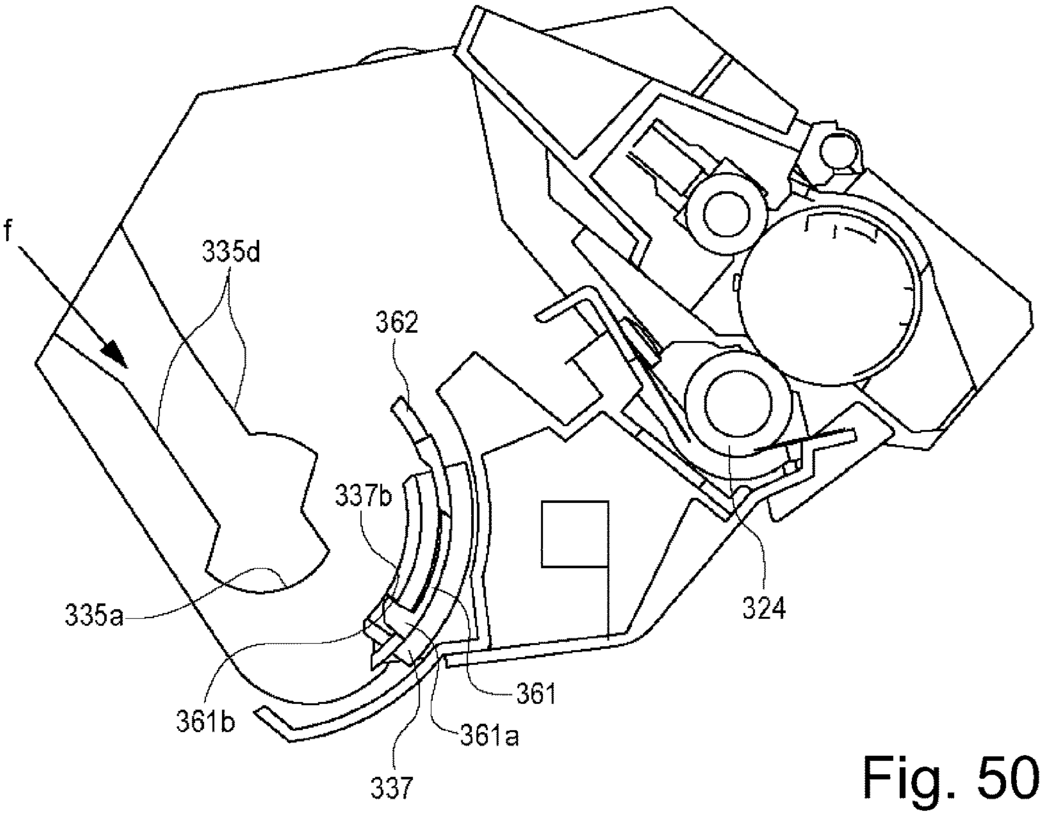

FIG. 50 is a longitudinal sectional view of the neighborhood of the insertion-guided portion (driving side) and the insertion-guiding portion (driving side).

Figure 51:
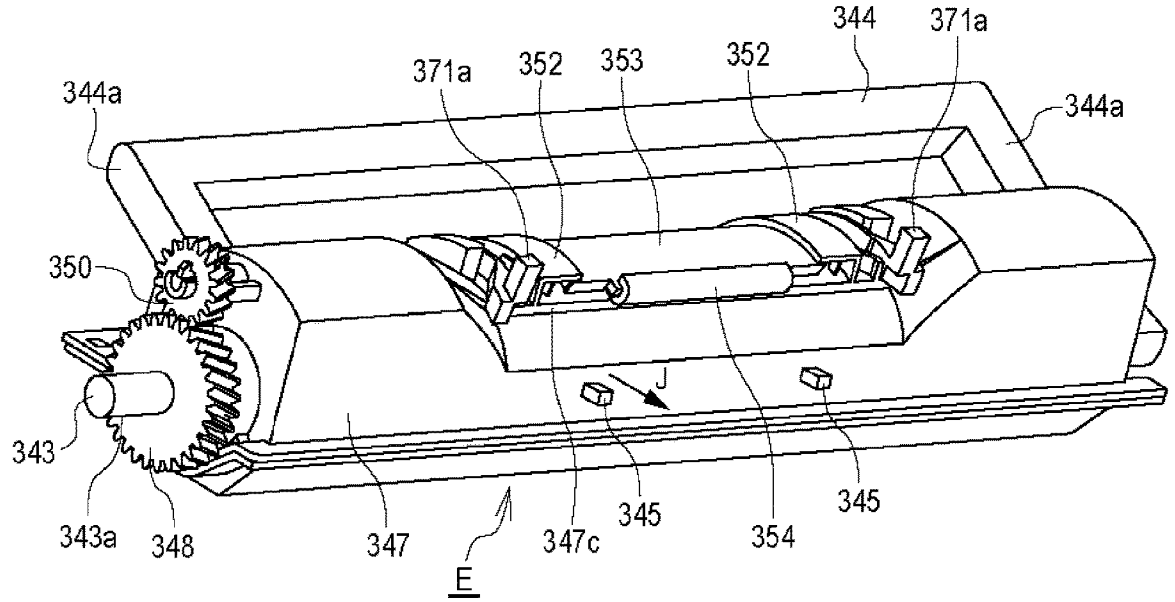
Figure 51:
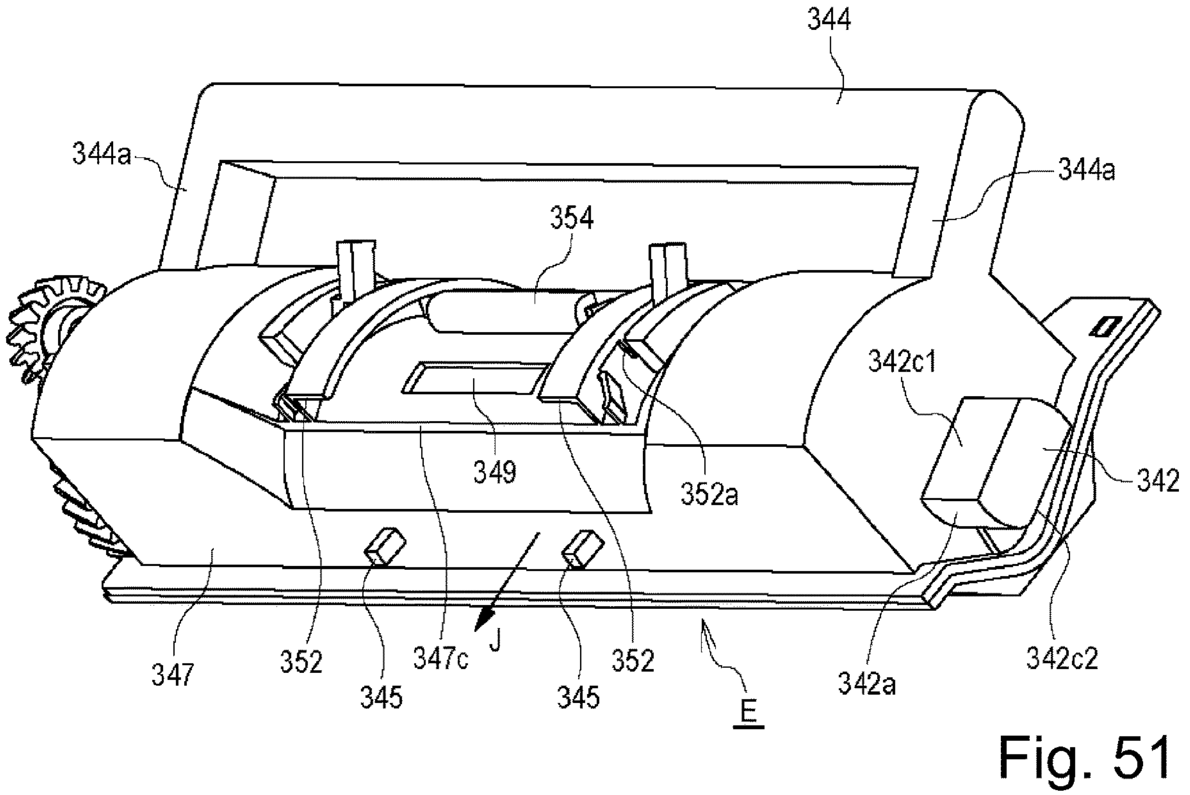

FIG. 51 is a sectional view illustrating shapes of the insertion-guided portion (driving side) and the insertion-guiding portion (driving side).

Figure 52:
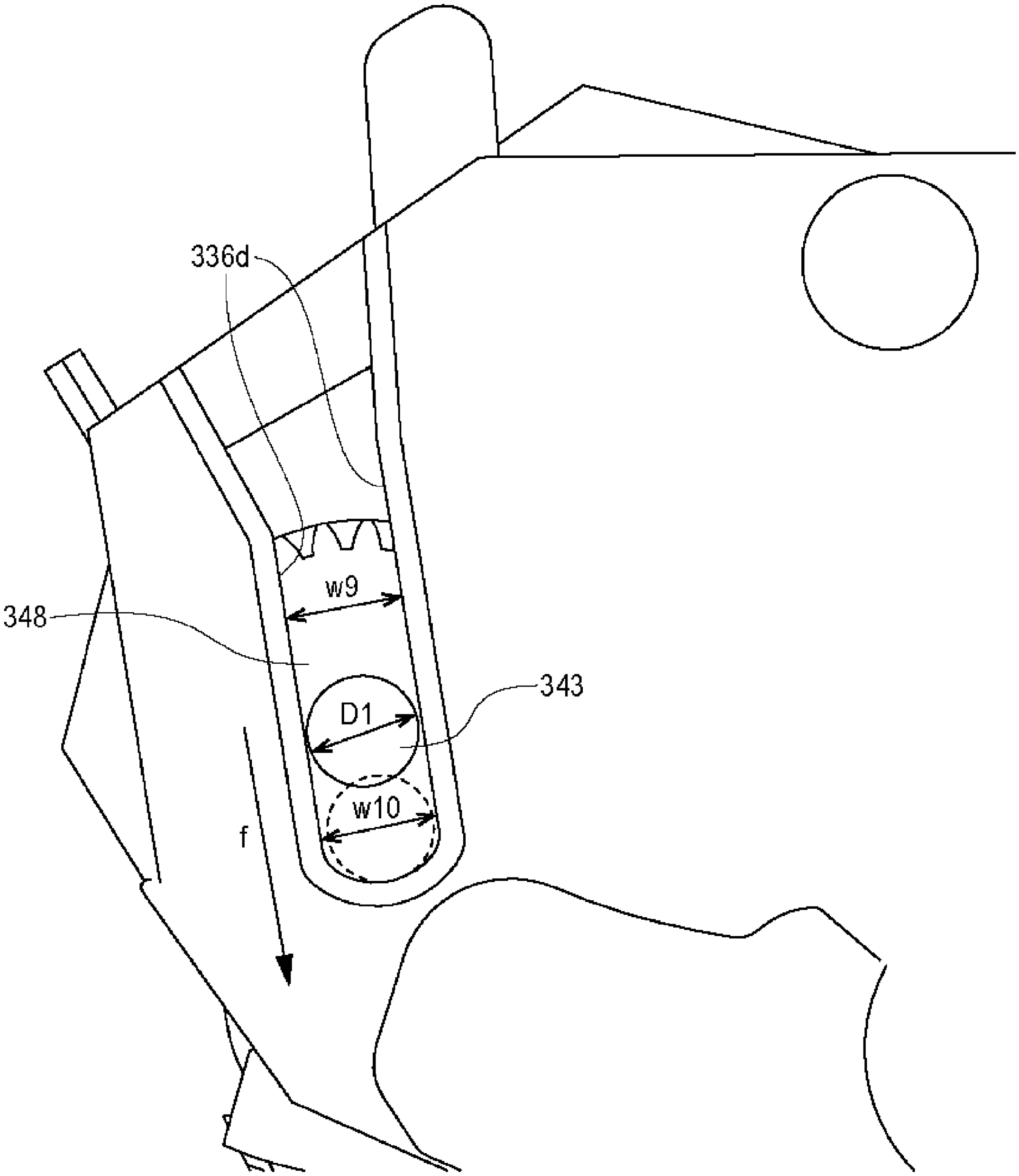

FIG. 52 is a sectional view illustrating shapes of the insertion-guided portion (driving side) and the insertion-guiding portion (driving side).

Figure 53:
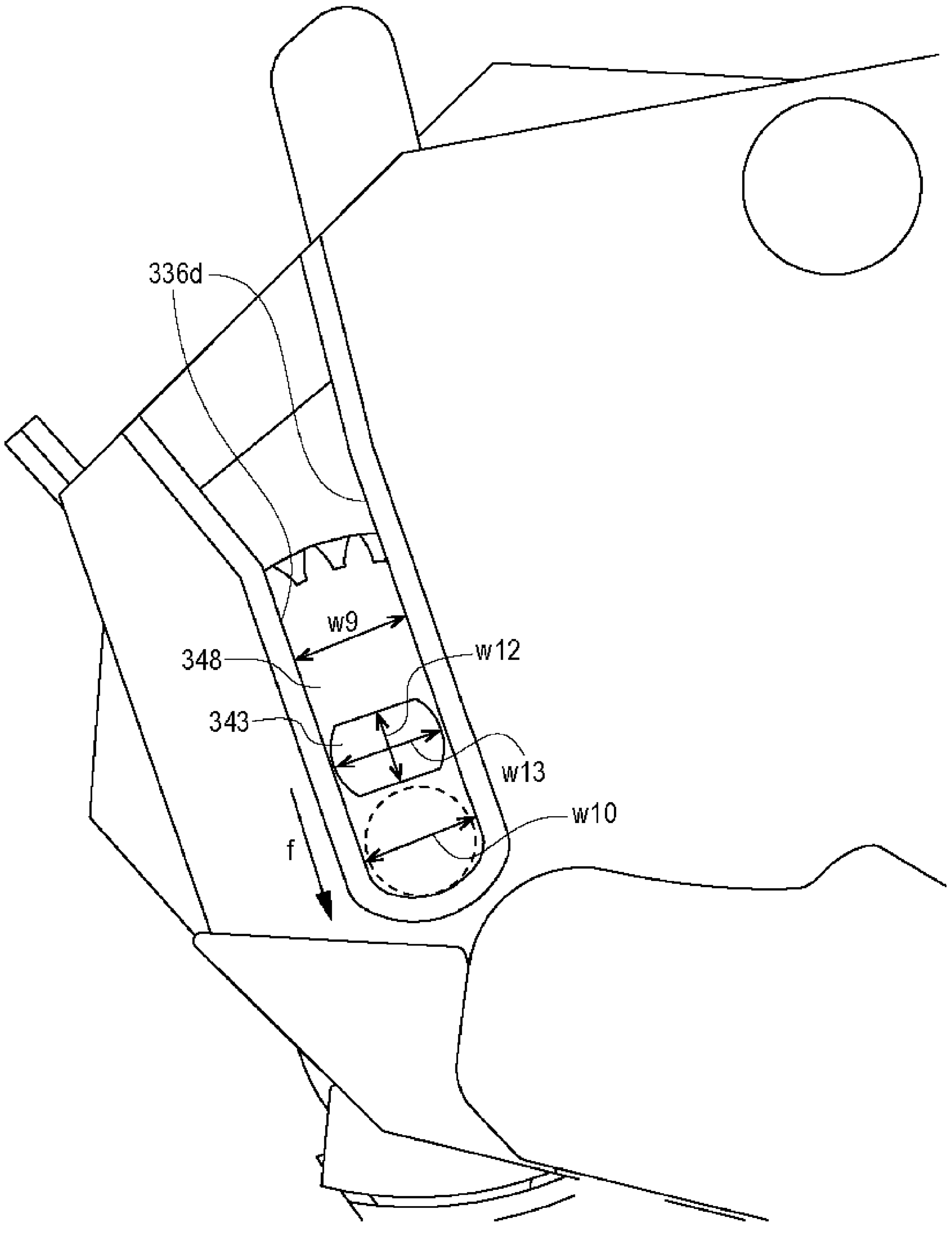

FIG. 53 is a longitudinal sectional view illustrating the neighborhood of the insertion-guided portion (non-driving-side) and the insertion-guiding portion (non-driving-side).

Figure 54:
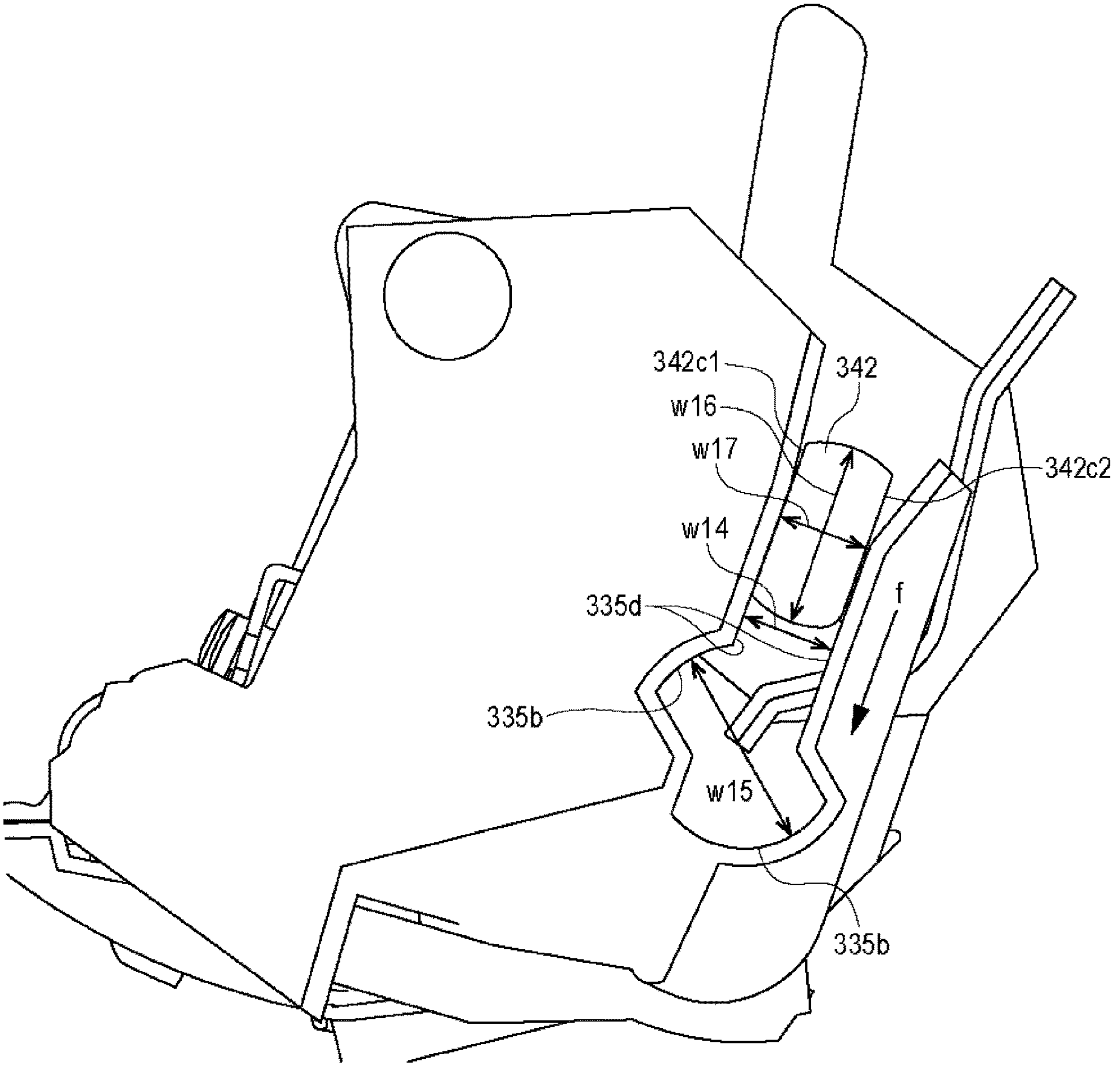

FIG. 54 illustrates a relationship between the insertion-guided portion (driving side) and the insertion-guided portion (non-driving-side).

Figure 55:
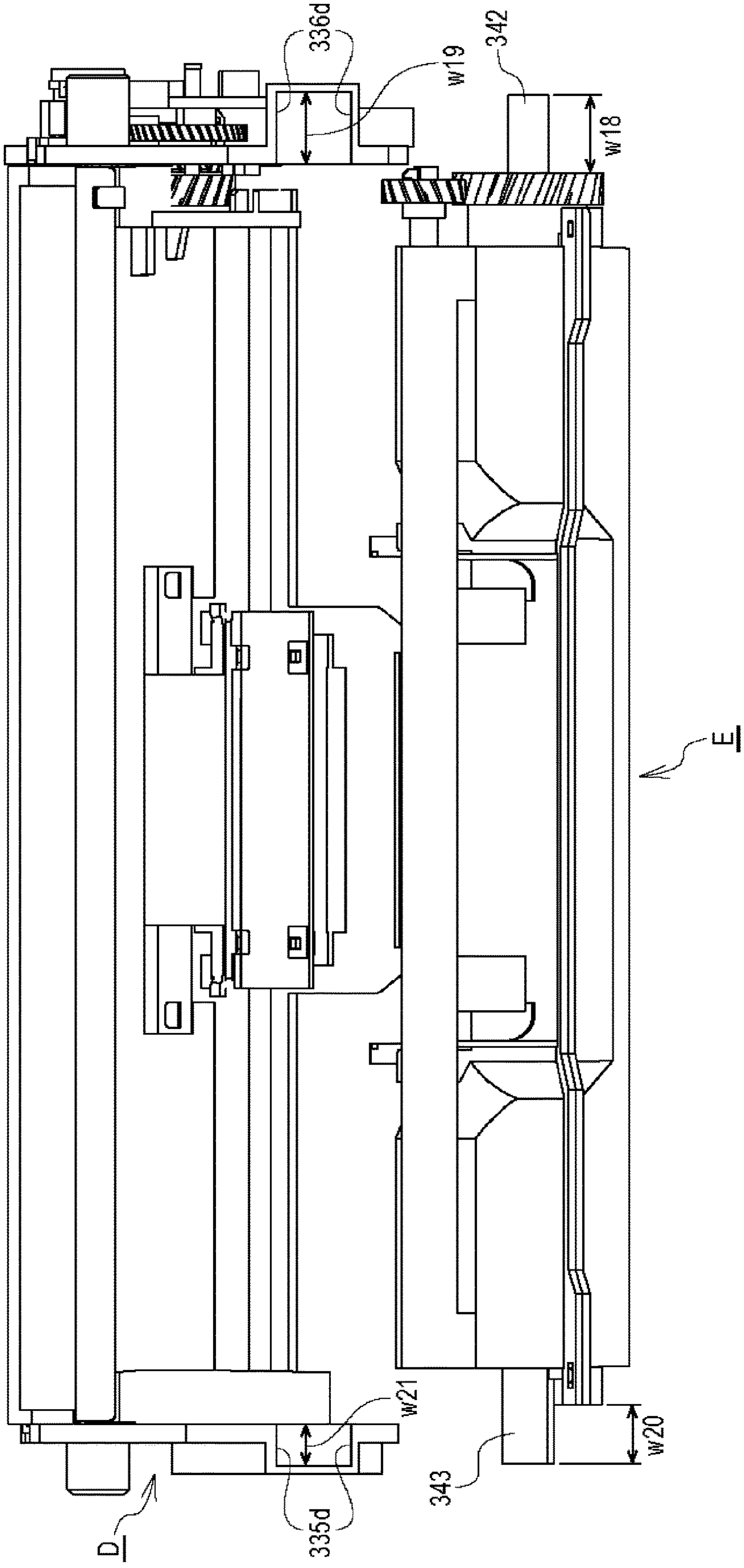

FIG. 55 illustrates a relationship between the insertion-guided portion (driving side) and the insertion-guided portion (non-driving-side).

Figure 56:
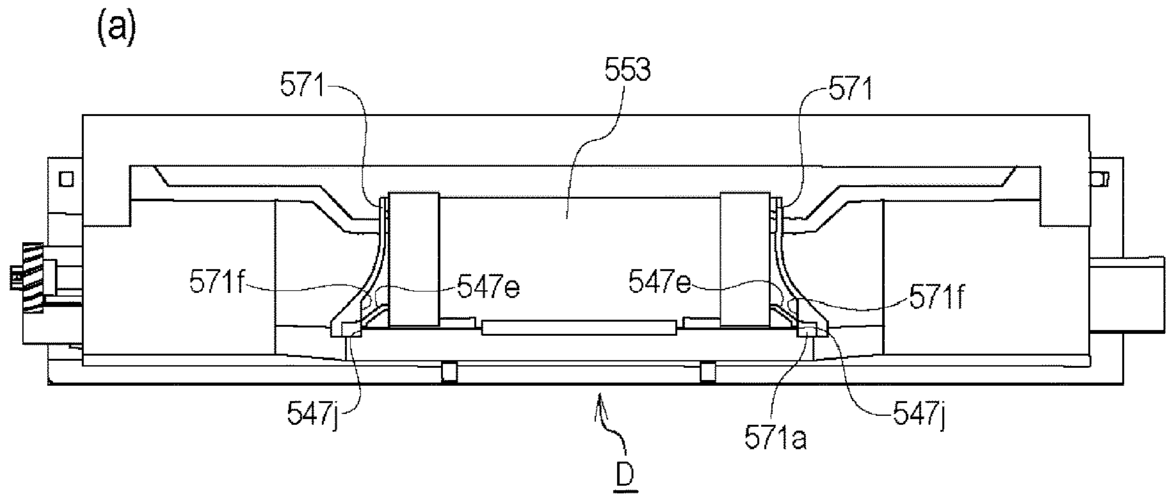
Figure 56:
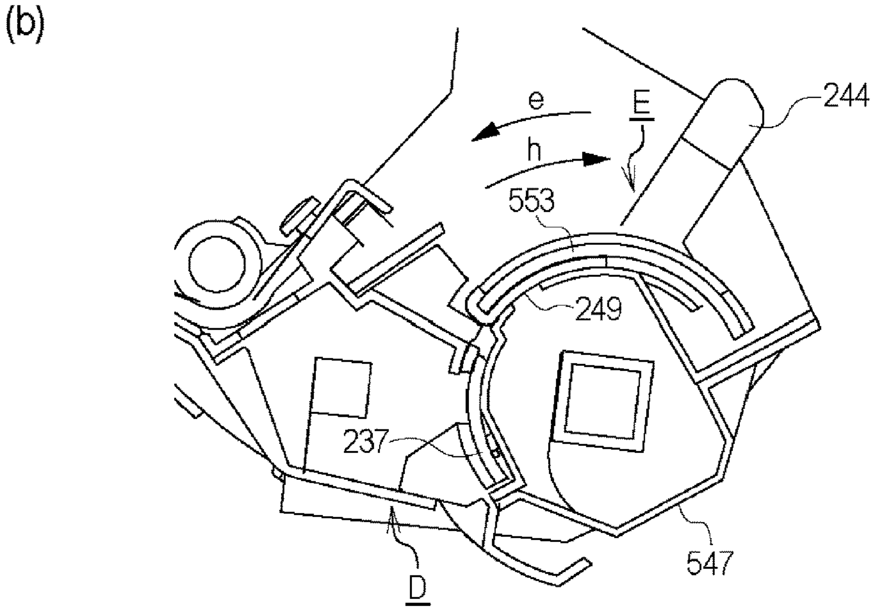
Figure 56:
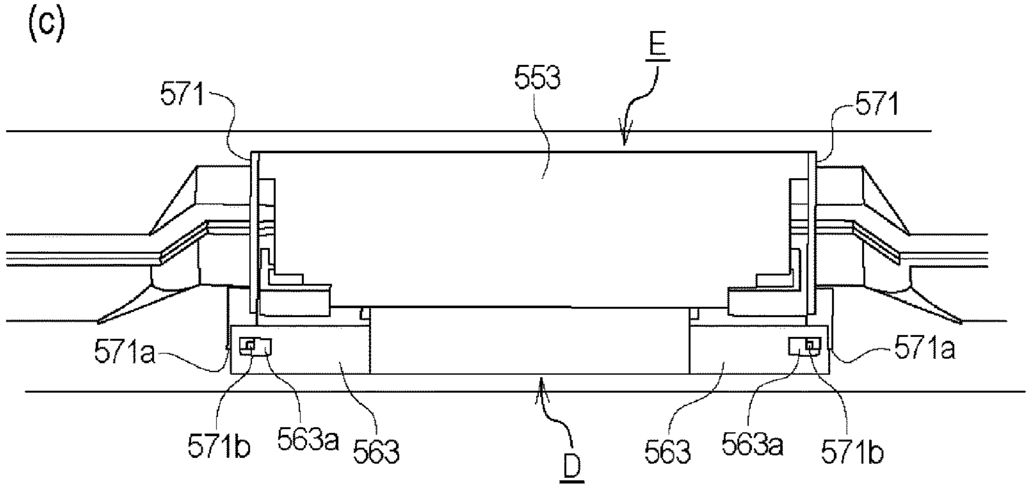

FIG. 56 illustrates a state in which the second shutter is in the closing position thereof.

Figure 57:
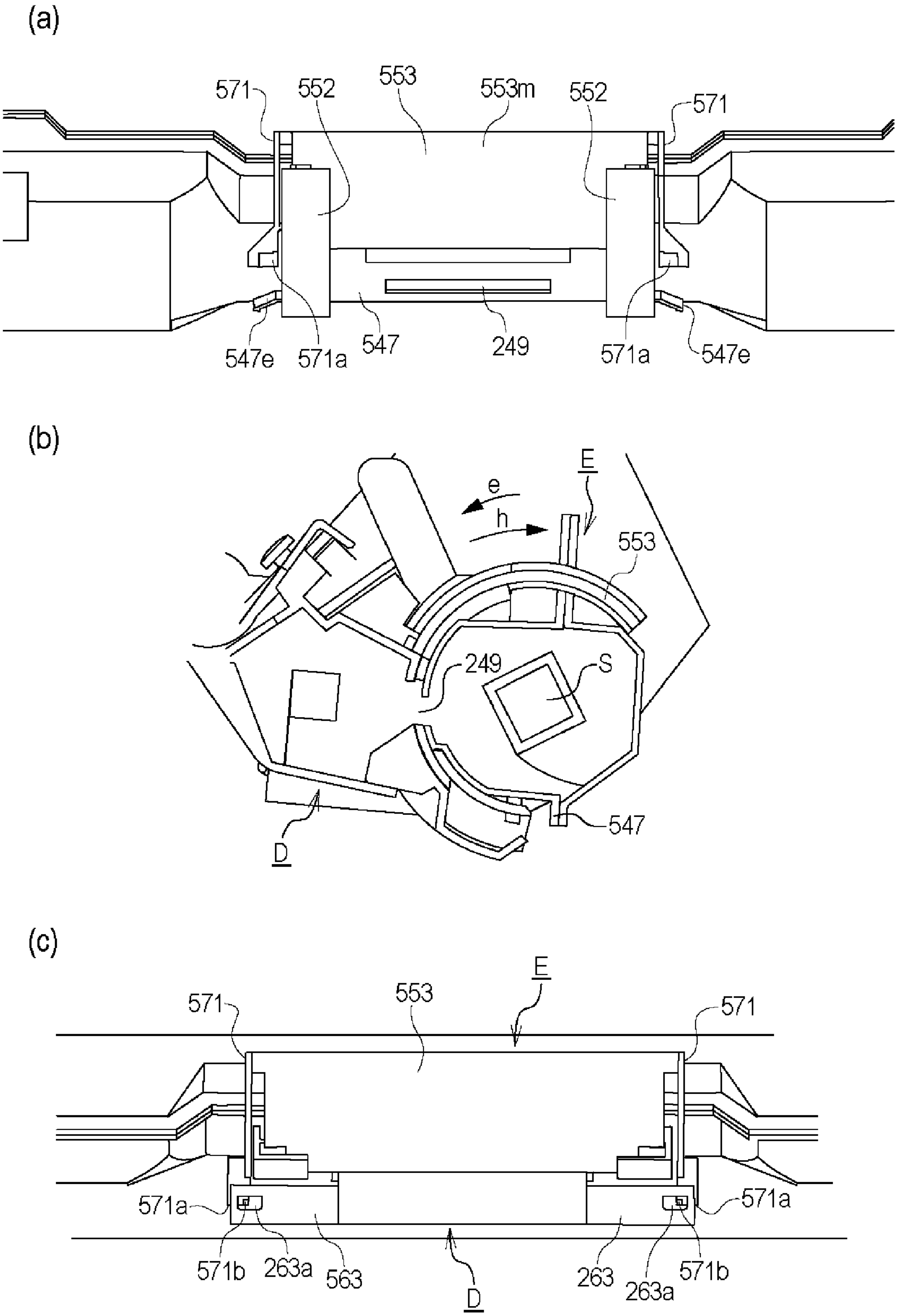

FIG. 57 illustrates a state in which the second shutter is in the open position.

Figure 58:
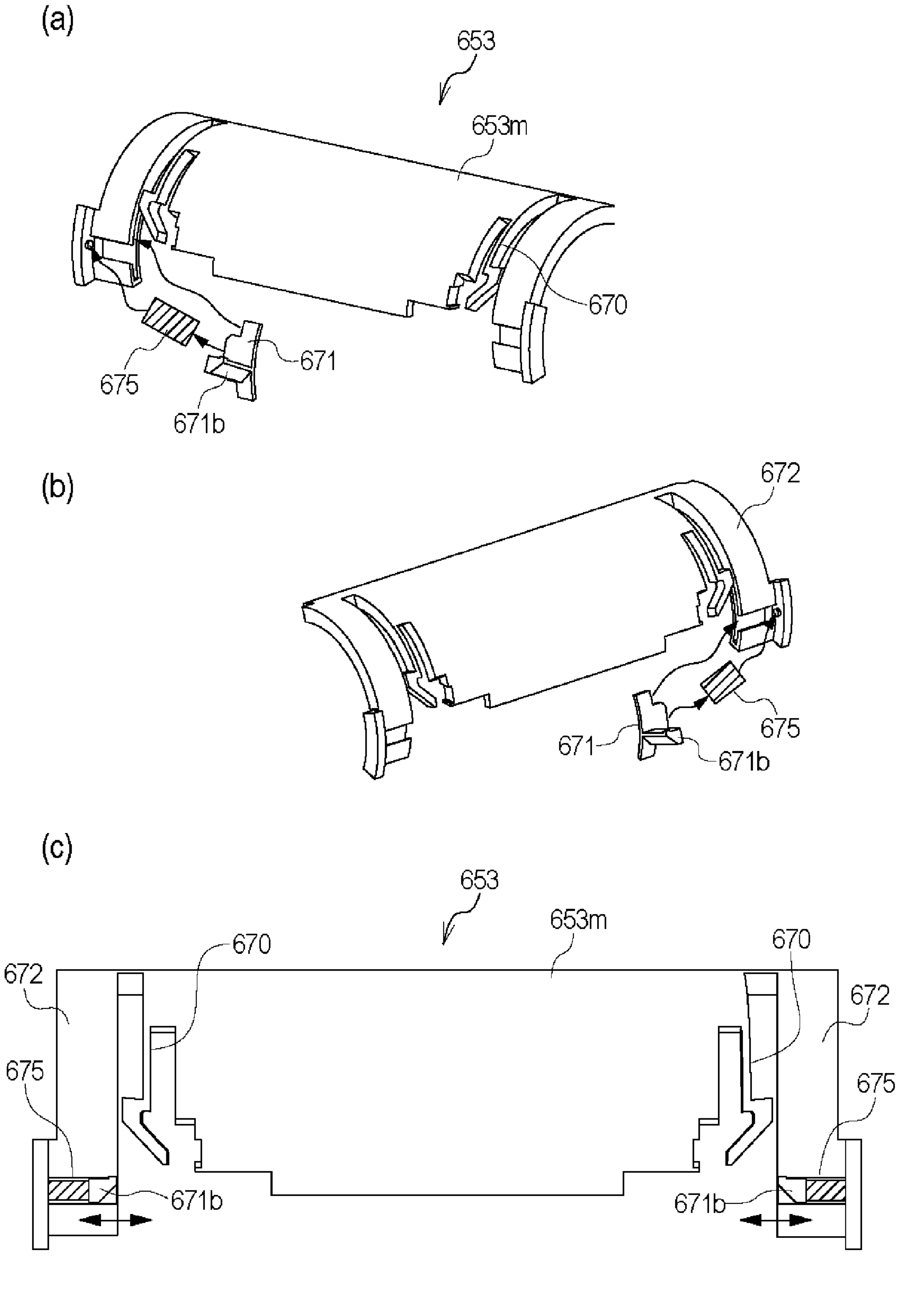

FIG. 58 illustrates the second shutter.

Figure 59:
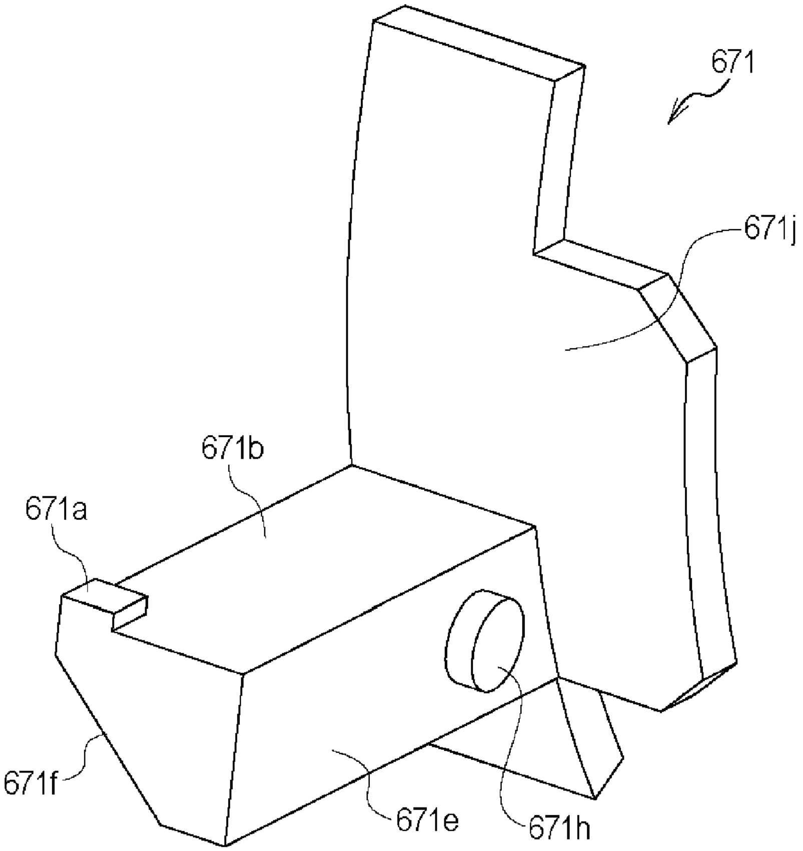

FIG. 59 illustrates the second shutter.

Figure 60:
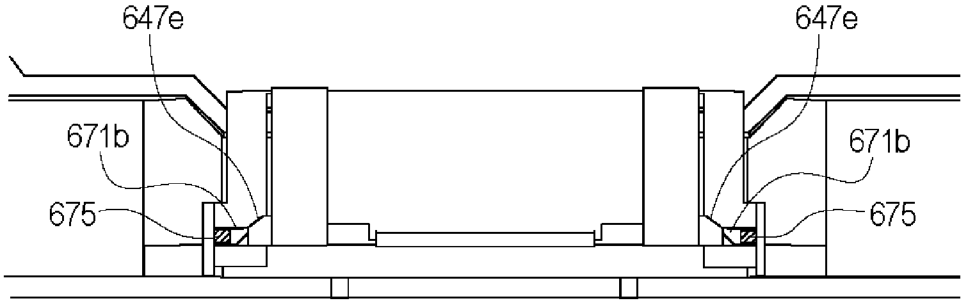
Figure 60:
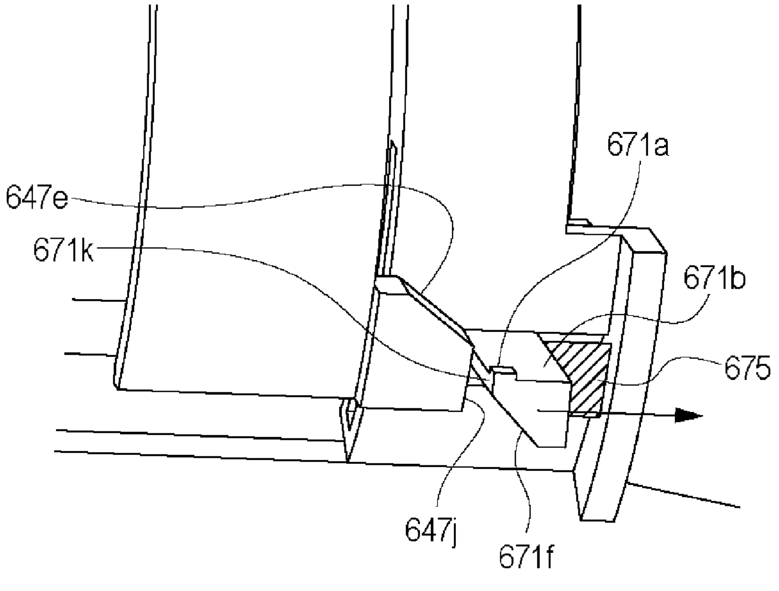

FIG. 60 illustrates a state in which the second shutter is in the closing position thereof.

Figure 61:
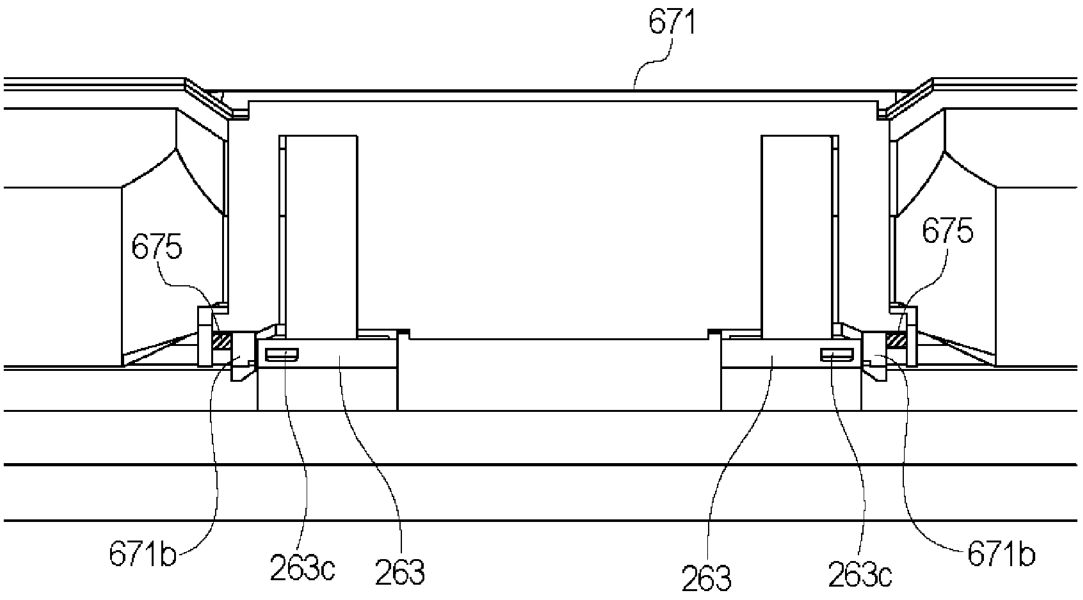
Figure 61:
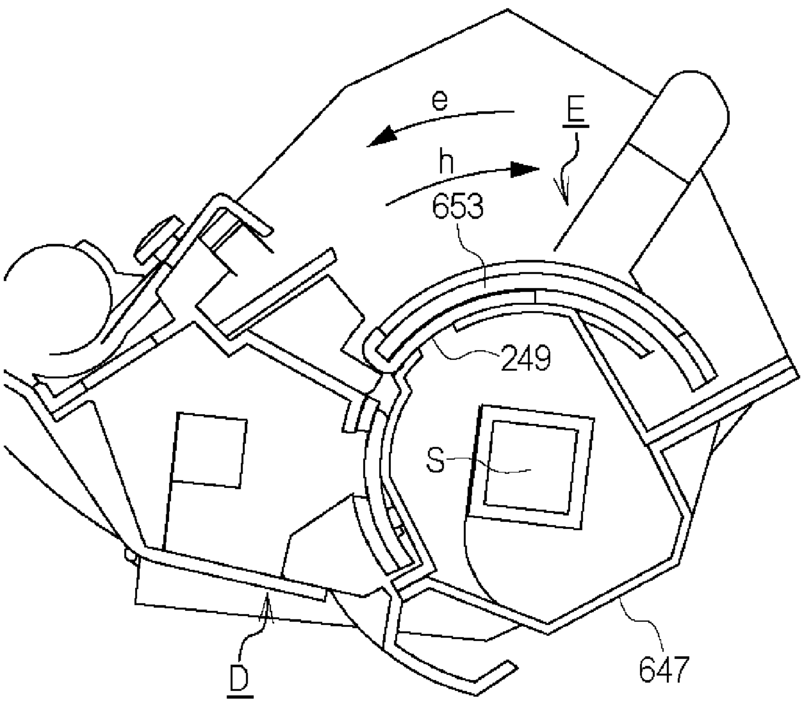

FIG. 61 illustrates a state in which the second shutter is in the closing position thereof.

Figure 62:
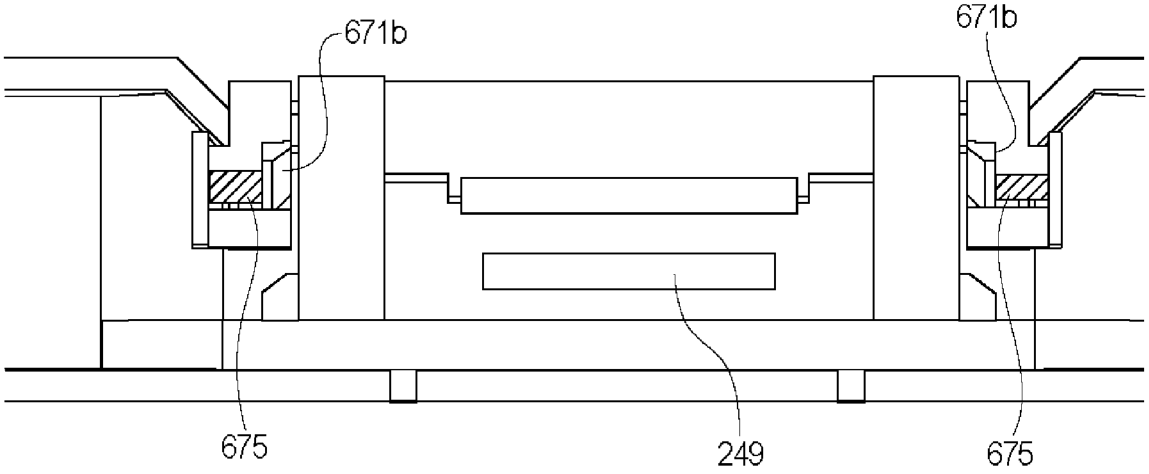
Figure 62:
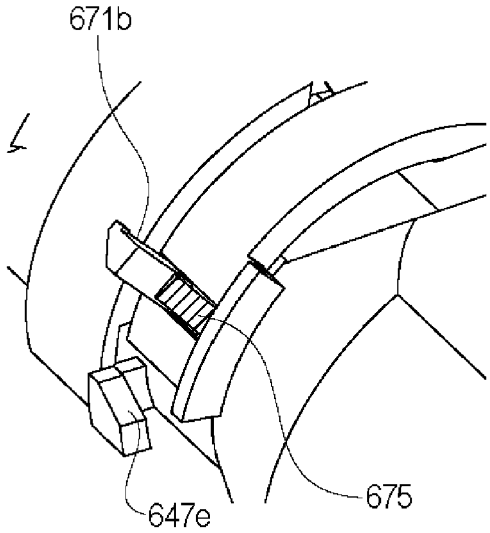

FIG. 62 illustrates a state in which the second shutter is in the open position.

Figure 63:
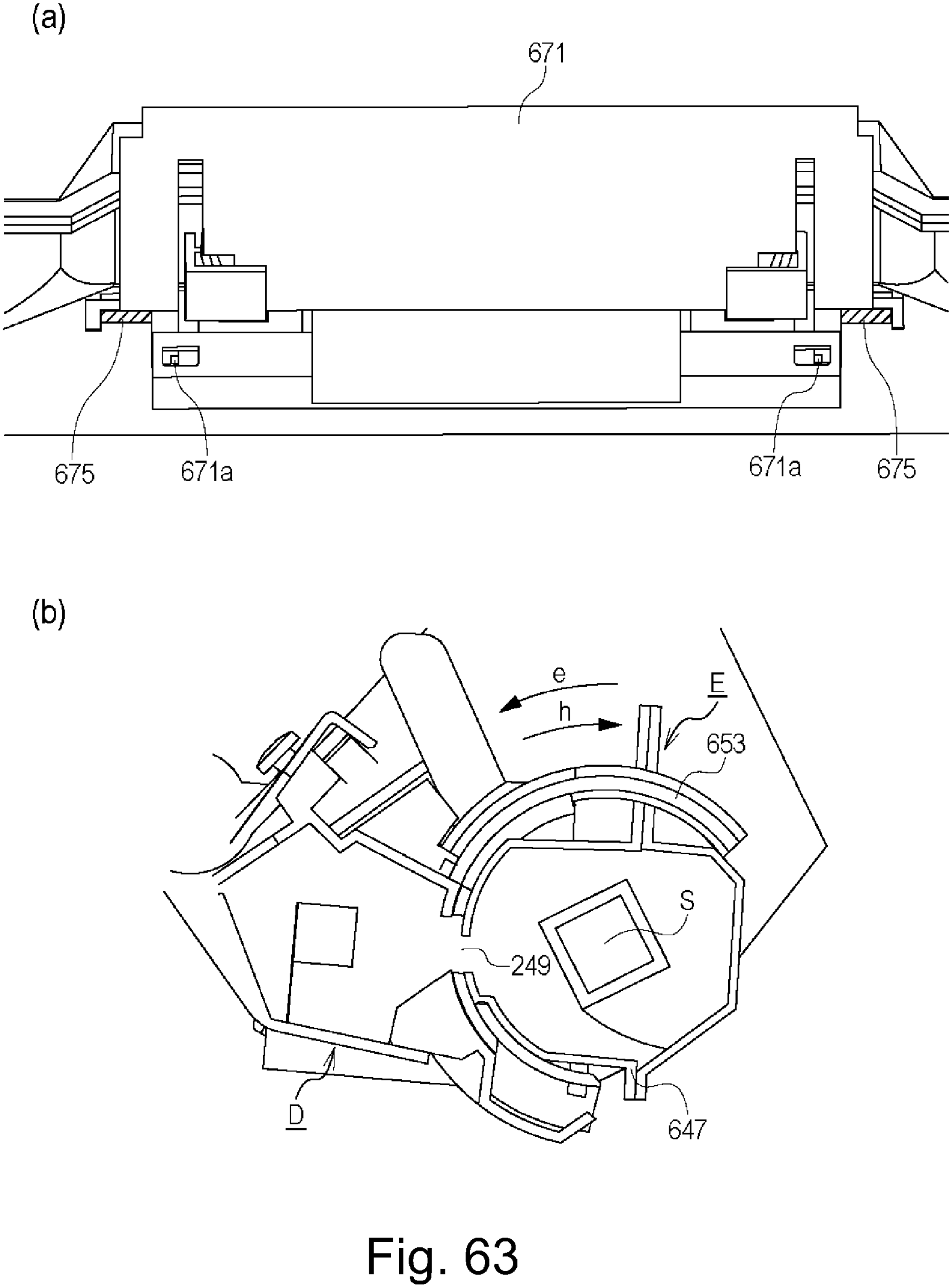

FIG. 63 illustrates a state in which the second shutter is in the closing position thereof.

Figure 64:
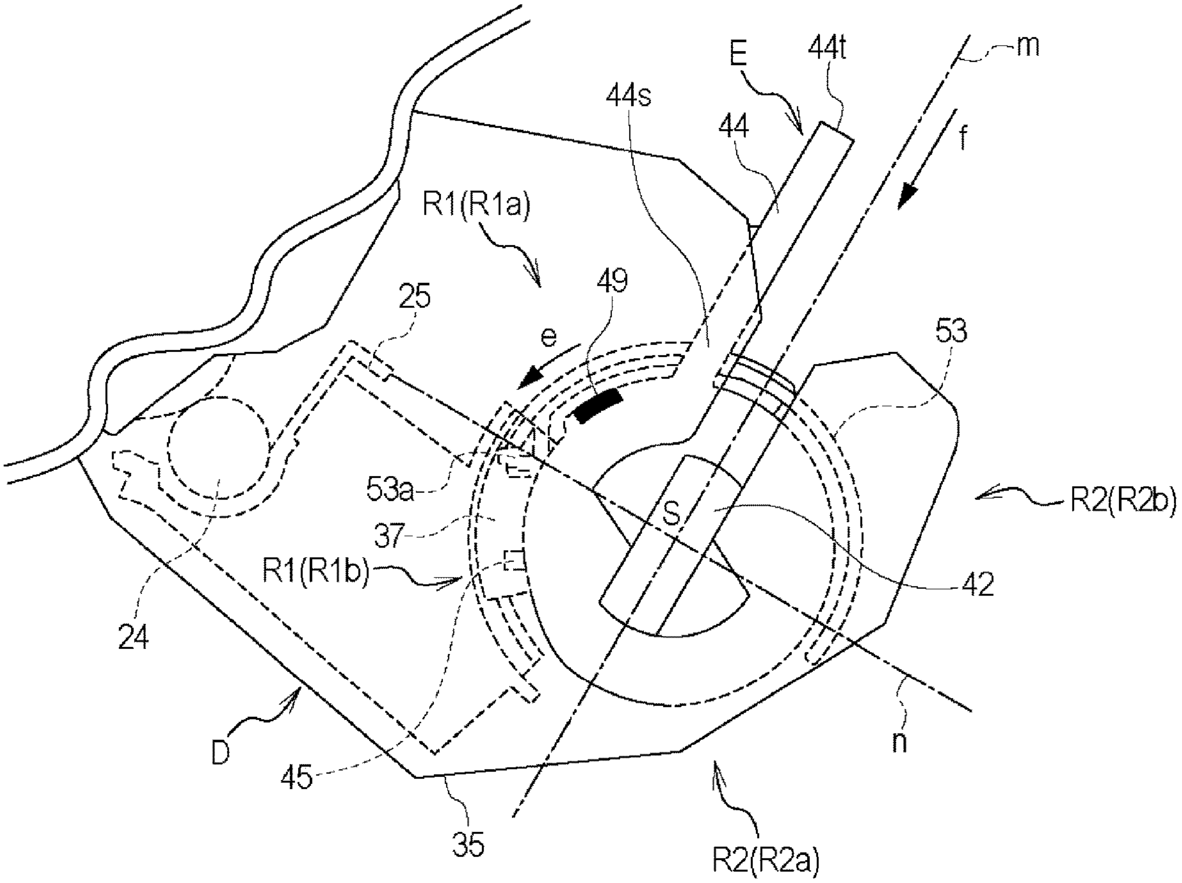

FIG. 64 illustrates the toner cartridge.

DESCRIPTION OF THE EMBODIMENTS

Referring to the accompanying drawings, an electrophotographic image forming apparatus, a toner image forming portion and a toner cartridge will be described. The image forming apparatus is an apparatus capable of forming an image on the recording material through an electrophotographic image forming process, for example. For example, it may be an electrophotographic copying machine, an electrophotographic printer (LED printer, laser beam printer or the like) or an electrophotographic printer type facsimile machine.

In this embodiment, it is a monochromatic image forming apparatus including one toner image forming portion. However, the number of the toner image forming portions provided in the image forming apparatus is not limited to this example. For example, the image forming apparatus may include a plurality of toner image forming portions to form color images.

Similarly, as for the structures disclosed in the embodiments, the material, the arrangement, dimension or other values or the like are not limited to the disclosed examples, unless otherwise stated particularly. In the following description, "up" is based on the direction of the gravity when the image forming apparatus is installed.

Embodiment 1

The structures contributable to the improvement in the usability will be described in detail. More particularly, it is a related with crispness when a user mounts the toner cartridge to a developing unit (developing cartridge).

The general arrangement of the image forming apparatus will be described the first, and then the developing unit and the toner cartridge will be described in detail. An operation of mounting the toner cartridge to the developing unit is called "mounting operation", and an operation of dismounting the toner cartridge from the developing unit is called "dismounting operation".

Figure 2:
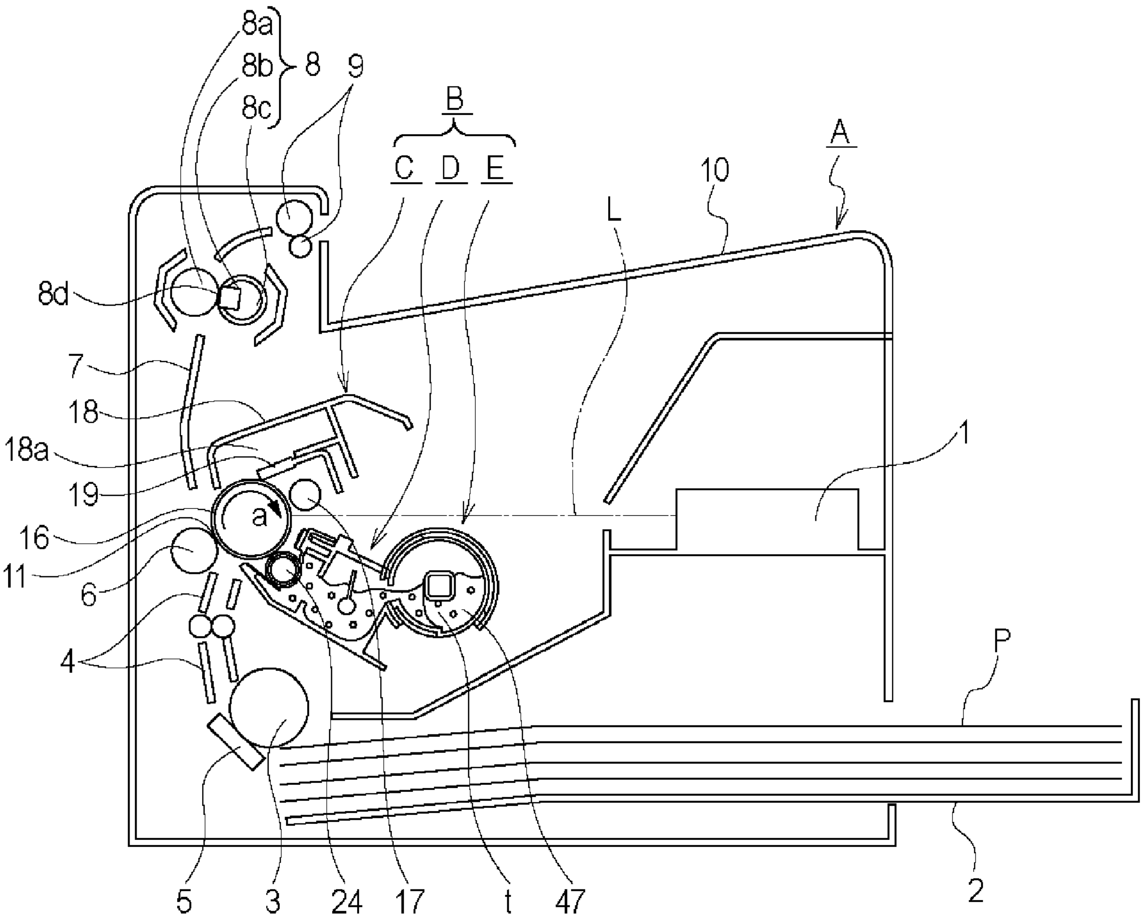
FIG. 2 is a sectional view illustrating a schematic structure of an image forming apparatus according to an embodiment of the present invention.

§ 1. Electrophotographic Image Forming Apparatus:

FIG. 2 is a side section of the image forming apparatus A according to this embodiment of the present invention. The image forming apparatus A shown in FIG. 2 receives image information from an external equipment such as a personal computer communicatably connected therewith. In accordance with image information received from the external equipment, the image forming apparatus A forms an image (toner image) with a developer (toner) on a recording material P (recording paper, OHP sheet, textile or the like) through an electrophotographic image forming process.

In the image forming apparatus A, the toner image forming portion (toner image forming unit) B is detachably mountable to a main assembly. The toner image forming portion (toner image forming unit) B of this embodiment comprises a drum unit (drum cartridge) C, the developing unit (developing device, developing cartridge) D and a toner cartridge E. The toner cartridge E is detachably mountable to the developing unit D. More particularly, the developing unit D is provided with a mounting portion for mounting the toner cartridge E, and constitutes a receiving device for receiving the toner cartridge E.

The toner image forming portion (toner image forming unit) can be deemed as a unit including a photosensitive drum and an element or elements actable on the photosensitive drum.

In this embodiment, the drum unit C, the developing unit D and the toner cartridge E are cartridges independently detachably mountable to the main assembly of the apparatus. In such a case, the drum unit C may be called a drum cartridge, and the developing unit D may be called a developing cartridge.

It is not inevitable that the drum unit C, the developing unit D and the toner cartridge E are in the form of such cartridges, respectively. For example, it is possible that the photosensitive drum (or drum unit including the photosensitive drum) is fixed in the main assembly, whereas the developing unit (developing cartridge) D and the toner cartridge E only are detachably mountable.

In addition, it is possible that the drum unit C and the developing unit D a unified into a single cartridge which is detachably mountable to the main assembly. The cartridge comprising the unified drum unit C and developing unit D may be called a process cartridge. In such a case, the toner cartridge E is mountable to and dismountable from the process cartridge. In such a case, the process cartridge is the receiving device. The image forming apparatus employing the process cartridge structure will be described in conjunction with Embodiment 4.

Furthermore, it is possible that the photosensitive drum and the developing unit are fixed in the main assembly, and the toner cartridge E only is detachably mountable to the main assembly. In such a case, the main assembly of the image forming apparatus per se is the receiving device for the toner cartridge E.

The structure including the receiving device (developing unit D) and the toner cartridge E in combination may be called a toner supply mechanism (toner supply unit, toner supplying device). In the toner supply mechanism, the toner is supplied from the toner cartridge E into the receiving device.

In this embodiment, the photosensitive drum as an image bearing member comprises a cylinder having a photosensitive layer and a flange or the like as a unit.

The mounting and dismounting of the cartridges are carried out by the user (operator). The main assembly (main assembly of the image forming apparatus) is the part of the image forming apparatus A except for the cartridges (drum unit C, developing unit D and toner cartridge E).

The drum unit C comprises the photosensitive drum (image bearing member) 16, a charging roller 17, the cleaning blade 19 and so on as a unit, and in this embodiment, it is a cartridge (drum cartridge) detachably mountable to the main assembly. The developing unit D comprises a developing roller (developer carrying member) 24 and so on as a unit, and in this embodiment, it is a cartridge (developing cartridge) detachably mountable to the main assembly. The toner cartridge E as the developer container comprises the toner container (developer accommodating container, container) 47 for accommodating the toner t as the developer and so on, which are unified into a cartridge.

The photosensitive drum 16 is rotatable in a direction indicated by an arrow a in FIG. 2. The surface of the rotating photosensitive drum 16 is uniformly charged by the charging roller 17 as charging means. The photosensitive drum 16 is exposed to a laser beam L supplied by way of the laser scanner (exposure means) 1 in accordance with the image information, so that an electrostatic latent image is formed on the photosensitive drum 16 in accordance with the image information. The toner t carried on the developing roller 24 develops the electrostatic latent image. By this, a toner image is formed on the photosensitive drum 16.

Figure 3:
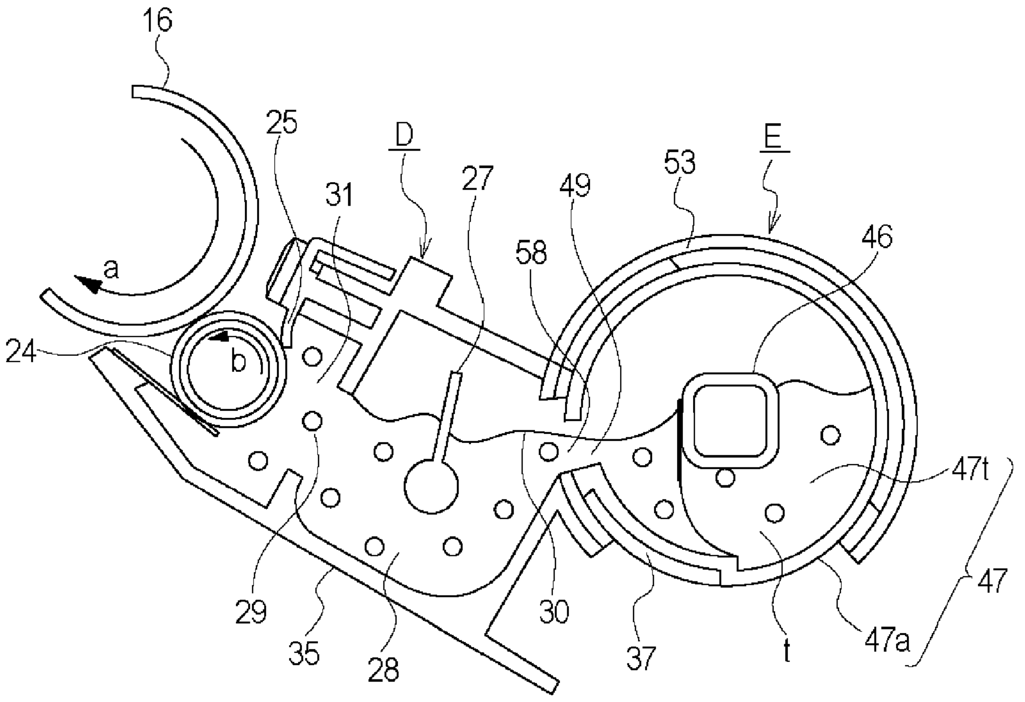
FIG. 3 is a side section schematically showing a state in which a developing unit is mounted to the toner cartridge.

Referring to FIG. 3, a developing process in the toner image forming portion B will be described. A frame 35 of the developing unit D as the receiving device rotatably supports the developing roller 24. The developing roller 24 receive a driving force from a power source such as a motor (unshown) provided in the main assembly to rotate codirectionally with the peripheral surface of the photosensitive drum 16 (arrow b in the Figure).

The toner tin a developing chamber 31 is carried on the peripheral surface of the developing roller 24 with a regulated layer thickness by a developing blade 25. When the layer thickness is regulated, the toner is triboelectrically charged. The charged toner develops the electrostatic latent image on the photosensitive drum 16.

In the developing unit D, the developing chamber 31 is in fluid communication with a first toner accommodating portion (developer accommodating portion) 28 through a first opening 29. A first toner feeding means 27 rotated by a driving source (unshown) feeds the toner t from the first toner accommodating portion 28 into the developing chamber 31.

In addition, a communicating portion 58 is provided by a second opening (accommodation member opening, receiving port, receiving opening) 30 and a third opening (container opening, discharge port, discharge opening) 49. Through the communicating portion 58, the first toner accommodating portion (accommodation member accommodation chamber) 28 is in fluid communication with the second toner accommodating portion (container accommodation chamber) 47*t* of the toner cartridge E.

The second toner accommodating portion 47*t* is the space in the container 47 for accommodating the toner. The second toner accommodating portion 47*t* is an accommodating portion (toner accommodating portion, developer accommodating portion) provided by the frame (container frame 47*a*) of the container 47.

A third opening 49 is formed in the container frame 47*a* and permits the toner to discharge from the second toner accommodating portion 47*t* to an outside (developing unit D) of the container 47. The toner discharged through the third opening 49 is received through the second opening 30 of the developing unit D.

Into the first toner accommodating portion 28, the toner t is supplied from the second toner accommodating portion 47*t* by a second toner feeding member 46 rotated by a driving force applied from the main assembly by way of the developing unit D.

The description will be made further, referring back to FIG. 2. The recording material P set in a feeding cassette 2 is singled out and is fed by a pick-up roller 3 and a press-contact member 5 press contacted thereto. In synchronism with the toner image formed on the photosensitive drum, the recording material P is fed to the transfer roller 6 as a transferring means, along a feeding guide 4.

Then, the recording material P is passed through a transfer nip 11 formed between the photosensitive drum 16 and the transfer roller 6 supplied with a predetermined voltage. At this time, the toner image formed on the photosensitive drum 16 is transferred onto the recording material P. The recording material P having the transferred toner image is fed into a fixing means 8 along the feeding guide 7.

The fixing means 8 includes a driving roller 8*a* and a fixing roller 8*c* containing a heater 8*b* therein. The recording material P receives heat and pressure during passing through a nip 8*d* formed between the fixing roller 8*c* and the driving roller 8*a*. By this, the toner image transferred onto the recording material P is fixed on the recording material P. Thereafter, the recording material P carrying the fixed toner image is further fed by a pair of discharging rollers 9 onto a discharging tray 10.

The cleaning blade 19 is elastically contacted to the outer peripheral surface of the photosensitive drum 16. By this, the toner t (untransferred toner) remaining on the photosensitive drum 16 without being transferred onto the recording material P is scraped off by the cleaning blade 19. The scraped toner t is accommodated into a removal toner accommodating portion (residual toner accommodating portion) 18*a* of a frame 18 on which the cleaning blade 19 is fixed.

As described hereinbefore, the image forming apparatus of this embodiment uses an electrophotographic image formation type process and forms an image on the recording material with the developer (toner). However, the image forming apparatus will suffice if an image is formed on the recording material, and the type of the image forming apparatus is not limited to the electrophotographic copying machine, the electrophotographic printer (laser beam printer, LED printer or the like), the electrophotographic printer type facsimile machine, the electrophotographic word processor or the like.

As described hereinbefore, the toner image forming portion B comprises the electrophotographic photosensitive member (photosensitive member) as the image bearing member and process means actable on the photosensitive member. In this embodiment, the toner image forming portion is detachably mountable to the main assembly of the image forming apparatus as a single cartridge or multiple cartridges.

The process means includes the charging means (charging member, charging device), the developing means (developing device, developing unit), the cleaning means (cleaning device, cleaning member).

The developing device is a device for developing an electrostatic latent image on the photosensitive member. In this embodiment, the developing device (developing unit) is formed into a cartridge which is independently detachably mountable to the image forming apparatus. On the hand, a part of the process cartridge may constitute the developing device.

The toner cartridge (developer cartridge, toner bottle, developer bottle, toner container, developer container) is a cartridge accommodating the developer (toner) for developing the electrostatic latent image formed on the photosensitive member.

§ 2. Structures of Cartridges (Units):

The details structures of the cartridges (units) detachably mountable to the image forming apparatus will be described.

(Neighborhood of Receiving Portion of Toner Cartridge of Developing Unit)

Figure 4:
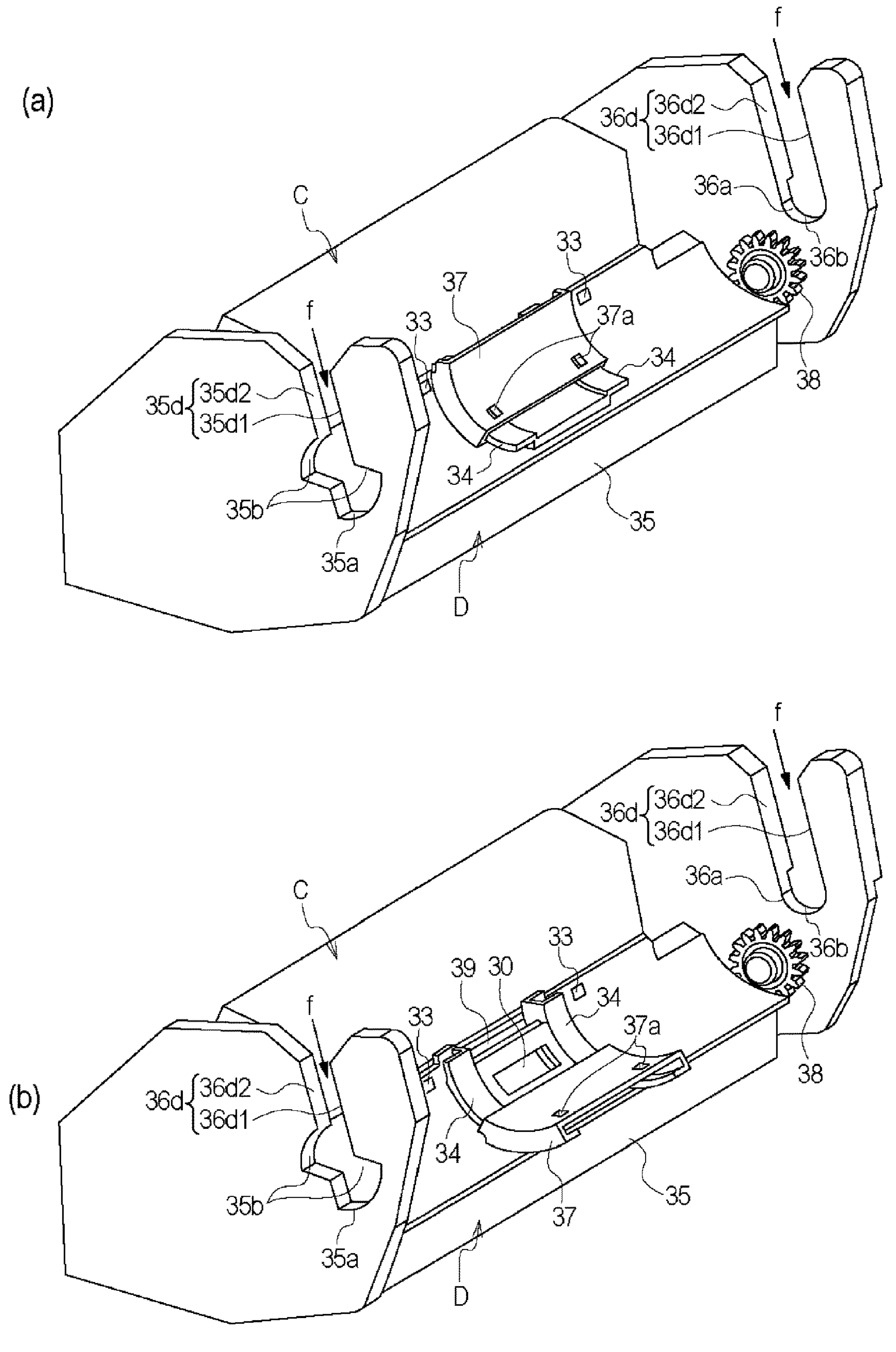
FIG. 4 is a perspective view schematically illustrating the developing unit according to this embodiment.

Referring to FIG. 4, the description will be made as to the details structure of the neighborhood of the receiving portion of the toner cartridge E of the developing unit (developing cartridge) D in this embodiment. FIG. 4 is a perspective view of the neighborhood of the receiving portion (mounting portion) of the toner cartridge E of the developing unit D. Part (a) of FIG. 4 illustrates the state in which the second opening 30 is closed, that is, a first shutter 37 is in a closing position. Part (b) of FIG. 4 illustrates the state in which the second opening 30 is opened, that is, the first shutter 37 is in an opening position. In this embodiment, a longitudinal direction of the developing unit D is parallel with a rotational axis direction of the developing roller 24 of the developing unit D. In the state that the toner cartridge E is mounted to the developing unit, the longitudinal direction of the toner cartridge E is substantially parallel with the longitudinal direction of the developing unit D The developing unit D is capable of receiving the toner cartridge E in the frame (developing device frame) 35 at the receiving portion. In the neighborhood of the receiving portion, the developing unit D is provided with the second opening (accommodation member opening, receiving opening) 30 and the first shutter (accommodation member shutter, receiving device side shutter, receiving device side open/close member) 37. In this embodiment, the second opening 30 is provided at a longitudinally central portion of the developing unit D. However, the position of the second opening 30 is not limited to such, and will suffice if it is opposed to the third opening (container opening) 49 which will be described hereinafter.

As shown in part (a) of FIG. 4, the second opening 30 is closed by the first shutter 37 having a shape curved along the outer peripheral surface of the toner cartridge E.

The first shutter 37 is provided with a hole portion 37*a* engageable with a projection (container side engaging portion, open/close member moving portion, container side projection) 47 provided on the toner cartridge E as the developer container. The hole portion 37 is disposed at the position out of a sealing range in which the first shutter 37 seals the second opening 30.

The opposite longitudinal end portions of the first shutter 37 are engageable with first shutter guide portions 34 provided at the longitudinally opposite sides of the second opening 30 of the frame 35 of the developing unit D. By this, the first shutter is slidable (movable) along first shutter guide portion 34.

By this, the first shutter 37 is movable between the closing position (receiving opening closing position, part (a) of FIG. 4) for closing the second opening 30 and the opening position (receiving opening position, part (b) of FIG. 4) for opening the second opening 30.

The frame 35 of the developing unit D is provided with a first sealing seal 32 for sealing between the first shutter 37 and the second opening 30 so as to surround the second opening 30.

The developing unit D is provided at the opposite longitudinal ends of the frame 35 with insertion guide portions 35*d*, 36*d* for guiding the toner cartridge E while maintaining the attitude (mounting attitude) of the toner cartridge when the toner cartridge E is mounted (inserted), respectively.

In addition, the developing unit D, is provided with abutted portion (portion to be abutted) 35*a*, 36*a* to which the abutting portions 42*a*, 43*a* of the toner cartridge E abuts upon the insertion which will be described hereinafter.

The developing unit D is further provided at the opposite longitudinal ends of the frame 35 with rotation guide portions 35*b*, 36*b* for guiding the rotation of the toner cartridge E when the first shutter 37 and the second shutter (container shutter) 53 is opened and closed.

The insertion-guiding portions 35*d*, 36*d* linear extend in parallel with each other along an inserting direction f (part (a) of FIG. 4) of the toner cartridge E. The inserting direction of the toner cartridge E is a mounting direction, and a dismounting direction is opposite from the mounting direction.

In a non-driving side of the developing unit D and the abutted portion 35*a* and the rotation guide portion 35*b* are provided in a downstream side with respect to the inserting direction f of the insertion guide portion 35*d*, and in the driving side thereof, the abutted portion 36*a* and the rotation guide 36*b* are provided in the downstream side with respect to the inserting direction f of the guide portion 36*d*.

Of opposite end sides of the developing unit D, the side provided with the driving portion (first drive transmitting portion 38, for example) such as a gear is called “driving side”. A non-driving side of the developing unit is the opposite side from the driving side.

In addition, the developing unit D is provided at one end portion of the frame 35 with respect to the longitudinal direction with the first drive transmitting portion 38 for transmitting a driving force to a second toner feeding means 46 of the toner cartridge E which will be described hereinafter.

The first drive transmitting portion 38 includes a gear which is connected with a driving mechanism of the main assembly of the image forming apparatus in the developing unit D. The first drive transmitting portion 38 is a rotational force receiving portion (driving force receiving portion) for receiving a rotational force for driving the second toner feeding member 46 from an outside of the toner cartridge E.

Furthermore, the developing unit D is provided with a hole portion 33 at each of longitudinally opposite end portions of the frame 35. The hole portions 33 are engageable with the claw portions 53*b* of the second shutter 53 of the toner cartridge E which will be described hereinafter.

The claw portion 53*b* is an engaging portion (open/close member side engaging portion) provided at a free end of an arm portion 53*a*. Therefore, when the third opening 49 is opened and closed, the second shutter 53 is prevented from rotating together with the container frame 47*a* which will be described hereinafter.

(Toner Cartridge)

Figure 5:
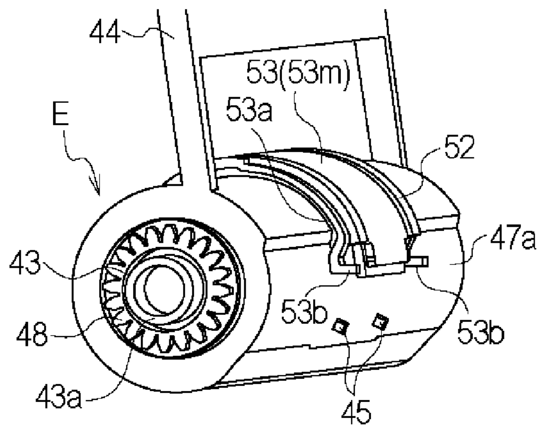
FIG. 5 is a schematic view of the toner cartridge according to the embodiment.
Figure 5:
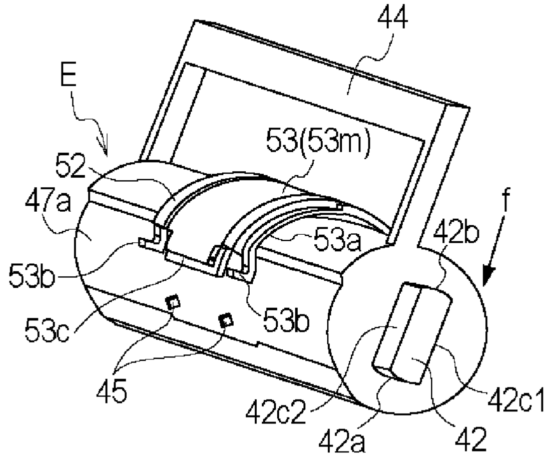
Figure 5:
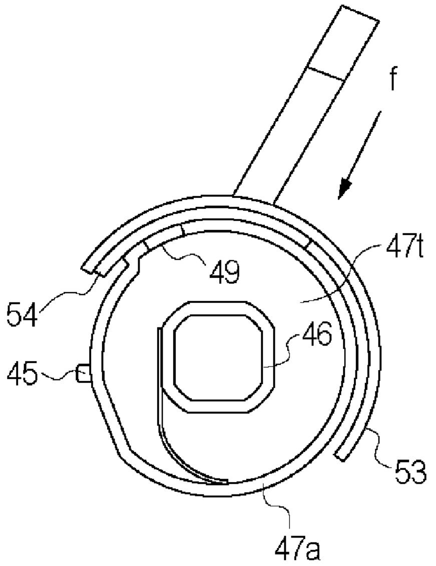
Figure 5:
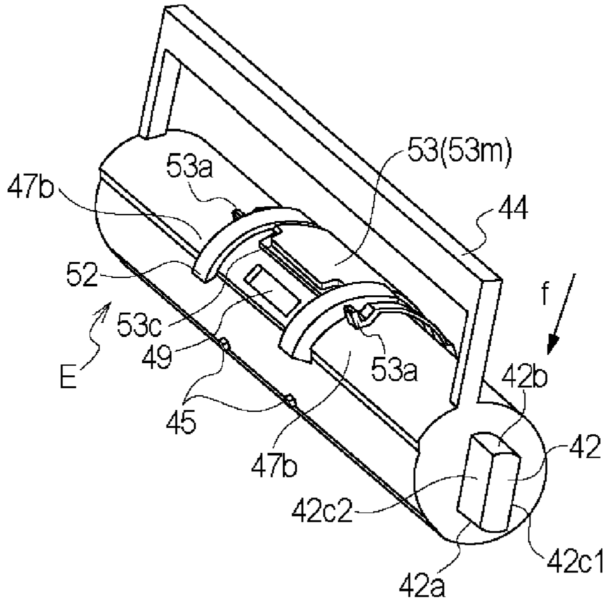

Referring to FIG. 5, the toner cartridge E according to this embodiment of the present invention will be described in detail.

Part (a) of FIG. 5 is a perspective view of the toner cartridge E as seen from the second drive transmitting portion 48 side (driving side). Part (b) of FIG. 5 is a perspective view of the toner cartridge E as seen from the opposite side (non-driving side) of the second drive transmitting portion 48.

Part (c) of FIG. 5 is a sectional view of the toner cartridge E as seen from the opposite side of the second drive transmitting portion 48. Part (d) of FIG. 5 is a perspective view of the toner cartridge E in the state that the second shutter 53 is in the opening position (third opening 49 is opened).

The toner cartridge E comprises the container 47, the second shutter (developer container shutter) 53 movable relative to the container 47, the second toner feeding member 46 provided in the container 47, and the second drive transmitting portion (gear) 48 mounted on the second toner feeding member 46.

The container 47 is substantially cylindrical. Thus, the frame (container frame) 47*a* constituting a main body (major part) of the container 47 is substantially cylindrical. The container 47 is provided with a grip member 44. The grip member 44 is in the form of a U-shaped projection integrally formed with the frame 47*a*. The shape of the grip member 44 is not limited to the U-shape, and the grip member 44 may be non-integral with the frame 47*a* and may be mounted to the frame 47*a*.

The container frame (cylindrical portion) 47*a* is hollow to constitute to the second toner accommodating portion 47*t* for accommodating the toner. The container frame 47*a* is provided in the peripheral surface thereof with the third opening 49 for discharging the toner from the second toner accommodating portion 47*t*.

The container frame 47*a* is provided with a second sealing seal 54 for sealing between the container frame 47*a* and the second shutter 53, the second sealing seal 54 surrounding the third opening 49.

The container frame 47*a* is provided on the cylindrical outer periphery with two projections 45 engageable with the hole portions 37*a* of the first shutter 37. The two projections 45 are projections projecting in substantially the same directions. A line connecting the two projections 45 with each other is substantially parallel with the longitudinal direction of the toner cartridge E.

In the longitudinal direction of the container 47, the two projections 45 are disposed outside the third opening 49. More specifically, as two projections 45 and the third opening 49 a projected on a phantom line parallel with a rotational axis of the second shutter 53, the entirety of the third opening 49 is within the range between the two projections.

Inside the second toner accommodating portion 47*t* of the container frame 47*a*, the second toner feeding member 46 for feeding the toner is rotatably provided. The position where the projection and the hole are engaged with each other is called "engaging position", and the position where they are disengaged from each other is called "non-engaging position)" (released position).

In one end portion of the second toner feeding member 46 with respect to the longitudinal direction (rotational axis direction), the second drive transmitting portion (gear) 48 for receiving a driving force for rotating the second toner feeding member 46 is provided. Here, the longitudinal direction of the toner cartridge E is parallel with the rotational axis direction of the second toner feeding member 46.

In this embodiment, the third opening 49 is provided on the outer peripheral surface of the container frame 47*a* in the longitudinally central portion of the toner cartridge E. The position of the third opening 49 not limited to a particular portion, and will be any if it is opposed to the second opening 30.

The second shutter 53 is curved along the outer peripheral surface of the container frame 47*a* of the toner cartridge E. A section of the second shutter 53 (section perpendicular to the center axis of the container frame 47*a*) has a curve configuration (substantially arcuate configuration) extending along the outer periphery of the container frame 47*a*.

The container frame 47*a* has a curved surface (substantially cylindrical or arcuate) at least in the peripheral area of the third opening 49. Along the curved surface portion (arcuate portion) around the third opening 49, the second shutter 53 is rotatable (circulatable) around the periphery of the container frame 47*a*. By this, the second shutter 53 is capable of opening and closing the third opening 49.

The second shutter 53 includes a main body portion 53*m* of the shutter for closing the third opening 49. The second shutter 53 is provided with two snap fit portions each including an arm portion 53*a* and a claw portion 53*b*.

More particularly, the second shutter 53 is provided with two arm portions 53*a* at the longitudinal the opposite end portions of the main body portion 53*m* of the shutter, and is provided with two claw portions 53*b* provided at a free end portions of the arm portions 53*a*, respectively. The longitudinal direction of the main body portion 53*m* of the shutter is substantially parallel with the longitudinal direction of the toner cartridge E.

The claw portion 53*b* is an engaged portion (portion to be engaged, shutter side engaging portion, open/close member side engaging portion) for engaging with the developing unit D. The claw portion 53*b* is exposed outwardly in the radial direction of the container 47 (container frame 47*a*) having the cylindrical shape. More particularly, the claw portion 53*b* is a projection projected at least radially outward of the container 47 (container frame 47*a*).

The arm portion 53*a* is a supporting portion for supporting the claw portion 53*b* and is a connecting portion for connecting the claw portion 53*b* with the main body portion 53*m* of the shutter. The arm portion 53*a* includes an elastic portion (deformable portion, movable portion) capable of elastic deformation. That is, the arm portion 53*a* itself is elastically deformable.

The arm portion 53*a* extends from the trailing side to the leading side of the second shutter 53. The leading side of the second shutter 53 is a downstream side in the direction in which the second shutter 53 move relative to the container frame 47*a* when the second shutter 53 closes the third opening 49. The free end of the second shutter 53 is an end portion of the second shutter 53 with respect to a widthwise direction of the second shutter 53 (direction perpendicular to the longitudinal direction of the second shutter 53).

By elastic deformation of a part of the arm portion 53*a*, the claw portion 53*b* is movable relative to the main body portion 53*m* of the shutter.

The opposite longitudinal end portions of the second shutter 53 (main body portion 53*m* of the shutter) are engaged with second shutter guide portions (opening and closing guide) 52 provided at the opposite longitudinal end portions of the third opening 49 of the container frame 47*a*. The second shutter is slidable on the outer peripheral surface of the container frame 47*a* along the second shutter guide portion 52 in a circumferential direction. By this, the second shutter 53 is movable along the outer peripheral surface of the toner cartridge E between the opening position (container opening position, part (d) of FIG. 5) for opening the third opening 49, and the closing position (container closing position, part (b) of FIG. 5) for closing the third opening 49.

When the second shutter 53 is in the opening position, it is desirable that the third opening 49 is fully opened without being covered by the main body portion 53*m* (closing portion) of the shutter, as shown in part (d) of FIG. 5. However, if the toner can be discharged through the third opening 49 when the second shutter 53 is in the opening position, a part of the third opening 49 may be covered by the main body portion 53*m* (closing portion) of the shutter. That is, it will suffice if the supply of the toner from the toner cartridge E into the developing unit D is permitted even if the main body portion 53*m* of the shutter opens at least a part of the third opening 49, when the second shutter 53 is in the opening position.

When the second shutter 53 is in the closing position, it is desirable that the third opening 49 as a whole is covered by the main body portion 53*m* of the shutter, as shown in part (b) of FIG. 5. However, it will suffice if the third opening 49 is substantially closed by the main body portion 53*m* of the shutter to sufficiently prevent leakage of the toner through the third opening 49 even if the third opening 49 slightly opens. That is, it will suffice if the main body portion 53*m* of the shutter substantially closes the third opening 49 when the second shutter 53 is in the closing position.

The container frame 47*a* of the toner cartridge E is provided with the insertion-guided portion (portion to be guided, toner cartridge side guide portion) 42, 43 at each of the longitudinal opposite end portions of the toner cartridge E. By the insertion-guided portions (portions to be guided, guided portions) 42, 43 being guided by the insertion-guiding portions 35*d*, 36*d* of the developing unit D, the attitude of the toner cartridge E is stabilized upon the mounting and dismounting of the toner cartridge E.

The toner cartridge E is further provided with an abutting portion 42*a*. The abutting portion 42*a* abuts to the abutted portion 35*a* of the developing unit D when the toner cartridge E is inserted to the developing unit D.

The toner cartridge E is provided with a rotation-guided portion 42*b* (portion to be guided for rotation). The rotation-guided portion 42*b* guides the container frame 47*a* when the toner cartridge E is rotated to open and close the first shutter 37 and the second shutter 53. The container 47 can be rotated by the provision of the rotation-guided portion 42*b*. The rotation-guided portion 42*b* is a rotation guide (toner cartridge side rotation guide) for guiding the rotation of the toner cartridge E. The rotation-guided portion 42*b* has a curved shape (substantially arcuate)

In addition, the insertion-guided portion 42 is provided with the regulated portion (portion-to-be-regulated, regulated surface, attitude regulating portion, inserting direction regulating portion) 42*c*1, 42*c*2 for regulating the insertion attitude, dismounting attitude (inserting direction and dismounting direction) of the toner cartridge E when the cartridge E is inserted and dismounted. The insertion-guided portion 42 may have a lightening in a part of an outer configuration to change the outer configuration.

The insertion-guided portion 43 is provided with the abutting portion 43*a* to abut to the abutted portion 36*a* of the developing unit D when the toner cartridge E is inserted. The insertion-guided portion 43 also functions as the rotation-guided portion (toner cartridge side rotation guide portion) For guiding the container frame 47*a* when the abutting portion 43*a* opens and closes the first shutter 37 and the second shutter 53.

In this embodiment, in the non-driving side, the abutting portion 42*a*, the rotation-guided portion 42*b*, the regulating portion 42*c*1 and the regulating portion 42*c*2 are formed integrally with the insertion-guided portion 42*b*. However, they may be separate members if the respective functions are performed.

Similarly, in the driving side, the insertion-guided portion 43*b* and the abutting portion 43*a* may be separate members, respectively. The rotation-guided portion may be a separate member from the abutting portion 43*a*. As for the portions of the toner cartridge E and the developing unit D which are not contacted to each other (non-function portions, non-contact stations) may be omitted while paying attention to the strength or the like.

In this embodiment, the insertion-guided portion 43 is provided at the end portion of the second drive transmitting portion 48 of the second toner feeding portion 46. However, the insertion-guided portion 43 may be provided on the container frame 47*a*. The container frame 47*a* is provided with the grip member 44 as a grip to be gripped by the user when the toner cartridge E is mounted. The grip member 44 is fixed to the container frame 47*a* at the opposite longitudinal end portions. The grip member 44 may be integrally molded with the container frame 47*a*.

Figure 1:
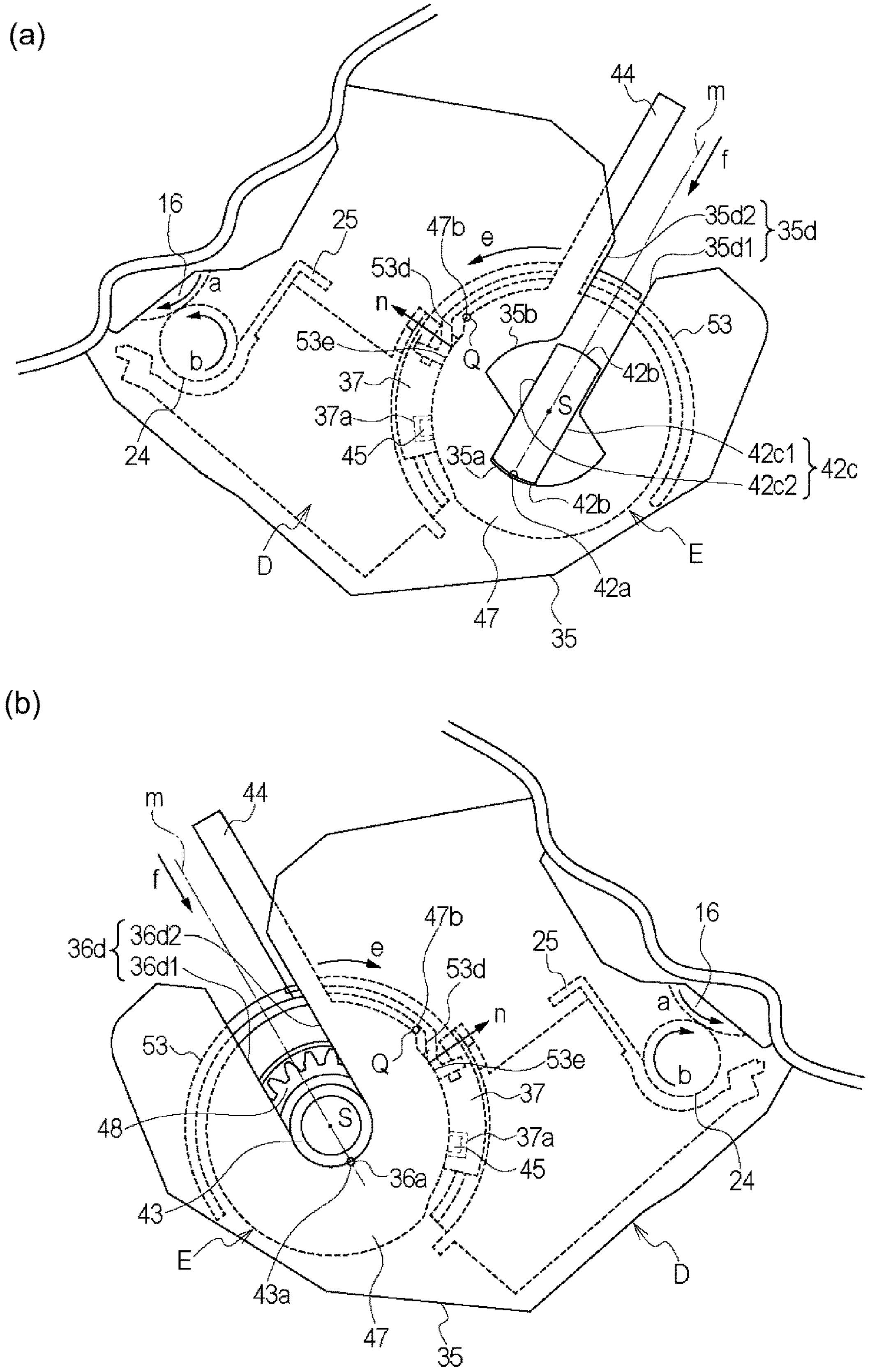
FIG. 1 is a side view of a toner cartridge according to an embodiment of the present invention.

Referring back to part (a) of FIG. 1, the description will be made as to the position of the grip member 44 on the container frame 47*a*. Part (a) of FIG. 1 is a side view of the side of the toner cartridge E opposite from the second drive transmitting portion 48 as seen in the longitudinal direction of the second toner feeding portion 46. This Figure shows the positional relationship between the grip member 44 and the abutting portion 42 relative to the inserting direction.

As shown in part (a) of FIG. 1, a line m is a line which is parallel with the inserting direction f of the toner cartridge E regulated by the regulating portion 42*c*1 and the regulating portion 42*c*2 and which passes through the abutting portion 42*a* and the abutting portion 43*a* (phantom line passing through the rotation axis S of the container frame 47*a*).

The grip member 44 is disposed in a downstream side of the line m with respect to the opening direction (arrow e in part (a) of FIG. 1) of the third opening 49 (part (d) of FIG. 5). The opening direction (arrow e direction) of the third opening 49 is in the direction in which the toner cartridge E is rotated to set the toner cartridge E relative to the developing unit D (setting direction).

§ 3. Mounting of Toner Cartridge to Developing Unit:

The description will be made as to the process of mounting the toner cartridge E to the developing unit D. By rotating the toner cartridge E in the state that the toner cartridge E is set in the developing unit D, the second opening 30 and the third opening 49 are opened and closed.

(Inserting Operation of Toner Cartridge into Developing Unit)

Referring to parts (a) of FIGS. 1 and 6, part (b) of FIG. 6, and FIG. 7, the inserting operation of the toner cartridge E to the developing unit D will be described.

Part (b) of FIG. 1 is a side view of the toner cartridge E and the developing unit D illustrating a positional relationship of the grip member 44 and the abutting portion 43*a* relative to the mounting direction of the toner cartridge E.

Figure 6:
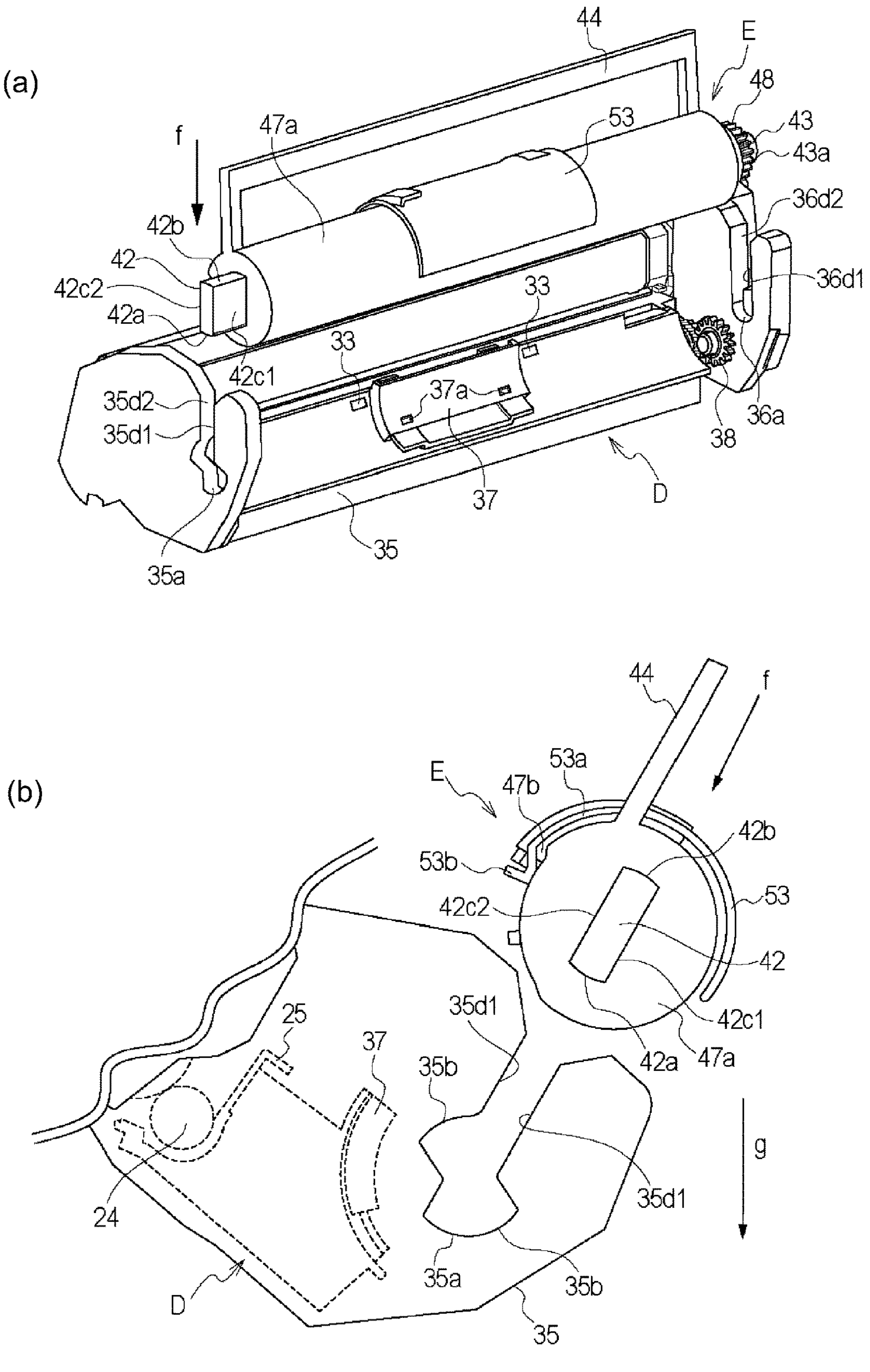
FIG. 6 is a schematic view of the developing unit and the toner cartridge in the state before the mounting (inserting).

FIG. 6 is a schematic view illustrating the toner cartridge E and the developing unit D in the state before the toner cartridge E is mounted (inserted), in which part (a) of FIG. 6 is a perspective view, and part (b) of FIG. 6 is a side view.

Figure 7:
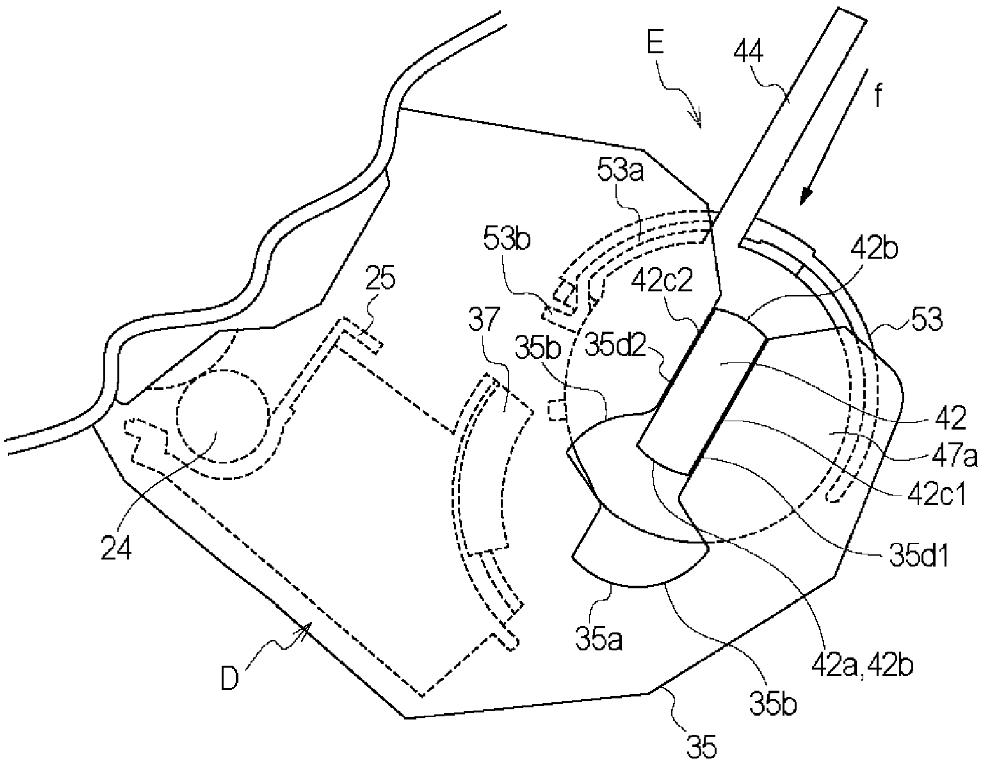
FIG. 7 is a schematic view of the developing unit and the toner cartridge in the process of mounting (inserting).

FIG. 7 is a side view showing the toner cartridge E and the developing unit D in the state of part way of the mounting (inserting) of the toner cartridge E.

Before the toner cartridge E is mounted to the developing unit D, the first shutter 37 is in the accommodation member closing position, and the second shutter 53 is in the container closing position. Therefore, the second opening 30 of the developing unit D and the third opening 49 of the toner cartridge E are closed.

The inserting direction of the toner cartridge E into the developing unit D is indicated by fin part (b) of FIG. 6. The direction f is along the surface of the regulating portion 42*c* as seen in the longitudinal direction of the toner cartridge E. More particularly, of the directions along the surface of the regulating portion 42*c*, the direction in which the abutting portion 42*a* is downstream of the insertion-guided portion 42 is in the direction f.

As shown in part (a) of FIG. 6, the user grips the grip member 44 and moves the toner cartridge E toward the developing unit D in the inserting direction f. At this time, the user move the toner cartridge E such that the insertion-guided portion 42 of the toner cartridge E and the insertion-guiding portion 35*d* of the developing unit D are engaged with each other, and the insertion-guided portion 43 and the insertion-guiding portion 36*d* are engaged with each other.

In this embodiment, the insertion-guided portions 42, 43 and the insertion-guiding portions 35*d*, 36*d* are formed such that the inserting direction f is inclined with respect to the direction g of gravity (part (b) of FIG. 6).

In other words, in the gravity direction g, the toner cartridge E is inserted while the surface of the regulated portion 42*c*1 of the insertion-guided portion 42 is guided by the surface 35*d*1 of the insertion-guiding portion 35*d*. Similarly, the toner cartridge E is inserted while the surface of the regulating portion 42*c*2 of the insertion-guided portion 42 is guided by the surface 35*d*2 of the insertion-guiding portion 35*d*.

By the surface of the lower side regulating portion 42*c*1 becoming on the surface 35*d*1 of the insertion-guiding portion 35*d*, the insertion-guided portion 42 is positioned relative to the rotation guide portion 35*b*. By this, the attitude of the toner cartridge E relative to the developing unit D is determined (FIG. 7).

While keeping the attitude, the user further moves the toner cartridge E downwardly along the insertion-guiding portion 35*d* and the insertion-guiding portion 36*d*. By this, the toner cartridge E is inserted into the developing unit D in the direction of the arrow f. By the further movement in the direction of the arrow f, the abutting portion 42*a* abuts to the abutted portion 35*a*. In addition, the abutting portion 43*a* abuts to the abutted portion 36*a*. By this, the insertion of the toner cartridge E is completed (part (a) of FIG. 1, part (b) of FIG. 1).

(Modified Example of Insertion-Guided Portion)

Figure 8:
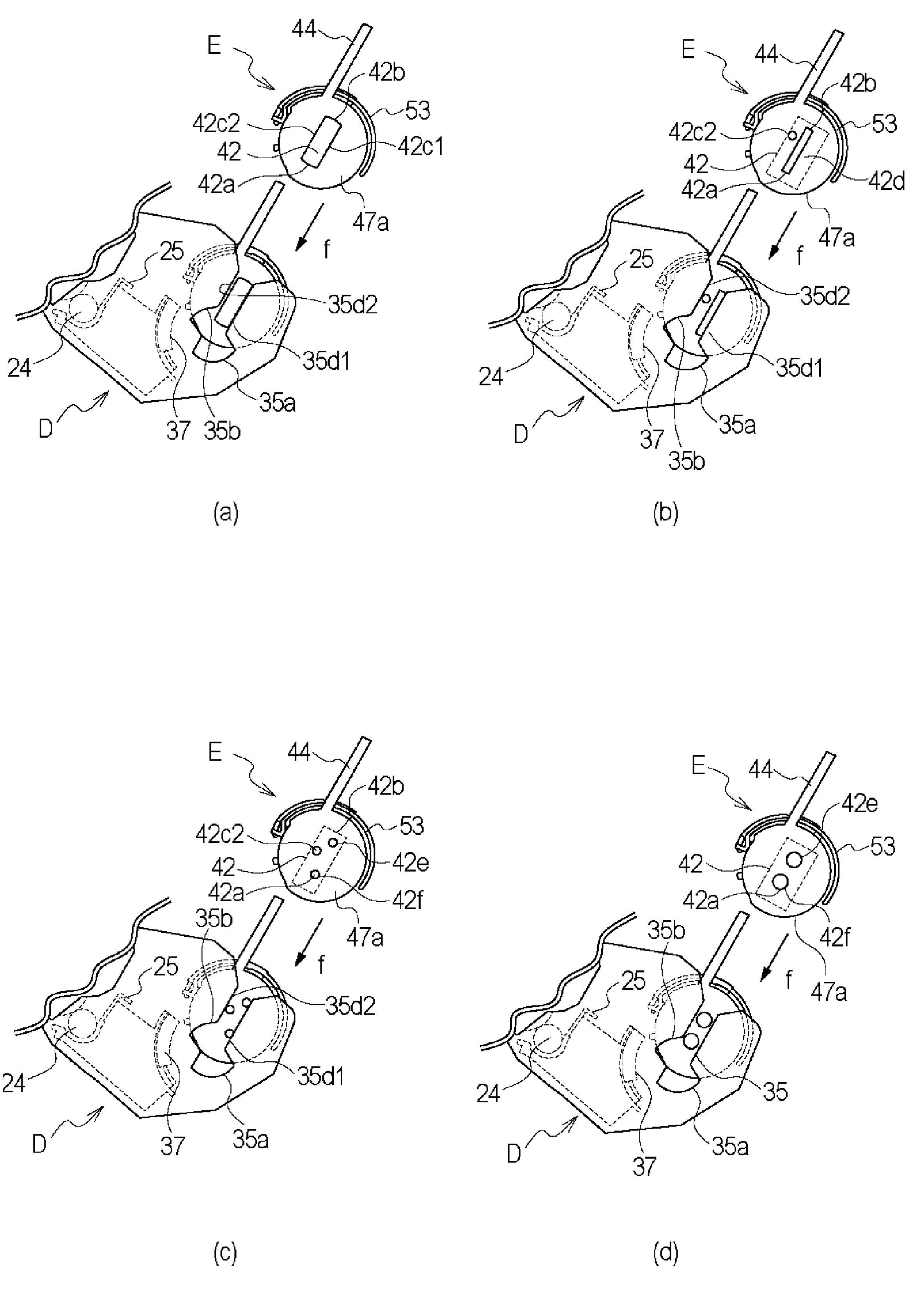
FIG. 8 is a side view schematically illustrating a modified example of the structure of insertion-guided portion (portion to be guided for insertion).

Referring to part (a) of FIG. 8, part (b) of FIG. 8, part (c) of FIG. 8 and part (d) of FIG. 8, a modified example of the structure of the insertion-guided portion 42 will be described. Parts (a)-(d) of FIG. 8 are side views of various modified examples, an insertion-guided portion 42, an abutting portion 42*a*, a regulating portion 42*c* of the toner cartridge E. In this embodiment, as shown in part (a) of FIG. 8, the insertion-guided portion 42 of the toner cartridge E is provided by a single projection in the form of an elongated circle. However, as long as the similar functions are provided, other configurations and the structures as shown in parts (a)?(d) can be employed. However, the configurations, the number and the positions of the projections are not limited to the specific examples.

As shown in part (b) of FIG. 8, a combination of the elongated circle projection and a circular column configuration projection is usable. With such a structure, a surface 42*d* of the elongated circle projection is guided (contacted) by the surface 35*d*1 of the insertion-guiding portion 35*d*, and a surface 42*c*2 of the circular column configuration projection is guided (contacted) by the surface 35*d*2 of the insertion-guiding portion 35*d*. By this, the attitude of the toner cartridge E is regulated in the inserting operation. In addition, the abutting portion 42*a* of the elongated circular projection abuts to the abutted portion 35*a* two completed the insertion of the toner cartridge E.

As shown in part (c) of FIG. 8 and part (d) of FIG. 8, the insertion-guided portion may be constituted by a combination of a plurality of circular column configuration projections. The configuration of the projection may not be circular column configuration, and may be triangular prism configuration. In other words, the configuration may be any if the insertion-guided portion is along the inserting direction f of the toner cartridge E, and the insertion attitude of the toner cartridge E can be regulated. The number of the insertion-guided portions may be one or more.

With the structure of part (c) of FIG. 8, the circular column configuration projections 42*e*, 42*f* arranged along the inserting direction f are guided by the surface 35*d*1 of the insertion-guiding portion 35*d*. In addition, the surface 42*c*2 of the circular column configuration projection 42 is guided by the surface 35*d*2 of the insertion-guiding portion 35*d*. By this, the attitude of the toner cartridge E is regulated. Similarly, a circular column configuration projection 42*f* provided at the position in the downstream side with respect to the inserting direction f is provided with the abutting portion 42*a*, which abuts to the abutted portion 35*a*. By this, the insertion of the toner cartridge E into the developing unit D is completed.

With the structure of part (d) of FIG. 8, the circular column configuration projections 42*e*, 42*f* arranged along the inserting direction f are guided by the surface 35*d*1 of the insertion-guiding portion 35*d*. The circular column configuration projections 42*e*, 42*f* are guided by the surface 35*d*2 of the insertion-guiding portion 35*d*. By this, the attitude of the toner cartridge E is regulated. In addition, the circular column configuration projection 42*f* provided in the downstream side with respect to the inserting direction f is provided with the abutting portion 42*a*, which abuts to the abutted portion 35*a*, by which the insertion of the toner cartridge E into the developing unit D is completed.

In this manner, in the case that a plurality of projections are provided at the longitudinal end portion of the toner cartridge E, the portion contacting the developing unit D are to be considered.

(Positioning of Toner Cartridge Relative to Developing Unit)

Referring to part (a) of FIG. 10, part (b) of FIG. 10, part (a) of FIG. 11, part (b) of FIG. 11 and part (c) of FIG. 11, the positioning of the toner cartridge E relative to the developing unit D will be described.

Figure 10:
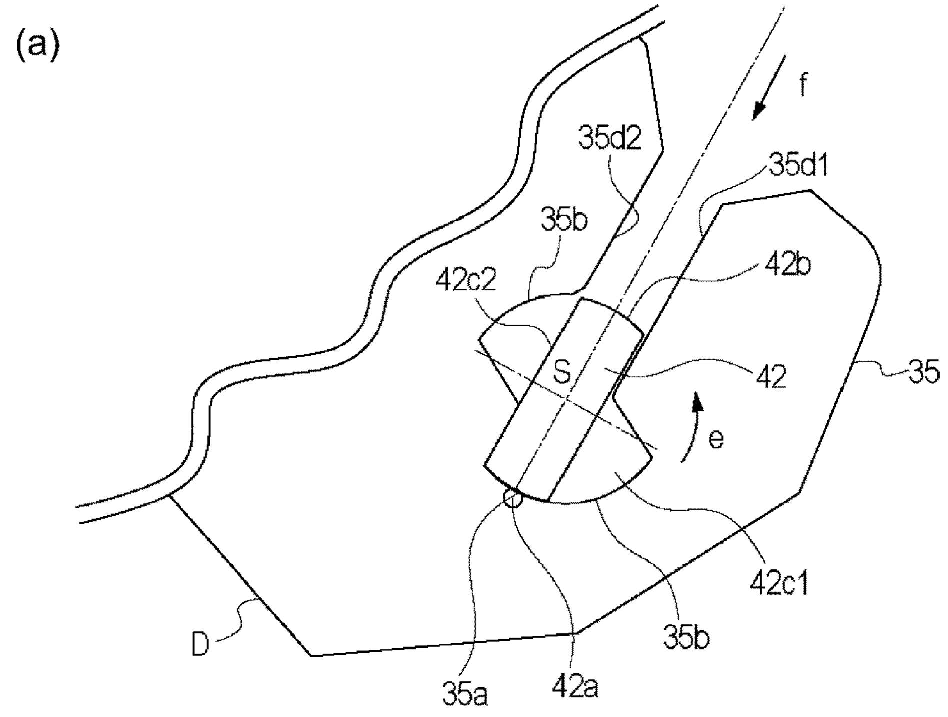
FIG. 10 is a schematic view in which an abutting portion abuts to an abutted portion (portion to be abutted).
Figure 10:
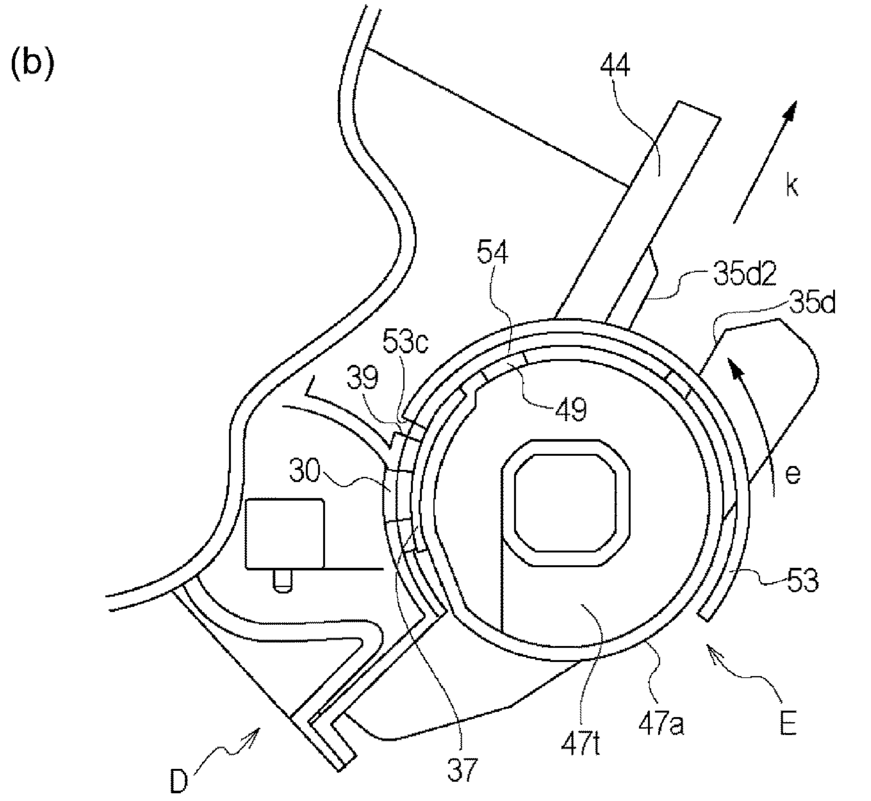

Part (a) of FIG. 10 is a side view of the insertion-guided portion 42 of the toner cartridge E and frame 35 of the developing unit D in the state the abutting portion 42*a* is in abutment to the abutted portion 35*a*. Part (b) of FIG. 10 is a sectional view of the toner cartridge E and the developing unit D in the state that the abutting portion 42*a* is in abutment to the abutted portion 35*a*.

Figure 11:
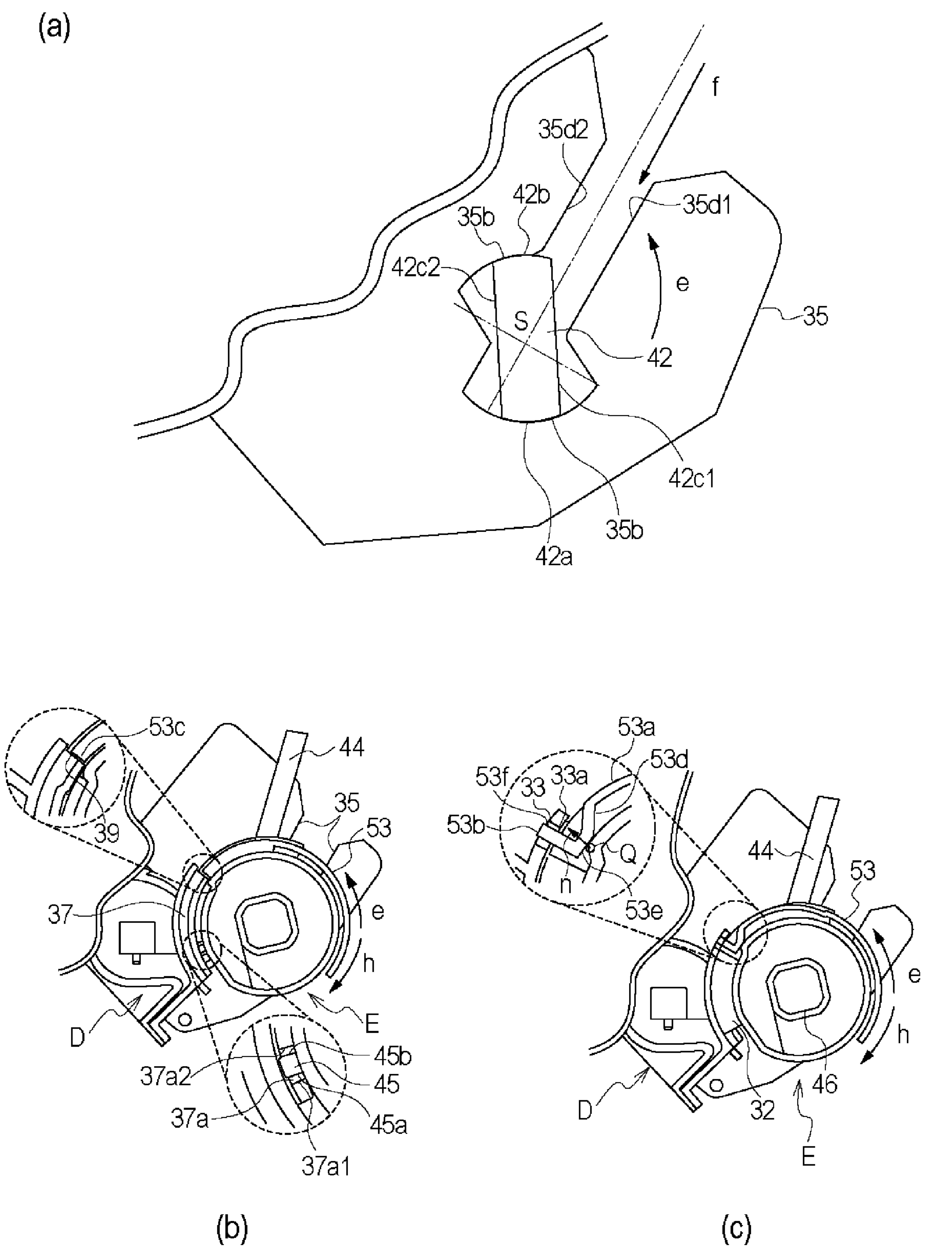
FIG. 11 is a schematic view at the time when a container frame is rotated so that the toner cartridge is positioned in place.

Part (a) of FIG. 11 is a side view of the insertion-guided portion 42 of the toner cartridge E and the frame 35 of the developing unit D in the state that the toner cartridge E is positioned relative to the developing unit D. Part (b) of FIG. 11 is a sectional view illustrating an engagement relationship between the positioned toner cartridge E and the developing unit D. Part (b) of FIG. 11 is a sectional view of the toner cartridge E and the developing unit D at the position of the second shutter 53.

Part (c) of FIG. 11 is a sectional view illustrating another engagement state between the positioned toner cartridge E and the developing unit D. Part (c) of FIG. 11 is a sectional view of the toner cartridge E and the developing unit D taken at the position of the claw portion 53*b*.

In FIG. 10, when the container frame 47*a* is rotated counterclockwisely (arrow e in the Figure), the abutting portion 42*a* and the rotation-guided portion 42*b* are engaged with the rotation guide 35*b*. By this, the toner cartridge E is positioned relative to the.

§ 4. [Opening and Closing Operation of the Shutter]

The detailed description will be made as to the opening and closing operation of the developing unit side shutter and the toner cartridge side shutter.

In this embodiment, in the process of mounting of the toner cartridge E to the developing unit D, the developing unit side first shutter 37 and the toner cartridge side second shutter 53 are opened (moved to the opening positions). And the contrary, in the process of dismounting the toner cartridge E from the developing unit D, the first shutter 37 and the second shutter 53 are closed (moved to the closing position).

The toner cartridge E is mounted by the mounting operation including at least a rotating operation relative to the developing unit D. More particularly, after being inserted substantially linearly into the developing unit D, the toner cartridge E is rotated relative to the developing unit D to be mounted. In interrelation with the rotating operation of the toner cartridge E in the mounting operation, the shutters 37, 53 are moved from the closing positions to the opening positions, respectively.

Similarly, the toner cartridge E is dismounted from the developing unit D by the dismounting operation including at least a rotating operation. More particularly, after being rotated relative to the developing unit D, the toner cartridge E is pulled out substantially linearly to be dismounted.

By the rotating operation of the toner cartridge E upon the dismounting, the shutters 37, 53 are moved to the opening positions.

(Opening Operation of Shutter)

Figure 12:
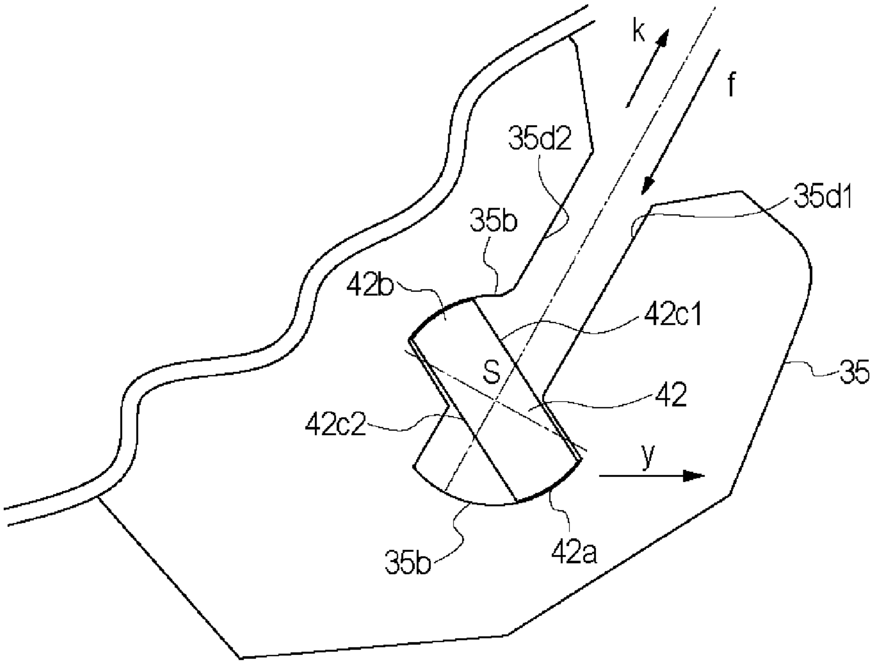
FIG. 12 is a schematic view at the time when shutters are moved to the open positions so that a toner accommodating portion is in fluid communication.
Figure 12:
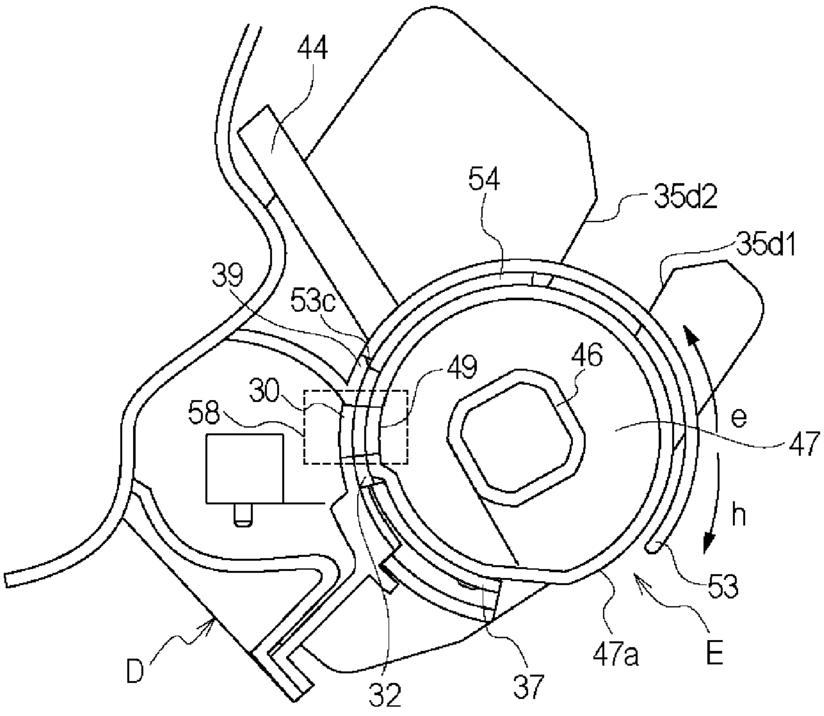

Referring to part (a) of FIG. 1, part (a) of FIG. 11, part (b) of FIG. 11, part (c) of FIG. 11, part (a) of FIG. 12 and part (b) of FIG. 12, the description will be made as to the opening operations of the first shutter 37 of the developing unit D and the second shutter 53 of the toner cartridge E. Part (a) of FIG. 12 is a side view of the insertion-guided portion 42 of the toner cartridge E and the frame 35 of the developing unit D in the state that the second opening 30 and the third opening 49 are opened. Part (b) of FIG. 12 is a sectional view of the toner cartridge E and the developing unit D in the state that the second opening 30 and the third opening 49 are opened.

In this embodiment, in the state that the toner cartridge E is positioned relative to the developing unit D (mounted state), the relative position between the second opening 30 and the third opening 49 can take different relative positions. In other words, in the state that the toner cartridge E is set in the developing unit D, at least two positions (states) can be taken by rotating the toner cartridge E.

In the first position, the second opening 30 and the third opening 49 are not overlapped with each other, and therefore, the first toner accommodating portion 28 and the second toner accommodating portion 47*t* are in non-fluid-communication state (non-communication position). In this state, the first shutter 37 is in the closing position closing the second opening 30.

In the second position, the second opening 30 and the third opening 49 are aligned with each other, so that the first toner accommodating portion 28 and the second toner accommodating portion 47*t* are in fluid communication with each other. In this state, the first shutter 37 is in the opening position opening the second opening 30.

Thus, the first shutter 37 is the open/close member for opening and closing the second opening 30. The third opening 49 is formed in a curved surface portion having the substantially arcuate configuration, and the first shutter 37 moves (rotates) along the curved surface portion to open and close the third opening 49.

As shown in part (a) of FIG. 1, when the toner cartridge E is inserted to the predetermined position of the developing unit D, the projection 45 of the container frame 47*a* and the hole portion 37*a* of the first shutter 37 are engaged with each other. In addition, at this time, a leading side surface 53*c* of the second shutter 53 (part (d) of FIG. 5) and a collision surface (contact surface) 39 (part (b) of FIG. 4) of the developing unit D are opposed to each other. By the insertion-guided portion 42 and being guided by the insertion-guiding portion 35*d*, the insertion attitude of the toner cartridge E is regulated such that the projection 45 enters the hole portion 37*a*. Similarly, the insertion attitude of the toner cartridge E is regulated such that the leading side surface 53*c* is opposed to the collision surface 39.

The container frame 47*a* of toner cartridge E is rotated by the user operating the grip member 44 in the direction of the arrow e from the mounted position shown in part (a) of FIG. 1. By this, the engagement state between the insertion-guided portion 42 and the frame 35 changes to the state shown in part (a) of FIG. 12 through the state shown in part (a) of FIG. 11. At this time, the rotational axis of the toner cartridge E (container frame 47*a*) is substantially parallel with the longitudinal direction of the toner cartridge E.

As shown in part (b) of FIG. 11, in the part way of the rotation of the container frame 47*a*, the leading side surface 53*c* of the second shutter 53 (part (d) of FIG. 5) and the collision surface 39 of the developing unit D (part (b) of FIG. 4) are abutted to each other. By this, the second shutter 53 is prevented from rotating integrally with the toner cartridge E.

That is, only the container frame 47*a* rotates by the movement of the leading side surface 53*c* of the second shutter 53 being limited by the collision surface 39. From this state, the toner cartridge E is further rotated to the mounting direction (arrow e in part (b) of FIG. 11). Then, the third opening 49 for supplying the toner into the developing unit is moved in the opening direction.

In other words, the second shutter moves relative to the container frame 47*a* in the direction of opening the third opening 49 More particularly, the leading side surface 53*c* of the second shutter receive a force (reaction force) from the collision surface 39, by which the second shutter 53 rotates (circulates) along the outer periphery of the container frame 47*a* in the direction of opening the third opening 49.

As shown in part (a) of FIG. 1 and part (c) of FIG. 11, the container frame 47*a* is provided with a surface (inclined surface) 47*b* such that the height ascends toward the arm portion 53*a* in the area opposing to the arm portion 53*a*. In other words, the container frame 47*a* is provided with the peripheral surface protruded radially outwardly and the peripheral surface recessed radially inwardly. The surface 47*b* is between the protruding peripheral surface and the recessed peripheral surface.

When the second shutter 53 is moved relative to the container frame 47*a* (surface 47*b*), the protruding peripheral surface of the container frame 47*a* contacts the arm portion 53*a* of the second shutter to guide the arm 53*a* radially outwardly.

Here, the output of the container frame 47*a* is outlet in the radial direction of the rotation of the second shutter 53 relative to the container frame 47*a*. The output of the container frame 47*a* is the direction away from the rotational axis (center axis) of the container frame 47*a*. The outward of the container frame 47*a* is away from the second toner feeding member 46 (or rotational axis of the second toner feeding member 46) provided inside the container frame 47*a*.

In this embodiment, the container frame 47*a* is substantially cylindrical, and therefore, the surface along which the arm 53*a* is moved is outwardly protruded peripheral surface. Another configuration can be employed if it can guide the arm 53*a*, and therefore, the configuration of the guide portion of the arm 53*a* is not limited to the above-described specific example.

When the container frame 47*a* rotates relative to the arm portion 53*a* of the second shutter 53 which is prevented from rotation, a point Q on the surface 47*b* move along the surface 53*d* of the arm portion 53*a*. Then, the point Q on the surface 47*b* contacts to the surface 53*e* (portion-to-be-contacted) provided behind the claw portion 53*b*. At this time, the claw portion 53*b* of the arm portion 53*a* is deformed so as to be raised by the surface 47*b*, because the surface 53*e* receives the force from the point Q in the direction indicated by arrow n.

By this, the arm portion 53*a* changes from the state of retracting along the recess provided on the peripheral surface of the container frame 47*a* to the state of engaging with the developing unit side. More particularly, the claw portion 53*b* of the arm portion 53*a* is engaged with the hole portion 33 of the frame 35 of the developing unit D (by this, the second shutter 53 is temporarily engaged with the frame 35). The surface 47*b* (part (b) of FIG. 6) is a moving portion (engaging position moving portion) for urging the claw portion 53*b* to move the claw portion 53*b* radially outwardly of the container frame 47*a* when the second shutter 53 is moved to the opening position (when the toner cartridge E is mounted). That is, the claw portion 53*b* is moved by the surface 47*b* to the engaging position for engagement with the hole portion 33. By the surface 47*b*, the claw portion 53*b* is moved outwardly of the container frame 47*a* (away from the center (rotational axis) of the container frame 47*a*), that is, always from the rotational axis of the second feeding member 46 provided inside the container frame 47*a*.

The surface 47*b* functions also as a guide portion for guiding the claw portion 53*b*, the arm portion 53*a* and the radially outwardly of the container frame 47*a* (to the engaging position) and also as an urging portion (pressing portion) for urging the arm 53*a* and the claw portion 53*b* radially outwardly. In addition, the surface 47*b* functions also as an engaging position holding portion for holding the engaging portion (claw portion 53*b*) in the engaging position (the position at which it is engaged with the hole portion 33) when the second shutter 53 is in the opening position. By the surface 47*b* supporting the snap fit (arm portion 53*a* or claw portion 53*b*), the claw portion 53*b* does not move to the retracted position into retracted hole portion 33.

When the container frame 47*a* rotates in the direction of the arrow e in part (b) of FIG. 11, the first shutter 37 is pressed in the rotational direction of the container frame 47*a* by the contact between the surface 45*a* of the projection 45 and the surface 37*a*1 of the hole portion 37*a*. As a result, the first shutter 37 opens the second opening 30 in interrelation with the rotation of the container frame 47*a*. The projection 45 of the container frame 47*a* functions as an opening force applying portion (opening position moving portion, open/close member moving portion) for applying a force to the first shutter 37 to move it to the opening position.

Thereafter, as shown in part (a) of FIG. 12 and part (b) of FIG. 12, the first toner accommodating portion 28 and the second toner accommodating portion 47 are brought into fluid communication with each other through the third opening 49 and the second opening 30. By this, the opening operation for the second opening 30 and the third opening 49 is completed.

At this time, the abutting portion 42*a* and the rotation-guided portion 42*b* are engaged with the rotation guide portion 35*b*. By this, the movement of the toner cartridge E relative to the developing unit D is prevented in the state that the second opening 30 and the third opening 49 are opened.

That is, the movement of the toner cartridge E in y-direction and k-direction opposite to the inserting direction f by the force received from the developing unit D is prevented. In this state, the second drive transmitting portion 48 of the toner cartridge E is connected with the drive transmitting portion 38 of the developing unit D. By this, the driving force for rotating the second toner feeding member 46 can be transmitted from the developing unit D. By the above-described structures, the toner supply from the second toner accommodating portion 47*t* of the E into the first toner accommodating portion 28 of the developing unit D is enabled. In this embodiment, the drive transmitting portion 38 for transmitting the driving force to the second drive transmitting portion 48 of the toner cartridge E is provided on the developing unit D side. However, the drive transmitting portion 38 engaged with the second drive transmitting portion 48 may be provided on the toner cartridge E side as in an embodiment which will be described hereinafter. The engagement between gears is called meshing engagement, which is used also for the case of a belt or the like provided with projections.

(Switching from Toner Cartridge Inserting Operation to Shutter Opening Operation)

Figure 9:
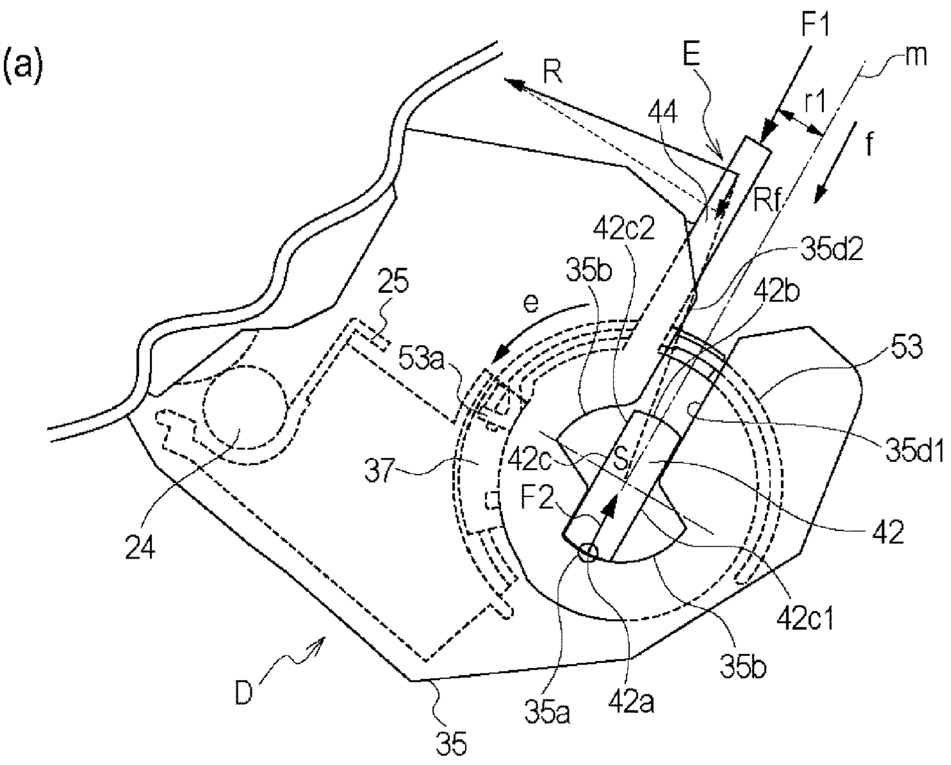
FIG. 9 is a side view schematically illustrating a relationship of forces applied to the toner cartridge.
Figure 9:
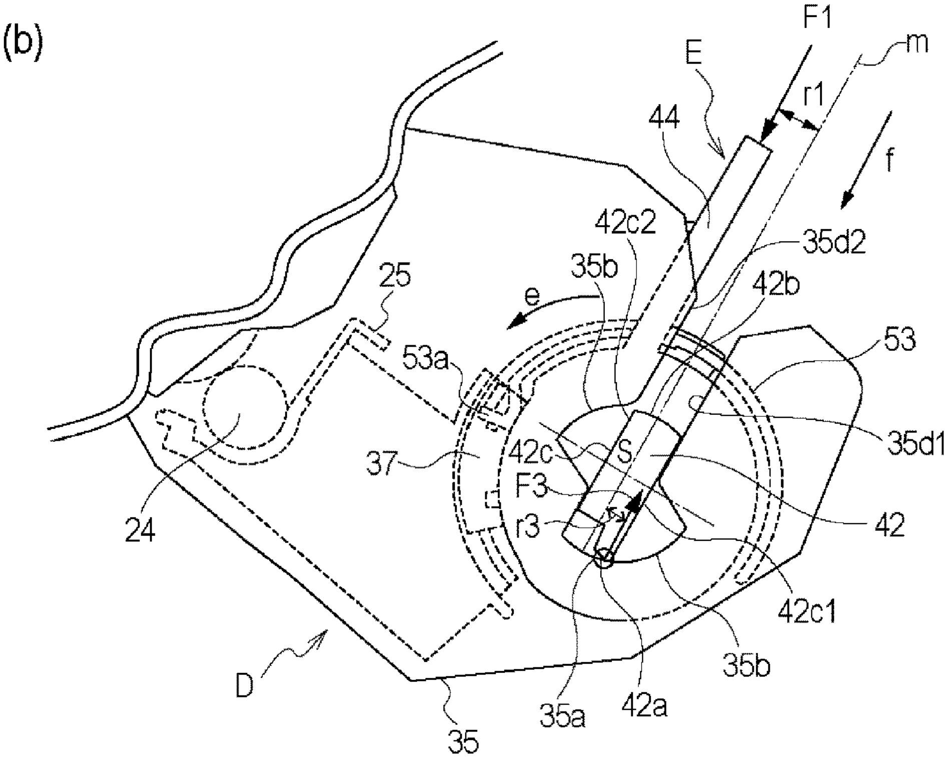

Referring to parts (a) of FIGS. 1 and 9 and part (b) of FIG. 9, a switching operation from the inserting operation of the toner cartridge E to the shutter opening operation, which is a feature of this embodiment will be described. Part (a) of FIG. 9 is a side view and shows a relationship of the forces applied to the toner cartridge E when it is inserted into the developing unit D. Part (b) of FIG. 9 is a side view and the shows a relationship of the forces applied to the toner cartridge E in the case of using an abutting portion 42*a* having a different structure.

As shown in part (a) of FIG. 9, the toner cartridge E is inserted into the developing unit D by the user, by which the abutting portion 42*a* abuts to the abutted portion (portion to be abutted) 35*a*. By this, the toner cartridge E receives a force F1 and a force F2. More particularly, the force F1 applied at the time when the user inserts the toner cartridge E acts on the grip member 44, and an equivalent force F2 as a reaction force is applied to the abutting portion 42*a* of the insertion-guided portion 42.

Here, a line (phantom line) m parallel with the mounting direction of the toner cartridge E and passing through the rotational axis (rotation axis of the second shutter member 53) S of the toner cartridge E will be considered. A length of the arm from the phantom line m to the grip member 44 is r1, and a length of the arm from the rotational axis (rotation axis) S to the abutting portion 42*a* is r2. At this time, a moment M about a rotational axis S of the third opening 49 (part (d) of FIG. 5) of the toner cartridge E is as follows:

$$M = F1 \times r1 + F2 \times r2.$$

As shown in part (a) of FIG. 9, the rotational moving direction of the toner cartridge E (container frame 47*a*) at the time when the second opening 30 and the third opening 49 are opened is counterclockwise (arrow e) as seen along an axial direction of the rotation of the container frame 47*a*. In this embodiment, the abutting portion 42*a* is on the line (phantom line) m parallel with the inserting direction (guiding direction) f and passing through the rotation axis S of the container frame 47*a*, and therefore, r2=0. The grip member 44 is disposed downstream of the line m with respect to the rotational moving direction e (positive in the opening direction of the second opening 30 and the third opening 49) (arrow e).

Therefore, F1×r1>0, and M>0.

Because F1×r1>0 and M>0, the force F1 applied by the user upon the insertion of the toner cartridge E into the developing unit D is converted to a force effective to rotate the second opening 30 and the third opening 49 in the opening direction e. Thus, the entirety of the toner cartridge E is rotated by the force F1 applied to the toner cartridge E in the direction f.

The rotation of the toner cartridge E is easier if the moment M is larger. In other words, with the increase of the moment M, the smoothness of the opening operation for the second opening 30 and the third opening 49 increases.

As for the structure of increasing the moment M, a change of the abutting portion 42*a* would be considered as shown in part (b) of FIG. 9, for example. This means that the abutting portion 42*a* is placed in a side opposite from the grip member 44 with respect to the phantom line m parallel with the mounting direction f and passing through the rotation axis S of the container frame 47*a*.

When a force F3 applied to the abutting portion 42*a*, and a distance to the abutting portion 42*a* from the phantom line m is r3, a moment M about the rotation axis S is as follows similarly to the case of the part (a) of FIG. 9:

$$M=F1\times r1+F3\times r3.$$

In this case, F3×r3 is a moment in the direction of opening the second opening 30 and the third opening 49 (opening direction e). Therefore, the moment M is larger, and therefore, the container frame 47a is more easily rotated in the opening direction e. The positional relationship between the abutting portion 42a and the grip member 44 described above may be applied to the relationship between the abutting portion 43a and the grip member 44, by which the similar effects are provided.

Referring to FIG. 64, the positional relation of the grip member 44 will be described in more detail. FIG. 64 shows a state in which the toner cartridge E is projected on a projection plane perpendicular to the rotational axis S, and the toner cartridge E is divided into two areas, namely an area R1 and an area R2 by the phantom line m.

In this case, the grip member 44 is in the same area R1 as the third opening (discharge opening) 49. In this embodiment, the entirety of the grip member 44 is in the area R1. That is, the free end portion (grip portion) 44t and the base portion 44s of the grip member 44 are both in the area R1. However, the free end portion (operating portion, grip portion) 44t directly gripped by the user is in the area R1 side. The base portion of the grip member 44 is the connecting portion between the container 47 and the grip member 44. In addition, the projection (container side projection, open/close member moving portion) 45 and the claw portion 53a (open/close member side engaging portion), the surface (engaging position moving portion) 47b are also in the area R1 side.

The projection 45, the claw portion 53a, the surface 47b, the third opening 49 in the grip member 44 relating to the opening and closing operation for the first shutter 37 and the second shutter 53 are all in the area R1. By this, the structures relating to the first shutter 37 and the second shutter 53 a simplified, and therefore, toner cartridge E and/or the developing cartridge D is downsized.

In order to further describe the positional relationship of the grip member 44, the toner cartridge E is divided into four parts by the phantom line m and the phantom line n. The phantom line n is a line passing through the rotation axis S and perpendicular to the phantom line m. Then, the toner cartridge E is divided into four areas, namely, an area R1a, an area Rib, an area R2a and an area R2b. The area R1a, the area Rib, the area R2a and the area R2b exists in the order named along the direction of the arrow e. The direction of the arrow e is the rotational direction of the container 47 upon the mounting of the toner cartridge E. In other words, the direction of the arrow e is a direction in which the second shutter 53 rotates relative to the container 47 from the opening position to the closing position.

The grip member 44 (free end portion 44t, base portion 44s), the surface (engaging position moving portion) 47b is disposed in the same area R1 a as the third opening 49.

The projection 45 is disposed in the area R1b which is downstream of the area R1a by one area in the direction of the arrow e. The claw portion 53a is disposed between the projection 45 and the grip member 44 with respect to the direction of the arrow e. The claw portion 53a is disposed adjacent to the phantom line n. Most of the claw portion 53a is in the area R1b side, but the claw portion 53a may be disposed in the area R1a.

In the direction of the arrow e, the grip member 44, the third opening 49, the surface 47b, the claw portion (engaging portion) 53a and the projection 45 are disposed in the order named.

(Shutter Closing Operation)

Referring to part (a) of FIG. 10, part (b) of FIG. 10, part (b) of FIG. 11, part (c) of FIG. 11 and part (b) of FIG. 12, the closing operation for the first shutter 37 of the developing unit D and the second shutter 53 of the toner cartridge E will be described. The closing operation of the first shutter 37 and the second shutter 53 is the opposite to the opening operation described above. In the closing direction of the first shutter 37 and the second shutter 53, the container frame 47a rotates in the clockwise direction (arrow h direction in part (b) of FIG. 12), as seen from the side opposite the side provided with the second drive transmitting portion 48.

In the state shown in part (b) of FIG. 12, the user gripping the grip member 44 rotates the container frame 47a in the closing direction (arrow h direction, closing direction). Then, the surface 45b of the projection 45 of the container frame 47a abuts to the surface 37a2 of the hole portion 37a of the first shutter 37. By this, the first shutter 37 receives the force from the surface 37a2 to rotate in interrelation with the rotational operation of the container 47. The first shutter 37 moves to the closing position for closing the second opening 30. The surface 45b of the projection 45 is a closing force applying portion for applying the force to the first shutter 37 to move the first shutter 37 to the closing position.

At this time, as shown in part (c) of FIG. 11, the claw portion 53b of the second shutter 53 is disposed in the engaging position by the surface 47b as described hereinbefore, so that the claw portion 53b is engaged with the hole portion 33 of the developing unit D. Therefore, the surface 53f of the claw portion 53b abuts to the surface 33a of the hole portion 33, and therefore, the second shutter 35 does not rotate integrally with the container frame 47a. That is, by the engagement between the claw portion 53b and the hole portion 33, the surface 53f receives the force from the surface 33a, and therefore, the rotation of the second shutter 35 is limited. In other words, the second shutter 35 does not move integrally with the container frame 47a, so that the relative movement between the second shutter 35 and the container frame 47a is permitted. Therefore, the second shutter 53 moves relative to the container frame 47a to the closing position for closing the third opening 49.

The claw portion 53b is a shutter side engaging portion engageable with the hole portion (receiving device side engaging portion) 33 to receive the force for moving the second shutter 53 when the claw portion 53b is in the engaging position. Particularly, the surface 53f of the claw portion 53b contacting the hole portion 33 is a force receiving portion for receiving the force from the hole portion 33.

When the container frame 47a is further rotated in the closing a direction (arrow h direction), the toner cartridge E is disengaged from the developing unit D, as shown in part (a) of FIG. 10 and part (b) of FIG. 10.

That is, the claw portion 53b of the second shutter 53 which has been engaged with the hole portion 33 of the developing unit D moves radially inwardly of the container frame 47a such that the surface 53e moves along the surface 47b. That is, the claw portion 53b retracts from the engaging position where it is engaged with the hole portion 33 and moves to the retracted position along the surface 47b. This is the state shown in part (a) of FIG. 1 and part (b) of FIG. 1.

More specifically, as described hereinbefore, the outer periphery of the container frame 47a has a diameter which is changed at the boundary of surface 47*b*. When the surface 47*b* reaches the position of the claw portion 53*b* by the rotation of the container frame 47*a*, the radius of the container frame 47*a* gradually decreases along the surface 47*b*. Therefore, the shape of the arm portion 53*a* outwardly deformed elastically by the container frame 47*a* restores. That is, the elastic deformation of the arm portion 53*a* is released to permit the arm portion 53*a* to move radially inwardly.

As a result, by the elastic force of the arm portion 53*a* (part (c) of FIG. 11), the claw portion 53*b* moves radially inwardly of the container frame 47*a*. The surface 47*b* is a guide portion for guiding the inward movement of the claw portion 53*b* toward the inside of the container frame 47*a*.

That is, the surface 47*b* guides the claw portion 53*b* from the retracted position to the engaging position when the second shutter 53 moves from the closing position to the opening position (when the toner cartridge E is mounted). On the contrary, when the second shutter 53 moves from the opening position to the closing position (when the toner cartridge E is dismounted), it guides the claw portion 53*b* from the engaging position to the retracted position.

The surface 47*b* constitutes a recess which is recessed radially inwardly of the container frame 47*a* to provide a clearance space (escape) for permitting the claw portion 53*b* to be moved by the surface 47*a* radially inwardly of the container frame 47*a*. That is, the surface 47*b* is a permitting portion for permitting movement of the claw portion 53*b* to the retracted position.

The "radially inwardly of the container frame 47*a*" is the inward with respect to a radius of rotation when the second shutter 53 rotates relative to the container frame 47*a*. In other words, the "radially inward" is toward the inside of the container frame 47*a* or toward the rotational axis (center axis) of the container frame 47*a*. The "radially inward" is toward the second feeding member 46 (or the rotational axis thereof) provided inside the container frame 47*a*.

By the movement of the claw portion 53*b* of the second shutter 53 from the engaging position (part (c) of FIG. 11) to the retracted position (part (b) of FIG. 1) to disengage from the hole portion 33, the toner cartridge E can be taken out in the direction of arrow k in part (b) of FIG. 10.

A movement distance measured along the radial direction of the container frame 47*a* at the time when the claw portion 53*b* moves from the engaging position to the retracted position (or from the retracted position to the engaging position) is not less than 1.3 mm. By this, the switching between the state of engagement between the claw portion 53*b* and the hole portion 33 and the state of disengagement therebetween is assured.

Although the claw portion 53*b* is movable in the radial direction of the container frame 47*a* (rotation radial direction of the second shutter 53), it is not inevitable that the claw portion 53*b* moves in parallel with the radial direction, but it may move in a direction crossing with the radial direction.

That is, it is not inevitable that the claw portion 53*b* moves in the radial direction only, and it will suffice if the claw portion 53*b* moves relative to the main body portion 53*m* of the shutter at least in the radial direction. For example, the claw portion 53*b* may move in the axial direction of the container frame 47*a* (rotational axis direction of the second shutter 53) with the movement of the claw portion 53*b* in the radial direction. Or, the claw portion 53*b* may move in the circumferential direction (rotational moving direction of the second shutter 53) of the container frame 47*a* relative to the main body portion 53*m* of the shutter with the movement of the claw portion 53*b* in the radial direction.

In the state that the toner cartridge E is set in the mounting position, the grip member 44 is disposed downstream of a phantom line passing through the rotation axis and extending in the inserting direction f as seen in the direction of the rotational axis of the container frame 47*a*, with respect to the rotational direction of the container frame 47*a*. In this position, the grip member 44 receives the force for rotating the container frame 47*a* provided by the operation of the user. This position is such that when the grip member 44 receives the force in the inserting direction f, the moment is produced in the direction of rotating the container frame 47*a* relative to the developing unit D.

In other words, the toner cartridge E of this embodiment is such that when the container frame 47*a* is rotated in this position, the force applied to the grip member 44 (arrow R in FIG. 9) includes a component force (arrow Rf, in FIG. 9) of the inserting direction f. By the user applying the force to the grip member 44 in the inserting direction fin the insertion, the grip member 44 receives the force in the inserting direction fat the time when the toner cartridge E reaches the mounting position. That is, at the time when the toner cartridge E reaches the mounting position, a part of the force required for rotating the container frame 47*a* is already applied to the grip member 44. Therefore, by the pressing force in the inserting direction f applied by the user to the grip member 44, the force in the inserting direction f continues to be applied to the grip member 44 also during the rotation of the container frame 47*a* continuing from the insertion of the toner cartridge E to the mounting position.

By this, the conversion of the force from the inserting operation force to the rotating operation force is smooth in the series of mounting operations including the insertion of the toner cartridge E to the mounting position of the developing unit D and the subsequent rotation of the container frame 47*a* by the user gripping the grip member (handle) 44. Therefore, the user can smoothly perform the inserting operation of the toner cartridge E to the developing unit D and the opening operation for the first shutter 37 and the second shutter 53, and therefore, the operationality is significantly improved.

In this embodiment, as seen in the direction of the rotational axis of the container frame 47*a*, the grip member (handle) 44 receives the force at the position remoter from the rotation axis than the abutting portion 42*a* when the toner cartridge E is in the mounting position. By this, in the rotation of the container frame 47*a*, the container frame 47*a* can be rotated by a relatively smaller force against the sliding resistances between the abutting portion 42*a* and the abutted portion 35*a* and the rotation guide 35*b* because of the principle of lever. The same applies to the sliding resistance between the abutting portion 43*a* and the abutted portion 36*a* and the rotation guide 36*b*.

In this embodiment, the second shutter 53 is rotatable around the circumference of the container 47 (container frame 47*a*). By this, the second shutter 53 can be opened and closed by the rotating operation of the toner cartridge E relative to the developing unit D (receiving device). In the case that the second shutter 53 is opened and closed by the rotating operation of the toner cartridge E, the space required for opening and closing the second shutter 53 is advantageously smaller than in the case that the second shutter 53 is opened and closed by a linear movement of the toner cartridge E.

That is, in the case that the toner cartridge E is rotated relative to the developing unit D, the toner cartridge E changes in the attitude only, and the center (rotational axis) of the toner cartridge E hardly displaces relative to the developing unit D. In other words, in the opening and closing operations for the second shutter 53, the area occupied by the toner cartridge E in the developing unit D hardly changes. For this reason, it is unnecessary to provide a large space in the developing unit D for the opening and closing of the second shutter 53. By employing the toner cartridge E of this embodiment, the receiving device (developing unit D) for receiving the toner cartridge E and/or the image forming apparatus including the receiving device can be downsized.

In addition, the engaging portion (claw portion 53*b*) of the second shutter 53 is moved with the rotation of the toner cartridge E. That is, the engaging portion moves to a proper position at the timing of the rotating operation of the toner cartridge E. For this reason, the engaging portion does not obstruct the mounting and dismounting in the process of the mounting and dismounting of the toner cartridge E. The engaging portion is capable of closing the open/close member in the process of the dismounting of the toner cartridge E.

In addition, by the rotating operation of the toner cartridge E, the engaging portion is moved. That is, utilizing the rotating operation of the toner cartridge E, the engaging portion is moved. For this reason, no mechanism for transmitting a driving force from the main assembly of the apparatus to the toner cartridge in order to move the engaging portion is necessary. Thus, the structures of the toner cartridge E, the developing unit D and the image forming apparatus can be simplified.

Modified Example

In this embodiment described in the foregoing, the arm portion (supporting portion) 53*c* per se has an elastically deformable elastic portion, and the claw portion (engaging portion) 53*b* moves from the engaging position to the retracted position by the elastic force of the arm portion 53*c* itself.

However, the elastic portion may be provided as an additional member separate from the supporting portion (arm portion 53*c*) and/or the engaging portion (claw portion 53*b*). For example, the arm portion 53*c* (supporting portion) is mounted on the main body portion 53*m* of the shutter so as to be slidable and/or rotatable. Then, the arm portion 53*c* is urged to the retracted position by an additional elastic portion (elastic member) separate from the arm portion 53*c*. With such a structure, the same effects as in this embodiment can be provided even though the arm portion 53*c* per se does not elastically deform. Such a structure will be described in detail with respect to Embodiment 7 hereinafter.

In addition, in this embodiment, the entire second shutter 53 including the main body portion 53*m*, the arm portion 53*a* and the claw portion 53*b* of the shutter are integrally molded from a resin material. However, the second shutter 53 may be constituted by combining separate members. For example, a metal leaf spring (metal member) may be connected with the main body portion 53*m* of the shutter of resin material, as a supporting portion for the shutter side engaging portion. In such a case, it is preferable that a free end of the leaf spring is bent to form the shutter side engaging portion (claw portion 53*b*), or a separate member functioning as the shutter side engaging portion is fixed on the free end portion of the free end of the leaf spring.

Or, the arm portion 53*a* may be constituted by combining multiple members of resin material and/or metal or the like.

Embodiment 2

(Laser Beam Deflects in the Space Defined by the Grip)

According to this embodiment, the inside space of the image forming apparatus can be saved.

Referring to the drawings, this embodiment will be described. In the description of this embodiment, the same reference numerals as in the foregoing Embodiment are assigned to the elements having the corresponding functions in this embodiment, and the detailed description thereof is omitted. In the drawings, a part of the shape or elements is omitted for simplicity of explanation. The dimensions, the materials, the configurations, the relative positions of the elements in this embodiment may be properly modified depending on the structure and/or various conditions of the apparatus. Therefore, the present invention is not limited to the specific structures in this embodiment.

The electrophotographic image forming apparatus is the same as the above-described embodiment, and therefore, the description thereof is omitted. The toner cartridge receiving portion of the developing unit D and the structures therearound will be described in detail.

Figure 13:
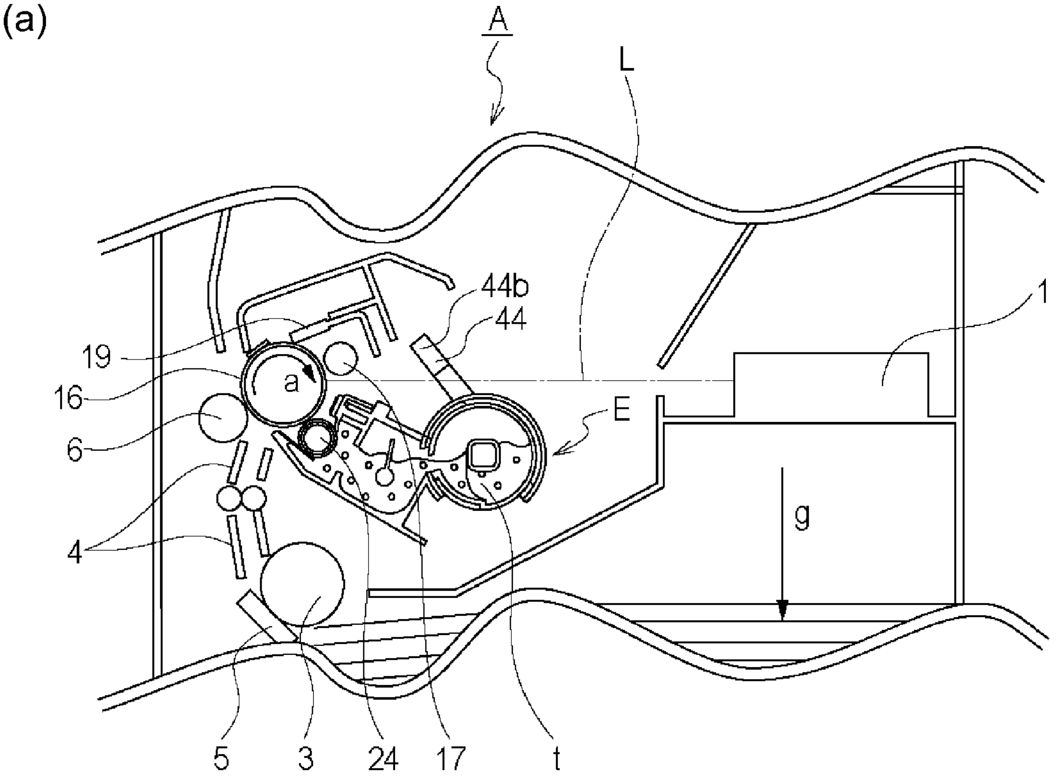
FIG. 13 is a schematic view illustrating a structure of the image forming apparatus according to this embodiment.
Figure 13:
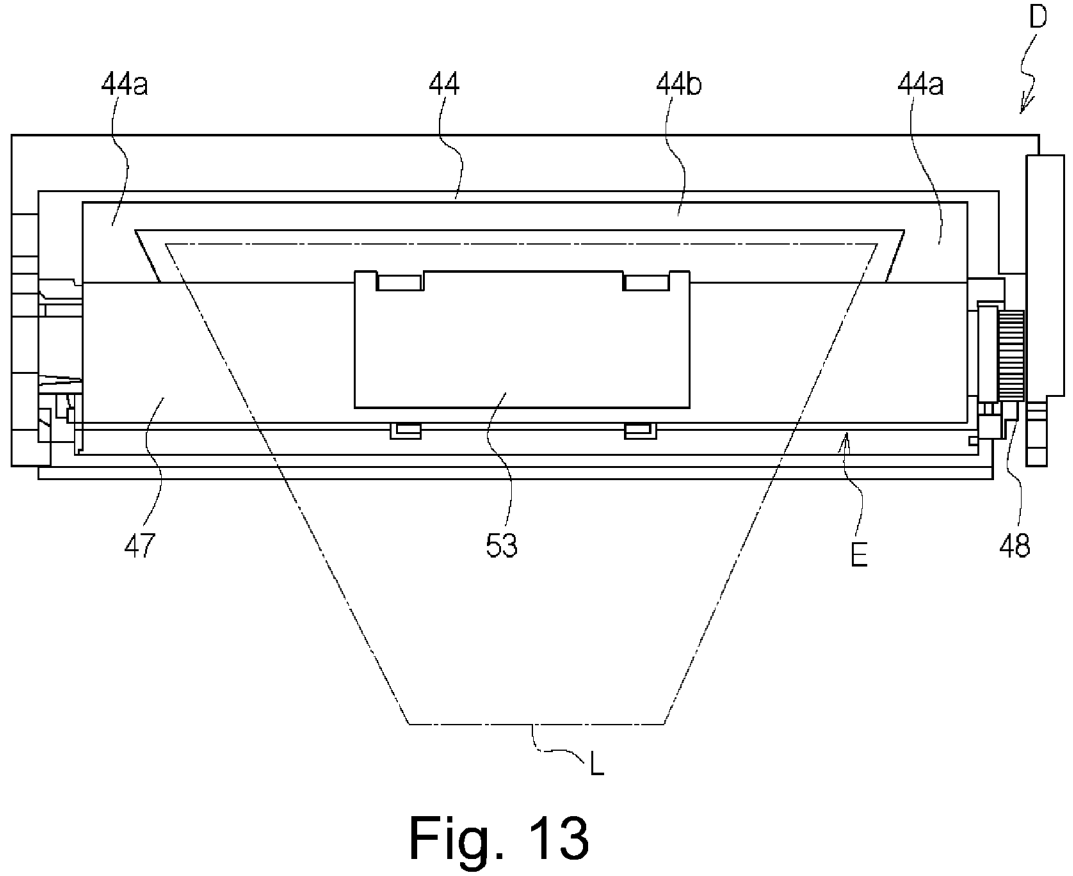

Part (a) of FIG. 13 is a sectional side view illustrating a positional relation of the grip member 44 of the toner cartridge E set in the image forming apparatus A and an optical path for the laser beam L in the electrostatic latent image forming operation. Part (b) of FIG. 13 is a top sectional view illustrating a positional relationship between the grip member 44 of the toner cartridge E set in the image forming apparatus A and a range of the passing laser beam during the electrostatic latent image forming operation.

In this embodiment, the laser beam L (the beam for forming the latent image on the photosensitive drum 16) is passed through an opening formed between the grip member 44 and the container frame 47*a*.

As shown in part (b) of FIG. 13, the grip member 44 has an operating portion (grip portion) 44*b* to be gripped and operated by the user, the operating portion extending in the longitudinal direction of the toner cartridge E. The opposite longitudinal end portions thereof are fixed (integral molding) to the container frame 47*a* by supporting portions 44*a*. Therefore, the toner cartridge E has such a structure that a space is provided between the container frame 47*a* and the operating portion 44*b* parallel with the rotational axis S of the grip member 44. In the image forming apparatus A of this embodiment, the laser beam L from the laser scanner 1 passes through the space (communicating portion) between the container frame 47*a* in the operating portion 44*b* of the grip member 44. By this, the inside space of the apparatus can be saved.

As shown in part (a) of FIG. 13, the grip member 44 is inclined to the limit where the shutter is in the opening position, by which the mounting operation is completed. In this mounting-completed state, the operating portion 44*b* of the grip member 44 does not interfere with the optical path for the laser beam L. As shown in part (b) of FIG. 13, the supporting portions 44*a* of the grip member 44 support the operating portion 44*b* at the positions out of a projection range (deflecting range) of the laser beam L in the longitudinal direction. By this, the toner cartridge E can be efficiently placed in the image forming apparatus A without deteriorating the user operationality. Therefore, the space saving can be accomplished, and the image forming apparatus A can be downsized.

It is further preferable that a lower side surface of the operating portion 44*b* is substantially in parallel with a plane in which the laser beam deflects, when the cartridge is mounted on the apparatus. More specifically, the lower side of the grip portion is closer to parallel with the laser beam than a plane contacting a peripheral surface of the bottle at the base portion of the grip. In other words, when the opening side lower surface and the lower surface of the grip in the upstream side with respect to the mounting direction are compared with each other, the lower surface in the downstream side is farther from the peripheral surface of the bottle.

Embodiment 3

Referring to the drawings, this embodiment will be described. In the description of this embodiment, the same reference numerals as in the foregoing Embodiments are assigned to the elements having the corresponding functions in this embodiment, and the detailed description thereof is omitted. In the drawings, a part of the shape or elements is omitted for simplicity of explanation. The dimensions, the materials, the configurations, the relative positions of the elements in this embodiment may be properly modified depending on the structure and/or various conditions of the apparatus. Therefore, the present invention is not limited to the specific structures in this embodiment.

The electrophotographic image forming apparatus is the same as the above-described embodiment, and therefore, the description thereof is omitted, and the toner cartridge receiving portion of the developing unit D and the structures therearound will be described in detail.

The structures for suppressing leakage of the toner t adjacent to a communicating portion 58 between the second opening (accommodation member opening) 30 and the third opening (container opening) 49 at the time when the toner cartridge E is mounted to or dismounted from the developing unit D will be described in detail.

(Brief Description of Developing Unit and Toner Cartridge)

Figure 15:
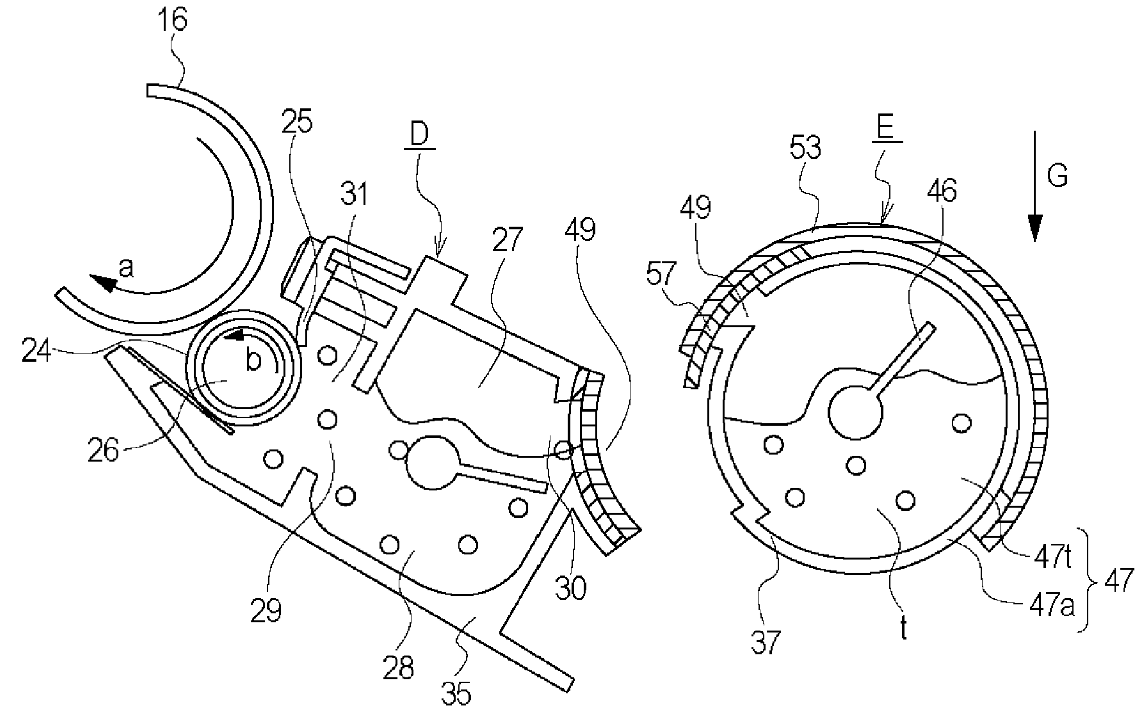
FIG. 15 is a sectional view of schematic structures of the developing unit and the toner cartridge.
Figure 15:
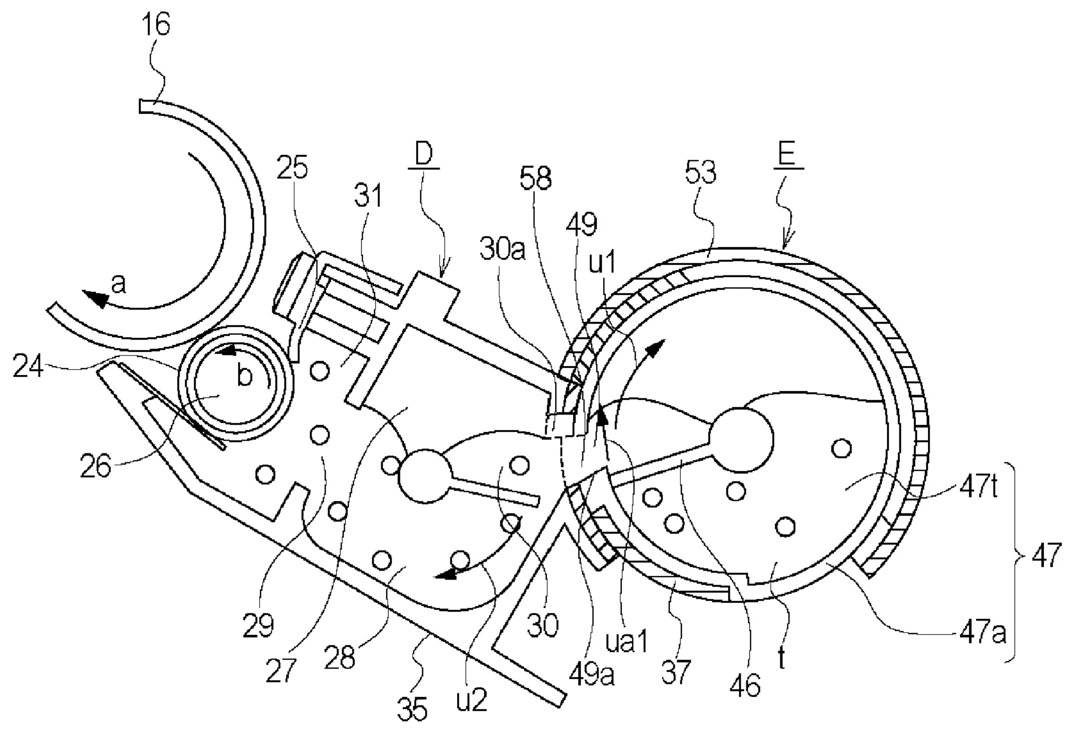

Referring to FIG. 15, a toner cartridge E and a developing unit D detachably mountable to a main assembly of an image forming apparatus A will be described. Part (a) of FIG. 15 is a sectional side view schematically illustrating the state in which the developing unit D and the toner cartridge E are separated. Part (b) of FIG. 15 is a sectional side view schematically illustrating the state in which the toner cartridge E is mounted to the developing unit D.

The toner cartridge (developer container) E comprises a container frame 47*a* including a second toner accommodating portion (container accommodation chamber) 47*t* accommodating the toner t. The container frame 47*a* is provided with a third opening (container opening) 49 for communication between the inside and the outside of a second toner accommodating portion 47*t*. Similarly, the container frame 47*a* is provided with a second shutter (container shutter) 53 for opening and closing the third opening 49, the second shutter 53 being movable along the peripheral surface. In the second toner accommodating portion 47*t* of the container frame 47*a*, a second toner feeding member 46 is rotatably supported. The second toner feeding member 46 feeds the toner accommodated in the second toner accommodating portion toward the third opening 49 and discharges the toner through the opening 49.

The toner cartridge E comprising these elements is detachably mountable to the developing unit D. The container frame 47*a* is rotatable (relative movement) about the rotational axis parallel with a developing roller axis direction z relative to the developing unit D (frame 35), in the state that the toner cartridge E is set (mounted) on the developing unit D.

The developing unit (accommodation member) D comprises a developing roller (developer carrying member) 24 as developing means and a developing blade (regulating member) 25. In addition, the developing roller 24 and the developing blade 25 are mounted to the frame (developing device frame) 35 of the developing unit D.

The frame 35 comprises a first toner accommodating portion (accommodation member accommodation chamber) 28 accommodating the toner t, a developing chamber 31, a first opening 29 for communication between the developing chamber 31 and the first toner accommodating portion 28, a second opening (accommodation member opening) 30 for communication between the inside and the outside of the first toner accommodating portion 28. The second opening 30 is provided at such a position that it opposes the third opening 49 of the toner cartridge E mounted to the developing unit D. The frame 35 is provided with the movable first shutter (accommodation member shutter) 37 capable of opening and closing the second opening 30. In the first toner accommodating portion 28 of the frame 35, a first toner feeding member 27 is rotatably supported. The developing roller 24 is provided in the frame 35 so that a part of the peripheral surface thereof is exposed to the inside of the developing chamber 31.

The toner cartridge E and the developing unit D constitutes a communicating portion 58 by the third opening 49 of the toner cartridge E and the second opening 30 of the developing unit D in the mounted state. Through the communicating portion 58, the first toner accommodating portion 28 and the second toner accommodating portion 47*t* are in fluid communication with each other. In this state, the second toner feeding member 46 rotatably supported in the second toner accommodating portion 47*t* of the toner cartridge E rotates in the direction indicated by an arrow u1. By this, the toner t accommodated in the second toner accommodating portion 47*t* of the toner cartridge E is supplied into the second toner accommodating portion 47*t* through the third opening 49. The toner t fed from the toner cartridge E through the third opening 49 is supplied into the first toner accommodating portion 28 of the developing unit D through the communicating portion 58 and the second opening 30. The toner t is fed into the developing chamber 31 through the first opening 29 by the rotation of the first toner feeding member 27 rotatably supported in the first toner accommodating portion 28 in the direction indicated by an arrow u2.

In the developing chamber 31, the developing roller 24 including a magnet roller 26 therein is provided. The developing roller 24 attracts the toner tin the developing chamber 31 onto the surface of the developing roller 24 by the magnetic force of the magnet roller 26. The developing blade 25 is elastically contacted to the developing roller 24 at a predetermined contact pressure. By the rotation of the developing roller 24 in a direction indicated by an arrow b, the amount of the toner t deposited on the surface of the developing roller 24 is regulated, and triboelectrically charge the toner t. By this, a toner layer is formed on the surface of the developing roller 24. The developing roller 24 is supplied with a voltage from the image forming apparatus A (unshown) and rotates in the direction indicated by the arrow b, by which the toner t is supplied to the developing zone of the photosensitive drum 16. By this, the toner t transfers onto the surface of the photosensitive drum 16 in accordance with the electrostatic latent image, thus developing the electrostatic latent image into a toner image on the photosensitive drum 16. The developing roller 24, the first toner feeding member 27 and the second toner feeding member 46 are rotated by a driving force transmitted from a power source (unshown) such as a motor or the like provided in the main assembly of the apparatus.

(Shutter Structures of Developing Unit and Toner Cartridge)

Figure 17:
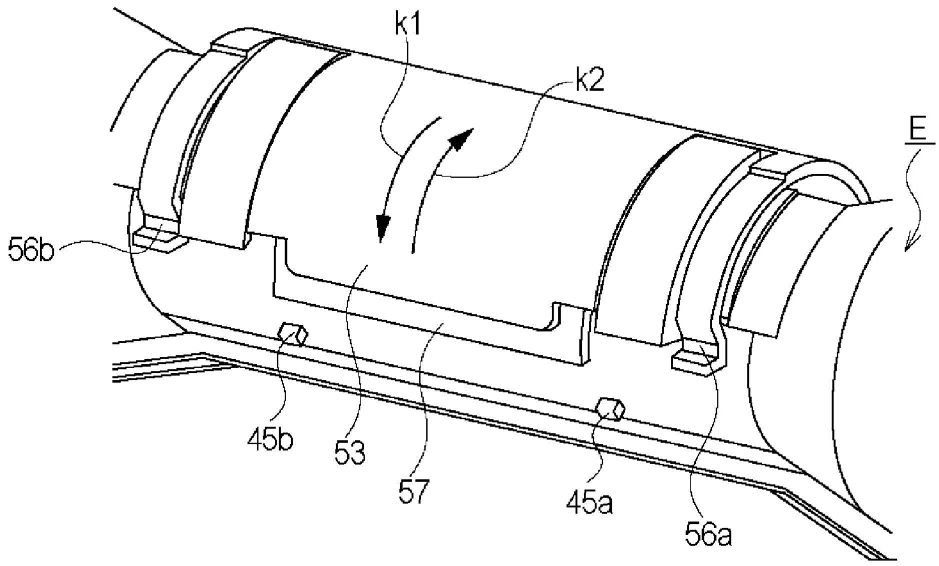
FIG. 17 is a perspective view illustrating opening and closing operations of the shutter of the toner cartridge.
Figure 17:
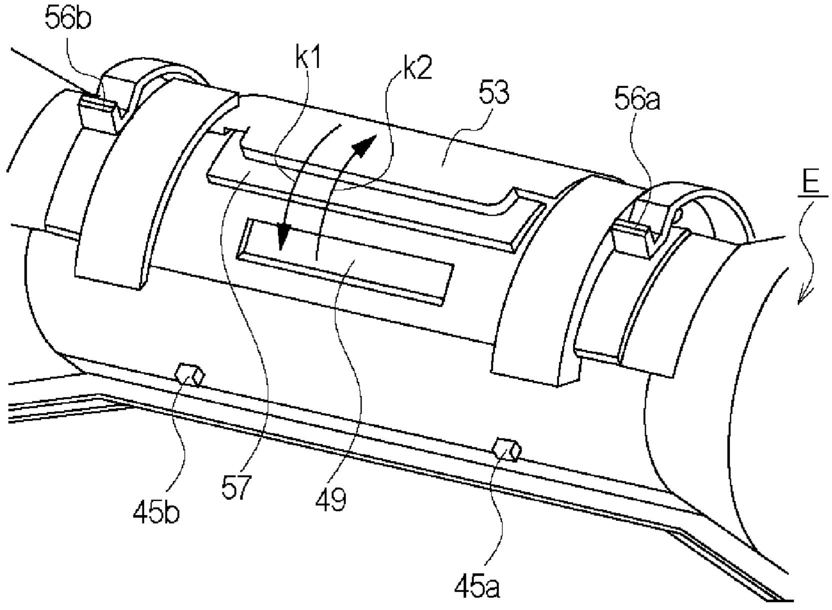
Figure 19:
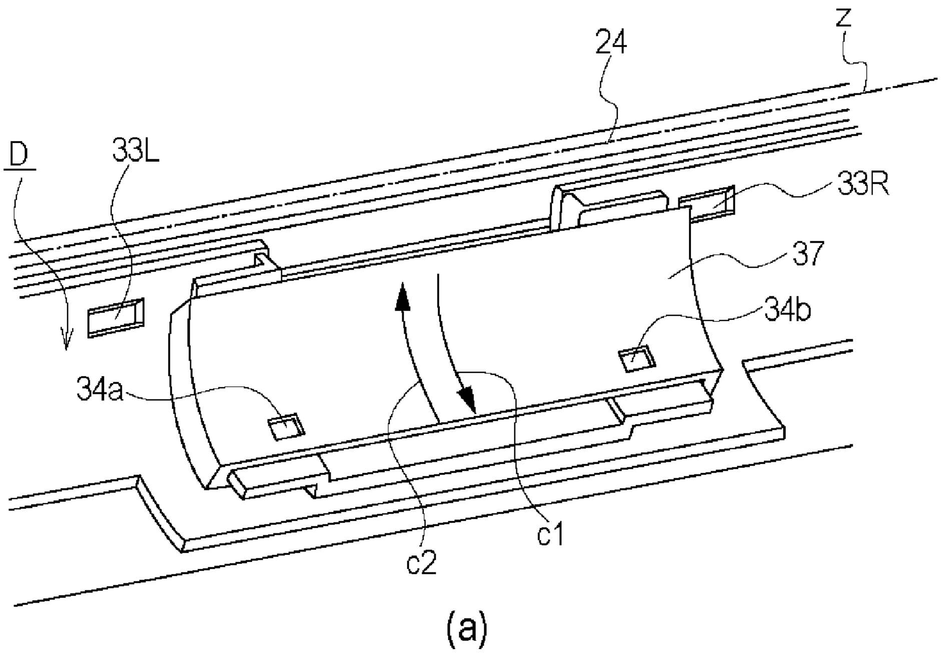
FIG. 19 is an exploded perspective view illustrating the opening and closing operations of the shutter of the developing unit.
Figure 19:
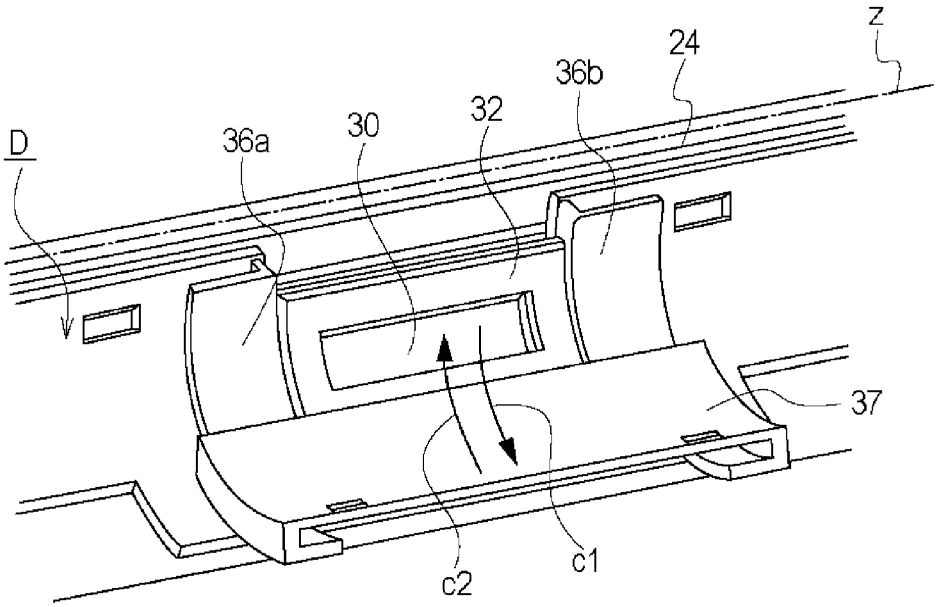

Referring to FIGS. 16, 17, 18, 19 and part (a) of FIG. 24, and part (b) of FIG. 24, the structures of the shutters of toner cartridge E and the developing unit D will be described. FIG. 16 is an exploded perspective view of a neighborhood of the third opening of the toner cartridge E. FIG. 17 is a perspective view illustrating an opening and closing operation of the shutter of the toner cartridge E. Part (a) of FIG. 17 illustrates the closed state of the shutter, and part (b) of FIG. 17 illustrates the open state of the shutter. FIG. 18 is an exploded perspective view of the neighborhood of the second opening of the developing unit D. FIG. 19 is an exploded perspective view illustrating the opening and closing operation of the shutter of the developing unit D. Part (a) of FIG. 19 illustrates the closed state of the shutter, and part (b) of FIG. 19 illustrates the open state of the shutter. Part (a) of FIG. 24 is a sectional view of the frame 48 of the toner cartridge E taken along a line A1 of FIG. 16. Part (b) of FIG. 24 is a sectional view of the frame 33 of the developing unit D taken along a line A2 of FIG. 18.

The toner cartridge E includes the container frame 47*a*, the third opening 49 provided in the container frame 47*a*, the second shutter 53 in the second sealing member 157. The container frame 47*a* father includes a guide portion 50*a* for guiding the second shutter 53, and a guide portion 50*b*.

The second shutter 53 is provided with a portion-to-be-guided 154*a* and a portion-to-be-guided 154*b* to be guided by the guide portion 50*a* and the guide portion 50*b* provided on the container frame 47*a*. The portion-to-be-guided 154*a* and the portion-to-be-guided 154*b* provided on the second shutter 53 are inserted into a gap 50*a*1 and a gap 50*b*1 between an outer configuration portion 47*a*1 of the container frame 47*a* and the guide portion 50*a* and the guide portion 50*b*. With such a structure, the second shutter 53 is movable between an open state (container opening position, part (b) of FIG. 17) for opening the third opening 49 provided in the container frame 47*a* and a closing state (container closing position, part (a) of FIG. 17) for closing the third opening 49.

As shown in FIG. 18, the developing unit D includes the frame 35, the second opening 30 provided in the frame 35, the first shutter 37 and a first sealing member 32. As shown in part (b) of FIG. 24, the frame 35 is provided with a guide portion 34*a* for guiding the first shutter 37 and an opening and closing guide portion 34*b*. In addition, the first shutter 37 is provided with the guide portion 34*a* provided on the frame 35, a portion-to-be-guided 37*s* and a portion-to-be-guided 37*t* to be guided by the guide portion 34*a* and the opening and closing guide portion 34*b*, respectively. The portion-to-be-guided 37*s* and the portion-to-be-guided 37*t* provided on the first shutter 37 are inserted into a gap 34*a*1 and a gap 34*b*1 between the outer configuration portions 35*a*, 35*b* of the frame 35 and the opening and closing guide portions 34*a*, 34*b*. By this, the first shutter 37 is movable between an open state (accommodation member opening position, part (b) of FIG. 19) for opening the second opening 30 provided in the frame 35 and a closing state (accommodation member closing position, part (a) of FIG. 19) for closing the second opening 30.

§ 2. [Opening and Closing Operation of Shutter]

The operations of the shutters provided on the developing unit D and the toner cartridge E of this embodiment will be described in detail.

Figure 21:
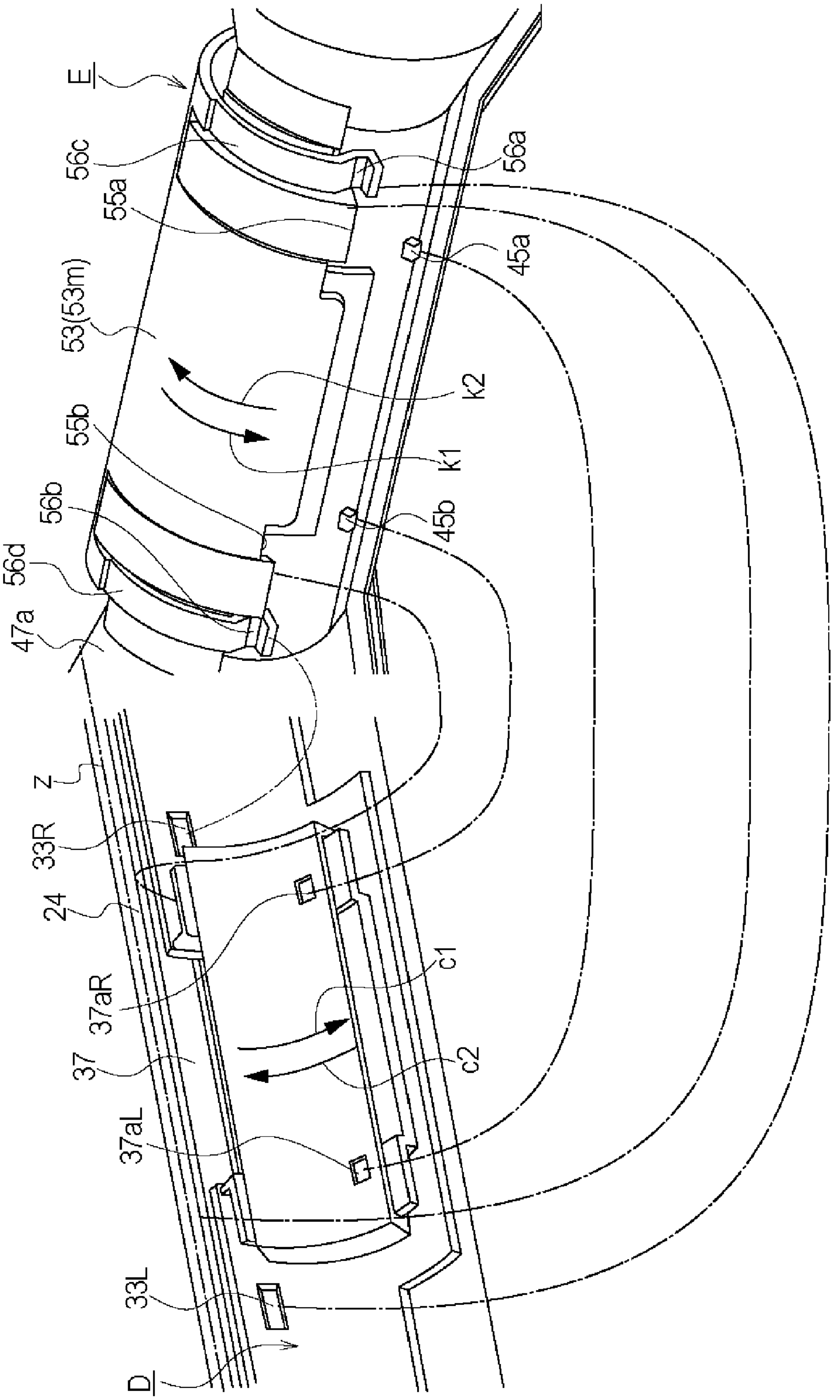
FIG. 21 is a perspective view of the toner cartridge and the developing unit.
Figure 22:
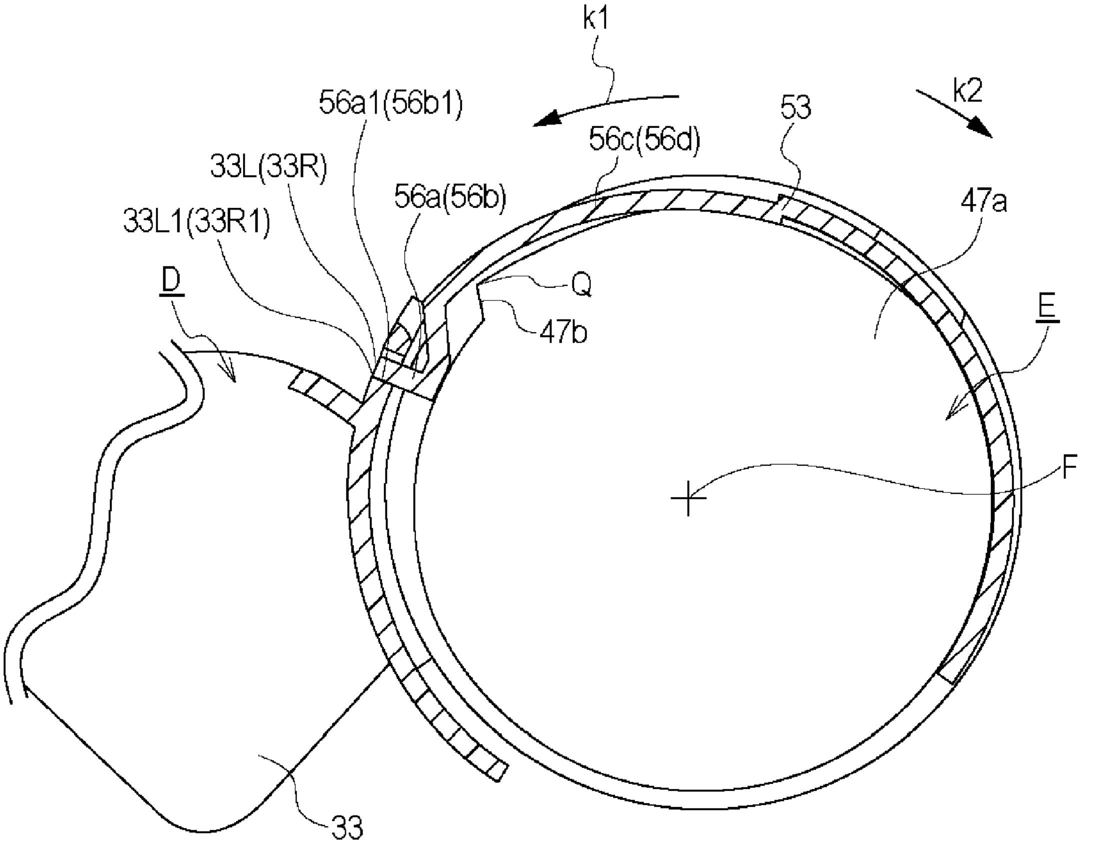
FIG. 22 is a schematic sectional view of the developing unit and the toner cartridge.
Figure 23:
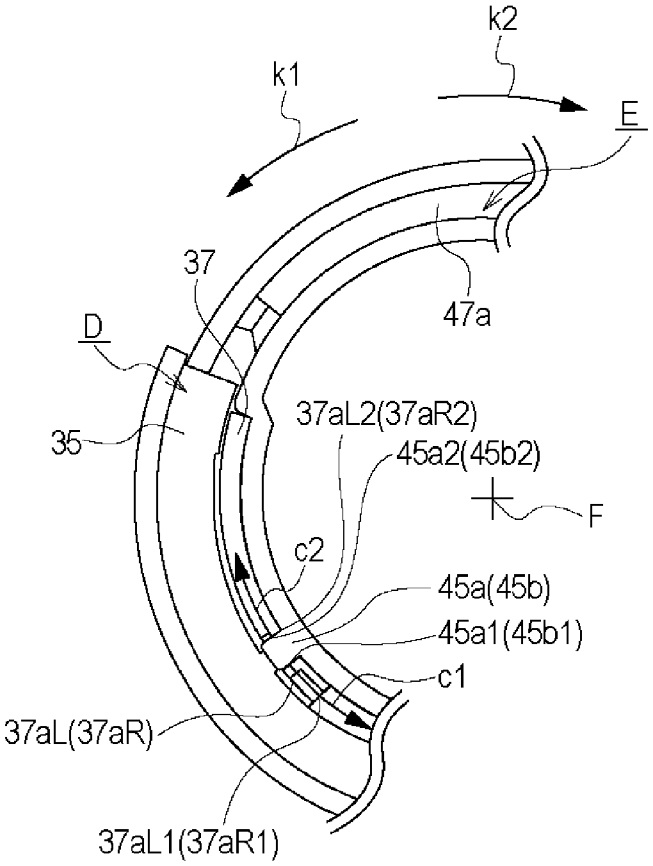
FIG. 23 is a schematic sectional side view of the neighborhood of the shutter portion.

FIGS. 20, 21, 22, 23 illustrate shutter opening/closing operations of the toner cartridge E and the developing unit D. FIG. 20 is a schematic sectional side view of the structure around the opening in the state that the toner cartridge E is engaged with the developing unit D; part (a) of FIG. 20 shows the state in which the opening is closed; and part (b) of FIG. 20 shows the state in which the opening is opened. FIG. 21 is a perspective view of the toner cartridge E and the developing unit D. FIG. 22 is a schematic sectional view of a hole portion 33L and a projection 56*a*, and a hole portion 33R and a projection 56*b* in the state that the toner cartridge E is engaged with the developing unit D. FIG. 23 is a schematic sectional side view of the shutter portion in the state that the toner cartridge E is engaged with the developing unit D.

The second shutter member 53 includes a main body portion (closing portion) 53*m* for closing the third opening 39, similarly to Embodiment 1. The opposite end portions of the main body portion 53*m* are provided with arm portions (connecting portions, supporting portions, elastic portions, deformable portions, movable portions) 56*c*, 56*d*, respectively. They are further provided with a claw portion (protrusion, projection, shutter side engaging portion, engaged portion) 56*a* supported by the arm portion 56*c*, a claw portion (protrusion, projection, shutter side engaging portion, engaged portion) 56*b* supported by the arm portion 56*d*.

The claw portions 56*a*, 56*b* correspond to the claw portion 53*b* of Embodiment 1, although the structure and the function are partly different. Similarly, the arm portions 56*c*, 56*d* correspond to the arm portion 53*a* of Embodiment 1. The portions different from Embodiment 1 will be described hereinafter.

As shown in part (a) of FIG. 20, in the state immediately after the engagement (mounting) between the toner cartridge E and the developing unit D, the third opening 49 of the toner cartridge E and the second opening 30 of the developing unit D are not opposed to each other. When the toner cartridge E is mounted to the developing unit D, the projection (container portion-to-be-engaged) 56*a* of the second shutter 53 of the toner cartridge E and the hole portion 33L of the frame 35 of the developing unit D are opposed (engaged) with each other. Similarly, the projection (container portion-to-be-engaged) 56*b* of the second shutter 53 of the toner cartridge E and the hole portion 33R on the frame 35 of the developing unit D are opposed (engaged) with each other. In addition, the projections (container engaging portions) 45*a*, 45*b* of the container frame 47*a* of the toner cartridge E are opposed (engaged) to the hole portions 37*a*L, 37*a*R of the first shutter 37 of the developing unit D.

In Embodiment 1, at the time when the toner cartridge E is inserted into the developing unit D, the claw portion (shutter side engaging portion) 53*b* of the second shutter member 53 does not enter the hole portion 33 (part (a) of FIG. 1). More particularly, by the rotation of the container frame 47*a* of the toner cartridge E, the claw portion 53*b* enters the hole portion 33 to establish the engagement (part (c) of FIG. 11).

On the contrary in this embodiment, before the rotation of the container frame 47*a* of the toner cartridge E, the projections (claw portions, shutter side engaging portions) 56*a*, 56*b* of the second shutter 53 enter the hole portion 33 (33R, 33L) of the developing unit D.

The shutter side engaging portion (claw portions 56*a*, 56*b*) receives from the developing unit D the force for moving the second shutter 53 from the closing position to the opening position and the force for moving the second shutter 53 from the opening position to the closing position. This will be described further.

(Opening Operation)

First, the toner cartridge E is moved to a predetermined mounting position of the developing unit D. By rotating the toner cartridge E, the third opening 49 of the toner cartridge E can be changed from the closing state (non-communication position, part (a) of FIG. 17) to the open state (communication position, part (b) of FIG. 17). More particularly, as shown in FIG. 20, the user rotates in the container frame 47*a* of the toner cartridge E in the direction indicated by an arrow k1 about a point F. At this time, when the container frame 47*a* rotates in the direction of the arrow k1 about the point F, a downstream side surface 56*a*1 of the projection 56*a* of the second shutter 53 with respect to the direction of the arrow k1 and a downstream surface 33L1 of the hole portion 33L with respect to the direction of the arrow k1 contact to each other. Similarly, when the container frame 47*a* rotates in the direction of the arrow k1, a downstream side surface 56*b*1 of the projection 56*b* with respect to the arrow k1 direction and a downstream surface 33R1 of the hole portion 33R with respect to the arrow k1 direction contact to each other. Therefore, when the container frame 47*a* of the toner cartridge E rotates in the direction of the arrow k1, second shutter 53 does not move because it is limited by the hole portion 33L and hole portion 33R of the frame 35 of the developing unit D. As a result, the container frame 47*a* of the toner cartridge E and the second shutter 53 move relative to each other, so that the third opening 49 of the container frame 47*a* is uncovered by the second shutter 53.

That is, by the claw portions 56*a*, 56*b* of the second shutter 53 receiving the force from the hole portions 33 (33L, 33R) of the developing unit, the second shutter 53 is moved relative to the container frame 47*a*. In other words, the second shutter 53 is rotated from the opening position in which at least a part of the third opening 49 is opened to the closing position in which the third opening 49 is substantially closed, using the forces received by the claw portions 56*a*, 56*b*.

As shown in FIG. 23, the container frame 47*a* rotates about the point F in the direction of the arrow k1. With this rotation, the downstream surface 45*a*1 of the projection 45*a* of the container frame 47*a* with respect to the arrow k1 direction pushes the downstream surface 37*a*L1 of the hole portion 37*a*L of the first shutter 37 with respect to the arrow k1 direction, in a direction indicated by an arrow c1. Similarly, the downstream surface 45*b*1 of the projection 45*b* of the container frame 47*a* with respect to the arrow k1 direction pushes the downstream surface 37*a*R1 of the hole portion 37*a*R of the first shutter 37, in the direction of the arrow c1. Therefore, with the rotation of the container frame 47*a* of the toner cartridge E about the point of F in the direction of the arrow k1, the first shutter 37 of the developing unit D moves relative to the frame 35 in the arrow c1 direction, thus opening the second opening 30 (part (b) of FIG. 20).

Thus, with the rotation displacement of the container frame 47*a* of the toner cartridge E in the arrow k1 direction, the first shutter 37 changes the second opening 30 of the developing unit D from the closing state to the opening state. As shown in part (b) of FIG. 20, the first toner accommodating portion 28 of the developing unit D and the second toner accommodating portion 47*t* of the toner cartridge E are brought into fluid communication with each other through the communicating portion 58 provided by the part of the second opening 30 and the third opening 49. By this, the toner t can be supplied from the second toner accommodating portion 47*t* of the toner cartridge E into the first toner accommodating portion 28 of the developing unit D.

As shown in FIG. 27, by the rotation of the container frame 47*a* of the toner cartridge E, a point Q on the surface 47*b* of the container frame 47*a* contacts to the claw portions 56*a*, 56*b* to push (urge) them. By the forces received by the claw portions 56*a*, 56*b* from the point Q, the arm portions 56*c*, 56*d* deform radially outwardly of the container frame 47*a*. Then, the projection 56*a* supported by the arm portion 56*c* and the projections 56*a*, 56*b* supported by the arm portion 56*d* deeply enter the hole portions 33L, 33R, respectively. In this state, the claw portions 56*a*, 56*b* have moved to the engaging position in which they engage with the hole portions 33L, 33R. That is, the claw portions 56*a*, 56*b* are held in the engaging positions by the surface 47*b*.

Part (c) of FIG. 24 is a sectional view taken along a line A3 of part (b) of FIG. 20, in which the second opening 30 of the developing unit D and the third opening 49 of the toner cartridge E are in fluid communication with each other. With advancement of the rotation of the container frame 47*a* of the toner cartridge E in the direction indicated by the arrow k1, the guide portions 50*a*, 50*b* of the container frame 47*a* are inserted into the gaps 34*a*1, 34*b*1 of the frame 35 of the developing unit D, as shown in part (c) of FIG. 24. In addition, the opening and closing guide portions 34*a*, 34*b* of the frame 35 of the developing unit D enter the gaps 50*a*1, 50*b*1 of the container frame 47*a* of the toner cartridge E. By this, when the second opening 30 of the developing unit D and the third opening 49 of the toner cartridge E are brought into fluid communication with each other, the movement of the toner cartridge E in the arrow q1 direction is prevented (part (b) of FIG. 20, part (c) of FIG. 24). In other words, the developing unit D and the toner cartridge E do not separate from each other in the state that the second opening 30 of the developing unit D and the third opening 49 of the toner cartridge E are in fluid communication with each other.

(Closing Operation)

A closing operation for changing the relationship between the second opening 30 of the developing unit D and the third opening 49 of the toner cartridge E from the fluid-communication state (part (b) of FIG. 20) to the closing state (part (a) of FIG. 20) is the opposite to the opening operation. That is, when the user operates in the direction opposite to that in the case of moving the first shutter 37 and the second shutter 53 to the open state, the container frame 47*a* of the toner cartridge E rotates about the point F in the direction indicated by an arrow k2 (part (b) of FIG. 20). At this time, as shown in FIG. 23, the projection 45*a* of the container frame 47*a* of the toner cartridge E and the hole portion 37*a*L of the first shutter 37 of the developing unit D are in engagement with each other. Similarly, the projection 45*b* of the container frame 47*a* of the toner cartridge E and the hole portion 37*a*R of the first shutter 37 of the developing unit D are in engagement with each other.

Therefore, with the rotation of the container frame 47*a* of the toner cartridge E about the point F in the arrow k2 direction, the downstream side surface 45*a*2 of the projection 45*a* with respect to the arrow k2 direction pushes the downstream surface 37*a*L2 of the first shutter 37 with respect to the arrow k2 direction, in the direction indicated by an arrow c2. In addition, the downstream side surface 45*b*2 of the projection 45*b* with respect to the arrow k2 direction pushes the downstream surface 37*a*R2 of the hole portion 37*a*R of the first shutter 37 with respect to the arrow k2 direction, in the direction indicated by the arrow c2.

Therefore, the first shutter 37 of the developing unit D moves in the arrow c2 direction.

In this manner, the first shutter 37 of the developing unit D changes the second opening 30 from the open state to the closing state (part (d) of FIG. 14, part (a) of FIG. 20) In addition, at this time, the second shutter 53 of the toner cartridge E closes the third opening 49, as will be described in the following.

When the container frame 47*a* of the toner cartridge E rotates about the point F in the arrow k2 direction, the projection 56*a* of the second shutter 57 is in engagement with the hole portion 33L of the developing unit D. The projection 56*b* of the second shutter 57 is in engagement with the hole portion 33R of the developing unit D. By the projection 56*a* and the projection 56*b* engaged with the hole portions 33L, 33R, the second shutter 57 does not move when the container frame 47*a* rotates. Therefore, the third opening 49 of the container frame 47*a* moves to the position opposing the second shutter 57 to close the third opening 49.

The projection 56*a* and the projection 56*b* of the second shutter 53 are the shutter side engaging portion (force receiving portion) to be engaged with the hole portions 33L, 33R to receive the force for moving the second shutter 57 to the closing position. That is, the projections 56*a*, 56*b* are engaged (hooked) with the hole portions 33L, 33R and receive the forces from the hole portions 33L, 33R, by which the movement of the second shutter 57 is limited to move the second shutter 57 relative to the container frame 47*a*. In other words, by the rotation of the second shutter 53 along the outer periphery of the container frame 47*a*, the third opening 49 is moved from the opening position in which the third opening 49 is at least partly open to the closing position in which the third opening 49 is substantially closed.

In this manner, the container frame 47*a* rotates relative to the second shutter 57, and at the time when the third opening 49 is closed by the second shutter 57, the point Q of the surface 47*b* separates from the projections 56*a*, 56*b*. The surface 47*b* is stepped at the point Q, and therefore, when the point Q separates from the projection 56*a*, the elastic deformation of the arm 56*c* is released from the surface 47*b*, and therefore, a part of the projection 56*a* retracts from the hole portion 33L. That is, by the elastic force of the arm 56*c*, the projection 56*a* moves from the engaging position to the retracted position.

Even though the projection 56*a* moves to the retracted position, a part of the projection 56*a* still in the hole portion 33L. However, the degree of entering of the projection 56*a* in the hole portion 33L decreases. Therefore, when the user takes the toner cartridge E out of the developing unit D, the projection 56*a* can be smoothly disengaged from the hole portion 33L.

Similarly, when the point Q separates from the projection 56*b*, the elastic deformation of the arm 56*d* by the surface 47*b* is released, so that a part of the projection 56*b* retract from the hole portion 33R. That is, by the elastic force of the arm 56*d*, the projection 56*b* moves from the engaging position to the retracted position.

Even though the claw portion 56*a* moved to the retracted position, a part of the projection 56*a* is still in the hole portion 33L. However, the degree of entering of the projection 56*a* in the hole portion 33L decreases. Therefore, when the user takes the toner cartridge E out of the developing unit D, the projection 56*a* can be smoothly disengaged from the hole portion 33L.

By this, the projections 56*a*, 56*b* do not obstruct the dismounting of the toner cartridge E. The projection 56*a* and the projection 56*b* move between the engaging positions and the retracted positions along the surface 47*b* of the container frame 47*a*. In other words, when the second shutter 47 moves to the opening position, the surface 47*b* functions as a guide portion for guiding the projections 56*a*, 56*b* from the retracted positions to the engaging positions. In addition, when the second shutter 47 moves to the closing position, the surface 47*b* functions to guide the projection 56*a* and the projection 56*b* from the engaging positions to the retracted positions.

In this embodiment, even though the shutter side engaging portion (claw portion 56*a*, 56*b*) moves from the engaging position to the retracted position, the engagement between the shutter side engaging portion and the receiving device side engaging portion (hole portions 33L, 33R) are is not completely released. However, by the movement of the shutter side engaging portion to the retracted position, the disengaging operation is easy.

§ 3. [Toner Leakage Suppression when Shutter is Closed]

The structures and the relationship of the toner cartridge E and the developing unit D in the neighborhood of the opening will be described in detail. In addition, the behavior of the toner stagnating in the openings of the toner cartridge E and the developing unit D when the toner cartridge E is removed will be described in detail as well.

(Toner Collecting Operation)

Figure 14:
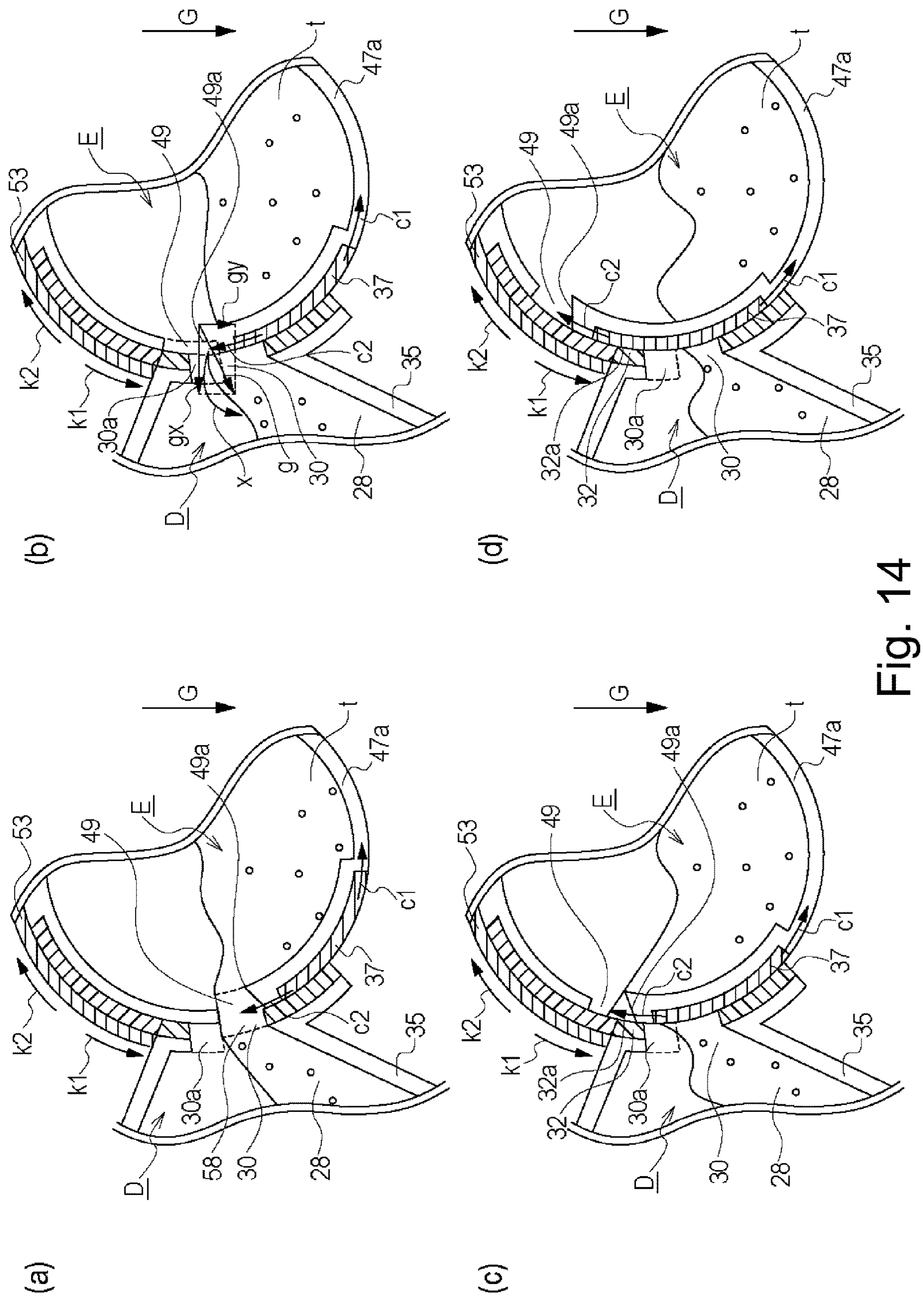
FIG. 14 is a partial sectional side view of the neighborhood of openings of the developing unit and the toner cartridge.

Referring to FIG. 14, a collecting operation for the toner t into the toner accommodating portion with the shutter closing operation will be described. FIG. 14 is a sectional view schematically illustrating the structure around the communicating portion 58 between the developing unit D and the toner cartridge E in this embodiment. Part (a) of FIG. 14 illustrates the state in which the second opening 30 in the third opening 49 are aligned with each other. In this state, the first toner accommodating portion 28 of the developing unit D and the second toner accommodating portion 47*t* of the toner cartridge E are in fluid communication with each other through the communicating portion 58. In such a communicating state, the toner t can be fed from the toner cartridge E into the developing unit D.

Part (b) of FIG. 14 illustrates the state in which the container frame 47*a* has been rotated relative to the frame 35 from the state shown in part (a) of FIG. 14. In this state, the area in which the second opening 30 and the third opening 49 are overlapped with each other is small. Part (c) of FIG. 14 illustrates the state in which the container frame 47*a* has been rotated relative to the frame 35 from the state shown in part (b) of FIG. 14. In this state, the second opening 30 and the third opening 49 are not overlapped with each other, thus closing the communicating portion 58. In this state, the first shutter 37 does not completely close of the second opening 30. Similarly, the second shutter 53 does not completely close the third opening 49.

part (d) of FIG. 14 illustrates the state in which the container frame 47*a* has been rotated relative to the frame 35 from the state shown in part (c) of FIG. 14. In this state, the first shutter 37 and the second shutter 53 completely close the second opening 30 and the third opening 49, respectively. In this state, the toner cartridge E is enabled to be removed from the developing unit D.

As shown in part (a) of FIG. 14 and FIG. 26, a collection portion 30*a* is provided in the position downstream of the first shutter 37 for the second opening 30 with respect to the closing direction (arrow c2) in this embodiment. FIG. 26 is a schematic view illustrating the communicating portion 58 as seen from the first toner accommodating portion 28 side. As shown in part (a) of FIG. 14 and FIG. 26, a width of the third opening 49 measured in the direction k2 of displacement of the container frame 47*a* (moving direction c2 of the first shutter 37) is smaller than that of the second opening 30. In the opening of the communicating portion 58 shown in part (a) of FIG. 14, the moving direction of the third opening 49 relative to the second opening 30 provided by the rotational operation of the container frame 47*a* is called "displacing direction". A downstream end portion the third opening 49 with respect to the displacing direction is upstream of the downstream end of the second opening 30. That is, when the toner t is fed and supplied through the communicating portion 58, a space area defined by the second opening 30 in the communicating portion 58 is open in the anti-gravity direction relative to the space area defined by the third opening 49. The space provided by expanding to the second opening 30 side of the communicating portion 58 by the size difference between the second opening 30 and the third opening 49 is the collection portion 30*a*.

In addition, an upstream surface (upstream side end portion) 49*a* below the third opening 49 of the frame of the toner cartridge E is inclined such that the second opening 30 of the developing unit D is in a lower position. That is, the upstream surface 49*a* is a surface area facing in the arrow u1 direction (rotational moving direction of the container frame 47*a*) in the end surface of the third opening 49, and the first toner accommodating portion 28 (second opening 30) side thereof is lower than the second toner accommodating portion 47 side with respect to the direction of gravity G direction.

As shown in part (a) of FIG. 14, a supply state is supposed in which during the toner supply from the second toner accommodating portion 47*t* into the first toner accommodating portion 28, the toner is filled up to the height (up with respect to the direction of gravity G) of the third opening 49 in the communicating portion 58. The toner t supplied from the second toner accommodating portion 47*t* into the first toner accommodating portion 28 through the communicating portion 58 moves through the communicating portion 58 in the direction from the third opening 49 to the second opening 30. Therefore, the height of an interface is limited by the third opening 49 which is lower than the second opening 30. As shown in part (b) of FIG. 15, the second toner feeding member 46 rotating in the direction indicated by the arrow u1 in the toner cartridge E feeds, when reaching the third opening 49, the toner t in the direction indicated by the arrow ua1 which is opposite to the direction G of the gravity. The toner t fed by the second toner feeding member 46 to the third opening 49 is supplied into the developing unit D along an upstream side surface 49*a* inclined downwardly toward the toner accommodation chamber 28, if the third opening 49 is not filled with the toner t. That is, the second toner feeding member 46 of the toner cartridge E scoops the toner t up to the third opening 30, but does not pack the toner into the developing unit D. Therefore, when the toner t fills the third opening 49 to the top, the toner t is not supplied from the second toner accommodation chamber 47*t* to the first toner accommodation chamber 28 even though the second toner feeding member 46 is rotated. In addition, the collection portion 30*a* is disposed upstream (upper) the third opening 49 with respect to the direction of gravity G. For this reason, the toner t is not in the collection portion 30*a*.

As shown in parts (a) of FIG. 14, the container frame 47*a* of the toner cartridge E is moved in the direction of the arrow k2 (the first shutter 37 moves in the arrow c2 direction) to change the state of the second opening 30 and the third opening 49 from the open state to the closing state (non-fluid-communication state). At this time, the upstream surface 49*a* of the third opening 49 of the container frame 47*a* of the toner cartridge E with respect to the moving direction (arrow k2) of the container frame 47*a* move up in the direction of arrow k2 with the movement of the container frame 47*a*, while collecting the toner t existing in the communicating portion 58. With the movement of the container frame 47*a* of the toner cartridge E, upstream surface 49*a* of the third opening 49 comes to the same height level as the collection portion 30*a* of the second opening 30, as shown in part (b) of FIG. 14. At this time, the height level is higher than the height of the interface of the toner regulated by the downstream surface opposed to the upstream surface 49*a* of the third opening 49 in the fluid-communication state shown in part (a) of FIG. 14. As shown in part (b) of FIG. 14, in this height position, the upstream surface 49*a* of the third opening 49 is inclined in the direction indicated by an arrow g provided by combining an arrow gy parallel with the direction of gravity G and an arrow x perpendicular to the arrow gy and extending in the direction from the second toner accommodating portion 47*t* toward the first toner accommodating portion 28. Therefore, by this inclination of the upstream surface 49*a*, the toner t collected up by the upstream surface 49*a* of the third opening 49 is moved and accommodated into the first toner accommodating portion 28 through the collection portion 30*a* which is in the space provided above the toner interface in the second opening 30.

The toner t collected by the upstream surface 49*a* of the third opening 49 enters the collection portion 30*a* before the upstream surface 49*a* moves beyond the height of the collection portion 30*a* and reaches the neighborhood of the first sealing member 32. Then, the toner t is collected into the first toner accommodating portion 28 (part (c) of FIG. 14). Therefore, the deposition of the toner t on the surface of the 32*a* sealing member 32 can be suppressed. That is, the toner t can be prevented from entering between the first sealing member 32 provided on the developing unit D And the container frame 47*a* of the toner cartridge E.

For reference, FIG. 25 illustrates a developing unit D1 not having the collection portion 30*a* and a toner cartridge E1 usable therewith. The developing unit D1 is provided with a second opening 930 defined by the developing device frame 935, and the toner cartridge E1 is provided with a third opening 949 defined by the frame 947*a*. The sizes and configuration of the second opening 930 and the third opening 949 are substantially the same. By the frame 947*a*, the toner accommodating portion 947*t* is provided.

As shown in part (a) of FIG. 25, when the container frame 947*a* is rotated about the axis F1 in this state that the toner t fills communicating portion 958, the toner cannot pass through the communicating portion 958 and may stagnate and the upstream surface 949*a* of the third opening 949 (part (b) of FIG. 25).

In such a case, as shown in part (c) of FIG. 25, the toner is deposited on the surface of the sealing member 932 In the state that the first shutter 937 and the second shutter 953 close the respective openings. When the toner cartridge E1 is removed from the developing unit D1, the toner to deposited on the sealing member 932 may leak to an outside of the developing unit D1 and/or the toner cartridge E1 (part (d) of FIG. 25).

On the contrary, according to this embodiment, the collection portion 30*a* is employed, and therefore, such leakage of the toner can be prevented. More particularly, by the rotation of the container frame 47*a* of the toner cartridge E in the direction of the arrow k2, the toner t is moved in the direction k2. By this, the leakage of the toner to the outside of the frame 35 of the developing unit D and the container frame 47*a* of the toner cartridge E can be suppressed.

As shown in part (d) of FIG. 14, after the second opening 30 and the third opening 49 become not overlapping with each other, the third opening 49 in the second opening 30 are closed by the second shutter 53 and the first shutter 37, respectively.

As described in the foregoing, according to this embodiment, as seen in the direction perpendicular to the moving direction of the shutter, the second opening is wider than the third opening toward the downstream with respect to the moving direction of the shutter, by which the leakage of the toner to the outside of the opening portion can be prevented when the opening is closed. By this, it is not necessary to provide a trapping portion (recess) for trapping the toner on the sealing member. Therefore, the leakage of the toner (developer) in the exchange operation of the toner cartridge can be more effectively suppressed with a simple structure without the necessity of increasing the sides of the sealing member or the like.

In the foregoing, the collection portion 30*a* has been described with this embodiment, the collection portion 30*a* is provided in the developing unit D in Embodiments 1, 2 as well (FIG. 3, 13, part (a)).

(Others)

In this embodiment, the sizes of the second opening 30 and the third opening 49 are made different from each other to provide the collection portion 30*a*. However, the present invention is not limited to such a structure. For example, in the communication state shown in part (a) of FIG. 1, the collection portion 30*a* is provided by positioning the second opening 30 and the third opening 49 with deviation therebetween so that the communicating portion 58 is provided by the partly overlapping area. The case, the sizes and/or the shapes of the openings are not limited to particular ones. In the foregoing embodiments, the shapes of the openings are rectangular, but may be another shapes, or may have different shapes, if a proper collection portion can be provided.

In this embodiment, the configuration of the upstream surface 49*a* of the third opening 49 is inclined such that an inside edge of the upstream a is downstream of an outside edge with respect to the displacing direction of the third opening 49 relative to the second opening 30. However, the present invention is not limited to such a structure. When closing the communicating portion 58, the third opening 49 displaces relative to the second opening 30. At this time, another shape is usable if the upstream side end portion of the third opening 49 with respect to the displacing direction produces a force for pushing the toner from the third opening 49 side to the second opening 30 side.

However, the provision of the collection portion 30*a* in the developing unit D is not inevitable. The collection portion 30*a* may be omitted, as shown in FIG. 25. That is, in FIG. 25, when the toner cartridge E1 is dismounted from the developing unit D1, the amount of the toner in the toner cartridge E1 and/or the developing unit D1 is small because the toner in the toner cartridge E1 and/or the developing unit D1 has normally been consumed. In such a case, the toner amount in the communicating portion 358 is not large, and therefore, the leakage of the toner upon the dismounting is unlikely even if the collection portion 30*a* is not provided.

However, the provision of the collection portion 30*a* as in this embodiment is preferable because the toner leakage can be assuredly suppressed with a simple structure. In addition, the toner leakage can be suppressed when the toner cartridge E is dismounted when the toner remains in the toner cartridge E.

In the following embodiments, the collection portion of this embodiment may be provided in the developing unit D.

Embodiment 4

A structure relating to the opening and closing of a shutter in this embodiment will be described. More specifically, the configuration of a second shutter 253 having a snap fit portion 271 and the structure for guiding the second shutter 253 will be described. In addition, the description will be made as to a drive transmission mechanism for improving a sealing property of a seal provided in an end portion of a container frame (frame, cylindrical portion) 247 *g* constituting the second toner accommodating portion 247*t*. Furthermore, the description will be made as to a feeding structure for stably supplying the toner t from the toner cartridge E into the developing unit D.

Referring to the drawings, this embodiment will be described. In the description of this embodiment, the same reference numerals as in the foregoing Embodiment are assigned to the elements having the corresponding functions in this embodiment, and the detailed description thereof is omitted. In the drawings, a part of the shape or elements is omitted for simplicity of explanation. The dimensions, the materials, the configurations, the relative positions of the elements in this embodiment may be properly modified depending on the structure and/or various conditions of the apparatus. Therefore, the present invention is not limited to the specific structures in this embodiment.

In this and subsequent embodiments, the developing unit D and the drum unit C are unified into a cartridge, and the developing unit D is a part of a process cartridge (parts (a) and (b) of FIG. 29). However, similarly to the foregoing embodiments, the developing unit D may be an independent cartridge, or the developing unit D may be fixed in the main assembly of the apparatus.

In the case that the developing unit D and the drum unit C are unified into a process cartridge, the process cartridge is the receiving device for receiving the toner cartridge E. However, only a portion of the developing unit D which is a part of the process cartridge may be called the receiving device as the case may be.

As for the structure of the main assembly of the image forming apparatus, the description will be omitted since it is similar to those of the other embodiment, and the neighborhood of the receiving portion for the toner cartridge E of the developing unit D and then the other parts will be described.

§ 1. [Details of the Neighborhood of the Toner Cartridge of the Developing Unit]

Referring to FIGS. 29, 30, 31, the structure of the neighborhood of the receiving portion of the toner cartridge E of the developing unit D according to this embodiment will be described in detail. In this embodiment, a longitudinal direction of the developing unit D is a direction of an axis of a developing roller 224 of the developing unit D.

(Structure of Cartridge and Unit)

FIG. 29 is a perspective view of the toner cartridge E of the developing unit D as seen from a receiving portion side. Part (a) of FIG. 29 illustrates a state in which a second opening (receiving opening) 230 is closed (first shutter 237 is in the closing position), part (b) of FIG. 29 illustrates a state in which the second opening 230 is opened (first shutter 237 is in opening position). FIG. 30 is an enlarged perspective view of the neighborhood of the receiving portion of the developing unit D for the toner cartridge E. Part (a) of FIG. 30 illustrates a state in which the second opening 230 is closed (first shutter 237 is in closing position); and part (b)

of FIG. 30 illustrates a state in which the second opening 230 is opened (first shutter 237 is in opening position).

FIG. 31 is a sectional view of a neighborhood of the second opening 230 of the developing unit D. Part (a) of FIG. 31 is a sectional view as seen from a driving side, and part (b) of FIG. 31 is a sectional view as seen from a non-driving side.

As shown in FIG. 29, the developing unit D is provided with the second opening 230 and the first shutter 237 adjacent to the toner cartridge receiving portion. The second opening 230 and the first shutter 237 are provided substantially at the longitudinal central portion of the developing unit D. The position of the second opening 230 is not limited to a particular position, and it will suffice if it is opposed to a third opening (discharge opening) 249 which will be described hereinafter. The position of the first shutter 237 is not limited to the central portion, it will suffice if the second opening can be covered.

As shown in part (a) of FIG. 29, the second opening 230 is sealed by the first shutter 237 having a configuration with a curvature along an outer peripheral surface of the toner cartridge E which will be described hereinafter.

For the first shutter 237, a hole portion 237*a* for engagement with a projection (container side projection the open/close member moving portion) 245 (FIG. 32) is provided outside a sealing range for the second opening 230. The first shutter 237 is engaged with a first shutter guide portion 234 provided at the opposite longitudinal end portions of the second opening 230 and is guided thereby. The first shutter 237 is slidable along the first shutter guide portion 234 the closing position (part (a) of FIG. 29) for closing the second opening 230 and the opening position (part (b) of FIG. 29) for opening the second opening 230.

Between the first shutter guide portion 234 and the second opening 230 with respect to the longitudinal direction of the developing unit D, a first locking arm (receiving device side locking member) 261 (part (b) of FIG. 30) is provided. The first locking arm 261 prevents the first shutter 237 from opening unintentionally. As shown in FIG. 31, the first locking arm 261 includes a claw portion 261*a*. The claw portion 261*a* of the first locking arm 261 is in the same position as the hole portion 237*a* of the first shutter 237 with respect to the longitudinal direction of the developing unit D.

A surface 261*b* of the claw portion 261*a* abuts to a surface 237*b* of the hole portion 237*a* of the first shutter 237. By this, the claw portion 261*a* suppresses unintentional opening of the first shutter 237. In the neighborhood of the second opening 230 of the developing unit D, there is provided a first sealing seal 232 for sealing between the first shutter 237 and the second opening 230. The first sealing seal 232 surrounds the second opening 230.

The opposite longitudinal ends of the developing unit D are provided with an insertion guide (non-driving side) and an insertion guide (driving side) 236*d* for guiding the insertion of the toner cartridge E, respectively. The developing unit D is provided with an abutted portion (non-driving side) 235*a* and an abutted portion (driving side) 236*a* to be abutted by an abutting portion (non-driving side) 242*a* and an abutting portion (driving side) 243*a* (FIG. 32) of the toner cartridge E.

For the opposite longitudinal end portions of the developing unit D, the end side provided with the driving portion such as a gear (first drive transmitting portion 238, for example) is called driving side. The other end side is called non-driving side. "(drive)" means the driving side. "(non) means the non-driving side.

In addition, there are provided a rotation guide portion (non) 235*b* and a rotation guide portion (drive) 236*b* for guiding the rotation of the toner cartridge E when the first shutter 237 and the second shutter (open/close member) 253 which will be described hereinafter are opened and closed, The insertion guide portions 235, 236 are guides (receiving device side guide portions) for guiding mounting and dismounting of the toner cartridge E. The insertion-guiding portion (non) 235*d* and the insertion guide (drive) 236*d* are provided with flat surfaces parallel with each other along an inserting direction f (part (a) of FIG. 29) of the toner cartridge E. The abutted portion (non) 235*a* and the rotation guide portion (non) 235*b* are disposed downstream of the insertion-guiding portion 235*d* (non) with respect to the inserting direction f. In addition, the abutted portion 236*a* (drive) and a rotation guide (drive) 236*b* are disposed downstream of the insertion guide (drive) 236*d* with respect to the inserting direction f.

The developing unit D is provided with the first drive transmitting portion 238 at one end portion of the developing unit D with respect to the longitudinal direction. The first drive transmitting portion 238 transmits driving forces to the second drive transmitting portion 248 (FIG. 32) and the second toner feeding means 246 (FIG. 35) through an idler gear (rotational force receiving portion) 250 of the toner cartridge E which will be described hereinafter. The first drive transmitting portion 238 is connected with a driving mechanism of the main assembly of the image forming apparatus inside the developing unit D, by a gear (unshown) as transmitting means.

The first drive transmitting portion 238 is a gear and are a rotational force transmitting portion for transmitting a rotational force for driving the second toner feeding member 246 to the toner cartridge E.

The idler gear 250 is a rotational force receiving portion for receiving the rotational force from an outside of the toner cartridge E (first drive transmitting portion 238 of developing unit D). The second drive transmitting portion 248 is a second rotational force receiving portion for receiving a rotational force (driving force) from the idler gear 250.

As shown in FIG. 30, in the neighborhood of the second opening 230 of the developing unit D, there are provided a release claw 262 for releasing the locking of the second shutter 253, and a shutter holding portion 263. Shutter holding portion 263 is provided with a locking hole 263*a*.

The release claw 262 functions to release the second locking arm 270 (FIG. 34) for preventing unintentional opening of the second shutter 253 of the toner cartridge E, as will be described hereinafter.

The shutter holding portion 263 contacts to the claw portion (first engaging portion) 271*a* or the projection (second engaging portion) 271*b* of the snap fit portion 271 provided on the second shutter 253 of the toner cartridge E, as will be described hereinafter (FIG. 42). By this when the second shutter 253 is closed, the rotation of the second shutter 253 container (developer accommodating container, toner accommodating container) 247 which will be described hereinafter, by being dragged by the second shutter 253 is prevented.

As to the operation of the second shutter 253 in the opening and closing, the description will be made hereinafter.

(Details of Toner Cartridge)

Referring to FIGS. 32, 33, 34, 35, 36, 37, the toner cartridge E according to this embodiment will be described in detail.

FIG. 32 is a perspective view of the toner cartridge E. Part (a) of FIG. 32 is a perspective view as seen from the second drive transmitting portion 248, and part (b) of FIG. 32 is a perspective view as seen from the opposite side. FIG. 33 illustrates a state in which the third opening 249 of the toner cartridge E is opened. Part (a) of FIG. 33 is an enlarged view of the neighborhood of the third opening 249, and part (b) of FIG. 33 is a sectional view of the neighborhood of the third opening 249 as seen from the non-driving side of the toner cartridge E. FIG. 34 illustrates the second shutter 253. FIG. 35 illustrates a relationship between the second toner feeding member 246 and the container 247. Part (a) of FIG. 35 illustrates a configuration of a sheet 246*a* of the second toner feeding member 246. Part (b) of FIG. 35 illustrates a section of a stirring shaft seal 264. Part (c) of FIG. 35 is a sectional enlarged view illustrating a relationship between the second drive transmitting portion 248 and the stirring shaft seal 264. FIG. 36 is an enlarged sectional view of the hole portion 252*a* of the second shutter guide portion (opening and closing) 252 cut from the third opening 29 in the state that the second shutter 253 is assembled with the toner cartridge E. Part (a) of FIG. 36 shows the state in which the second shutter 253 is closed, and part (b) of FIG. 36 shows the state in which the second shutter 253 is opened. In FIG. 36, the second shutter guide portion 252 is depicted by broken lines for better showing of the second locking arm 270. FIG. 37 is a perspective view illustrating the state before the toner cartridge E is inserted into the developing unit D.

As shown in FIG. 32, part (b) of FIG. 35 and part (c) of FIG. 35, the toner cartridge E comprises the container 247, the third opening 249, the second shutter 253, the second sealing member 254, the second drive transmitting portion (gear 248), the idler gear 250 and the stirring shaft seal 264. Here, the longitudinal direction a toner cartridge E is a rotational axis direction of the second toner feeding member 246. The longitudinal direction of the toner cartridge E is the longitudinal direction of the container 247 and the second shutter 253, as well. When the toner cartridge E is rotated, the container 247 rotates. The longitudinal direction of the toner cartridge E is the rotational axis direction of the container 247. The second shutter 253 opens and closes the opening by rotating around the container 247. The longitudinal direction of the toner cartridge E is the rotational axis direction of the second shutter 253.

The container 247 is a substantially cylindrical hollow member. That is, the frame (container frame 247*g*) constituting the main body portion (major part) of the container 247 is substantially cylindrical. Assuming that the container 247 is a cylinder, the longitudinal direction of the toner cartridge E is a generatrix direction of the cylindrical or a center axis direction of the cylindrical.

The container frame 247 *g* includes a flat surface portion, and a curved surface portion (arcuate portion) having a substantially cylindrical (substantially arcuate configuration) at least around the third opening 249 (part (b) of FIG. 33, and so on). The second shutter 253 rotates along the curved surface portion to open and close the third opening 249.

The container frame (cylindrical portion) 247 *g* is a hollow member and constitutes a toner accommodating portion (toner accommodation chamber) 247*t* for accommodating the toner.

The container 247 is provided with a projection (container side projection or protrusion for engagement with the hole portion 237*a* of the first shutter 237 on the outer periphery of the container frame 247*g*. The container 247 (container frame 247*g*) is provided with an abutment surface 247*c* for abutment to the abutment surface 237*b* (FIG. 30) of the first shutter 237 in the process of opening and closing of the first shutter 237. The abutment surface 247*c* is provided by a stepped portion formed on the frame (container frame 247*g*) of the container 247 and is a surface crossing with the rotational moving direction of the toner cartridge E (rotational moving direction of second shutter 252). It is an elongated surface extending in the longitudinal direction (axial direction) of the toner cartridge E.

The abutment surface 247*c* is an opening force applying portion (open/close member moving portion) for applying a force for opening the first shutter 237 to the first shutter 237 to move the first shutter 237 to the opening position, as will be described in detail hereinafter.

The abutment surface 247*c* is provided in the neighborhood of a free end of the second shutter 253 (main body portion 253*m* of shutter when the second shutter 253 is in the closing position.

As shown in a part (b) of FIG. 33, the second toner accommodating portion 247*t* is provided with a second toner feeding member 246 for feeding the toner. In addition, one end portion of the second toner feeding member 246 is rotatably supported by the container 247, and the other end portion thereof is rotatably supported by the second drive transmitting portion 248 for driving the second toner feeding member 246. Here, the stirring shaft seal 264 has a hollow cylindrical shape, and the outer diameter d1 thereof is slightly larger than the inner diameter d2 of the container frame 247*g*. The inner diameter d3 of the stirring shaft seal 264 is slightly smaller than the outer diameter d4 of the cylindrical portion 248*b* of the second drive transmitting portion 248. A width w1 of the stirring shaft seal 264 in the spontaneous state is larger than a distance between the sealing surface 248*a* of the second drive transmitting portion 248 and the seal abutment surface 247*f* of the container frame 247 at the time when the second drive transmitting portion 248 is positioned in place in the container frame 247*g*.

The stirring shaft seal 264 is sandwiched between the sealing surface 248*a* of the second drive transmitting portion 248 and the seal abutment surface 247*a* of the container 247 in the container frame 247 *g* of the container 247.

As shown in FIG. 32 the container 247 is provided with an idler gear 250 for drive transmission with the second drive transmission member 248. The second drive transmitting portion 248 and the idler gear 250 of this embodiment are helical gears, and second drive transmitting portion 248 is biased in the inward direction (the direction indicated by an arrow r4 in part (c) of FIG. 35) with respect to the longitudinal direction of the toner cartridge E, during the drive transmission.

The second toner feeding member 246 comprises a feeding shaft 246*a* and a flexible sheet 246*b*. The sheet 246*b* is provided with a slit (part (a) of FIG. 35) to move the toner accommodated in the second toner accommodating portion 247*t* container 247 toward the third opening 249. The detailed structures thereof will be described hereinafter.

In this embodiment, as shown in part (b) of FIG. 32, the third opening 249 is provided in the longitudinally central portion of the toner cartridge E on the circumference of the container 247 (container frame 247*g*). However, the position of the third opening 249 may be any if it is opposed to the second opening 230 of the developing unit D.

As shown in FIG. 32 and part (a) of 33, the longitudinally opposite end of the third opening 249 of the toner cartridge E are provided with second shutter guide portions 252 for guiding the movement of the second shutter 253, respectively. As shown in part (b) of FIG. 32 and FIG. 36, the hole portion 252*a* is provided in a part of the second shutter guide portion 252.

As shown in FIG. 34, the main body portion (main body portion 253*m* of shutter) of the second shutter 253 is curved with the curvature along the outer peripheral surface of the toner cartridge E. That is, the second shutter 253 (main body portion 253*m* of shutter) has a curved surface configuration (substantially arcuate configuration) extending along the container 247.

That is, the container 247 (container frame 247*g*) has a curved surface (substantially cylindrical, substantially arcuate) around the third opening 249 (part (b) of FIG. 33). The second shutter 253 is reciprocable along the curved surface portion (arcuate portion) of the container 247 provided around the third opening 249. That is, the second shutter 253 rotates (revolves) on the container 247. By this, the second shutter 253 can open and close the third opening 249.

The second shutter 253 is provided with a second locking arm (arm portion) 270 on the outside of a second sealing seal 254 which will be described hereinafter, with respect to the longitudinal direction and is provided with snap fit portions (arm portions) 271 at the opposite end portions outside of the second locking arm 270 with respect to the longitudinal direction.

The second locking arm 270 is provided between the main body portion 253*m* of the shutter and the snap fit portion 271, and extends from a trailing end side toward the leading end side of the main body portion 253*m* of the shutter. The second locking arm has an elastic portion and is elastically deformable.

The two snap fit portions 271 are connected with the opposite end portions of the main body portion (main body portion 253*m* of shutter) of the second shutter 253, respectively. Similarly, the two second locking arms 270 are connected with the opposite end portions of the main body portion 253*m* of the shutter.

The main body portion 253*m* of the shutter is a portion (closing portion) for substantially closing the third opening 249. The snap fit portion 271 is movable relative to the main body portion 253*m* of the shutter by deformation. Similarly, the second locking arm 270 is movable relative to the main body portion 253*m* of the shutter by deformation, as well.

The snap fit portion 271 may be molded integrally with the main body portion 253 of the shutter from the resin material, or may be formed by a separate member (metal leaf spring, for example).

The second locking arm 270 is provided with an abutted surface 270*a* to be abutted by the release claw 262 (FIG. 30) of the developing unit D. The second locking arm 270 is provided with a claw portion 270*b* engageable with the hole portion 252*a* (FIG. 32) of the second shutter guide portion 252 of the toner cartridge E.

The second locking arm 270 is molded integrally with the main body portion 253*m* of the shutter from a resin material, but the second locking arm 270 may be formed by mounting a member (metal member, for example) different from the main body portion 253*m* of the shutter.

The abutted surface 270*a* of the second locking arm 270 is an inclined portion (inclined surface) inclined toward the main body portion 253*m* as the distance to the free end of the second locking arm 270 decreases. The claw portion 270*b* is a projection (protrusion) projecting at least outwardly with respect to the longitudinal direction of the toner cartridge E.

The snap fit portion 271 is provided with an arm portion 271*c* elastically deformable in the longitudinal direction of the second shutter 253 and the toner cartridge E. The snap fit portion 271 is provided at the free end of the arm portion 271*c* and includes a claw portion (projection, protrusion, engaging portion) 271*a* projecting radially outwardly of the second shutter 253 (radial outward).

The claw portion 271*a* and the projection 271*b* constitute an engaging portion (open/close member side engaging portion) for engagement with the developing unit D. By the arm portion 271*c* of the snap fit portion 271, the claw portion 271*a* (or projection 271*b*) is connected with the main body portion 253*m* of the shutter (FIG. 34).

The arm portion 271*c* of the snap fit portion 271 constitutes a connecting portion for connection of the claw portion 271*a* and the projection 271*b* with the main body portion 253 of the shutter.

The arm portion 271*c* of the snap fit portion 271 is a supporting portion for supporting the engaging portion (claw portion 271*a* and projection 271*b*). The arm portion 271*c* has an elastic portion which is elastically deformable. That is, the arm portion 271*c* is elastically deformable.

The snap fit portion 271 (arm portion 271*c*) extends from the trailing end side toward the free end side of the main body portion 253*m* of the shutter. The free end side of the main body portion 253 of the shutter is the downstream side with respect to the rotational moving direction (moving direction) of the second shutter 253 rotating from the opening position to the closing position. On the other hand, the trailing end side of the main body portion 253 of the shutter is the upstream side with respect to the rotational moving direction.

The claw portion 271*a* projects at least in the radially outward direction of the container 247 (radially outward of the second shutter 253) The radially outward direction of the second shutter 253 is the radially outward direction of the container 247, and is an outward in the rotational radius direction of the rotation locus of the second shutter 253.

The radial outward direction is in the outward direction of the container 247 (toward the outside of the container 247), and is away from the container 247 or the rotational axis (center axis) of the container 247. The radially outward direction is away from the second toner feeding member 246 or the rotational axis of the second toner feeding member 246.

The projection 271*b* is a projection projecting at least in a circumferential direction of the container 247 (rotational moving direction of second shutter 253). More particularly, in the rotational moving direction (opening direction) of the second shutter 253 relative to the container 247 from the closing position to the opening position, the projection 271*b* projects toward the downstream side.

In other words, the second shutter 253 includes the claw portion (first engaging portion) 271*a* and the projection (second engaging portion) 271*b* as the engaging portion, and the claw portion 271*a* and the projection 271*b* are projected in the directions different from each other (crossing directions relative to each other).

The snap fit portion 271 (arm portion 271*c*) has a width which increases toward the free end side. That is, in the longitudinal end portion side, the snap fit portion 271 is provided with a first regulated surface 271*d* to be regulated and a second regulated surface 271*e* to be regulated and a third regulated surface 271*f* to be rotated. The first regulated surface 271*d* is an inclined surface (inclined portion) inclined toward an outside with respect to the longitudinal direction as the distance to the free end of the arm portion 271*c* decreases. The second third regulated surfaces 271*e*, 271*f* are the surfaces extending substantially in parallel with the direction in which the arm portion 271*c* extends. A distance between the regulation surface 271*e* and the regulation surface 271*f* is larger than a width of the trailing end side (base portion side) of the arm portion 271*c*.

The first and the second regulated surfaces 271*d*, 271*e* contact a first regulation surface 247*d* of the container 247 (part (a) of FIG. 33), as will be described hereinafter. The third regulated surface 271*f* contacts a second regulation surface 247*e* of the container 247 (part (a) of FIG. 33).

The second shutter 253 is engaged with the second shutter guide portion (opening and closing guide) the of the toner cartridge E. It is slidable in the circumferential direction of the container 247 along the outer peripheral surface of the toner cartridge E between a position for closing the third opening 249 (part (a) of FIG. 32) and the position for opening the third opening 249 (part (b) of FIG. 32).

As shown in FIG. 36, in the state that the third opening 249 is closed, the claw portion 270*b* of the second locking arm 270 is engaged with (fitted in) the hole portion 252*a* provided in the second shutter guide portion 252 of the toner cartridge E. The surface 270*c* of the claw portion 270*b* contacts the surface 252*b* of the hole portion 252*a* of the second shutter guide portion 252. As a result, the movement of the second shutter 253 relative to the container 247 is limited, thus suppressing unintentional opening of the second shutter 253.

The claw portion 270*b* is a locking portion for locking the second shutter 253 in the closing position. By the second locking arm 270, the claw portion 270*b* is connected with the main body portion 253*m* of the shutter. That is, the second locking arm 270 (trailing end side of the second locking arm 270 beyond the claw portion 270*b* strictly stating) is the connecting portion connecting the claw portion 270*b* with the main body portion 253*m* of the shutter and is the supporting portion for supporting the claw portion 270*b*.

As shown in FIG. 32, the toner cartridge E is provided and longitudinally opposite end portions with an insertion-guided portion (non) 242 and an insertion-guided portion (drive) 243, respectively. The insertion-guided portion (non) and the insertion-guided portion (drive) 243 are guided by the insertion guide (non) 235*d* and the insertion guides (drive) 236*d* of the developing unit D, respectively. Insertion-guided portions 242, 243 to be guided for insertion are toner cartridge side guides.

Referring to FIGS. 32, 31, the description will be made as to the insertion guide (non) 235*d*, the insertion guide (drive) 236*d* of the developing unit D, and the insertion-guided portion (non) 242, the insertion-guided portion (drive) 243 and the grip member 244. The detailed operation, the operation and the function a substantially similar to those of Embodiment 3, and therefore, the description thereof is omitted.

The insertion-guided portion (non) is provided with the abutting portion (non) 242*a* and the rotation-guided portion (non) 242*b*. The abutting portion (non) 242*a* abuts to the abutted portion (non) 235*a* of the developing unit D when the toner cartridge E is inserted. The portion around the abutting portion (non) 242*a* is formed as a rotation-guided portion (toner cartridge side rotation guide) having a curved surface configuration (substantially arcuate configuration). When the first shutter 237 and the second shutter 253 are opened and closed, the rotation-guided portion slides relative to the rotation guide portion 235*b* of the insertion guide (non) 235*d* to guide the rotating operation of the toner cartridge E.

The insertion-guided portion (drive) 243 is provided with the abutting portion (drive) 243*a*. The abutting portion (drive) 243*a* abuts to the abutted portion (drive) 236*a* of the developing unit D in the insertion of the toner cartridge E.

In addition, the insertion-guided portion (non) 242 is provided with a regulating portion 242*c*1 and a regulating portion 242*c*2 as an attitude regulating portion for regulating the insertion attitude (dismounting attitude) of the toner cartridge E when toner cartridge E is inserted. The regulating portion 242*c*1 and the regulating portion 242*c*2 are inserting direction regulating portions (mounting direction regulating portions, dismounting direction regulating portions, removing direction regulating portions) for regulating the inserting direction (mounting direction) and/or dismounting direction of the toner cartridge E.

The container 247 is provided with the grip member 244 as the grip to be gripped by the user when the toner cartridge E is mounted. The grip member 244 is U-shaped fixed at the opposite longitudinal end portions of the container 247.

More specifically, the grip member 244 includes fixed portions 244*a* at the opposite end portions of the operating portion 244*b* to be gripped by the user. The fixed portion 244*a* has a U-shaped fixed to the second toner container 247 at the opposite longitudinal ends of the toner cartridge E. The shape of the grip member 244 is not limited to this example if the user can grip it.

§ 2. [Shutter Opening and Closing Operation in Mounting and Dismounting of Toner Cartridge Relative to Developing Unit]

Referring to FIG. 28 and FIGS. 37-43, an opening operations of the first shutter 237 of the developing unit D and the second shutter 253 of the toner cartridge E will be described.

FIG. 28 illustrates movement of the second shutter 253 up to the uncovering of the third opening 249 and a positional relationship in the neighborhood of the snap fit portion 271. Part (a) of FIG. 28 and part (d) of FIG. 28 are enlarged views of the neighborhood of the second shutter 253, showing the process of insertion of the toner cartridge E into the developing unit D. Part (a) of FIG. 28 is a view of the second shutter 253 as seen from the front side, and part (d) of FIG. 28 is a sectional view of the third opening 249 as seen from the non-driving side. Part (b) of FIG. 28 is an enlarged view of a neighborhood of the second shutter 253 in the state in which the leading side surface 253*c* of the second shutter 253 abuts to the abutment surface 239 of the developing unit D after the rotation of the toner cartridge E in the direction of uncovering the third opening 249 by further rotation from the state shown in part (a) of FIG. 28. Part (b) of FIG. 28 and part (e) of FIG. 28 are views of the second shutter 253 as seen from the front side, and part (e) of FIG. 28 is a sectional view of the third opening 249 as seen from the non-driving side. Part (c) of FIG. 28 and part (f) of FIG. 28 are enlarged views of the neighborhood of the second shutter 253 in the state in which the second opening 230 and the third opening 249 are in fluid communication with each other and the mounting of the toner cartridge E is completed, by further rotation from the state of part (b) of FIG. 28. Part (c) of FIG. 28 is a view of the second shutter 253 as seen from the front side, and part (f) of FIG. 28 is a sectional view of the third opening 249 as seen from the non-driving side.

Part (a) of FIG. 38 is a sectional view of the first locking arm 261 of the developing unit D as seen from the non-driving side immediately before the toner cartridge E is inserted into the developing unit D. Part (b) of FIG. 38 and part (c) of FIG. 38 are sectional views of the first locking arm 261 of the developing unit D as seen from the non-driving side when the toner cartridge E is inserted into the developing unit D.

FIG. 39 is a sectional view of the second locking arm 270 of the second shutter 253 and the hole portion 252*a* of the second shutter guide portion 252 as cut from the front side of the second shutter 253 when the toner cartridge E is inserted into the developing unit D. Part (a) of FIG. 39 illustrates a state immediately after the insertion of the toner cartridge E into the developing unit D. Part (b) of FIG. 39 illustrates a state that the toner cartridge E is rotated in the direction of uncovering the third opening 249 at the insertion of the toner cartridge E into the developing unit D.

FIG. 40 shows the positional relation in the neighborhood of the snap fit portion 271 of the second shutter 253 until the third opening 249 is uncovered. Part (a) of FIG. 40 shows a relationship between the snap fit portion 270 and the shutter holding portion 263 in the state shown in part (e) of FIG. 28. Part (c) of FIG. 40 shows a relationship between the snap fit portion 270 and the shutter holding portion 263 in the state of part (c) of FIG. 28 and part (f) of FIG. 28. Part (b) of FIG. 40 shows a relationship between the snap fit portion 270 and the shutter holding portion 263 at the timing between the state of part (a) of FIG. 40 and part (c) of FIG. 40. Part (d) of FIG. 40 shows a relationship between the snap fit portion 270 and the first regulating portion 247*d* of the container 247 in the state shown in part (a) of FIG. 40. Part (e) of FIG. 40 shows a relationship between the snap fit portion 270 and the first regulating portion 247*d* of the container 247 in the state shown in part (b) of FIG. 40. Part (f) of FIG. 40 shows a relationship between the snap fit portion 270 and the first regulating portion 247*d* of the container 247 in the state shown in part (c) of FIG. 40.

FIG. 41 illustrates the neighborhood of the snap fit portion 271 of the second shutter 253 in the state of part (f) of FIG. 28. FIG. 42 illustrates a state in which the leading side surface 253*c* of the second shutter 253 abutted to the abutment surface 239 of the developing unit D, and the second shutter 253 is limited by the developing unit D. Part (a) of FIG. 42 shows a relationship in the longitudinal direction between the snap fit portion 271 of the second shutter 253 and the locking holding portion 263 of the developing unit D. Part (b) of FIG. 42 shows a positional relationship, in the rotational direction of the toner cartridge E, between the snap fit portion 271 of the second shutter 253 in the locking holding portion 263 of the developing unit D.

FIG. 43 illustrates a positional relation between the first drive transmitting portion 238 of the developing unit D and the idler gear 250 as seen from the driving side in the mounting process of the toner cartridge E. Part (a) of FIG. 43 shows the state in which the second shutter 253 is closed during the insertion of the toner cartridge E, and part (b) of FIG. 43 shows the state in which the second shutter 253 is opened by the completion of the mounting of the toner cartridge E.

FIG. 44 is a sectional view of the neighborhood of the second opening 230 and the third opening 249 as seen from the driving side in the state shown in part (b) of FIG. 43. In FIG. 39, part (a) of FIG. 40, part (b) of FIG. 40 and FIG. 42, the parts which are not significantly related with the operations of the second locking arm 270 and/or the snap fit portion 271 are omitted for simplicity of explanation.

The insertion process of the toner cartridge E into the developing unit D in this embodiment is similar to that of Embodiment 1. Therefore, the description will be made in detail as to the opening and closing of the first shutter 237 and the second shutter 253 after the positioning of the toner cartridge E in the developing unit D.

(Operations of First Locking Arm and Second Locking Arm)

Referring to FIGS. 37, 38, 39, the description will be made as to the state of the first locking arm 261 of the developing unit D and the state of the second locking arm 270 of the toner cartridge E in the state that the toner cartridge E is positioned in place in the developing unit D.

As shown in FIGS. 37, 38, in the state that the toner cartridge E is set in place in the developing unit D, the projection 245 of the container 247 is engaged with the hole portion 237*a* of the first shutter 237.

At this time, the surface 245*c* of the projection 245 of the container 247 contact and the surface 261*c* of the first locking arm 261 of the developing unit D. By this, the first locking arm 261 receives a force F11 from the projection 245 of the container 247 to elastically deform in the direction of the arrow r1. The claw portion 261*a* of the first locking arm 261 is disengaged from the hole portion 237*a* of the first shutter 237. As a result, the limitation to the movement of the first shutter 237 in the direction of an arrow e by the contact between the surface 237*a*2 of the hole portion 237*a* and the surface 261*b* of the first locking arm 261 is released, so that the first shutter 237 becomes movable relative to the second opening 230.

The projection 245 is a release portion for releasing the locking the state of the first shutter 237 caused by the contact (engagement) with the hole portion 237*a*.

The insertion attitude and direction of the toner cartridge E is regulated such that by the insertion of the toner cartridge E into the developing unit D, the projection 245 is engaged with (enter) the hole portion 237*a* to contact the first locking arm 261. That is, the attitude and/or the inserting direction of the toner cartridge E relative to the developing unit D is regulated by the insertion-guided portion (non) 242 and the insertion guide (non) 235*d*.

When the toner cartridge E is dismounted from the developing unit D, the projection 245 separates from the first locking arm 261. Therefore, the elastic deformation of the first locking arm 261 is freed to cause the first locking arm 261 to engage with the hole portion 237*a*, thus blocking the first shutter 237 again.

By rotating the toner cartridge E in the direction of the arrow e after the insertion of the toner cartridge E into the developing unit D, the leading side surface 253*c* of the second shutter 253 (FIG. 34) abuts to the abutment surface 239 of the developing unit D (FIG. 30). By this, the rotation of the second shutter 253 in the direction of the arrow e is limited. At this time, as shown in FIG. 39, the release claw 262 of the developing unit D abuts to the abutted surface 270*a* of the second locking arm 270 of the second shutter 253 so that the second locking arm 270 receive a force F12 from the release claw (release portion) 262. By a component force F12*x* of the force F12, the second locking arm 270 elastically deforms in a direction indicated by arrow r2 (longitudinally inwardly of the toner cartridge E). As a result, the claw portion 270*b* of the second locking arm 270 is disengaged from the hole portion 252*a* of the second shutter guide portion 252. That is, by the force received by the abutment surface 270*a* from the release claw 362, the claw portion 270*b* is moved from the locking position (part (a) of FIG. 39) for locking the second shutter 253 in the closing position to the unlocking position (part (b) of FIG. 39) for releasing it. The abutment surface 270*a* is a release force receiving portion for receiving the force for moving the claw portion 270*b* (locking portion) from the developing unit D by the rotation of the toner cartridge E during the mounting operation.

The abutment surface 270*a* is an inclined portion (inclined surface) inclining longitudinally inwardly as the distance to the free end of the second shutter 253 (free end of the second locking arm 270) decreases. Because of the inclination of the abutment surface 270*a*, the force (F12) received from the release claw 262 comprises a longitudinally inward component (F12*x*).

By the movement of the claw portion 270*b* to the unlocking position by the force F12*x*, the limitation in the direction of the arrow e by the contact between the claw portion 270*b* of the second locking arm 270 and the surface 252*b* of the hole portion 252*a* of the second shutter guide portion 252 is removed. Therefore, the second shutter 253 becomes movable in the direction of the arrow e relative to the third opening 249 of the container 247. More particularly, by the leading side surface 253*c* of the second shutter 253 receiving the force from the abutment surface (force applying portion) 239 of the developing unit D, the second shutter 253 rotates relative to the container 247 from the closing position to the opening position.

The leading side surface 235*c* of the second shutter 253 is an opening force receiving portion for receiving the force for moving the second shutter 253 from the closing position to the opening position, from an outside of the toner cartridge E (from the developing unit D).

The second locking arm 270 (claw portion 270*b*) is substantially covered by the second shutter guide portion 252, and therefore, the locking by the second locking arm 270 is not easily released inadvertently by the user. Second shutter guide portion 252 functions also as a cover portion covering the second locking arm 270 (claw portion 270*b*).

When the toner cartridge E is mounted to the developing unit D, the release claw of the developing unit D enters between the second shutter guide portion 252 and the container frame 247*g*. Thus, the release claw 662 is engaged with the second shutter guide portion 252.

(Relationship Between Shutter Holding Portion and Snap Fit Portion of Toner Cartridge)

Father the description will be made as to the state in which the toner cartridge E is set in the developing unit D.

In the state the leading side surface 253*c* and the abutment surface 239 are in abutment to each other, the claw portion 271*a* of the snap fit portion 271 is outside of the shutter holding portion 263 of developing unit D with respect to the longitudinal direction of the toner cartridge E (part (a) of FIG. 42).

The positional relation of the claw portion 271*a* of the snap fit portion 271 relative to the locking hole 263*a* of the shutter holding portion 263 of the developing unit D is as shown in part (b) of FIG. 42. The claw portion 271*a* is downstream of the locking hole 263*a* with respect to the rotational moving direction of the toner cartridge E (arrow e direction in part (b) of FIG. 42) at the time when the third opening 249 is opened.

(Operations of First Shutter and Second Shutter)

Referring to FIGS. 28, 40, 42, the operations of the first shutter 237 and the second shutter 253 at the time when the toner cartridge E is further rotated will be described.

With further rotation of the toner cartridge E, the abutted surface 237*b* (FIG. 30) of the first shutter 237 abuts to the abutment surface 247*c* (FIGS. 32, 38). As shown in part (e) of FIG. 28, the first shutter 237 is pressed by the container 247 to receive a force F13 in the rotational direction of the toner cartridge E. At this time, as described hereinbefore, the first locking arm 261 limiting the movement of the first shutter 237 is released. As a result, the first shutter 237 rotates integrally with the container 247 in the direction of opening the second opening 230 (arrow e in FIG. 28). Then, the first shutter 237 move in the order of part (d) of FIG. 28, part (e) of FIG. 28 and part (f) of FIG. 28.

In addition, at this time, as shown in part (b) of FIG. 39, the leading side surface 253*c* of the second shutter 253 abuts to the abutment surface 239 of the developing unit D. Therefore, with the rotation of the container 247, the container 247 rotates relative to the second shutter 253. Simultaneously, as shown in part (d) of FIG. 40, the first regulated surface 271*d* of the snap fit portion 271 of the second shutter 253 contacts the point 247*h* of the first regulation surface 247*d* of the container 247 to receive a force F14 (longitudinally inward direction). Then, the arm portion 271*c* of the snap fit portion 271 elastically deforms longitudinally inwardly of the toner cartridge E (toward the third opening 249, arrow r3 direction in parts (d) of FIGS. 28 and 40).

When the container 247 is further rotated, the second regulated surface 271*e* of the snap fit portion 271 of the second shutter 253 abuts to the first regulation 247*d* of the container 247 (from state of part (d) of FIG. 40 to state of part (e) of FIG. 40. Part (c) of FIG. 28, part (d) of FIG. 40 and part (e) of FIG. 40 illustrates the state in which the second regulated surface 271*e* of the snap fit portion 271 and the first regulation 247*d* of the container 247 are in abutment to each other. In this state, the positions of the claw portion 271*a* of the snap fit portion 271 and the projection 271*b* are overlapped with the shutter holding portion 263 with respect to the longitudinal direction of the toner cartridge E. In this state, the relationship between the claw portion 271*a* and the projection 271*b* is in the engaging position.

Claw portion 271*a* of the snap fit portion 271 is downstream (arrow e direction) of the shutter holding portion 263 of the developing unit D with respect to the rotational direction of the toner cartridge E at the time when the third opening 249 is opened. The snap fit portion 271 elastically deforms (operates) in the order of the state of part (a) of FIG. 28, the state of part (b) of FIG. 28 and the state of part (c) of FIG. 28.

The first regulation 247*d* is the moving portion (engaging position moving portion) for moving the claw portion 271*a* and the projection 271*b* longitudinally inwardly (inward with respect to the axial direction). The first regulation 247*d* urges the first regulated surface 271*d* when the second shutter 253 moved to the opening position (when the toner cartridge E is rotated for mounting). By the force applied to the first regulated surface 271*d* from the first regulation 247*d*, the claw portion 271*a* is moved to the engaging position for engagement with the shutter holding portion 263, and the projection 271*b* is also moved to the engaging position for engagement with the locking hole 263*a*.

The first regulation surface 247*d* is the guiding portion for guiding the claw portion 271*a* and the projection 271*b* from the retracted position to the engaging position through the first regulated surface 271*d*. The first regulation surface 247*d* is an urging portion (pressing portion) for urging or pressing the claw portion 271*a* and the projection 271*b* toward the engaging position through the first regulated surface 271*d*.

In addition, the first regulation surface 247*d* urges the second regulated surface 271*e* longitudinally inwardly when the second shutter 253 moves to the opening position. By this, the first regulation surface 247*d* holds the engaging portion (claw portion 271*a*, claw portion 271*a*) in the engaging position. The first regulation surface 247*d* is the engaging position holding portion.

The first regulation surface 247*d* urges the first regulated surface provided on the supporting portion (arm portion 271*c*) supporting the engaging portion (claw portion 271*a*, projection 271*b*) and the second regulated surfaces 271*d*, 271*e*, thus urging the engaging portion through the arm portion 271*c*.

However, it is a possible alternative that the first regulation surface 247*d* contacts directly to the engaging portion (claw portion 271*a*, projection 271*b*) to urge the engaging portion.

By the first regulation surface 247*d*, the engaging portion (claw portion 271*a*, 271*b*) of the second shutter 253 moves axially inwardly by not less than 2.3 mm. That is, the movement distance (movement distance) measured along the axial direction (longitudinal direction) when the engaging portion moves from the retracted position to the engaging position is not less than 2.3 mm.

(Operation Until Second Opening Communicates with Third Opening)

As shown in part (e) of FIG. 28 and part (f) of FIG. 28, when the toner cartridge E is further rotated in the direction of the arrow e, the first shutter 237 rotates integrally with the container 247 in the direction of opening the second opening 230 (arrow e direction). In addition, the container 247 rotates relative to the second shutter 253. At this time, the second shutter guide portion 252 of the container 247 engages with the first shutter guide portion 234, and rotates in the direction of the arrow e while roughly regulating the movement in the radial direction of the cylindrical shape of the container 247. As shown in part (f) of FIG. 28, in the state of the established fluid communication between the third opening 249 and the second opening 230, the opening operations of the second opening 230 and the third opening 249 are completed.

At this time, the curved surface portions (rotation-guided portions) at the opposite end portions of the insertion-guided portion 242 is engaged with the rotation-guide portion 235*b*. By this, the toner cartridge E is limited in the movement, in the state the second opening 230 and the third opening 249 are opened. As to the details structures, they are similar to those of Embodiment 1, and the description thereof is omitted.

§ 3. [Drive Transmission Developing Unit to Toner Cartridge]

In the following, the description will be made as to the forces at the time of the transmission of the driving force from the developing unit D to the toner cartridge E.

(Drive Transmission Structure from Developing Unit to Toner Cartridge)

Referring to FIG. 43 and FIG. 44, the drive transmission structure from the developing unit D to the toner cartridge E will be described. For the drive transmission from the developing unit D to the toner cartridge E, the idler gear 250 and the first drive transmitting portion 238 are engaged with each other.

In part way of mounting of the toner cartridge E to the developing unit D, the idler gear 250 and the first drive transmitting portion 238 are not connected with each other, but the idler gear 250 is connected with the second drive transmitting portion 248 only.

The position of the idler gear 250 in the mounting process of the toner cartridge E is upstream of the first drive transmitting portion 238 with respect to the mounting rotating direction (arrow e in FIG. 43) of the toner cartridge E. By the rotation of the toner cartridge E in the mounting direction (arrow e in FIG. 43), the idler gear 250 approaches to the first drive transmitting portion 238. In the state that the mounting of the toner cartridge E to the developing unit D is completed, the idler gear 250 is connected (engaged) with the first drive transmitting portion 238. By this, the drive transmission from the developing unit D to the second toner feeding member 246 is enabled (in part (b) of FIG. 43). That is, by the rotation of the toner cartridge E, the idler gear 250 can receive the rotational force.

In this embodiment, the second drive transmitting portion 248 and the idler gear 250 are helical gears. Therefore, by the thrust force produced in the drive transmission, the second drive transmitting portion 248 is moved longitudinally inwardly of the toner cartridge E (arrow r4 direction in part (c) of FIG. 35). Therefore, in the drive transmission, the positioning surface 248*c* of the second drive transmitting portion 248 abuts to the surface 247*g*1 of the container frame 247*g*, so that the position is determined.

At this time, the stirring shaft seal 264 is sandwiched by the 247*f* of the container 247 and the sealing surface 248*a* of the second drive transmitting portion 248. Therefore, the stirring shaft seal 264 is compressed in the longitudinal direction of the toner cartridge E. By the compressed stirring shaft seal 264, a hermetical property for the space between the cylindrical portion 248*b* of the second drive transmitting portion 248 and the container frame 247 *g* of the container 247 can be enhanced. Therefore, the leakage of the toner from the inside of the container 247 in the neighborhood of the second drive transmitting portion 248 can be suppressed.

The external force (rotational force received by idler gear 250) applied at the time when the drive transmission is effected from the first drive transmitting portion 238 of the developing unit D to the toner cartridge E, a moment of rotating the entirety of the toner cartridge E is produced. In this embodiment, the first drive transmitting portion 238 of the developing unit D rotates in a direction indicated by an arrow q in part (b) of FIG. 43. By the external force F16 applied at the time when the driving force is transmitted from the first drive transmitting portion 238 of the developing unit D, a moment M1 is produced for the toner cartridge E. The direction of the moment M1 is the same as the rotational direction (arrow e) of the container 247 in opening the third opening 249.

In other words, the rotational moving direction (arrow u) of the idler gear 250 is the same as the rotational moving direction (arrow e) of the container 247 at the time when the third opening 249 of the toner cartridge E is opened. Namely, the rotational moving direction of the idler gear (arrow u) is the same as the rotational moving direction (arrow e) in the rotation of the second shutter from the opening position to the closing position relative to the container 247.

With the above-described structure of this embodiment, when the driving force is transmitted from the developing unit D to the toner cartridge E, the force in the direction of opening the third opening 249 (arrow e) is applied to the toner cartridge E.

By this, when the toner is discharged from the toner cartridge E, the closure of the first shutter 237 and the second shutter 253 can be suppressed. With the same structure, even when the exposure of the third opening 249 of the toner cartridge E is incomplete, the moment M1 applied to the toner cartridge E is effective to rotate the entirety of the toner cartridge E in the direction of the arrow e to completely open the third opening 249.

From the standpoint of the toner feeding, the rotational directions of the second drive transmitting portion 248 and the second toner feeding member 246 are to move the toner upwardly (arrow d in FIG. 44) with respect to the direction of gravity (arrow G) at the third opening 249.

(Toner Feeding from the Toner Cartridge into the Developing Unit)

Referring to FIG. 45, the toner feeding structure for feeding the toner from the toner cartridge E into the developing unit D will be described. Part (a) of FIG. 45 is a longitudinal sectional view showing the relationship between the configuration of the sheet 246*b* of the second toner feeding member 246 and the container 247. Part (b) of FIG. 45 is a sectional view showing a relationship between the configuration of the sheet 246*b* of the second toner feeding member 246 in the neighborhood of the third opening 249 and the container 247. Part (c) of FIG. 45 is an enlarged view of a part of the sheet 246*b*. Part (d) of FIG. 45 is a sectional view illustrating the motion of the second toner feeding member 246 during the rotation.

The toner in the toner cartridge E is fed into the developing unit D through the third opening 249 and the second opening 230 which are in fluid communication with each other by the second feeding member 246.

The second feeding member 246 rotates inside the toner cartridge E by the driving force received through the first drive transmitting portion 238 of the developing unit D, the idler gear 250 and the second drive transmitting portion 248.

The rotational direction of the second feeding member 246 is the direction of moving the toner upwardly at the third opening 249 (arrow d in part (b) of FIG. 45). At this time, the sheet 246*b* of the second toner feeding member 246 (part (a) of FIG. 45) is provided with a plurality of slits. The slits of the sheet 246*b* of the second toner feeding member 246 are symmetrically arranged with respect to the center of the third opening 249.

The slits are inclined inwardly with respect to the longitudinal direction of the sheet 246*b* from the widthwise center of the sheet 246*b* toward the free end. More particularly, as shown in part (a) of FIG. 45, a point 246*b*2 at the free end of the sheet 246*b* is longitudinally inward of a point 246*b*1 at the central portion with respect to the widthwise direction.

Furthermore, a widthwise shape in the longitudinal direction of the sheet 246*b* is along the inside surface of the container 247 with slight fictitious intrusion. As shown in part (a) of FIG. 45 and part (b) of FIG. 45, a width w3 is a distance from the rotational center S of the second toner feeding member 246 of the sheet 246*b* to the widthwise free end (246*b*3, 246*b*4). Similarly, a distance w5 is a distance from the rotational center S of the second toner feeding member 246 of the container 247 to a point 247*h*1 on an internal wall surface of the container 247 measured in a direction perpendicular to the longitudinal direction. In this embodiment, the width w3 is larger than the distance w5.

Furthermore, a width w4 is a distance from the rotational center S of the second toner feeding member 246 of the sheet 246*b* to the widthwise free end 246*b*7. A distance w6 is a distance from the rotational center S of the second toner feeding member 246 of the container 247 to a point 247*h*2 on the internal wall surface of the container 247 measured in the direction perpendicular to the longitudinal direction. In this embodiment, the width w4 is larger than the distance w6.

With this structure of the second toner feeding member 246, the second feeding member 246 contacts the toner inside the container 247 or the inner wall of the container 247. Then, the longitudinally inward point 246*b*4 at the free end deforms more than the point 246*b*3 at the free end of the sheet 246*b* in the direction of the arrow d (FIG. 45). Referring to part (c) of FIG. 45, this will be further described. The point 246*b*3 and the point 246*b*4 are on the free end of the sheet 246*b* with respect to the widthwise direction of the sheet 246*b*. The point 246*b*4 is closer to the third opening 249 (part (a) of FIG. 45) than the point 246*b*3 in the longitudinal direction. A support point 246*b*5 is the closest force receiving support point when a force in the downward direction perpendicular to the sheet of the drawing is applied to the point 246*b*3 of the sheet 246*b*, and a distance r10 is the distance between the point 246*b*3 and the support point 246*b*5. A support point 246*b*6 is the closest force receiving support point when a force is applied to the point 246*b*4 of the sheet 246*b*, and a distance r11 is in the distance between the point 246*b*4 and the support point 246*b*6. A point 246*b*3 is a given point in an area w30 in which the point 246*b*3 and the support point 246*b*5 are on the same segment divided by the adjacent slits with respect to the longitudinal direction of the sheet member 246*b*. Point 246*b*4 is a given point in an area w30 in which the point 246*b*4 and the point 246*b*6 are not on the same segment divided by the adjacent slits with respect to the longitudinal direction of the sheet member 246*b*.

The slits are inclined in such directions that they are toward the longitudinally central portion of the sheet member 246*b* as the distance from the rotational center increases. Therefore, when the same force is applied to the point 246*b*3 and the point 246*b*4, the point 246*b*4 which is farther from the support point deforms (flexes) more. As a result, the sheet 246*b* of the second feeding member 246 is capable of feeding the toner toward the longitudinally central portion (toward the third opening 249). In addition, by the structure of moving the second feeding member 246 upwardly, the amount of the toner which cannot be discharged and remains in the toner cartridge E can be reduced.

The neighborhood of the third opening 249 with respect to the longitudinal direction of the sheet 246*b* is not provided with the slit in the range longer than the third opening 249 in the longitudinal direction. More particularly, as shown in part (a) of FIG. 45, a width w7 of the sheet 246*b* in the neighborhood of the third opening 249 measured in the longitudinal direction is larger than a width w8 of the third opening 249 measured in the longitudinal direction. By this, the sheet 246*b* is prevented from entering toward the second opening 230 from the third opening 249 (part (b) of FIG. 45).

As a result, the toner adjacent to the third opening 249 is scraped off by the inner wall of the container 247. By this, it can be avoided that sheet 246*b* pushes the toner into the developing unit D with the result of agglomeration and therefore deterioration of the toner in the developing unit D.

In this embodiment, an angle θ2 (part (a) of FIG. 45) of the slits or slit of the sheet 246*b* is 70 degrees relative to the longitudinal direction of the sheet 246*b*.

The configuration of the sheet 246*b* is not limited to that of the above-described example, and it will suffice if the toner can be stably supply the from the toner cartridge E into the developing unit D.

With the above-described structure of the second feeding member 246, the toner can be stably discharged into the developing unit D even if the opening through which the toner is discharged is narrow. Since the width of the third opening 249 measured along the longitudinal direction is enough to cover the central portion, the size of the first seal member 232 can be reduced. As a result, the amount of the material of the seal can be reduced to save cost. By reducing the third opening 249, the toner leakage in the toner cartridge E mounting and dismounting operation can be reduced.

In this embodiment, the container 247 is substantially cylindrical, the diameter (inner diameter and outer diameter) of the container 247 is different depending on the position, as will be understood from part (a) of FIG. 45, in which w5>w6. More particularly, the diameter in the longitudinal end portion of the container 247 is larger than the diameter in the central portion of the container 247 (that is, the neighborhood of the third opening 249). The diameter of the center portion of the container 247 is made smaller to provide a space for the second shutter 253, correspondingly. On the other hand, in the end portion side of the container 247 is large to provide a large volume for accommodating of the toner.

Similarly to the container 247, the diameter of the second feeding member 246 (sheet 246*b*) is different depending on the position. As described hereinbefore, the diameter of the second feeding portion 246 in the axial direction the portion is larger than the diameter in the central portion of the second feeding member 246 (neighborhood of third opening 249).

(Shutter Closing Operation)

Referring to FIG. 46, 47, 48, the closing operations of the first shutter 237 of the developing unit D and the second shutter 253 of the toner cartridge E will be described.

FIG. 46 illustrates the neighborhood of the projection 245 of the container 247 when the second shutter 253 of the toner cartridge E is closed, part (a) of FIG. 46 is a sectional view as seen from the non-driving side, and part (b) of FIG. 46 is an enlarged sectional view of the neighborhood of the projection 245 of the container 247.

FIG. 47 illustrates a state of the snap fit portion 271 of the second shutter 253 at the time when the second shutter 253 of the toner cartridge E is closed. Part (a) of FIG. 47 is an enlarged view illustrating a relationship between the snap fit portion 271 of the second shutter 253 and the shutter holding portion 263 with respect to the longitudinal direction. Part (b) of FIG. 47 is a sectional view as seen from the non-driving side showing a positional relationship between the snap fit portion 271 of the second shutter 253 and the shutter holding portion 263 with respect to the rotational direction of the toner cartridge E. Part (c) of FIG. 47 is an enlarged view illustrating a projection 71*b* of the snap fit portion 271 of the second shutter 253 and the locking hole of the shutter holding portion 263.

FIG. 48 illustrates the process of closing of the second shutter 253 of the toner cartridge E. Part (a) of FIG. 48 shows a neighborhood output of the snap fit portion 271 in the state in which the second shutter 253 of the toner cartridge E is opened. Part (b) of FIG. 48 illustrates a neighborhood of the snap fit portion 271 in the state in which the second shutter 253 of the toner cartridge E is closed. Part (c) of FIG. 48 is a sectional view as seen from the non-driving side in the state shown in part (a) of FIG. 48, and part (d) of FIG. 48 is a sectional view as seen from the non-driving side in the state shown in part (b) of FIG. 48.

The closing operations of the first shutter 37 and the second shutter 253 are the opposite to those of the opening operations. The closing direction of the first shutter 237 and the second shutter 253 is the opposite to that in the driving of the second feeding member 246 (arrow h direction in part (a) of FIG. 46, part (b) of FIG. 47, part (c) of FIG. 48 and part (d) of FIG. 48).

First, in the state shown in FIG. 46, the user grips the grip member 244 and rotates the container 247 in the closing direction (arrow h direction). Dan, the surface 245*b* of the projection 245 of the container 247 abuts to the surface 237*a*2 of the hole portion 237*a* of the first shutter 237. By this, the first shutter 237 receive a force F18 from the surface 237*a*2 to rotate in interrelation with the container 247 to close the second opening 230.

At this time, as shown in part (a) of FIG. 47, the positions of the projection 271*b* and the claw portion 271*a* of the snap fit portion 271 of the second shutter 253 overlap with the shutter holding portion 263 of the developing unit D in the longitudinal direction of the toner cartridge E. As shown in part (b) of FIG. 47, the claw portion 271*a* of the snap fit portion 271 is downstream (arrow e in FIG. 47) of the shutter holding portion 263 of the developing unit D with respect to the direction of opening the third opening 249 of the toner cartridge E.

Therefore, when the container 247 is rotated in the closing direction (arrow h), the claw portion 271*a* of the snap fit portion 271 of the second shutter 237 and the shutter holding portion 263 contact to each other in the container 247 closing direction (arrow h direction) (part (c) of FIG. 47).

In addition, the projection 271*b* of the second shutter 253 is engaged with the locking hole 63*a* of the shutter holding portion 263 (part (c) of FIG. 47). Therefore, the second shutter 253 is limited by the locking holding portion 262 in the container 247 closing direction (arrow h direction). With the rotation of the toner cartridge E in the arrow h direction, the second shutter 253 moves relative to the container 247. By this, the second shutter 253 closes the third opening 249 (FIG. 38 (from part (c) of FIG. 48 to part (d) of FIG. 48)).

More particularly, the claw portion 271*a* projects at least in the radially outward direction (outward with respect to rotation radius direction) of the second shutter 253. By this, when the container 247 rotates, the claw portion 271*a* contacts (engages) to the shutter holding portion 263. The claw portion 271*a* is the engaging portion (closing force receiving portion) for receiving the force for moving the second shutter 253 from the shutter holding portion 263 to the closing position. The movement of the second shutter 253 is limited when the container 247 rotates by the force received from the shutter holding portion 263 by the claw portion 271*a*. In other words, by the force received by the claw portion 271*a*, the second shutter 253 rotates relative to the container 247 from the opening position to the closing position.

In addition, the projection 271*b* projects at least toward an upstream side in the direction of arrow e (rotational moving direction of the second shutter 253 relative to the container 247 from the opening position to the closing position). By this, the projection 271*b* can be kept in engagement with the locking hole 263*a* when the second shutter 253 rotates from the opening position to the closing position. By the projection 271*b* engaging with the locking hole 263*a*, the engagement state (contact state) between the claw portion 271*a* and the shutter holding portion 263 is kept.

That is, the projection 271*b* is an engaging portion (second engaging portion) engageable with the locking hole 263*a*, and an engagement maintaining portion for maintaining the engagement state between the claw portion 271*a* and the shutter holding portion 263. The projection 271*b* is smaller than the claw portion 271*a*. More particularly, a height of the projection 271*b* (measured along the direction in which the projection 271*b* projects) is smaller than a height of the claw portion 271*a* (measured along the direction in which the claw portion 271*a* projects). In this embodiment, the height of the claw portion 271*a* is 5.6 mm, and the height of the projection 271*b* is 0.3 mm. The height of the projection 271*b* is preferably not less than 0.1 mm and not more than 0.5 mm.

As shown in part (a) of FIG. 48 and part (b) of FIG. 48, the first regulated surface 271*d* or the second regulated surface 271*e* of the second shutter 253 contacts a corner portion 247*h* and the first regulation surface 247*d* of the container 247 until the third opening 249 is closed. By this, the position, with respect to the longitudinal direction of the snap fit portion 271, of the first regulated surface 271*d* or the second regulated surface 271*e* of the second shutter 253 is maintained. The first regulation surface 247*d* is the engaging position holding portion for holding the claw portion 271*a* and the projection 271*b* in the engaging positions.

When the toner cartridge E further rotates after closing the third opening 249, the third regulated surface 271*f* of the snap fit portion 271 abuts to the second regulation surface 247*e*. The third regulated surface 271*f* of the snap fit portion 271 receives a longitudinally outward force F17 from the second regulation surface 247*e* of the container 247. At this time, the second regulated surface 271*e* is out of contact from the first regulation surface 247*d* of the container 247. The claw portion 271*a* and the projection 271*b* of the snap fit portion 271 is disengaged in the longitudinally outwardly direction relative to the shutter holding portion 263 by the force F17 (arrow r6 in part (b) of FIG. 48). As a result, the positions of the claw portion 271*a* and the projection 271*b* of the snap fit portion 271 of the second shutter 253 is placed in the same position as before the mounting, relative to the shutter holding portion 263 of the developing unit D (the state of FIG. 42). In this state, the positioning of the toner cartridge E to the developing unit D is released, so that toner cartridge E becomes able to be dismounted.

The second regulation surface 247*e* is a moving portion (retracted position moving portion) for moving the claw portion 271*a* and the projection 271*b* in the longitudinally outwardly direction (axially outward direction). When the second shutter 253 moved to the closing position (when the toner cartridge E is rotated to dismount it), the second regulation surface 247*e* urges the third regulated surface 271*f*. By the force applied to the third regulated surface 271*f* from the second regulation surface 247*e*, the claw portion 271*a* is moved to the retracted position in which the engagement with the shutter holding portion 263 is released. Similarly, the projection 271*b* is moved to the retracted position for releasing from the locking hole 263*a*.

The second regulation surface 247*e* as the guide portion for guiding the engaging portion (claw portion 271*a*, projection 271*b*) from the engaging position to the retracted position, and is the urging portion (pressing portion) for urging or pressing the claw portion 271*a* and the projection 271*b* toward the retracted position through the third regulated surface 271*f*.

The second regulation surface 247*b* urges the engaging portion by contacting the arm portion 271*c* supporting the engaging portion (claw portion 271*a*, projection 271*b*) to the third regulated surface 271*f* However, the second regulation surface 247*b* may contact directory to the engaging portion (claw portion 271*a*, projection 271*b*).

The engaging portion (claw portion 271*a*, projection 271*b*) is moved by the second regulation surface 247*b* axially outwardly by not less than 1.3 mm. That is, the movement distance (movement distance) at the time when the engaging portion moves to the retracted position by the second regulation surface 247*b* is not less than 1.3 mm as measured along the axial direction. By this, the projection 271*b* is assuredly disengaged from the locking hole 263*a*.

The second regulation surface 247*e* is retracted position holding portion for holding the engaging portion in the retracted position. The second regulation surface 247*e* limits the movement of the engaging portion (271*a*, projection 271*b*) to the engaging position. When the toner cartridge E is inserted into or taken out of the developing unit D substantially linearly, the engaging portion is held in the retracted position, and therefore, the engaging portion does not obstruct such operation of the toner cartridge.

When the claw portion 271*a* and the projection 271*b* moved to the retracted position, an elastic force of the snap fit 271 (arm portion 271*c*) is used as well. That is, in the process of movement of the second shutter 253 from the opening position to the closing position, the snap fit portion 271 departs from the first regulation surface 247*d*. Then, the elastically deformed snap fit portion 271 (arm portion 271*c*) tends to restore. By the motion of the snap fit 271 (elastic force) at this time, the claw portion 271*a* and the projection 271*b* moved to the retracted positions.

That is, without the second regulation surface 247*e*, the claw portion 271*a* and the projection 271*b* may be movable to the retracted position by the elastic force of the snap fit portion 271 (arm portion 271*c*).

However, if the second shutter 253 is in the opening position, and the snap fit portion 271 is kept deformed for a long-term by the first regulation surface 247*d*, the snap fit portion 271 may plastically deforms. In such a case, the elastic force of the snap fit portion 271 is so small that the claw portion 271*a* and the projection 271*b* cannot be moved to the retracted position. In view of this, in this embodiment, the retracted position moving portion (second regulation surface 247*e*) for moving the claw portion 271*a* and the projection 271*b* to the retracted position by acting on the snap fit portion 271, so that the claw portion 271*a* and the projection 271*b* are assuredly moved to the retracted position.

Nevertheless, the retracted position moving portion (second regulation surface 247*e*) may be omitted if the elastic force of the arm portion 271*c* (supporting portion, connecting portion) supporting the claw portion 271*a* and/or the projection 271*b* can be assured.

For example, using a metal leaf spring or the like for the arm portion 271*c*, the arm portion 271*c* does not easily deform plastically and can maintain the elastic force. Therefore, without the retracted position moving portion (second regulation surface 247*e*), the claw portion 271*a* and the projection 271*b* can be moved to the retracted position.

Alternatively, an additional elastic member (elastic portion) may be provided without providing the supporting portion (arm portion 271*c*) itself with an elasticity. For example, a supporting portion (arm portion) is rotatably mounted on the main body portion 253*m* of the shutter using a shaft. Then, it would be considered that a twist spring (elastic member, elastic portion seven is provided on the shaft to urge the supporting portion to the retracted position. Without deformation of the supporting portion per se, the engaging portion (claw portion 271*a*, projection 271*b*) is movable by rotation of the supporting portion. In addition, the engaging portion is movable from the engaging position to the retracted position by the elastic force of the twist spring.

With the above-described structure of the second shutter 253, although the toner cartridge is mounted to the developing unit by the mounting and dismounting operation including the rotation, the shutters of them can be assuredly opened and closed.

As described in the foregoing, in this embodiment, by the opening and closing operation of the second shutter, the claw portion 271*a* and the projection 271*b* are moved relative to the main body portion 253*m* of the shutter in the longitudinal direction of the container frame 247 *g* (rotational axis direction, center axis direction). Thus, the claw portion 271*a* and the projection 271*b* are movable between the engaging positions and the retracted positions. However, this does not mean that the claw portion 271*a* and the projection 271*b* move only in the longitudinal direction of the container frame. That is, the moving directions of the claw portion 271*a* and the projection 271*b* are not limited to the parallel directions with the longitudinal direction.

When the claw portion 271*a* and the projection 271*b* move in the longitudinal direction, there may move also in the radial direction of the container frame 247 *g* and/or in the circumferential direction of the container frame as well.

In this embodiment, the claw portion 271*a* and the projection 271*b* move in the circumferential direction as well relative to the main body portion of the shutter, when they move to between the retracted position and the engaging position. More particularly, the claw portion 271*a* and the projection 271*b* move toward the trailing end of the second shutter 253 when they move from the retracted position to the engaging position.

In this embodiment, the engaging position moving portion (first regulation surface 247*d*) for moving the engaging portion (claw portion 271*a* and projection 271*b*) of the second shutter 253 to the engaging position is a surface formed by the projection (projection) of the container 274. Similarly, the retracted position moving portion (second regulation surface 247*e*) for moving the engaging portion (claw portion 271*a* and projection 271*b*) to the retracted position is a projection (projection) of the container 274.

However, the engaging position moving portion (first regulation surface 247*d*) and/or the retracted position moving portion (second regulation surface 247*e*) may be a recess (groove) provided on the container 274. For example, it would be considered that the snap fit portion 271 is provided in the groove (recess) formed on the container 247, and the engaging portion (claw portion 271*a* and/or projection 271*b*) is moved to the retracted position and/or the engaging position along the groove.

Embodiment 5

In this embodiment, the structure for improving the reliability of opening and closing of the shutter provided on the developing unit D is employed.

In the description of this embodiment, the same reference numerals as in the foregoing Embodiments are assigned to the elements having the corresponding functions in this embodiment, and the detailed description thereof is omitted for simplicity. In the drawings, a part of the shape or elements is omitted for simplicity of explanation. The dimensions, the materials, the configurations, the relative positions of the elements in this embodiment may be properly modified depending on the structure and/or various conditions of the apparatus. Therefore, the present invention is not limited to the specific structures in this embodiment.

§ 1. [Guiding Portion]

In this embodiment, the side of the toner cartridge E provided with a second drive transmitting portion 348 is called driving side, and in the other side is called non-driving side. An insertion-guided portion provided on the driving side is called insertion-guided portion (drive) 343. An insertion-guided portion provided on the non-driving side is called insertion-guided portion (non) 342.

In addition, an insertion-guiding portion provided on the driving side is called insertion-guiding portion (drive) 336*d*. An insertion-guiding portion provided on the non-driving side is called insertion-guiding portion (non) 335*d*.

Referring to FIGS. 49, 50, 51, the major parts will be described. FIG. 49 is a perspective view before the toner cartridge E is mounted to the developing unit D in this embodiment. FIG. 50 is a sectional view of a neighborhood of the second opening 330 of the developing unit D. Part (a) of FIG. 50 is a sectional view as seen from a driving side, and part (b) of FIG. 50 is a sectional view as seen from a non-driving side. In this embodiment, a longitudinal direction of the developing unit D is a direction parallel with an axial direction of a developing roller 324 of the developing unit D. FIG. 51 is a perspective view of the toner cartridge E, parts (a) of FIG. 51 is a perspective view as seen from the second drive transmitting portion 348, and part (b) of FIG. 51 is a perspective view as seen from the opposite side.

As shown in FIGS. 49, 50, 51, an inserting direction f of the toner cartridge E into the developing unit D is a linear direction along the insertion-guiding portion (drive) 336*d* and the insertion-guiding portion (non) 335*d*, in this embodiment. The inserting direction fin this embodiment is substantially the same in direction (J direction in FIG. 51) on which the projection 345 provided on the container 347 of the toner cartridge E projects from the container 347 as seen in the direction of a section. This is because projection 345 of the container 347 is required to engage with a hole portion 337*a* of a first shutter 337 when the toner cartridge E is inserted into the developing unit D to a predetermined mounting position.

As regards the detailed structures of the projection 345 of the container 347, the description in the foregoing embodiments apply, and therefore, the detailed description thereof is omitted.

However, repeating the description, the insertion-guided portion (non) 342 is provided with an abutting portion 342*a* which abuts to the abutted portion 335*a* (part (b) of FIG. 50) of the developing unit D in the insertion of the toner cartridge E. The insertion-guided portion (non) 342 includes a rotation-guided portion 342*b* for guiding a container frame 347*a* when the first shutter 337 (FIG. 49) and the second shutter 353 (part (a) of FIG. 51) are opened and closed. The insertion-guided portion (non) 342 includes regulated portions (to be regulated) (regulated surfaces) 342*c*1, 342*c*2 for regulating the insertion attitude and the moving direction of the toner cartridge E in the inserting operation.

The insertion-guided portion (drive) 343 is provided at the end portion of the second drive transmitting portion 348 with respect to the longitudinal direction of the toner cartridge E, but it may be provided on the container 347. Furthermore, the insertion-guided portion (drive) 343 is provided with an abutting portion 343*a* which abuts to an abutted portion 336*a* of the developing unit D in the insertion of the toner cartridge E. The insertion-guided portion (drive) 343 also functions as the rotation-guided portion for guiding the rotation of the container frame 347*a* when the abutting portion 343*a* opens and closes the first shutter 337 and the second shutter 353.

In this embodiment, in the insertion-guided portion (non) 342, the abutting portion 342*a*, a rotation-guided portion 342*b*, a regulating portion 342*c*1 and the regulating portion 342*c*2 is integral with the insertion-guided portion (non) 342*b*. However, they may be separate members if the functions of them are performed.

(Relationship Between Insertion-Guided Portion (Drive) and Insertion-Guiding Portion (Drive))

Referring first to FIG. 52, 53, the description will be made as to the relationship between the insertion-guided portion (drive) 343 and the insertion-guiding portion (drive) 336*d* in this embodiment. FIG. 52 is a longitudinal sectional view of a neighborhood of the insertion-guided portion (drive) 343 and the insertion-guiding portion (drive) 336*d* in this embodiment.

FIG. 53 is a sectional view illustrating configurations of the insertion-guided portion (drive) 343 and the insertion-guiding portion (drive) 336*d* of another type.

In this embodiment, the configuration of the insertion-guided portion (drive) 343 is cylindrical. The insertion-guided portion (drive) 343 has a diameter of D1. A width of the insertion-guiding portion (drive) 336*d* (measured in a direction crossing with the inserting direction f of the toner cartridge E) is as follows. In partway of insertion of the toner cartridge E into the developing unit D, the width of the insertion-guiding portion (drive) is w9, and after completion of the mounting of the toner cartridge E, the width of the insertion-guiding portion (drive) is w10.

The insertion-guided portion (drive) seven functions to guide the insertion of the toner cartridge E into the developing unit D. The insertion-guided portion (drive) 343 is integral with the second drive transmitting portion 348, and when the drive transmission is carried out after the completion of the insertion of the toner cartridge E, the insertion-guiding portion (drive) 343 rotates integrally with the second drive transmitting portion 348. Therefore, it is necessary that the insertion-guided portion (drive) 343 functions as the insertion guide in the inserting process of the toner cartridge E in cooperation with the insertion-guiding portion (drive), and is rotatable when the driving force is transmitted to the second drive transmitting portion 348 after the completion of the insertion. Therefore, in this embodiment, the configuration of the insertion-guiding portion (drive) 336*d* is such that the width is in the process of insertion of the toner cartridge E into the developing unit D and the width w10 after the completion of the mounting of the same, and D1<w9=w10 is satisfied.

In this embodiment, the configuration of the insertion-guided portion (drive) 343 is cylindrical, but this is not limiting, and the configuration shown in FIG. 53 is usable. The configuration of the insertion-guided portion (drive) 343 shown in FIG. 53 is such that the dimension of the toner cartridge E in the inserting direction f (direction in which the projection 345 projects from the container 347, FIG. 50) is smaller than that in the widthwise direction of the insertion-guiding portion (drive) 336*d*. A width of the insertion-guided portion (drive) 343 in the inserting direction f is w12, and a width of the insertion-guided portion (drive) 343 in the widthwise direction of the insertion-guided portion (drive) 336*d* is w13, and then w12<w13 is satisfied. With such configuration, the insertion-guided portion (drive) 343 functions as the insertion guide in the insertion process of the toner cartridge E in cooperation with the insertion-guiding portion (drive) 336*d*, and is rotatable when the driving force is transmitted to the second drive transmitting portion 348 after the completion of the insertion.

(Relationship Between Insertion-Guided Portion (Non) and the Insertion-Guiding Portion (Non))

Referring to FIG. 54, the relationship between the insertion-guided portion (non) 342 and the insertion-guiding portion (non) 335*d* will be described. FIG. 54 is a longitudinal sectional view illustrating the neighborhood of the insertion-guided portion (non) 342 and the insertion-guiding portion (non) 335*d* in this embodiment.

In this embodiment, the insertion-guided portion (non) 342 has a long side in the mounting direction f A length of the long side of the insertion-guided portion (non) 342 in the mounting direction f is w16, and a width of the insertion-guided portion (non) 342 in the widthwise direction of the insertion-guiding portion (non) 335*d* is w17, and then w16>w17 is satisfied. A width of the insertion guide (non) 335*d* in partway of the insertion of the toner cartridge E into the developing unit D is w14, and then w17<w14 is satisfied. In addition, a width of the rotation guide portion (non) 335*b* for guiding the rotation of the toner cartridge E when the first shutter 337 (FIG. 49) and the second shutter 353 (FIG. 51) are opened and closed is w15, and then w16<w15 is satisfied. By satisfying these, the regulated portions (regulated surfaces) 342*c*1, 342*c*2 which are long side portions of the insertion-guided portion (non) 342 extending in the mounting direction f regulate the insertion attitude and the moving direction of the toner cartridge E along the width of the insertion guide (non) 335*d*. Similarly to the foregoing embodiments, the mounting operation of the toner cartridge E can be carried out.

§ 2. [Guide Configuration of End Portion of Toner Cartridge]

A projection (portion-to-be-guided) provided at the end portion of the toner cartridge E will be described in detail. A projection (releasing projection) projecting codirectionally with the mounting direction from a peripheral surface of the toner cartridge E will be described as well.

(Relationship Between Insertion-Guided Portion (Drive) 343 and Insertion-Guided Portion (Non) 342)

Referring to FIG. 55, the relationship between the insertion-guided portion (drive) 343 and the insertion-guided portion (non) 342 will be described. FIG. 55 illustrates the state in which the positions of the toner cartridge E and the developing unit D in the longitudinal direction are correct.

A projecting length of the insertion-guided portion (drive) 343 measured in the longitudinal direction of the toner cartridge from a driving side end surface of the second drive transmitting portion 348 is w18 (length w18 of insertion-guided portion (drive) 343). A depth of the insertion-guiding portion (drive) 336*d* measured in the longitudinal direction of the toner cartridge is w19 (depth w19 insertion-guiding portion (drive) 336*d*).

Similarly, a projecting length of the insertion-guided portion (non) 342 measured in the longitudinal direction of the toner cartridge from the non-driving side end portion of the container 347 is w20 (length w20) of insertion-guided portion (non) 342. A depth of the insertion-guiding portion (drive) 336*d* measured in the longitudinal direction of the toner cartridge is w21 (depth w21) of insertion-guiding portion (non) 335*d*).

In this embodiment, the length w18 of the insertion-guided portion (drive) 343 is such that the insertion-guided portion) 343 can fit the insertion-guiding portion (drive) 336*d* having the depth w19 within the range of the tolerances. More particularly, the length w18 of the insertion-guided portion (drive) 343 is slightly smaller than the depth w19 of the insertion-guiding portion (drive) 336*d*. The length w20 of the insertion-guided portion (non) 342 is such that the insertion-guided portion) 342 can fit the insertion-guiding portion (non) 335*d* having the depth w21 within the range of the tolerances. More particularly, the length w20 of the insertion-guided portion (non) 342 is slightly smaller than the depth w21 of the insertion-guiding portion (non) 335*d*. The length w18 of the insertion-guided portion (drive)

343 and the length w20 of the insertion-guided portion (non) 342 are different from each other. Correspondingly, depth w19 of the insertion-guiding portion (drive) 336*d* and the depth w21 of the insertion-guiding portion (non) 335*d* are made different from each other. This is in order to prevent the user from mounting the toner cartridge E to the developing unit D with wrong orientation of the driving side and the non-driving side, when the user mounts the toner cartridge E to the. In this embodiment, the length w18 of the insertion-guided portion (drive) 343 is larger than the length w20 of the insertion-guided portion (non) 342. Correspondingly, the depth w19 of the insertion-guiding portion (drive) 336*d* is larger than the depth w21 of the insertion-guiding portion (non) 335*d*.

In this manner, the configurations and the mutual relationships of the insertion-guided portion (drive) 343, the insertion-guiding portion (drive) 336*d*, the insertion-guided portion (non) 342 and the insertion-guiding portion (non) 335*d* are adjusted. By this, the mounting property of the toner cartridge E into the developing unit D can be improved.

Embodiment 6

In this embodiment, the structures of the second shutter 253 and so on of Embodiment 4 are partly changed in the toner cartridge E. In the description of this embodiment, the same reference numerals as in Embodiment 4 are assigned to the elements having the corresponding functions in this embodiment, and the detailed description thereof is omitted for simplicity.

As regards another structure of the toner cartridge E, the description may be omitted for the parts similar to those of the foregoing embodiments, by using the same part terms.

Parts (a), (b) and (c) of FIG. 56 illustrate the state in which the second shutter is in the closing position. At (a), (b) and (c) of FIG. 57 illustrates the state in which the second shutter is in the opening position.

In this embodiment, a third opening 249 can be opened and closed by moving a second shutter 553 relative to the container 547. For the second shutter 553, a snap fit portion (supporting portion, connecting portion, and elastic portion) 571 is connected with the main body portion 553*m* of the shutter. The snap fit portion 571 is provided at a free end with a claw portion (first engaging portion, first projection) 571*a*, and the claw portion 571*a* is provided with a projection (second engaging portion, second projection) 571*b*. The claw portion 571*a* and the projection 571*b* constitute an engaging portion for engagement with the receiving device (developing unit D).

In this embodiment, when the engaging portion (claw portion 571*a* and projection 571*b*) is in a retracted position, an arm portion of the snap fit portion 571 is deformed. That is, as shown in parts (a), (b) and (c), when the second shutter 553 is moved from the opening position to the closing position, a regulated surface 571*f* of the snap fit portion 571 contacts a regulation surface 547*e*. By this, the snap fit portion 571 receives a force from the regulation surface 547*e* to deform outwardly with respect to the axial direction. By this, the engaging portion (claw portion 571*a* and projection 571*b*) is moved to the retracted position. In the state that the second shutter 553 is in the opening position, the engaging portion (claw portion 571*a* and projection 571*b*) is held in the retracted position by the contact between the regulation surface 571*j* (retracted position holding portion) and the snap fit portion 571.

On the other hand, when the second shutter is opened as shown in parts (a), (b) and (c), the snap fit portion 571 departs from the regulation surface 547*e* to restore (spontaneous state). As a result, the engaging portion (claw portion 571*a* and projection 571*b*) moves to the engaging position. That is, by the elastic force of the snap fit portion 571, the engaging portion moves inwardly with respect to the axial direction. By this, the claw portion 571*a* engages with the shutter holding portion 263, and the projection 571*b* is engaged with a locking hole 263*a*.

In this embodiment, too, the engaging position moving portion for moving the engaging portion to the engaging position and/or the engaging position holding portion for holding the engaging portion in the engaging position may be provided on the container 547 (first regulation surface 247*d* of Embodiment 4).

In this embodiment, the supporting portion (arm portion of snap fit portion 571) supporting the engaging portion has an elastic portion. That is, the engaging portion (claw portion 571*a*, projection 571*b*) is moved by the elastic force of the supporting portion (snap fit portion 571) per se. However, it is not inevitable that the supporting portion per se has the elastic portion.

For example, using a shaft, a supporting portion (supporting member, arm portion) for supporting the engaging portion (claw portion 571*a*, projection 571*b*) is rotatably mounted on the main body portion 553*m* of the shutter. It would be considered that a twist spring (elastic member, elastic portion) is provided on the shaft, and by the force of the twist spring, the supporting portion is urged to the engaging position. With such a structure, even though the supporting portion per se does not deform, the engaging portion (claw portion 571*a*, projection 571*b*) is movable by the rotation of the supporting portion. The engaging portion is movable from the retracted position to the engaging position by the elastic force of the twist spring.

Or, it would be considered that the supporting portion is slidable relative to the main body portion 553 of the shutter, and the supporting portion is urged to the engaging position by a coil spring (elastic member). With such a structure, even though the supporting portion per se does not deform, the engaging portion is movable by the sliding of the supporting portion.

The structure in which the movable supporting portion (supporting member) is urged by the elastic portion (elastic member) will be described in Embodiment 7.

Embodiment 7

In this embodiment, the structures of the second shutter 253 and so on of Embodiment 4 are partly changed in the toner cartridge E. In Embodiment 4 or the like, the supporting portion (arm portion 271*c*) per se supporting the engaging portion (claw portion 271*a*, projection 271*b* or the like) of the second shutter is the elastic portion. In the present embodiment, a separate elastic member (elastic portion) is provided in addition to the supporting portion (supporting portion). The supporting portion is supported movably.

The structures of the parts other than the toner cartridge E are similar to those of Embodiment 4, and therefore, the description is omitted. As regards another structure of the toner cartridge E, the description may be omitted for the parts similar to those of the foregoing embodiments, by using the same part terms. In the drawings, a part of the shape or elements is omitted for simplicity of explanation. The dimensions, the materials, the configurations, the relative positions of the elements in this embodiment may be properly modified depending on the structure and/or various conditions of the apparatus. Therefore, the present invention is not limited to the specific structures in this embodiment.

Parts (a), (b) and (c) of FIG. 58 is an illustration of a second shutter in this embodiment. FIG. 59 is an illustration of an engaging portion (engageable member) provided on the second shutter.

Parts (a) and (b) of FIG. 60 and parts (a) and (b) of FIG. 61 illustrates the state in which the second shutter is in a closing position. Parts (a) and (b) of FIG. 62 and parts (a) and (b) of FIG. 63 illustrate the state in which the second shutter is in an opening position.

In this embodiment, a third opening 249 can be opened and closed by moving the second shutter (open/close member) 653 relative to the container 647.

A second shutter 653 comprises a main body portion (closing portion) 653*m*, the engageable member the (supporting portion, supporting member) 671, an arm portion 672, coil spring 675 and so on. The arm portion 672 extends up from a lower end side of the main body portion 653*m* of the shutter toward the free end side, and the free end side of the arm portion 672 is provided with an engageable member 671 and a coil spring (pressing spring) 675 mounted thereto.

As shown in FIG. 59, the engageable member 671 includes a claw portion (first engaging portion) 671*a*, a projection (second engaging portion) 671*b*. The claw portion 671*a* and the projection 671*b* constitutes an engaging portion (open/close member side engaging portion) provided on the second shutter 653, and have the configuration to those of the claw portion 271*a* and the projection 271*b* in Embodiment 4. The claw portion 671*a* projects at least radially outwardly with respect to the radius of rotation of the second shutter 653. The projection 671*b* projects at least to a downstream side with respect to a moving direction of the second shutter 653 from the closing position to the opening position.

The portions of the engageable member 671 except for the engaging portion (claw portions 671*a*, 671*b*) are supporting portion supporting the engaging portion. The engageable member 671 functions also as a movable member (slidable member) slidable relative to the main body portion 653*m* of the shutter. The coil spring (elastic member, elastic portion) 675 is an urging portion for urging the engageable member 671. The coil spring 675 is mounted on a boss 671*h* provided on the engageable member 671 and press is a surface (portion-to-be-urged) 671*e* of the engageable member 671 to urge the engageable member 671 in a predetermined direction. In this embodiment, the engageable member 671 (claw portion 671*a*, projection 671*b*) is urged axially inwardly by the coil spring (elastic member, elastic portion) 675. In other words, the engaging portion (claw portion 671*a*, 671*b*) is urged toward the engaging position by the coil spring 675.

The urging portion may be an elastic member (elastic portion) other than a coil spring. For example, a leaf spring is usable. In this embodiment, the urging portion is a compression spring, but may be tension spring with different arrangement of the urging portion relative to the engageable member 671. That is, using a tension force of a coil spring applied to the engageable member 671, the engaging portion can be urged to the engaging position.

As shown in parts (a) and (b) of FIG. 60 and parts (a) and (b) of FIG. 61, when the second shutter 653 is in the closing position, the engageable member 671 is in contact with the regulation surface, so that the movement is limited. That is, the engaging portion (claw portion 671*a*, projection 671*b*) is urged toward the engaging position by the coil spring 675, but it is held at the retracted position by a regulation surface 647*j* provided on the container 647. The regulation surface 647*j* is a retracted position holding portion for holding the engaging portion in the retracted position against the coil spring 675.

When the second shutter 653 is in the closing position, the claw portion 671*a* does not engage with the shutter holding portion, and the projection 671*b* is not engaged with a locking hole, either.

In this state, the container 647 is rotated in the direction indicated by an arrow e in part (b) of FIG. 61. Then, the second shutter 653 rotates in the direction of an arrow h relative to the container 647. As a result, as shown in parts (a) and (b) of FIG. 62 and parts (a) and (b) FIG. 63, the second shutter 653 is in the opening position, so that the third opening (discharge opening) is opened.

With the movement of the second shutter 653 from the closing position to the opening position, the regulation surface 647*j* and the regulation surface 647*e* depart from the engageable member 671 (regulated surfaces 671*f*, 671*k*). Then, the engageable member 671 (claw portion 671*a*, projection 671*b*) is moved axially inwardly to the engaging position by the force of the coil spring 675. That is, the claw portion 671*a* is in the position engageable with the shutter holding portion 263, and the projection 671*b* is in the position engageable with the locking hole 263*a*.

Coil spring 675 is an engaging position moving portion provided on the second shutter 653 for moving the claw portion 671*a* and the projection 671*b* to the engaging position.

It is supposed that the container 647 is rotated in the direction of the arrow e depicted in part (b) of FIG. 63 from the state in which the second shutter 653 is in the opening position. At this time, the claw portion 671*a* in the engaging position is engaged with the shutter holding portion 263, and the projection 671*b* in the engaging position is engaged with the locking hole 263*a*. As a result, the movement of the second shutter 653 is limited, and therefore, only the container 647 is rotated in the direction of the arrow e. In other words, the second shutter 653 rotates relative to the container 647 in the direction of the arrow h. That is, the second shutter 653 moves to the closing position using the forces received by the claw portion 671*a* and the projection 671*b* from the shutter holding portion 263*a*.

With the movement of the second shutter 653 to the opening position, the regulation surface 647*e* provided on the container contacts to the regulated surface 671*f* provided on the engageable member 671 (claw portion 671*a*). The regulation surface 647*e* is a surface (inclined portion) inclined relative to the moving direction (rotational moving direction) of the second shutter 653. Therefore, the engageable member 671 contacts with the regulation surface 647*e* to move axially outwardly on the regulation surface 647*e*. In other words, the engageable member 671 (claw portion 671*a*, projection 671*b*) moves toward the retracted position against the elastic force of the coil spring 675, by the force received from the regulation surface 647*e*.

As a result, the projection 671*b* is disengaged from the locking hole 263*a*, and the claw portion 671*a* thereof is disengaged from the shutter holding portion 263.

The regulation surface 647*e* is the retracted position moving portion for moving the engaging portion (claw portion 671*a*, projection 671*b*) provided on the second shutter 653 toward the retracted position. The regulation surface 647*e* is the surface provided by a protrusion (projection) provided on the container 647. On the other hand, the container 647 may be provided with a recess (groove, for example), by means of which the regulation surface 647*e* is provided.

In addition, in this embodiment, the engaging portion is moved toward the engaging position by the elastic portion (coil spring, elastic member) provided on the second shutter 653, and the engaging portion is moved to the retracted position by the regulation surface (retracted position moving portion) provided on the container.

However, to the contrary, the engaging portion is moved to the retracted position by an elastic member (coil spring or the like) provided on the second shutter 653, and the engaging portion is moved to the engaging position by a regulation surface (engaging position moving portion) provided on the container. That is, the elastic member (coil spring or the like) of this embodiment may be applied to above-described Embodiment 6.

INDUSTRIAL APPLICABILITY

According to the present invention, a toner cartridge detachably mountable to an image forming apparatus is provided.

REFERENCE NUMERALS

30: second opening
43: insertion-guided portion
43*a*, abutting portion
43: rotation-guided portion
44: grip member
44*a*: fixed portion
44*b*: operating portion
53: second shutter
53*a*: snap fit portion
53*b*: claw portion
53*c*: leading side surface
54: second sealing seal
58: communicating portion
61: first locking arm
61*a*: claw portion
62: release claw
63: shutter holding portion
64: stirring shaft seal

The invention claimed is:

1. A toner cartridge comprising:

a frame having a toner accommodating portion configured to accommodate toner, the toner accommodating portion having an opening portion through which the toner is discharged to outside of the toner cartridge;

a toner conveying member provided in the toner accommodating portion and configured to rotate about a rotational axis, the toner conveying member including (i) a rotating shaft and (ii) a sheet having (ii-i) a first end portion in an orthogonal direction orthogonal to the rotational axis and (ii-ii) a second end portion opposite to the first end portion in the orthogonal direction, the first end portion of the sheet being fixed to the rotating shaft, the second end portion of the sheet being a free end portion and configured to contact an inner surface of a wall constituting the toner accommodating portion;

a shutter movable with respect to the frame between a closed position in which the shutter is closed to cover the opening portion and an open position in which the shutter is opened to expose the opening portion; and a portion-to-be-guided protruding from an end surface of the toner cartridge in a direction of the rotational axis, the portion-to-be-guided having a substantially rectangular shape with short sides and long sides when viewed in the direction of the rotational axis, wherein the portion-to-be-guided is provided such that the rotational axis is located at a center portion of the portion-to-be-guided in a long sides direction of the portion-to-be-guided when viewed in the direction of the rotational axis.

2. The toner cartridge according to claim 1, wherein the shutter is configured to rotate between the closed position and the open position, and wherein the second end portion of the sheet is bent along the inner surface of the wall in a direction opposite to a rotational direction of the shutter from the closed position to the open position by contacting the inner surface of the wall.

3. The toner cartridge according to claim 1, further comprising a gear configured to transmit a driving force to the toner conveying member and to rotate about the sheet together with the rotating shaft.

4. The toner cartridge according to claim 1, wherein, when viewed in the direction of the rotational axis, the short sides of the portion-to-be-guided have round shape.

5. The toner cartridge according to claim 4, wherein, when viewed in the direction of the rotational axis, the long sides of the portion-to-be-guided have straight shape.

6. The toner cartridge according to claim 1, wherein the toner cartridge is configured to be attached to a developing unit with the portion-to-be-guided guided by a guiding portion of the developing unit.

7. The toner cartridge according to claim 6, wherein the toner cartridge is configured to rotate with respect to the developing unit about the rotational axis with the portion-to-be-guided guided by the guiding portion of the developing unit while the toner cartridge is being attached to the developing unit.

8. The toner cartridge according to claim 1, wherein the portion-to-be-guided is the outermost portion of the toner cartridge in the direction of the rotational axis.

9. The toner cartridge according to claim 1, wherein the sheet has a plurality of notches which are arranged in the direction of the rotational axis and extend from an edge of the second end portion of the sheet toward the rotating shaft in a direction crossing the rotational axis.

* * * * *